US012580756B2

(12) United States Patent
Berta et al.

(10) Patent No.: US 12,580,756 B2
(45) Date of Patent: Mar. 17, 2026

(54) CRYPTOGRAPHIC SYSTEMS AND NON-DETERMINISTIC RANDOM NUMBER GENERATORS BASED ON QUANTUM SYSTEMS

(71) Applicant: Quantinuum Ltd, London (GB)

(72) Inventors: Mario Berta, Los Angeles, CA (US); Florian Curchod, Trumpington (GB); Cameron Foreman, Herne Bay (GB); Sherilyn Wright, London (GB); Alec Edgington, London (GB); Yui Chi Yeung, Cumnor (GB); Hyejung Jee, London (GB); Mafalda Ludovino Almeida, Cambridge (GB); Matthew Hoban, Oxford (GB); Elizabeth Lee, Hounslow (GB)

(73) Assignee: Quantinuum Ltd, London (GB)

( * ) Notice: Subject to any disclaimer, the term of this patent is extended or adjusted under 35 U.S.C. 154(b) by 274 days.

(21) Appl. No.: 18/180,835

(22) Filed: Mar. 8, 2023

(65) Prior Publication Data

US 2023/0291555 A1    Sep. 14, 2023

Related U.S. Application Data

(63) Continuation of application No. PCT/GB2021/052341, filed on Sep. 9, 2021.
(Continued)

(51) Int. Cl.
*H04L 9/08* (2006.01)
*G06F 7/58* (2006.01)

(52) U.S. Cl.
CPC ............ *H04L 9/0869* (2013.01); *G06F 7/588* (2013.01)

(58) Field of Classification Search
CPC .... H04L 9/0869; H04L 2209/26; G06F 7/588
See application file for complete search history.

(56) References Cited

U.S. PATENT DOCUMENTS 10,168,996 B1    1/2019  Reulet et al.
11,966,483 B2 *  4/2024  Choi ...................... G06F 7/588
(Continued)

FOREIGN PATENT DOCUMENTS

JP        2001-034584      2/2001
WO        WO 17/019507     2/2017
(Continued)

OTHER PUBLICATIONS

Acin et al., Aug. 1, 2017, Certified randomness in quantum physics, arXiv:1708.00265v1 [quant ph], 18 pages.
(Continued)

*Primary Examiner* — Phy Anh T Vu
(74) *Attorney, Agent, or Firm* — KNOBBE, MARTENS, OLSON & BEAR, LLP

(57)            ABSTRACT

This disclosure relates to protocols and systems for generating random bit strings by amplifying weak bit strings using certified quantum random bit strings generated by measuring a quantum state of entangled photons. Some disclosed systems include a quantum apparatus comprising one or more quantum systems configured to generate entangled photons and measure their quantum state. Certain disclosed systems include one or more security tests, wherein at least one security test evaluates the quantum nature of the measurements using a Bell inequality. A randomness extractor can amplify the randomness of weak random strings using random strings certified by the security tests. The generated random bit strings may be used as cryptographic keys.

41 Claims, 53 Drawing Sheets

Related U.S. Application Data

(60) Provisional application No. 63/078,152, filed on Sep. 14, 2020, provisional application No. 63/076,289, filed on Sep. 9, 2020.

(56) References Cited

U.S. PATENT DOCUMENTS

| | | | | |
|---|---|---|---|---|
| 12,088,704 | B1 * | 9/2024 | Stapleton | H04L 9/0841 |
| 2019/0250889 | A1 | 8/2019 | Brandao et al. | |
| 2023/0004661 | A1 * | 1/2023 | Choi | G06F 21/602 |
| 2023/0030316 | A1 * | 2/2023 | Pessl | G06F 21/75 |

FOREIGN PATENT DOCUMENTS

| | | | | |
|---|---|---|---|---|
| WO | WO-2019125733 | A1 * | 6/2019 | G06F 7/588 |
| WO | WO-2019200660 | A1 * | 10/2019 | H04L 9/0819 |
| WO | WO-2020257124 | A1 * | 12/2020 | H04L 9/0852 |
| WO | WO-2022053812 | A1 * | 3/2022 | H04L 9/0869 |
| WO | WO-2023108037 | A1 * | 6/2023 | H04L 9/088 |
| WO | WO-2023172998 | A1 * | 9/2023 | G06F 7/588 |
| WO | WO-2025059384 | A1 * | 3/2025 | G06F 7/588 |

OTHER PUBLICATIONS

Arnon-Friedman et al., 2016, Quantum-proof multi-source randomness extractors in the Markov model, Proceedings TQC, 61: pp. 1-34.

Arnon-Friedman et al., 2018, Practical device-independent quantum cryptography via entropy accumulation, Nature communication, 9(459):1-11.

Berta et al., May 4, 2017, Quantum-proof randomness extractors via operator space theory, arXiv:1409.3565v3, 34 pages.

Brandao et al., 2016, Realistic noise-tolerant randomness amplification using finite number of devices, Nature Communications, 7(11345):1-46.

Chen et al., Jul. 27, 2006, Experimental violation of Bell's inequality beyond tsirelson's bound, arXiv:quant-ph/0607194v1, 4 pages.

Chung et al., 2016, General randomness amplification with non-signaling security,https://ix.cs.uoregon.edu/ xiaodiwu /papers/ csw16.pdf, 38 pages.

Chung et al., May 29, 2014, Physical randomness extractors: generating random numbers with minimal assumptions, arXiv:1402.4797v2 [quant ph], 28 pages.

Colbeck et al., 2012, Free randomness can be amplified, Nature Physics, vol. 8: pp. 450-153.

De et al., Jun. 18, 2012, Trevisan's Extractor in the Presence of Quantum Side Information, arXiv:0912.5514v3 [quant ph], 30 pages.

Dodis et al., 2004, Improved randomness extraction from two independent sources, Lecture Notes in Computer Science, vol. 3122, DOI:10.1007/978-3-540-27821-4_30; pp. 334-344.

Dupuis et al., Jul. 6, 2016, Entropy accumulation, arXiv:1607.01796v1 [quant ph], 40 pages.

Foreman et al., Sep. 14, 2020, Practical randomness and privacy amplification, arXiv:2009.06551[v1][quant ph], 26 pages.

Gallego et al., Oct. 24, 2012, Full randomness from arbitrarily deterministic events, arXiv:1210.6514v1 [quant ph], 15 pages.

Gavinsky et al., Mar. 26, 2007, Exponential Separation for one-way Quantum Communication Complexity, with Applications to Cryptography, arXiv:quant-ph/0611209v2, 22 pages.

Gonzalez et al., May 22, 2020, Revisiting the experimental test of Mermin's inequalities at IBMQ, arXiv:2005.11271v1 [quant ph], 9 pages.

Greenberger et al., 1989, Going beyond Bell's theorem, in Bell's theorem, quantum theory and conceptions of the universe, Fundamental Theories in Physics book series (FTPH vol. 37), pp. 69-72.

Hayashi et al., Aug. 18, 2015, More efficient privacy amplification with less random seeds via dual universal hash function, arXiv:1311.5322v5 [quant ph], 33 pages.

Herrero-Collantes et al., Oct. 21, 2016, Quantum random number generators, arXiv:1604.03304v2 [quant ph], 54 pages.

Julsgaard et al., 2004, Experimental demonstration of quantum memory for light, Nature, 432(7016):482-486.

Kessler et a., Sep. 7, 2017, Device-independent randomness amplification and privatization, arXiv:1705.04148v2 [quant ph], 37 pages.

Li, 2016, Improved two-source extractors, and affine extractors for polylogarithmic entropy, in 2016 IEEE 57th Annual Symposium on Foundations of Computer Science (FOCS), pp. 168-177.

Li, Mar. 8, 2015, Three-source extractors for polylogarithmic min-entropy, arXiv:1503.02286v1 [quant ph], 31 pages.

Ma et al., Jun. 22, 2013, Postprocessing for quantum random-number generators: entropy evaluation and randomness extraction, arXiv:1207.1473v2 [quant ph], 13 pages.

Mauerer et al., Dec. 2, 2012, A modular framework for randomness extraction based on Trevisan's construction, arXiv:1212.0520v1 [cs.IT], 21 pages.

Mermin, Oct. 8, 1990, Extreme quantum entanglement in a superposition of macroscopically distinct states, Physical Review Letters, 65(15):1838-1840.

Portmann et al., Sep. 11, 2014, Cryptographic security of quantum key distribution, arXiv:1409.9525.3525f1 [quant ph], 58 pages.

Ramanathan et al., Apr. 23, 2015, Randomness amplification against no-signaling adversaries using two devices, arXiv:1504.06313, 14 pages.

Ramanathan et al., Oct. 27, 2018, Generic randomness amplification schemes using hardy paradoxes, arXiv:1810.11648v1 [quant ph], 23 pages.

Raz, 2004, Extractors with weak random seeds, Electronic Colloquium on Computational Complexity, Report No. 99, 34 pages.

Rukhin et al., 2001, A statistical test suite for random and pseudo-random number generators for cryptographic applications, NIST Special Publication 800-22, 169 pages.

Santha et al., 1986, Generating quasi-random sequences from semi-random sources, Journal of computer and system sciences, vol. 33: pp. 75-87.

Sivarajah et al., Apr. 24, 2020, t|ket>: A retargetable compiler for NISQ devices, arXiv:2003.10611v3 [quant-ph], 43 pages.

Stipcevic e al., 2014, True random number generators, in Open Problems in Mathematics and Computational Science, Springer, pp. 275-315.

Stipcevic, 2012, Quantum random number generators and their applications in cryptography, International Society for Optics and Photonics: Advanced Photon Counting Techniques VI, 8375:837504.

Trevisan, Jul. 2001, Extractors and Pseudorandom Generators, J. ACM, 48:860-879.

Vadhan, Oct. 16, 2007, The unified theory of pseudorandomness: guest col. ACM SIGACT News, 38(3): pp. 39-54.

Van Assche, 2006, Quantum cryptography and secret-key distillation, Cambridge University Press (TOC).

Wojewodka et al., Nov. 13, 2018, Amplifying the randomness of weak sources correlated with devices, arXiv:1601.06455v2 [quant ph], 38 pages.

Woodhead et al., Aug. 6, 2018, Randomness versus nonlocality in the merrnin-bell experiment with three parties, arXiv:1804.09733v2 [quant ph], 14 pages.

Y. Luo et al., Jun. 2021, Optimization of the Randomness Extraction Based on Toeplitz Matrix for High-Speed QRNG Post-Processing on GPU, 13th International Conference on Communication Software and Networks (ICCSN).

X. Zhang, Jun. 2016, FPGA implementation of Toeplitz hashing extractor for real time post-processing of raw random numbers, 2016 IEEE-NPSS Real Time Conference (RT).

M. Berta et al., Robust randomness generation on quantum computers, https://marioberta.info/wp-content/uploads/2021/07/randomness-theory.pdf, uploaded Aug. 31, 2021.

Colbeck et al., 2013, Free randomness can be amplified, arXiv:1105.3195v3: 12 pages.

Aaronson et al., Jun. 20-23, 2023, Certified Randomness from Quantum Supremacy, Theory of Computing (STOC '23), 12 pp.

Agresti et al., 2020, Experimental device-independent certified randomness generation with an instrumental causal structure, Communications Physics, 3:110.

(56) References Cited

OTHER PUBLICATIONS

Amer et al., Mar. 25, 2025, Applications of Certified Randomness, arXiv:2503.19759v1 [quant-ph], 15 pp.

Bosley et al., Nov. 28, 2006, Does Privacy Require True Randomness?, 18 pp.

Buller et al., Apr. 2023, Discussion on the Full Entropy Assumption of the SP 800-90 Series, NIST Interagency Report, NIST IR 8427, 19 pp.

Chung et al., Mar. 9, 2015, Physical randomness extractors: generating random numbers with minimal assumptions, arXiv:1402.4797v3 [quant ph], 21 pp.

Dodis et al., 2004, Randomness extraction and key derivation using the CBC, cascade and HMAC modes, Advanced in Cryptology—Crypto 2005, Lecture Notes in Computer Science, 3152:1-17.

Foreman et al., 2024, Statistical Testing of Random Number Generators and Their Improvement Using Randomness Extraction, Entropy, 26:1053, 33 pp.

Martin et al., Apr. 29, 2015, Quantum random number generation for 1.25 GHz quantum key distribution systems, arXiv:1504.07769v1 [quant-ph], 6 pp.

Miller et al. Jul. 29, 2016, Robust protocols for securely expanding randomness and distributing keys using untrusted quantum devices, arXiv:1402.0489v4 [quant-ph], 70 pp.

Mitchell et al., Jan. 13, 2015, Strong experimental guarantees in ultrafast quantum random number generation, arXiv:1501.02950v1 [quant-ph], 11 pp.

Renner, Sep. 2005, Security of quantum key distribution, doctoral dissertation, Swiss Federal Institute of Technology, arXiv:quant-ph/0512258v2, 148 pp.

Cabello et al., Sep. 16, 2008, Necessary and sufficient detection efficiency for the mermin inequalities, arXiv:0712.3268v5 [quant-ph], 5 pp.

Notice of reasons for refusal dated Oct. 7, 2025 in Japanese patent application No. 203-515776.

* cited by examiner

SECURITY TESTS PASSED
700

INPUT MEASUREMENT STRING
TO TWO-SOURCE EXTRACTOR
702

INPUT NUMBER FROM A SECOND
WEAK SOURCE OF RANDOMNESS
704

OUTPUT RANDOM NUMBER FROM
TWO-SOURCE EXTRACTOR
706

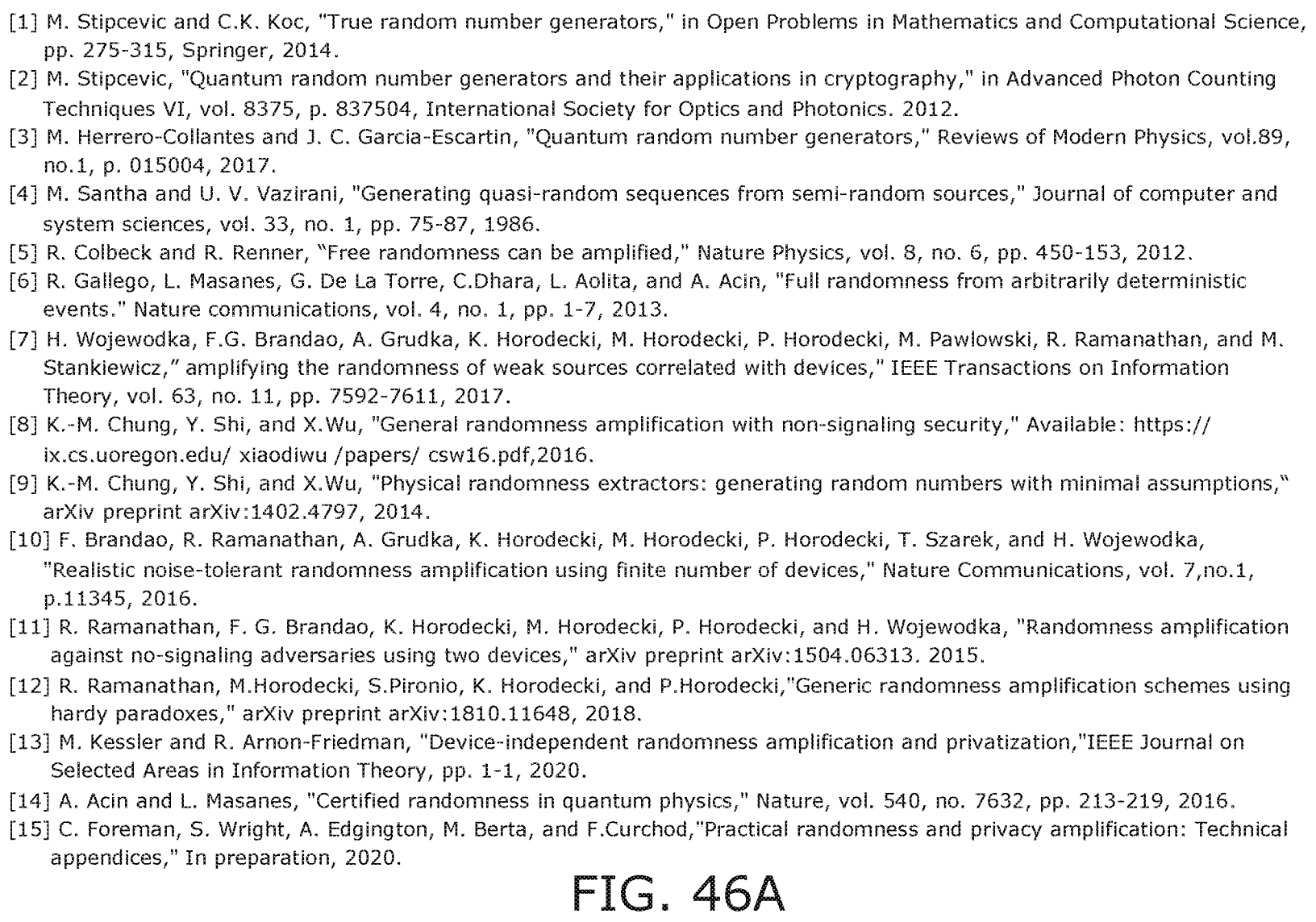

[1] M. Stipcevic and C.K. Koc, "True random number generators," in Open Problems in Mathematics and Computational Science, pp. 275-315, Springer, 2014.

[2] M. Stipcevic, "Quantum random number generators and their applications in cryptography," in Advanced Photon Counting Techniques VI, vol. 8375, p. 837504, International Society for Optics and Photonics. 2012.

[3] M. Herrero-Collantes and J. C. Garcia-Escartin, "Quantum random number generators," Reviews of Modern Physics, vol.89, no.1, p. 015004, 2017.

[4] M. Santha and U. V. Vazirani, "Generating quasi-random sequences from semi-random sources," Journal of computer and system sciences, vol. 33, no. 1, pp. 75-87, 1986.

[5] R. Colbeck and R. Renner, "Free randomness can be amplified," Nature Physics, vol. 8, no. 6, pp. 450-153, 2012.

[6] R. Gallego, L. Masanes, G. De La Torre, C.Dhara, L. Aolita, and A. Acin, "Full randomness from arbitrarily deterministic events." Nature communications, vol. 4, no. 1, pp. 1-7, 2013.

[7] H. Wojewodka, F.G. Brandao, A. Grudka, K. Horodecki, M. Horodecki, P. Horodecki, M. Pawlowski, R. Ramanathan, and M. Stankiewicz," amplifying the randomness of weak sources correlated with devices," IEEE Transactions on Information Theory, vol. 63, no. 11, pp. 7592-7611, 2017.

[8] K.-M. Chung, Y. Shi, and X.Wu, "General randomness amplification with non-signaling security," Available: https://ix.cs.uoregon.edu/xiaodiwu /papers/ csw16.pdf,2016.

[9] K.-M. Chung, Y. Shi, and X.Wu, "Physical randomness extractors: generating random numbers with minimal assumptions," arXiv preprint arXiv:1402.4797, 2014.

[10] F. Brandao, R. Ramanathan, A. Grudka, K. Horodecki, M. Horodecki, P. Horodecki, T. Szarek, and H. Wojewodka, "Realistic noise-tolerant randomness amplification using finite number of devices," Nature Communications, vol. 7,no.1, p.11345, 2016.

[11] R. Ramanathan, F. G. Brandao, K. Horodecki, M. Horodecki, P. Horodecki, and H. Wojewodka, "Randomness amplification against no-signaling adversaries using two devices," arXiv preprint arXiv:1504.06313. 2015.

[12] R. Ramanathan, M.Horodecki, S.Pironio, K. Horodecki, and P.Horodecki,"Generic randomness amplification schemes using hardy paradoxes," arXiv preprint arXiv:1810.11648, 2018.

[13] M. Kessler and R. Arnon-Friedman, "Device-independent randomness amplification and privatization,"IEEE Journal on Selected Areas in Information Theory, pp. 1-1, 2020.

[14] A. Acin and L. Masanes, "Certified randomness in quantum physics," Nature, vol. 540, no. 7632, pp. 213-219, 2016.

[15] C. Foreman, S. Wright, A. Edgington, M. Berta, and F.Curchod,"Practical randomness and privacy amplification: Technical appendices," In preparation, 2020.

FIG. 46A

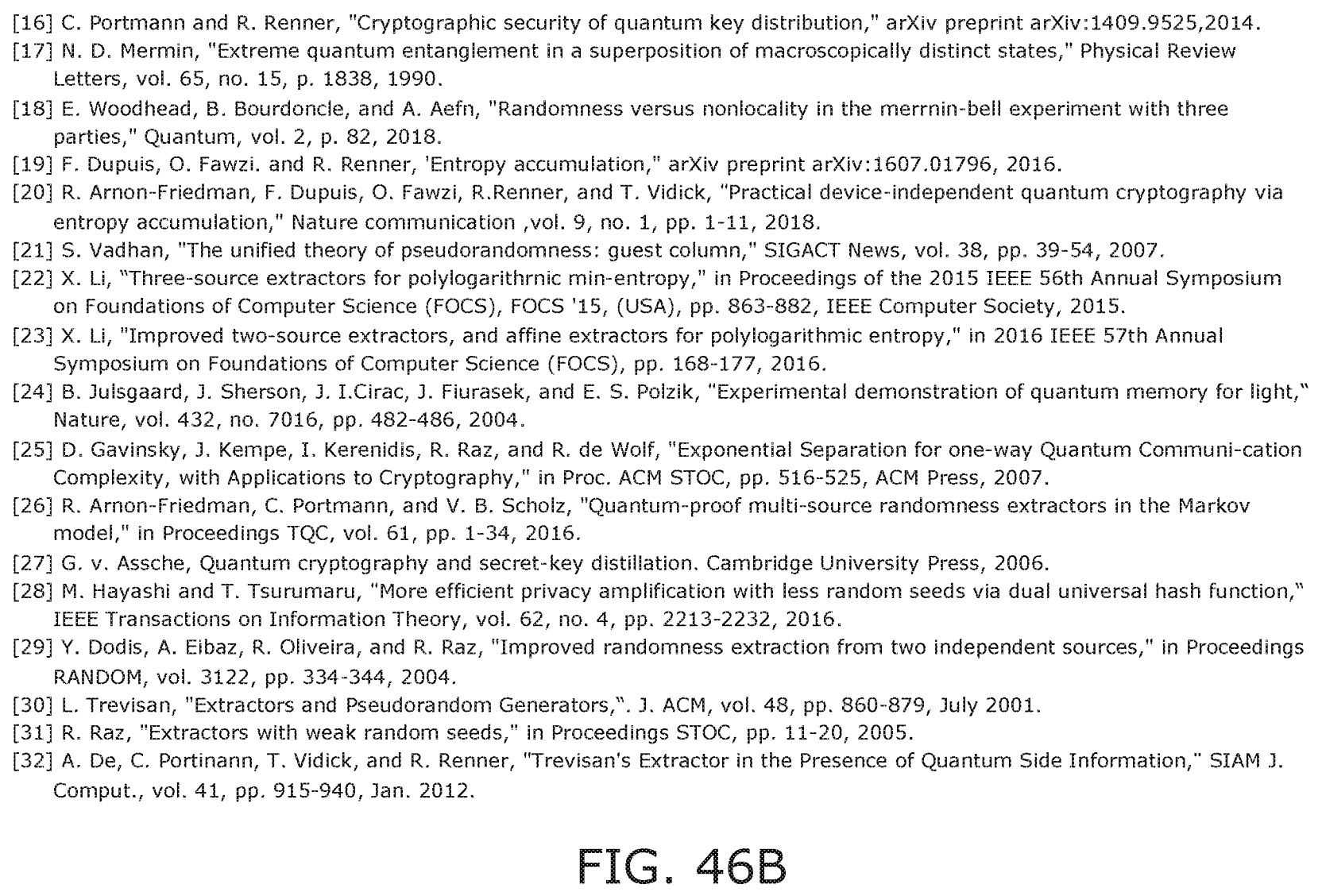

[16] C. Portmann and R. Renner, "Cryptographic security of quantum key distribution," arXiv preprint arXiv:1409.9525,2014.

[17] N. D. Mermin, "Extreme quantum entanglement in a superposition of macroscopically distinct states," Physical Review Letters, vol. 65, no. 15, p. 1838, 1990.

[18] E. Woodhead, B. Bourdoncle, and A. Aefn, "Randomness versus nonlocality in the mernin-bell experiment with three parties," Quantum, vol. 2, p. 82, 2018.

[19] F. Dupuis, O. Fawzi. and R. Renner, 'Entropy accumulation," arXiv preprint arXiv:1607.01796, 2016.

[20] R. Arnon-Friedman, F. Dupuis, O. Fawzi, R.Renner, and T. Vidick, "Practical device-independent quantum cryptography via entropy accumulation," Nature communication ,vol. 9, no. 1, pp. 1-11, 2018.

[21] S. Vadhan, "The unified theory of pseudorandomness: guest column," SIGACT News, vol. 38, pp. 39-54, 2007.

[22] X. Li, "Three-source extractors for polylogarithmic min-entropy," in Proceedings of the 2015 IEEE 56th Annual Symposium on Foundations of Computer Science (FOCS), FOCS '15, (USA), pp. 863-882, IEEE Computer Society, 2015.

[23] X. Li, "Improved two-source extractors, and affine extractors for polylogarithmic entropy," in 2016 IEEE 57th Annual Symposium on Foundations of Computer Science (FOCS), pp. 168-177, 2016.

[24] B. Julsgaard, J. Sherson, J. I.Cirac, J. Fiurasek, and E. S. Polzik, "Experimental demonstration of quantum memory for light," Nature, vol. 432, no. 7016, pp. 482-486, 2004.

[25] D. Gavinsky, J. Kempe, I. Kerenidis, R. Raz, and R. de Wolf, "Exponential Separation for one-way Quantum Communi-cation Complexity, with Applications to Cryptography," in Proc. ACM STOC, pp. 516-525, ACM Press, 2007.

[26] R. Arnon-Friedman, C. Portmann, and V. B. Scholz, "Quantum-proof multi-source randomness extractors in the Markov model," in Proceedings TQC, vol. 61, pp. 1-34, 2016.

[27] G. v. Assche, Quantum cryptography and secret-key distillation. Cambridge University Press, 2006.

[28] M. Hayashi and T. Tsurumaru, "More efficient privacy amplification with less random seeds via dual universal hash function," IEEE Transactions on Information Theory, vol. 62, no. 4, pp. 2213-2232, 2016.

[29] Y. Dodis, A. Eibaz, R. Oliveira, and R. Raz, "Improved randomness extraction from two independent sources," in Proceedings RANDOM, vol. 3122, pp. 334-344, 2004.

[30] L. Trevisan, "Extractors and Pseudorandom Generators," J. ACM, vol. 48, pp. 860-879, July 2001.

[31] R. Raz, "Extractors with weak random seeds," in Proceedings STOC, pp. 11-20, 2005.

[32] A. De, C. Portinann, T. Vidick, and R. Renner, "Trevisan's Extractor in the Presence of Quantum Side Information," SIAM J. Comput., vol. 41, pp. 915-940, Jan. 2012.

FIG. 46B

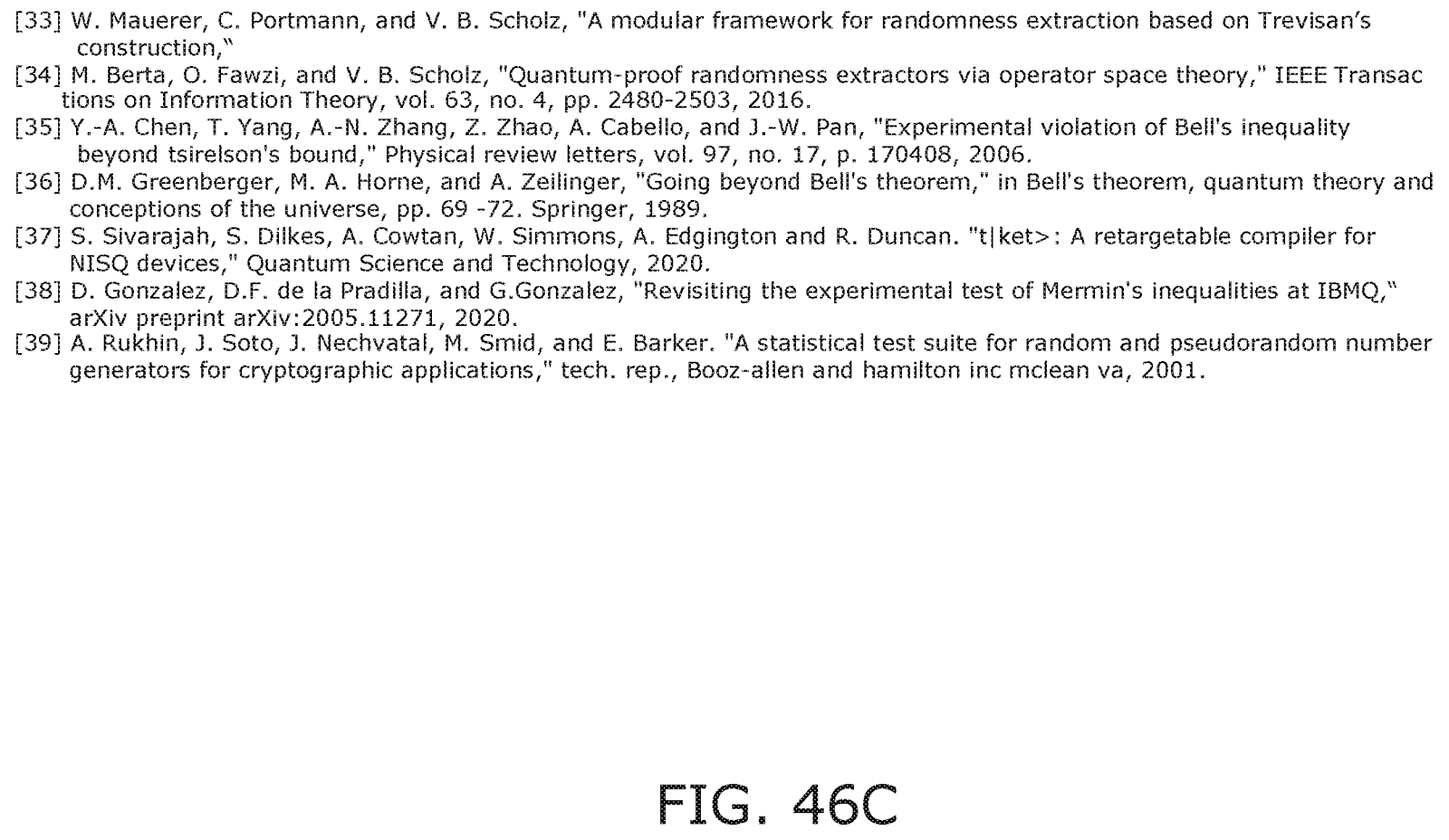

[33] W. Mauerer, C. Portmann, and V. B. Scholz, "A modular framework for randomness extraction based on Trevisan's construction,"

[34] M. Berta, O. Fawzi, and V. B. Scholz, "Quantum-proof randomness extractors via operator space theory," IEEE Transactions on Information Theory, vol. 63, no. 4, pp. 2480-2503, 2016.

[35] Y.-A. Chen, T. Yang, A.-N. Zhang, Z. Zhao, A. Cabello, and J.-W. Pan, "Experimental violation of Bell's inequality beyond tsirelson's bound," Physical review letters, vol. 97, no. 17, p. 170408, 2006.

[36] D.M. Greenberger, M. A. Horne, and A. Zeilinger, "Going beyond Bell's theorem," in Bell's theorem, quantum theory and conceptions of the universe, pp. 69 -72. Springer, 1989.

[37] S. Sivarajah, S. Dilkes, A. Cowtan, W. Simmons, A. Edgington and R. Duncan. "t|ket>: A retargetable compiler for NISQ devices," Quantum Science and Technology, 2020.

[38] D. Gonzalez, D.F. de la Pradilla, and G.Gonzalez, "Revisiting the experimental test of Mermin's inequalities at IBMQ," arXiv preprint arXiv:2005.11271, 2020.

[39] A. Rukhin, J. Soto, J. Nechvatal, M. Smid, and E. Barker. "A statistical test suite for random and pseudorandom number generators for cryptographic applications," tech. rep., Booz-allen and hamilton inc mclean va, 2001.

FIG. 46C

CRYPTOGRAPHIC SYSTEMS AND NON-DETERMINISTIC RANDOM NUMBER GENERATORS BASED ON QUANTUM SYSTEMS

CROSS-REFERENCE TO RELATED APPLICATIONS

This application is a continuation of PCT Patent Application No. PCT/GB2021/052341, filed on Sep. 9, 2021, entitled "Cryptographic Systems and Non-deterministic Random Number Generators Based on Quantum Systems" which claims the benefit of priority to U.S. Provisional Patent Application No. 63/076,289, filed Sep. 9, 2020, and U.S. Provisional Patent Application No. 63/078,152, filed Sep. 14, 2020. The entire contents of each application identified in this paragraph are hereby incorporated by reference herein and made part of this specification.

BACKGROUND

Encryption and authentication used in computer security use random bit generators since random numbers are important in the generation of symmetric keys and nonces that make up part of encryption and authentication processes. Ways of generating random bit sequences are typically grouped into three different types including: deterministic random bit generators which generate pseudo random bit sequences using software; non-deterministic random number generators based on classical physics; and non-deterministic random number generators based on quantum systems.

TECHNICAL FIELD

This disclosure relates to non-deterministic random number generators based on quantum systems, and to cryptographic systems which use such non-deterministic random number generators.

BACKGROUND

Cryptography is used to protect data in both a temporal context (storage) and in a spatial context (communication) and during data processing (computation). In the former, typically there is only a single party who stores and then later retrieves the data; in the latter, there are at least two parties (a sender and a recipient). The data is encrypted prior to storage or transmission, and then generally decrypted upon retrieval or receipt. The form of the data prior to encryption, and also again after subsequent decryption, is sometimes referred to as plain-text (this is without limitation to the content of the data itself, which might be text, images, video, audio, or any other form of information or data).

The encryption of the data seeks to prevent a third party, typically referred to as an adversary, from gaining access to the plain-text (or from extracting even partial information concerning the plain-text). In some cases, the adversary might be someone who is deliberately trying to access the plain-text, potentially for some malevolent purpose; in other cases, the adversary might just be someone who accidentally receives a communication (for example, because of an incorrect email address).

In most modern cryptography systems, especially those used in a commercial context, the algorithms used to encrypt and decrypt data are themselves publicly known, and may be subject to various standards. For such systems, the security of the encryption generally relies on one or more keys, where a key represents a string of bits having some predetermined length. In particular, an encryption system receives the plain-text and receives or generates an appropriate key and these are then used to generate the encrypted data. Conversely, a decryption system receives the encrypted data and an appropriate key and uses them to retrieve the plain-text. Thus it is access to the appropriate key that controls access to the plain-text.

Key-based cryptographic systems can be split into two main types—symmetric and asymmetric. In a symmetric system, if plain-text is encrypted with a given key, the same key is used for the decryption of this data back to plain-text. In contrast, for asymmetric encryption, there is a key pair, with a first key in the pair being used for encryption, and the second key in the pair being used for decryption. In a typical configuration, the key pair is associated with a first party, which makes the first key (referred to as a public key) available to third parties to use for encryption. However, the second key (referred to as a private key) is maintained as a secret by the first party. Accordingly, only the first party is able to decrypt data which has been encrypted by the third parties using the public key.

In a communications context, the use of symmetric cryptography requires some way of providing both the sender and the recipient with the same key (which must be kept secret to stop an adversary gaining access to the plain-text). This issue is avoided in an asymmetric cryptography system, because the planned recipient can provide its public key to the sender without the need for secrecy, because it is the private key, rather than the public key, which will be used for decryption.

Consequently, many cryptographic communication systems utilize a two-stage approach in which asymmetric encryption is used in a first stage to share a key between first and second parties, and then in a second stage, this shared key is used for symmetric encryption to perform encrypted data communications between the first and second parties.

Accordingly, computer systems for cryptography (and also for authentication, which is closely related to cryptography), use random bit generators to provide random numbers, which are important in the generation of symmetric keys for use in encryption and authentication processes. Such random numbers may also be used for the generation of nonces. (A nonce, "number once", is a number that can be used just once in a cryptographic communication to ensure that old communications cannot be reused in a replay attack).

Ways of generating random bit sequences are typically grouped into three different types, namely: deterministic random bit generators which generate pseudo-random bit sequences using software; deterministic random number generators based on complex (e.g. chaotic) classical physics; and non-deterministic random number generators based on quantum systems.

In a published PCT patent application WO2019125733A1 "AMPLIFYING, GENERATING, OR CERTIFYING RANDOMNESS" (inventors: Brandao and Worrall), the entire contents of which are incorporated herein by reference, there is described a security test logic system that includes a non-transitory memory that is configured to store measurements from a measurement apparatus. Measurements output from the security test logic system indicate the presence or absence of coincidences where particles are detected at a plurality of detectors substantially simultaneously. The detectors are configured to be at ends of corresponding mutually different channels from a particle source, wherein the channels have substantially the same length. The system includes a processor that is configured to compute a test statistic from the stored measurements. The test statistic expresses, for example, a Bell inequality, wherein the system is configured to compare the test statistic with a threshold. The processor is configured to generate and output a certificate certifying that the measurements are from a quantum system if the value of the computed test statistic passes the threshold.

U.S. Pat. No. 9,436,436B2 (Batelle) discloses a system and method for generating random numbers. The system may include a random number generator (RNG), such as a quantum random number generator (QRNG) configured to self-correct or adapt in order to substantially achieve randomness from the output of the RNG. By adapting, the RNG may generate a random number that may be considered random regardless of whether the random number itself is tested as such. As an example, the RNG may include components to monitor one or more characteristics of the RNG during operation, and may use the monitored characteristics as a basis for adapting, or self-correcting, to provide a random number according to one or more performance criteria.

U.S. Pat. No. 10,860,403B2 (Boeing) discloses systems and methods for facilitating random bit generation. In one example, a method includes receiving a first random bit stream in a first memory that includes a plurality of memory cells. Each of the plurality of memory cells stores a respective one bit of the first random bit stream. The method further includes generating, by a logic circuit, each bit of a second random bit stream based on a respective pair of bits of the first random bit stream. The method further includes storing the second random bit stream in a second memory.

In practice, computer systems supporting cryptography may utilise a significant number of keys, e.g. symmetric keys, for example for different visitors to a website, different subscribers to an on-line service, and so on. Moreover, such symmetric keys may for security reasons be retained (or remain valid) only for a limited time period, for example a session; this further increases the number of symmetric keys required. Accordingly, a random number generator for use in such systems should provide not only reliable (certified) randomness but also an acceptable rate of output.

SUMMARY

A first system for providing a random bit string for use in one or more cryptographic applications comprises:

a test system configured to receive a first random bit string having a first entropy and to perform a test using the first random bit string to confirm quantum behaviour in the generation of the first random bit string; and a two-source randomness extractor configured to: receive a first input comprising the first random bit string for which the test has confirmed quantum behaviour in the generation of the first random bit string; receive a second input comprising a second random bit string having a second entropy; and generate and output a third random bit string derived from the first and second random bit strings, the third random bit string having a third entropy which has been amplified to be greater than both the first entropy and the second entropy.

Also disclosed is a cryptographic software-as-a-service system for providing cryptographic keys to client users, the system comprising:

a client interface configured to receive a request from a client for a cryptographic key;

a service interface configured to request and receive a first random bit string from a quantum device; and at least one processing component configured to:

perform a test on the first random bit string received from the quantum device to confirm quantum behaviour by the quantum device in generating the received random bit string;

on condition that the test provides a confirmation of quantum behaviour, generate one or more cryptographic keys using the first random bit string;

encrypt the one or more cryptographic keys; and transmit the encrypted one or more cryptographic keys via the client interface to the client in response to receiving the request from the client.

Also disclosed is a cryptographic system comprising a secure user environment including:

a store containing one or more seeds, each seed comprising or generated from a first random bit string which is certified as produced by quantum behaviour within a quantum device;

a first private source of randomness configured to generate and output a second random bit string; and a seeded randomness extractor configured to receive a first input comprising a seed from the store and a second input comprising the second random bit string, wherein the randomness extractor is further configured to generate and output a third random bit string in response to a user request, the third random bit string being usable for forming a cryptographic key, wherein the third random bit string has amplified entropy compared to the second random bit string.

Also disclosed and defined in the claims of this patent specification are various methods and apparatus using non-deterministic random number generation and randomness verification, such as for use in cryptographic systems and applications.

DESCRIPTION OF THE DRAWINGS

The present invention will be better understood from the following detailed description, with reference to the accompanying drawings in which:

FIG. 15 is a block diagram illustrating the building blocks and the operation of an example of a quantum random number generator and amplifier system, based on a passive 2-qubit quantum apparatus;

FIG. 21 is a block diagram illustrating the building blocks and the operation of an example of a quantum random number generator and amplifier system, based on an active 2-qubit quantum apparatus;

FIGS. 46A, 46B, and 46C are tables of references for Appendix A.

Like reference numerals are used to designate like parts in the accompanying drawings. The drawings provided are not necessarily to scale and are provided to illustrate example embodiments described herein and are not intended to limit the scope of the disclosure.

DESCRIPTION OF EMBODIMENTS

Figure 1:
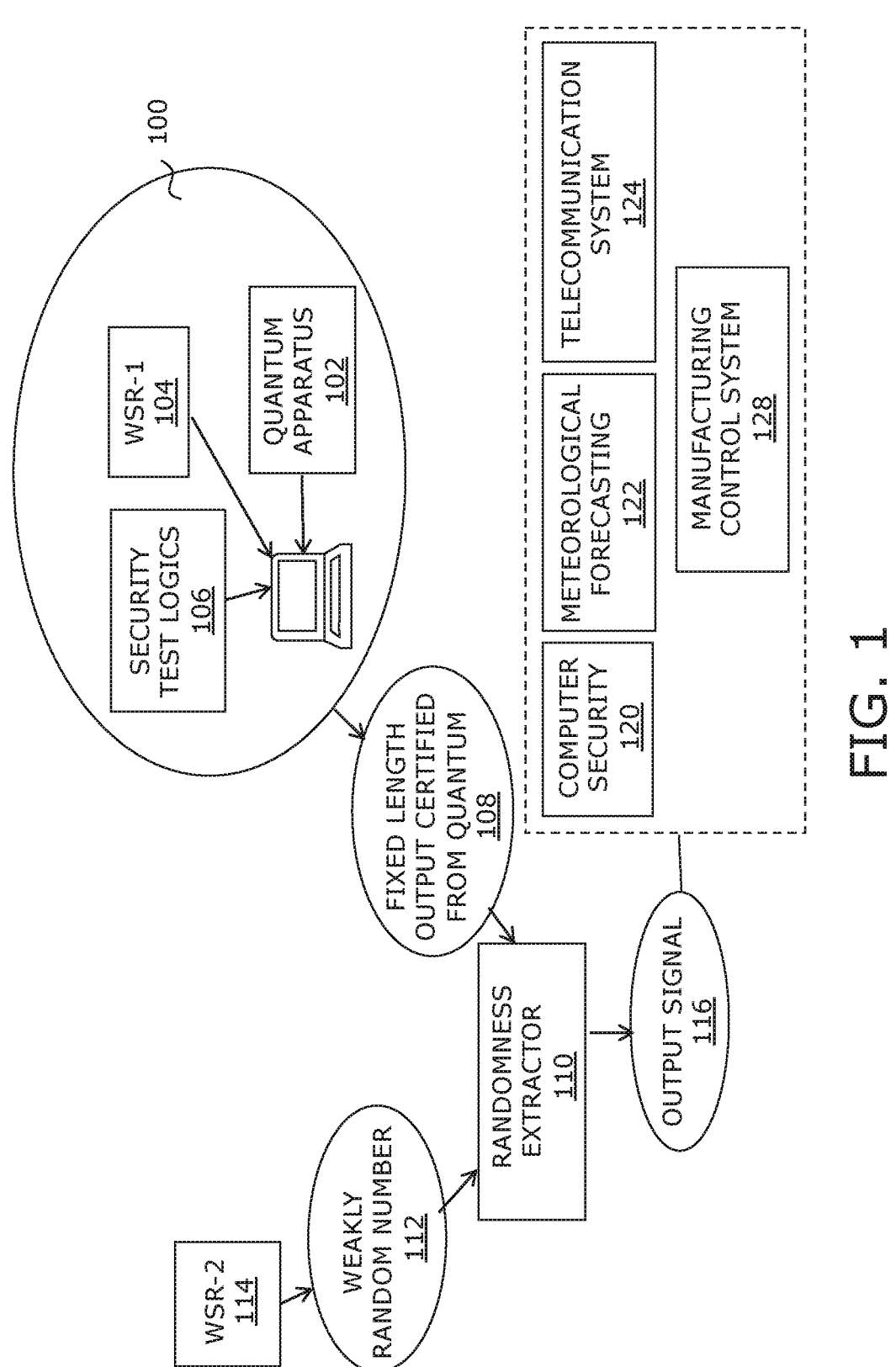
FIG. 1 is a schematic diagram of an example of an apparatus for certifying that a number has been produced by a quantum apparatus and of an example of a randomness extractor configured to generate a random number for use in a variety of downstream applications.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Random bits have too many applications to enumerate, ranging from cryptography to gambling and scientific computing. However, traditional random number generators are based on classical physics, which is deterministic. Therefore, the output randomness cannot be trusted without further assumptions, since the apparent randomness is based on ignorance that may not be shared by an adversary. Random-seeming numbers generated by any sort of deterministic software and/or hardware are in principle vulnerable to hacking for this reason. Quantum mechanics is intrinsically probabilistic and therefore might be used to generate randomness.

When considering a device that purportedly generates random output based on quantum mechanics, one might be able to trust that the output is random only if one trusts or assumes the quantum device is operating correctly. Once a random number has been generated by a system, there is typically no easy way to certify that the random number has been generated by a quantum system. To determine whether a purportedly quantum system in fact leverages quantum phenomena to produce its output, a human operator typically would not only need to be an expert in the field but would also need to visually inspect, test and characterise the internal structure, including mechanical apparatus, of the purportedly quantum system and perhaps even independently test the system.

The embodiments described below are not limited to implementations which solve any or all of the disadvantages of known technology for amplifying, generating or certifying randomness. For example, different embodiments may address different disadvantages or challenges relating to amplifying, generating, or certifying randomness.

While there exist commercialized quantum systems that produce purportedly random bits, to verify that such a device is working as intended would be a difficult task even for an expert with access to the device's internal workings. It would be preferable, then, if the device's output could be verified as genuine merely by considering the output, without any knowledge of the inner workings of the device. This property is known as device independence.

In the following detailed description, various non-limiting examples of a randomness amplifying process and various embodiments of real-world systems that implement examples of the process are described. These examples and embodiments are intended to illustrate, but not to limit, the scope of the disclosure.

The present disclosure provides, inter alia, a complete implementation of a randomness and privacy amplification protocol based on Bell tests. This allows the building of device-independent random number generators which output provably unbiased and private numbers, even if using an uncharacterised quantum device potentially built by an adversary. The generation rates are linear in the runtime of the quantum device and the classical randomness post-processing has quasi-linear complexity, thereby making it efficient on a standard personal laptop. The statistical analysis is tailored for real-world quantum devices, making it usable as a quantum technology today.

The use of the protocol has been implemented on quantum computers from the IBM-Q experience. Although not purposely built for the task, such quantum computers can run faithful Bell tests by adding minimal assumptions, which at a high level amount to trusting that the quantum device was not purposely built to trick the user, but otherwise remains mostly uncharacterised. In this semi-device-independent manner, the protocol generates provably private and unbiased random numbers on existing quantum computers.

Figure 28:
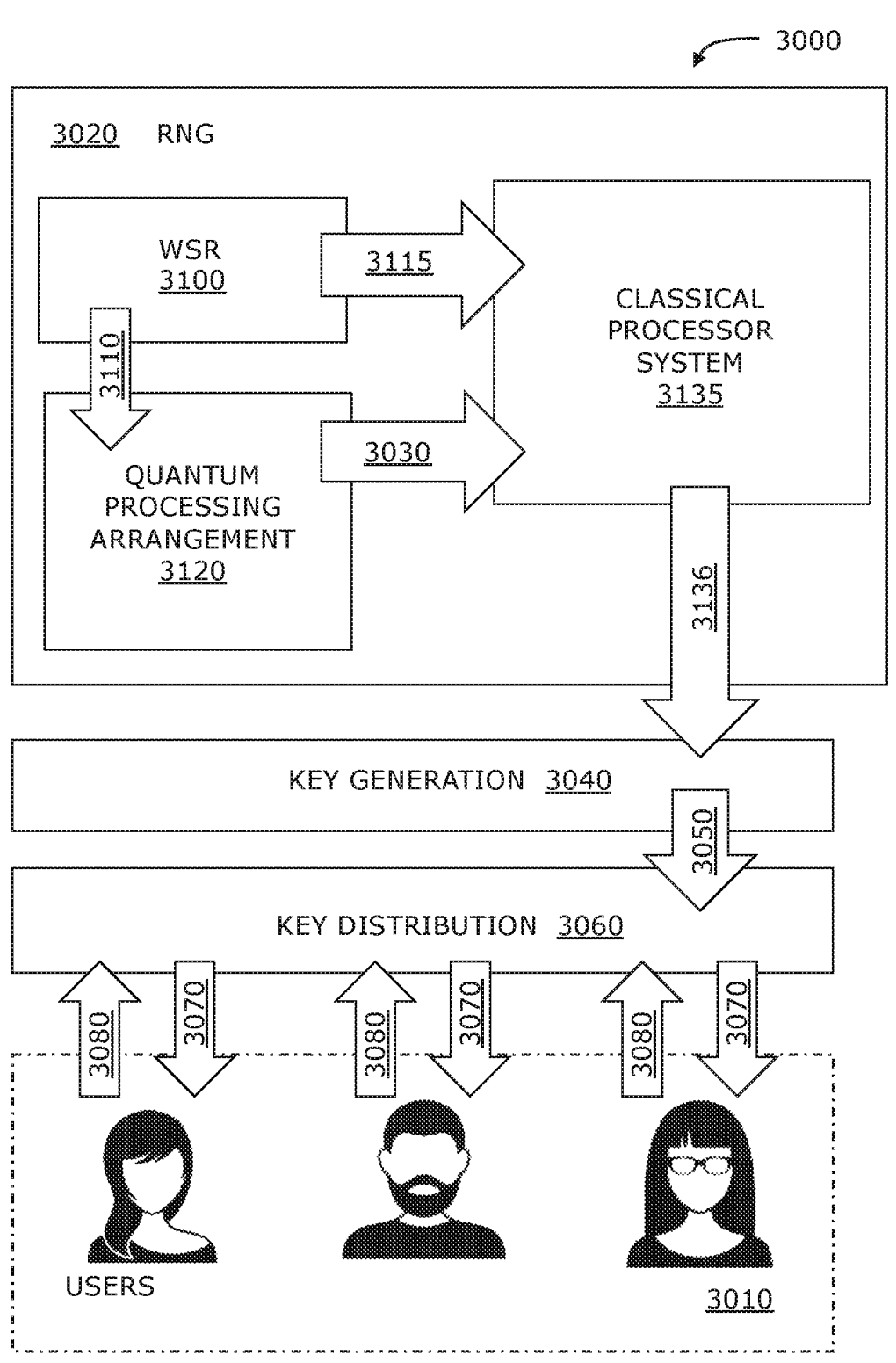
FIG. 28 is a schematic diagram of a system for generating and distributing quantum encryption keys.

Referring to FIG. 28, an overview is provided of a cryptographic system indicated generally by 3000. Optionally, the system 3000 may be used to provide a cloud-hosted software-as-a-service (SaaS) for various aspects of cryptography. The system 3000 is configured to generate one or more quantum-grade encryption keys, and to distribute the one or more quantum-grade encryption keys securely to one or more users 3010, for example to a single user or to a group of users. For present purposes, a key is regarded as "quantum-grade" if it can be shown (certified) that the key has been generated using at least in part a quantum process which is inherently random or non-deterministic. Similarly, quantum behaviour represents behaviour of a physical system which cannot be explained according to classical physics, but only on the basis of quantum physics.

Note that in the present context, references to a user 3010 may represent or include a computer system, such as a client device, which may be controlled or associated with respective human operator of that computing system. The users may use the keys provided by the system 3000 to perform encryption/decryption of data for communication, storage, or any other desired purpose, for example by using encryption and decryption functionality incorporated into (or otherwise accessible to) clients 3010.

The system 3000 includes a random number (bit string) generator 3020 (RNG) which in turn includes a weak source of randomness (WSR) 3100; a quantum processing arrangement 3120; and a classical processor system 3135. In operation, the quantum processing arrangement is configured in use to generate a first random bit string 3030. The classical processor system 3135, for example a classical computer or other processing device, is used (inter alia): (i) to validate (certify) the random bit string 3030 was generated using nondeterministic quantum process; and (ii) to measure the entropy of the random bit string 3030 which allows a second random bit string 3136 to be produced which has amplified randomness (more entropy) than the first random bit string 3030.

The second random bit string 3136 is passed to a key generation apparatus 3040 that is configured in use to convert the second random bit string 3136 into one or more quantum-grade encryption keys 3050. The cryptographic system further includes a key distribution apparatus 3060 that is configured in use to receive the encryption keys 3050 from the key generation apparatus 3040 and to encrypt the one or more received encryption keys 3050 to generate one or more corresponding encrypted encryption keys 3070 and to distribute the one or more corresponding encrypted encryption keys 3070 to the one or more users 3010. The system 3000 may be configured to communicate the encrypted encryption keys 3070 to the users 3010 via a data communication network (not shown in FIG. 28), for example via the Internet.

Beneficially, the one or more users 3010 provide one or more conventional encryption keys 3080 to the key distribution apparatus 3060 which is configured to use the one or more conventional encryption keys 3080 to encrypt the encryption keys 3050 to generate the corresponding encrypted encryption keys 3070. Accordingly, even if a third party hacker or other adversary were to intercept delivery to a user 3010 of the encrypted encryption keys 3070, the third party hacker would still not have access to the underlying (plain-text) quantum-grade encryption keys 3050 themselves because these encryption keys 3050 are protected by the encryption applied to generate the corresponding encrypted encryption keys 3070.

Note that in this context, the "conventional" encryption keys 3080 may be generated using any appropriate encryption scheme, various examples of which are described in more detail below. It is not excluded that future implementations may utilise newly developed encryption schemes for encrypting the encryption keys 3050, and hence the term "conventional" should not be regarding as limiting in this respect. Furthermore, it is also contemplated that the users 3010 may be provided with the random bits strings 3136 (potentially in encrypted form, e.g. as described in relation to the key distribution 3060), and the generation of the keys 3050 from these bits strings, for example using key generation 3040, is performed on the user system 3010 (without the need for further distribution).

There are various ways in which the conventional encryption keys 3080 may be provided to the system 3000 to reduce or avoid the risk that a third-party adversary might gain access to the conventional encryption keys 3080. For example, an asymmetric encryption system may be used, in which a user 3010 encrypts the conventional encryption keys 3080 using a public key of the asymmetric encryption system prior to transmission of the conventional encryption keys 3080 to the key distribution apparatus 3060. The private key corresponding to the public key is generally known only to the key distribution apparatus 3060—hence only the key distribution apparatus 3060 is able to decrypt (and hence access) the conventional encryption keys 3080 as supplied by the user 3010 in encrypted form.

In other implementations, the conventional encryption keys 3080 may be communicated from a user 3010 to the system 3000 via a different communication route to that used for the delivery of the encrypted quantum-grade encryption keys 3070 as supplied back to the user from the key distribution apparatus 3060.

In some cases, the one or more conventional encryption keys 3080 are derived from a transport key that is generated during a registration of a new user to the system 3000. The transport key may be sent in multiple XOR components to the user, through a variety of different mediums, including potentially SMS messaging, email, and printed on paper. For example, each XOR component might be sent using a different respective medium. A user 3010 is then able to reconstruct the transport key by using an XOR operation to combine the multiple different XOR components. Note that in this latter approach, the conventional encryption keys 3080 are generated by the key distribution apparatus 3060 for supply to the client, rather than being generated by a user and sent to the key distribution apparatus 3060 as shown in FIG. 28. It will be appreciated that either of these approaches may be used as appropriate, since they both end up with the conventional encryption keys 3080 being shared between the user 3010 and the key distribution apparatus 3060.

In some cases, a communication connection that is used between a given user 3010 and the cryptographic system 3000 is secured using a standard transport layer security (TLS) connection (also referred to sometimes as a secure sockets layer, SSL). TLS is identical to the security scheme used by an HTTPS website. Inside the TLS connection, the conventional encryption keys 3080 are further encrypted by using 256-bit AES (see https://en.wikipedia.org/wiki/Advanced_Encryption_Standard), which is an open standard. In some implementations, a user 3010 may be optionally provided with customer integration software that includes functionality to perform encryption and decryption with 256-bit AES, for example to support TLS. However, this may not be provided in some implementations—e.g. because the customer's (namely, the user's 3010) software already has, or has access to, AES functionality, and/or because a given implementation may use a different encryption scheme from AES and/or TLS. Any other suitable cryptographic scheme can be used for the key distribution 3060, including homomorphic, hybrid, and/or post-quantum encryption (the latter seeks to protect against an attack using a quantum computer).

The random number generator 3020 will now be described in greater detail. As noted above, the random number generator 3020 includes a weak source of randomness (WSR) 3100, which is configured, for example, to provide a deterministic string of random data—see the afore-mentioned published patent application WO2019125733A1 as well as later passages of this specification for further information about WSRs. The weak source of randomness 3100 is implemented using any suitable device or system, such as a digital random number generator, a laser operating near its lasing threshold, a semiconductor thermal noise source and so forth.

FIG. 28 shows a first random output 3115 from the WSR 3100 which is passed directly to the classical processor system 3135. The WSR 3100 may also produce a second random output 3110 that is used for specifying measurements of a quantum processing arrangement 3120 as part of the testing to confirm quantum behaviour. However, other implementations may use a different approach to making measurements, in which case the second random output 3110 might be omitted or not used.

Figure 29:
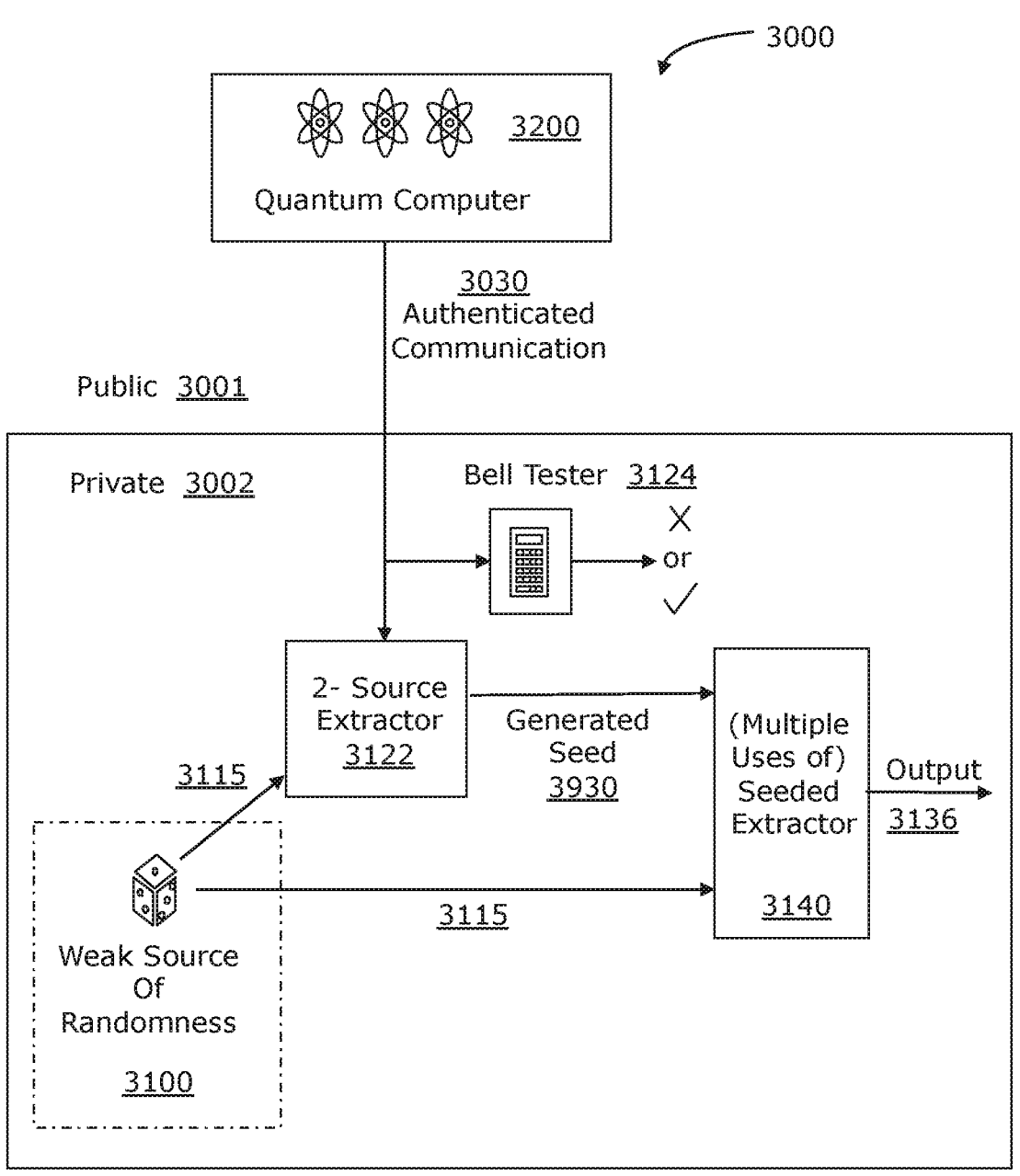
FIG. 29 is a schematic illustration of an implementation of the system of FIG. 28 configured to use a public quantum computer to generate random bit strings for use in generating quantum encryption keys.

The quantum processing arrangement 3120 is configured to generate quantum entanglement that can be used to demonstrate a quantum original for the first bit string 3030. The classical processor 3135 greatly increases (amplifies) the entropy of the first random bit string 3030 to generate the second random bit string 3136. The classical processor 3135 is also configured to apply a test to the first random bit string 3030 to certify that it originates from quantum processes arising in the quantum processing arrangement 3120. The test beneficially involves checking for violation of Bell's inequality, for example by applying a Mermin test, which is an example of the aforesaid Bell's inequality; the test further quantifies the amount of entropy in the first random bit string 3030. The quantum processing arrangement 3120 can be implemented in any suitable manner, for example as an optical photonic arrangement such as described in the above-mentioned published patent application WO2019125733A1, see also later passages of this specification. As another example, the quantum processing arrangement 3120 may be implemented by using a quantum computer such as shown in FIG. 29, which is configured to provide quantum entanglement. Note that the approach of the present disclosure is agnostic to the particular hardware or system used to provide the quantum behavior (such as entanglement).

The classical processor system 3135 will now be described in greater detail. Although the quantum processing arrangement 3120 produces the first random bit string 3030 based on quantum processes, the first random bit string 3120 is not perfectly entropic, for example, it may include a degree of classical (deterministic) noise due to activity in the quantum processing arrangement 3120. The classical processor system 3135 is configured to perform randomness extraction as described below on the first random bit string 3030 to generate the second random bit string 3136 which has amplified randomness compared to the first random bit string 3030.

One example of the operation of the random number generator 3020 includes the following steps (see also FIG. 29):

(a) executing a plurality of 3-qubit circuits on a quantum computing system 3200 (or other form of the quantum processing arrangement 3120) and testing the output from the quantum computer 3200 to obtain therefrom a Mermin's inequality value, wherein the Mermin's inequality value indicates how much entropy can be extracted from output (results) generated by the 3-qubit circuits. This testing of the output may be performed by the classical processor system 3135.

(b) combining an output from the quantum processing arrangement 3120, namely the first random bit string 3030 with the output 3115 from a local private source of randomness (such as WSR 3100) using a two-source randomness extractor 3122 (located within the classical processor system 3135) to generate a first extracted output result 3930 (which is also a random bit string); and (c) combining the first extracted output result 3930 with the output 3115 from a local private source of randomness (such as WSR 3100) using a seeded extractor 3140 (also located within the classical processing system 3135) to obtain the second, random bit string 3136 which can be used by the key generation system 3040 to generate quantum-grade encryption keys 3050.

In some implementations, the system 3000 is configured to use the following protocol (denoted ARQ for "Amplified Randomness using Quantum") which is well-suited for use in generating the quantum-grade encryption keys 3050. The ARQ protocol involves using a public quantum computer 3200 (or other suitable quantum source device) to convert an output 3115 from a weak source of randomness 3100 into a (nearly) perfect source of randomness.

Perfect entropy can be considered as representing a complete lack of correlation or predictability of the bits within a string of a given length. In the context of cryptography, this may be expressed, for example, as the bit string looking random even to an adversary with unbounded computational power (classical and quantum) and with a complete description of the quantum device that produced the bit string.

In this context, the qualification "nearly" recognises that in any practical cryptographic scheme, a protocol error may arise. In the context of a practical randomness extractor, such a protocol error may correspond to the probability that an adversary with unbounded computational power is able to distinguish an output of a practical randomness extractor from a perfectly uniformly random bit string. For example, if the protocol error is $2^{-128}$, this represents the probability that the adversary is able to distinguish between the output of the practical randomness extractor and the perfectly uniformly random bit string.

At a high level, the ARQ protocol is used to provide a method for generating nearly perfect random bit strings from the first random bit string 3030 from the quantum computer 3200 (or other quantum source) and an additional random bit string 3115 from a weak source of randomness (WSR). Examples of other quantum systems that may be used instead of or in addition to the quantum computer to generate the first random bit string 3030 include an optical apparatus that is configured to provide quantum entanglement or an ion trap device. The aforesaid ARQ protocol is able to certify a quantum process occurring in a given device that generates the random bit strings 3030 given certain (minimal) assumptions about the device. Thus, when implementing the cryptographic system 3000, randomness produced by a quantum computer 3200 (for example) may be combined with output 3115 from a weak source of randomness (WSR) to generate a random bit string output 3930 that is nearly perfectly entropic and thus appropriate for use in generating quantum-grade encryption keys.

In this approach, a weak source of randomness 3100 may be implemented using a "block min-entropy source". In such a source, each block, or fixed length random bit string, used to generate the random output 3115 has a certain amount of entropy, referred to as the "min-entropy", even when conditioned on an adversary knowing all previous blocks and having a complete model of a process that the weak source of randomness (WSR) 3100 uses in operation. The min-entropy can be expressed as equivalent to a number of truly (completely) random bits, however, the min-entropy may be distributed across a number of partially random bits. Thus in the random bit string 3115, there is no assumption on how entropy is distributed therein. For example, if we have a bit string of 100 bits, with min-entropy 2:

(i) the first 2 bits of the output 3115 are potentially perfectly random;

(ii) the bits 8, 24, 45, 76 of the output 3115 are potentially 50% random; or (iii) X bits of the output 3115 are potentially somewhat random and Y bits are not random such that a probability of guessing the entire string of bits of the output 3115 is $2^{-2}$ (as $-\log_2(2^{-2})=2$).

Some implementations may utilise a more constrained model of a weak source of randomness (WSR), for example, a Santha-Vazirani (SV) source. Such an SV weak source of randomness 3100 may be viewed as being a block source with block length 1, namely there is a certain amount of randomness per bit.

Referring next to FIG. 29, another implementation of a cryptographic system 3000 will be described in greater detail. Note that the implementation of FIG. 29 shares many aspects with that of FIG. 28, and many components and procedures are inter-changeable between these implementations.

In FIG. 29, there is shown an example implementation of cryptographic system 3000 which includes a quantum computer 3200, a Bell tester 3124, and a 2-source extractor 3122. The quantum computer 3200 can be regarded as forming the main component of the quantum processing arrangement

3120 of FIG. 29. Note that in FIG. 29 there is shown only a single quantum computer 3200, however, this may represent one or more quantum computers running in a cluster or independently of one another. (For example, an input may be received from multiple different quantum computers to provide a form of redundancy and extra protection with regard to the first random bit string(s)).

The cryptographic system 3000 further includes a WSR 3100 which provides an output 3115 to both the 2-source extractor 3122, and a seeded extractor 3140. The seeded extractor receives the output 3930 from the 2-source extractor 3122. The output 3930 is generally referred to as a seed and has (near) perfect entropy. The seeded extractor 3140 provides as output the second random bit string 3136 which can be passed to the key generation unit 3040 for producing one or more keys 3050 for use in data encryption and decryption, authentication, or any other application as desired. In practical terms, the seeded extractor 3140 can be regarded as a single extractor which may be used multiple times to generate a relatively large number of keys 3050. Typically, the keys 3050 from the system 3000 may be provided to users 3010 via a key distribution system 3060 such as described above in relation to FIG. 28.

Note that the components in the system 3000 may potentially be replaceable. For example, the WSR 3100 may be replaced by one or more different implementations of WSR, likewise the 2-source extractor and/or the seeded extractor 3140 may likewise be replaced by other implementations of these extractors. Such replacement may be desirable to configure the components to the particular circumstances of any given implementation, such as the available hardware, the implementation of the private domain 3002 shown in FIG. 29 and discussed below, the desired throughput of the overall system (in terms of bit string output 3136), the complexity of any given implementation in relation to the processing power available, and so on. (It will be appreciated that such considerations apply generally, and not just to the specific implementation shown in FIG. 29).

Figure 33:
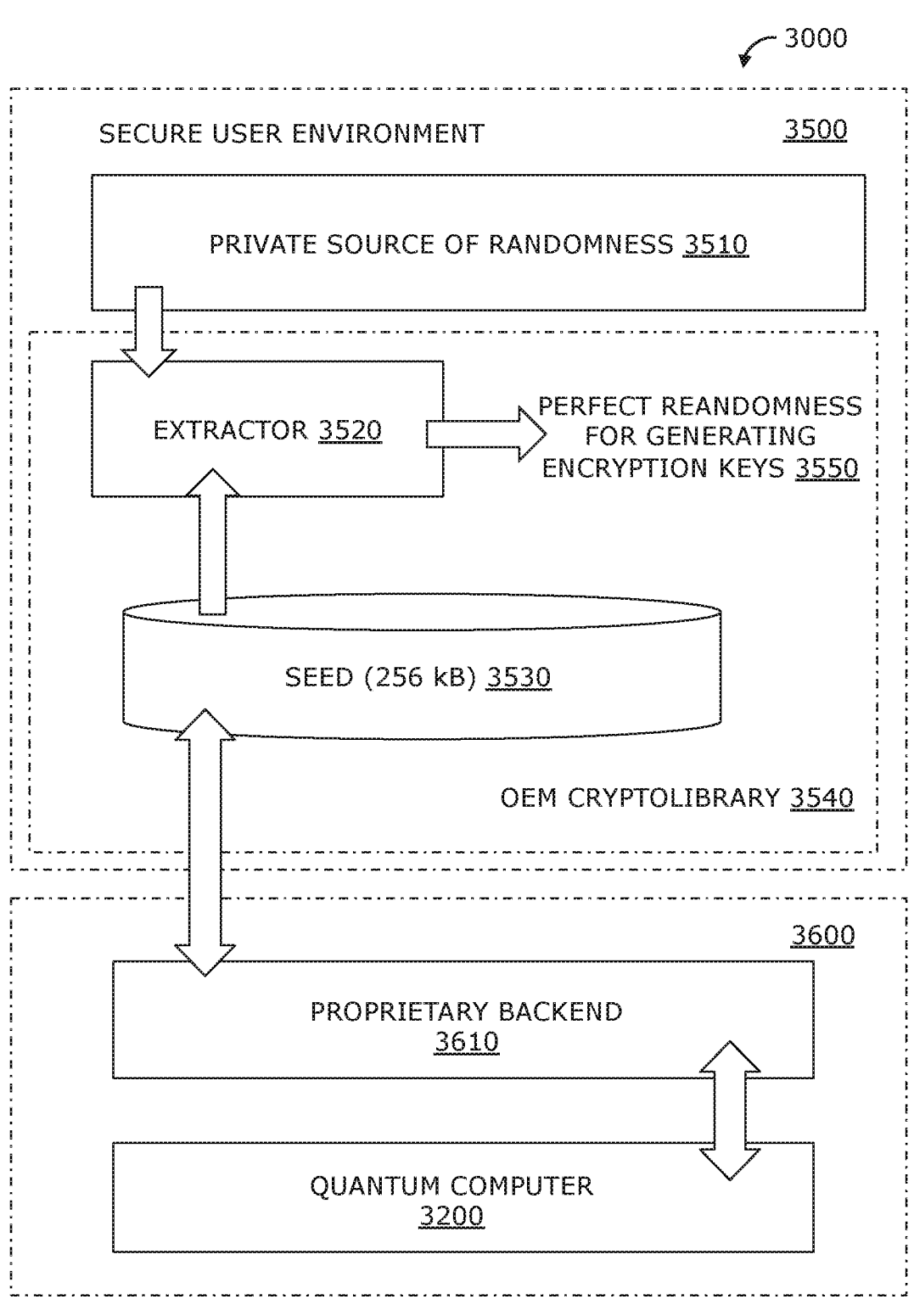
FIG. 33 is an illustration of an alternative implementation of the system of FIG. 28 wherein a majority of data processing to generate quantum encryption keys may occur locally on a user device.

In some cases, the seeded extractor 3140 may store random bit strings representing key precursors) into a database, such as a database 3530 shown in FIG. 33. Users 3010 are then able to request and retrieve from the database quantum-grade encryption keys 3050 (converted from the precursor(s) if needed) as and when required.

The cryptographic system 3000 of FIG. 29 may therefore be used to perform (inter alia) the steps of the following procedure:

1. Initiate an authenticated session with a quantum computer (QC) 3200 and request the output of a series of quantum circuits.
2. Once the output is received, determine if the output passes the Bell test performed by the Bell Tester 3124 to confirm violation of classical physics. The test performed by the Bell Tester 3124 is sometimes referred to below as a Security test A. Note that in some implementations, the Bell Tester may be a part of an overall test unit (not shown in FIG. 29) that is also responsible for interacting with the quantum computer to obtain the measurement results of Step 1 above.
3. If the test is passed, feed the first random bit string 3030 from the quantum computer 3200 and an output 3115 from the (private) WSR 3100 into a two-source extractor 3122 to make another random bit string referred to herein as the generated seed 3930. (If the test is failed, return to Step 1 above to request new output from the QC 3200).

4. Feed the generated seed and further output 3115 from the WSR into the seeded extractor 3140 to produce an output 3136 which can be used to generate a quantum-grade key 3050.
5. Repeat Step 4 to generate further quantum-grade keys as permitted by a protocol security parameter (and/or to store the quantum grade keys or key precursors into a database as discussed above for subsequent retrieval).

In FIG. 29 there are shown two domains, a public domain 3001 containing the quantum computer 3200 and a private domain 3002 containing the remaining components and corresponding generally to the classical processor system 3135. In this context, the private domain 3002 can be regarded, for example, as a set of one or more computers under the control of an operator who supplies quantum-grade encryption keys 3050 to clients 3010 such as shown in FIG. 28 (these clients are typically located in the public domain 3001). The components within the private domain 3002 may be connected to one another by dedicated/private links and/or networks; in contrast, communications between the private domain 3002 and the quantum computer 3200 in the public domain 3001 may be performed over standard networks such as the Internet (likewise for communications between the private domain 3002 and the users 3010, not shown in FIG. 29). Note that as indicated in FIG. 29, communications between the quantum computer 3200 and the components of the private domain 3002 may require some form of (mutual) authentication (likewise for communications between components of the private domain and users 3010). Various protocols for such authentication are known to the skilled person and may be based (for example) on certificates and/or digital signatures.

In the context shown in FIG. 29, the quantum computer 3200 is regarded as a public quantum device since it is not within the direct control of the operator of the private domain 3002. Consequently, the operator of the private domain 3002 is not able to closely inspect or monitor the operation of quantum computer 3200. As described herein however, the quantum operation of quantum computer 3200 can be verified based on the quantum entanglement and the Bell test as described herein.

The private domain 3002 may be set up such that whatever happens in this section remains secret, i.e. hidden from any external adversary, and is known only to the user (until it is used in some subsequent protocol that may not retain this secrecy). In some cases, such privacy may be implemented at a computational level, in which the private domain 3002 corresponds (for example) to a trusted execution environment, such as Intel Software Guard Extension (SGX). This privacy domain 3002 may also be achieved physically through shielding, e.g. in hardware security modules (HSMs).

The configuration shown in FIG. 29 for the cryptography system 3000 can be seen as a 3-tier architecture having users or clients 3010 (not shown) as the first (client) tier, the components in private domain 3002 as the second (server) tier, and the quantum computer 3200 as the third (backend) tier. In operation, a user 3010 may request one or more keys from the server tier in private domain 3002, which returns the requested quantum-grade keys to the user 3010. The private domain components generate the requested keys, whether in advance or in real-time response to the request, by interacting with the quantum computer 3200 to obtain a quantum bit string 3030 from which the requested keys may be generated.

It will be appreciated that the configuration shown in FIG. 29 is provided by way of example only, and other configurations will be apparent to the skilled person. For example, in some implementation, some or all of the components of the private domain 3002 might be installed on a client device 3010 (rather than on a separate server), for example in the form of an app or other software entity. In this case, the client device might itself then interact directly with the quantum computer 3200 to obtain the random bit strings 3030. Other possible configurations (and combinations of configurations) will be apparent to the skilled person.

The operation of the cryptography system 3000 shown in FIG. 29 will now be described in greater detail by way of example. The Quantum Computer (QC) 3200 may be used to perform multiple (8 in general, 4 in particular) sets of local measurements on GHZ states of three qubits (as described in more detail below); the measurement settings may be changed round on round, or may be fixed for a quarter of the total number of rounds each. (See FIG. 2A, including WSR-1 218 and driver 216, plus associated description, for an example of changing the measurement settings for each round in accordance with a (weak) random number sequence). In one implementation, a minimum of $10^6$ quantum computer rounds are performed to provide a reliable Bell test.

In some implementations, the following assumptions are made with regard to the operation of the quantum computational device 3200 (other implementations may make different assumptions):

Assumption 1: The device is non-malicious but uncharacterised: the device may have some error that is unknown to the operator of the cryptographic system 3000, but it is not maliciously controlled by an adversary.

Assumption 2: An adversary can intercept (but not change) the messages from the quantum computer 3200 to the private space (domain) 3002, since this communication is public, but authenticated.

The Bell Tester 3124 represents a classical algorithm implemented on hardware/software to perform a Bell test (a test of 'quantumness') on the observed behaviour of the quantum computer 3200. This may be achieved by performing analysis on the input circuits that the quantum computer ran and the measurement outcomes from each circuit (as discussed in more detail below). The input-output combinations from the quantum computer are used to create an observed probability distribution, from which the Bell Value may be calculated for assessment against the Mermin Inequality. This Bell Tester can be used to provide an analytical bound on the amount of randomness (from the 'quantumness') in the output from the quantum computer 3200. Other implementations may analyse the full observed probability distributions to attain better bounds on the 'quantumness' which can then be certified accordingly.

The randomness of data generated from both the weak source of randomness (WSR) 3100 and the public quantum computer 3200 is measured in terms of entropy, wherein entropy is indicative of "how many truly random bits are contained in a bit string". The configuration shown in FIG. 29 helps to provide a measure of a quantitative lower bound on entropy in output data generated from the quantum computer 3200, and allows an output from the WSR 3100 to be converted into a (near-)perfect source of randomness using a two-source extractor 3122. The (near-)perfect source of randomness is referred to as being "a generated seed" and generally corresponds to random bit string 3930. This generated seed can then be used to allow the seeded extractor 3140 to generate multiple quantum-grade random bit strings which can be used to create keys 3050 as described above (e.g. by using a key generation unit 3040, not shown in FIG. 29).

The configuration of FIG. 29, in particular the processing performed within the private domain 3002, uses the Bell tester 3124 to confirm or certify the quantum randomness of the data received from the (public) quantum computer (and hence of the keys generated therefrom), and also to determine the amount of entropy in the first random bit string 3030. Knowledge of this entropy can then be used in combination with an estimate of the entropy in the min-entropy input 3115 from WSR 3100 by the two-source extractor 3122 to produce an output, namely a seed 3930, that is (near) perfectly entropic. (In broad overview, this is achieved by the two-source randomness extractor reducing the number of bits in the output 3930 compared to the inputs 3030, 3115 such that the entropy of the seed 3930 approaches or reaches the theoretical maximum. The seeded generator is then used to generate multiple output random bit strings 3136, all likewise having perfect randomness like seed 3930, to support producing a greater number of output keys 3050 (compared to the number of keys that could be output by directly using the first random bit string 3030 from the quantum computer 3200 or the seed 3930 to generate the cryptographic key 3050).

In the context of this description, "private data" refers to data that remains secret from any external adversary and is only known to a given user (until the data is used in some subsequent protocol that may not retain this secrecy). Private data may be limited to local data (hardware and software), e.g. held at a single geographical site. However, in some cases private data may be maintained across multiple sites if suitable protection is available (for example, communication facilities dedicated to a single organisation). Public data can be considered as any data which is not private. Local can be considered herein as analogous to a local area network, again generally matching a single site or maybe multiple neighbouring sites. Remote can be considered as any separation beyond local.

The cryptographic system 3000, in particular the two-source extractor 3122, can be regarded as not only providing entropy amplification, but also privacy amplification. In particular, the first random bit string 3030 from the quantum computer 3200 will in many implementations be regarded as public (e.g. created on a public computer and/or transmitted over a public network). However, by combining with a private WSR output 3115, the resulting output from the two-source extractor 3122, namely the seed 3930, also becomes private, so we have gone from a quantum-grade public random bit string 3030 to a quantum-grade private random bit string 3930. (The same approach allows a public WSR string to be combined with a private quantum-grade string to likewise produce a private quantum-grade output).

In the system 3000, the private data is stored and processed within the private domain 3002, which may be implemented using a trusted execution environment, for example in an Intel Software Guard Extension (SGX). In other implementations, the security and privacy of private data in domain 3002 may be maintained by the provision of physical shielding, for example as implemented in hardware security modules (HSMs).

The ARQ protocol may be implemented, for example, using the private domain components and quantum computer 3200 shown in FIG. 29 to perform a method that includes steps set out below. As noted above, the quantum computer 3200 (and also the users 3010) can be considered as public, i.e. external to the private domain 3002. The components in the private domain 3002 are typically provided with appropriate (public) network and/or communications links for communicating as required with the quantum computer 3200 and the users 3010.

Some implementations of the ARQ protocol include the following steps:

STEP 1: initiate an authenticated session with the quantum computer 3200 and request as an output a series of quantum circuits;

STEP 2: on receiving the series of quantum circuits, determine whether or not the series of quantum circuits satisfies a Bell test executed by a Bell tester;

STEP 3: in an event that the series of quantum circuits passes the Bell test, feed the output of the quantum computer 3200 and a (private) weak source of randomness (WSR) 3100 into a two-source extractor 3122 to generate a seed 3930; in an event that the series of quantum circuits fails the Bell test, a new output from the quantum computer 3200 may be requested (or the processing may abort);

STEP 4: feed the generated seed 3930 and further bits 3115 from the weak source of randomness (WSR) 3100 into the seeded extractor 3140 for generating a quantum-grade random bit string (and optionally store in a database, as described above); and STEP 5: repeat STEP 4 as permitted by a protocol security parameter.

When implementing the above method, the quantum computer 3200 may be configured in some implementations to perform four sets of local measurements on Greenberger-Horne-Zeilinger (GHZ) states of three qubits; the measurement settings can change round-on-round, or can be fixed for a quarter of the total number of rounds each. A Greenberger-Horne-Zeilinger (GHZ) state is a certain type of entangled quantum state that involves at least three subsystems, for example particle states or qubits. The system 3000 in practice implements a minimum of $10^6$ quantum computer rounds.

When implementing the above method and the ARQ protocol, the Bell tester 3124, used in STEP 2 of the aforesaid method, may be provided as a classical algorithm implemented on hardware, in software, or a combination of both, that performs a Bell test, namely a test of entropy, on an observed behaviour and outputs of the quantum computer 3200. The Bell test may be implemented by performing an analysis on input circuits which were run by the quantum computer 3200 and the measurement outcomes from each circuit. The input-output combinations from the quantum computer 3200 are used to create an observed probability distribution, from which a Bell value for the Bell test can be calculated. In some implementations, the Bell test is evaluated against a Mermin inequality. This Bell test allows the system 3000 to analytically delimit or bound an amount of randomness, namely entropy, in the output from the quantum computer 3200.

In the configuration shown in FIG. 29, the two-source extractor 3122 may be provided as a classical algorithm that is implemented on hardware, in software, or a combination of both. The two-source extractor 3122 takes two weak (namely imperfect) random bit strings that are conditionally independent of one another and produces a shorter but (near-)perfect random output string (this can be viewed as a form of entropy amplification).

In some implementations, the two-source extractor used in the system 3000 is a Dodis extractor. Note that a strong two-source extractor means that its output is (near-)independent of one of two input sources thereto. As a result, one source could be made public without compromising the secrecy of the generated output from the two-source extractor 3122. This operating property of a strong two-source extractor supports the use of public quantum computer 3200 for implementing the cryptographic system 3000, i.e. the use of a quantum computer which is in a public domain 3001 separate from the WSR 3100 and 2-source extractor 3122 in the private domain 3002.

A Dodis extractor is based on technology described in a scientific publication by authors Y. Dodis, A. Elbaz, R. Oliveira, and R. Raz, "*Improved randomness extraction from two independent sources*," in Proceedings RANDOM, vol. 3122, pp. 334-344, 2004; this scientific publication describing a 2-norm extractor is hereby incorporated in its entirety by reference.

The Dodis extractor has two inputs, each of which takes an imperfect source providing a data stream of mutually the same length in a current implementation (although other implementations may accept two inputs of different length). The Dodis extractor amplifies the two data streams to generate an almost perfectly entropic output stream of data, provided that a combined min entropy rate of both sources is >1, namely over 50% of the total input bits across the two sources are random. In effect, the Dodis extractor does not increase overall entropy, but rather concentrates the initial entropy, which is spread across the two independent input data streams, into a single output data stream (bit string).

The Dodis extractor may be implemented using a convolution theorem on circulant matrices and a number theoretic transform (NTT), which gives a complexity of order O(n log n), wherein n is the input bit stream length of each source. Accordingly, the Dodis extractor is capable of running efficiently in practice for large data block sizes.

In some implementations, a core of the Dodis extractor may be implemented as a numerically precise version of a Fast Fourier Transform (FFT), for example, using the number theoretic transform mentioned above. The Dodis extractor, when implemented in software, may be written (for example) in the C-language for use on a regular computer; alternatively, the Dodis extractor may be implemented for example in a more contemporary Go+VHDL language for use on a Field Programmable Gate Array (FPGA). Accordingly, the Dodis extractor can be implemented in various ways on different platforms.

In some cases, the system 3000 may be implemented primarily in software. This can help to allow complexity improvements in the post-processing used to generate the aforesaid quantum-grade encryption keys 3050, for example by way of improved randomness extraction, even when data block sizes in the quantum-grade encryption keys are relatively large. Moreover, such a software-based implementation of the cryptography system 3000 supports the use of quantum circuits in quantum computer 3200 having small or minimal depth that can be run on noisy intermediate-scale quantum (NISQ) computing devices. Furthermore, the quantum circuits of quantum computer 3200 may be optimized to provide specific configurations of backend native gate sets to achieve smaller quantum circuits of shallow depth that are quantum noise-resistant.

Next, the weak source of randomness (WSR) 3100 will be described in greater detail. As described above, the weak source of randomness (WSR) 3100 may be implemented as a block min-entropy source. Here, "Block min entropy source" means that the source produces bit strings, and each string has a minimum set amount of entropy even when conditioned on previous bit strings. A Santha-Vazirani source provides one example of such a block min-entropy source, but it will be appreciated that the weak source of randomness (WSR) 3100 may be implemented in various other ways. For example, the weak source of randomness (WSR) 3100 might be implemented as a classical chip-based random number generator (RNG), for example an RDSEED as described in a scientific publication Hamburg, M., Kocher, P. and Marson, M. E., 2012, *"Analysis of Intel's Ivy Bridge digital random number generator"* that is accessible online: http://www.cryptography.com/public/pdf/ Intel_TRNG_Report_20120312.Pdf (this scientific publication is hereby incorporated in its entirety by reference). In other cases, the weak source of randomness (WSR) 3100 might be implemented as a commercially available quantum random number generator (QRNG), for example a commercially available IDQuantique device (see https://www.id-quantique.com/), or as a noise-based avalanche diode.

The quantum computer 3200 will now be described in greater detail. The quantum computer 3200 may be implemented as an ion-trap quantum computer (for example, as manufactured by Honeywell Inc.) or as a superconducting junction quantum computer (for example as manufactured by IBM Inc.), although other implementations of the quantum computer 3200 (including special purpose devices) are also feasible. The quantum computer 3200, when in operation, is used to run one or more quantum circuits, and may be configured to perform a Bell test, for example to compute a Mermin inequality. The Mermin inequality is described in a scientific publication N. D. Mermin, *"Extreme quantum entanglement in a superposition of macroscopically distinct states,"* Physical Review Letters, vol. 65, no. 15, p. 1838, 1990; this scientific publication is hereby incorporated in its entirety by reference. The Mermin inequality may be expressed as:

$$M_{obs} \equiv M(\vec{P}_{obs}) = \qquad \text{Eq. A1}$$

$$\langle A_0 B_1 C_1 \rangle + \langle A_1 B_0 C_1 \rangle + \langle A_1 B_1 C_0 \rangle - \langle A_0 B_0 C_0 \rangle \leq 2$$

where $\langle A_x B_y C_z \rangle \equiv$ $$\sum_{a,b,c=0,1} (p(a \oplus b \oplus c = 0|xyz) - p(a \oplus b \oplus c = 1|xyz)) \text{ and } \oplus$$

denoting the sum modulo 2.

wherein a, b, c are the measurement results for each of three qubits, (namely, the outputs from the quantum computer 3200) when measurements x, y, z (namely, the inputs to the quantum computer 3200) are performed. A violation of $M_{obs} > 2$ is only possible if the 3 qubits are in an entangled state; it is thereby feasible to certify their true quantum nature from observed statistics of such a Bell test (for example):

$$|GHZ\rangle = \frac{1}{\sqrt{2}}(|000\rangle + i|111\rangle). \qquad \text{Eq. A2}$$

Note that Equation A2 provides one example of a (GHZ) quantum state that would violate a Mermin inequality. There are many more examples of such states, and the approach described herein can be used with many different states.

In operation, statistical computations are executed in order to calculate Equation A1 (Eq. A1), the statistical data being collected by running circuits on the quantum computer

3200. The operations of each quantum circuit are based on a method including following steps:

Step 1: prepare a quantum state and generate a three-qubit GHZ state as specified in Equation A2 above;

Step 2: make a measurement choice: for example, for the state specified in Equation A2, one of 4 different measurement choices is performed on the state (x, y, z=YXX, XYX, XXY or YYY) in which a Pauli-X or Pauli-Y measurement is made on each of the 3 qubits. A Pauli-X measurement is implemented using a Hadamard gate (H) and a Pauli-Y measurement is implemented using an S-dagger, or phase gate (S†), and a Hadamard gate (H). This is then followed by a measurement in the standard basis (computational basis) to provide detection;

Step 3: perform a detection, wherein the state of the qubits is read out from each quantum circuit as the measurement result (a, b, c); and Step 4: perform a collection of results.

Figure 30:
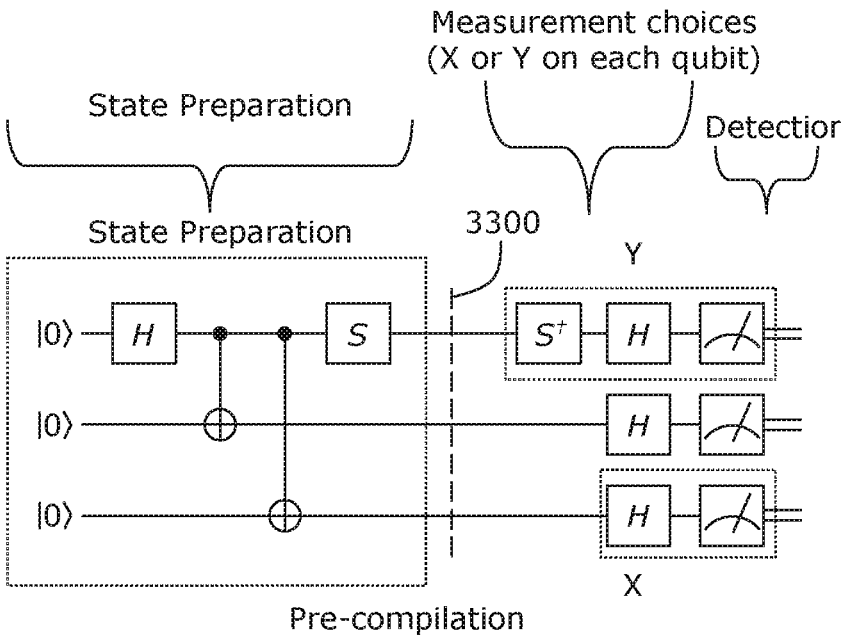
FIG. 30 is an illustration of a quantum circuit for use in the quantum computer of FIG. 29, wherein the quantum circuit is configured to collect statistical data for calculating whether or not a violation of a Bell inequality has occurred.

In FIG. 30, there is shown one of the four quantum circuits which is run on the quantum computer 3200 in order to collect the statistical data to determine any Bell inequality violation as per Equation A1 above. Note there are 8 possible circuits which could be run on the quantum computer 3200 in order to calculate the Mermin inequality for our chosen GHZ state. In one implementation (shown in FIG. 29), only 4 of these circuits are used. However, other implementations might use different permutations of measurement bases and so could also be used in a protocol in which 8 circuits are applied. FIG. 30 is denoted as precompilation—this generally indicates the circuits before any compiler optimisation is applied.

Steps 1 to 4 as provided above will next be elucidated in greater detail.

Steps 1: State Preparation:

The 3 qubits are initialised in the |0> state and we apply single-qubit gates (Hadamard Hand phase gate S) and two-qubit gates (CNOT gate) on them in order to generate the GHZ state as per Equation A2 above.

In FIG. 30 there is shown a dotted line 3300 after state preparation. This dotted line represents an instruction to the compiler to ensure that the state is fully prepared before any measurement is performed each time a quantum circuit is run, in particular, the line enforces preparing the exact same state when implementing the (4 or 8) circuits. Accordingly, if any optimisation is performed by the compiler for the quantum computer 3200 on the gates used (such as shown in FIG. 30), the gates for measurement and the gates for state preparation are kept separate, hence there is no mixing of gates between the state preparation and the subsequent measurement.

Step 2: Measurement Choice

The gates after the dotted line 3300 in the quantum circuit of FIG. 30 are used to select a measurement choice and to read a state of the qubit. In some implementations, the quantum circuit is used to provide statistical data (for example) for <$A_0 B_1 C_1$>, where the subscript 0 is used for a Pauli-Y measurement on a qubit and the subscript 1 is used for a Pauli-X measurement on the qubit. It will be appreciated that FIG. 30 therefore shows a 011 measurement being taken, i.e. a YXX measurement. The other three quantum circuits are permutations of this configuration, namely 101, 110, and 000, corresponding to XYX, XXY, YYY respectively. This is achieved by re-positioning the S† and H gates accordingly.

Step 3: Detection:

The state of the qubits is read out at the end of the quantum circuit as the measurement results (a, b, c). (This is equivalent to measurement in the standard or computational basis).

Step 4: Collect Results:

Quantum circuits are repeatedly sent to the quantum computer 3200 and the measurement results collected (a, b, c), together with the measurement choices (x, y, z) such that Eq. A1. For example, in an example implementation of the system 3000, a minimum of $10^6$ total quantum circuits may be used.

These are 4 of 8 possible circuits that could run on the quantum computer in order to calculate the Mermin inequality for a given chosen GHZ state. In one implementation, that of FIG. 29, only these 4 are required; however, other permutations of measurement bases may also be used, some in a protocol where all 8 circuits would be applied.

Figure 31:
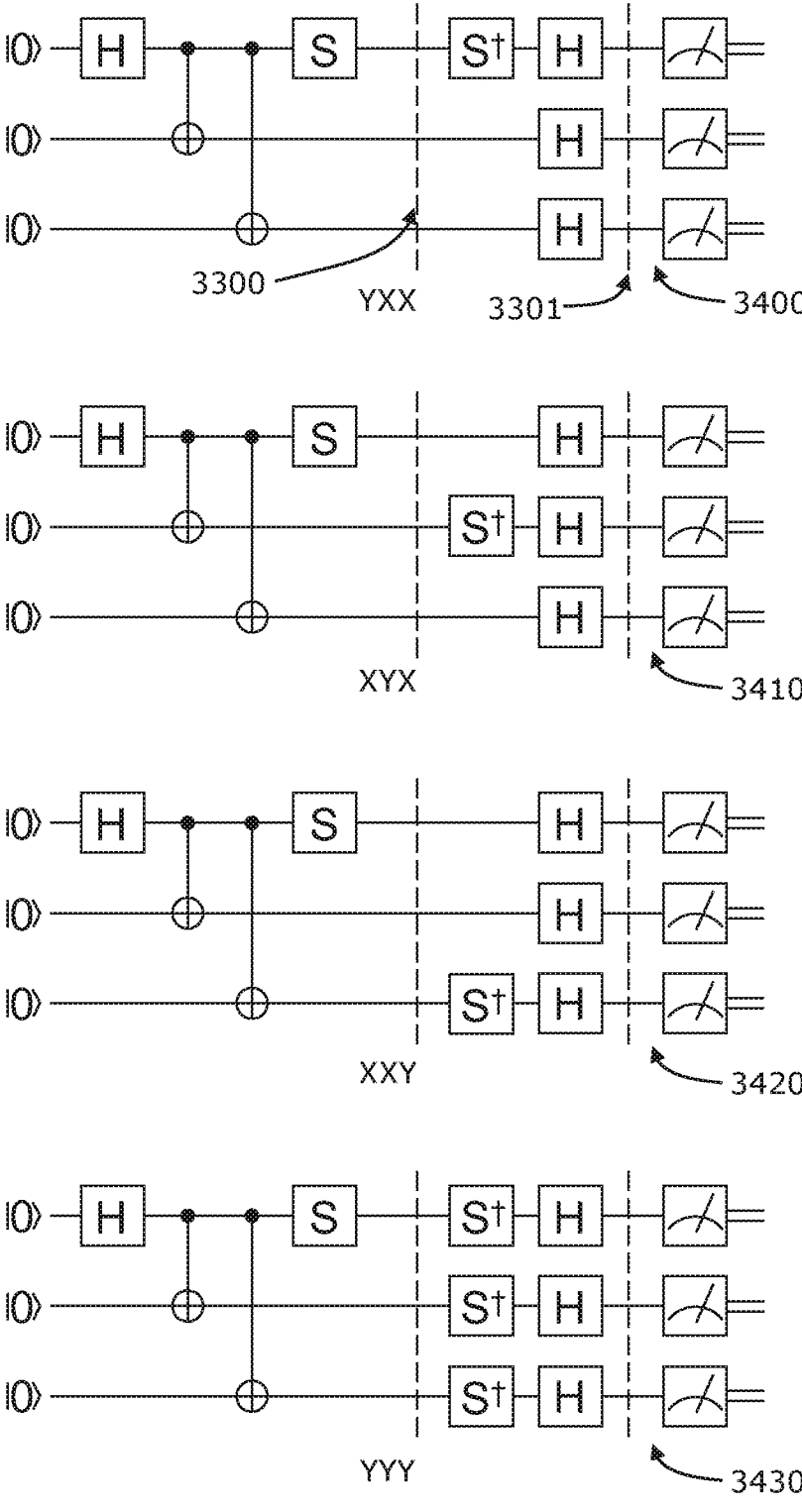
FIG. 31 is an illustration of quantum circuits for use in the system of FIG. 29, wherein the quantum circuits are configured to collect statistical data for detecting whether or not a Bell violation has occurred.

In FIG. 31, four quantum circuits are indicated generally by 3400, 3410, 3420 and 3430, corresponding to YXX, XYX, XXY and YYY respectively (note that circuit 3400 is also shown in FIG. 30). In the quantum computer 3200, each of these four quantum circuits 3400 to 3430 is run many times to collect the statistical data needed for Eq. A1. Such a collection of statistical data enables the system 3000 to determine whether or not the Bell inequality has been violated, and hence provide a measure of quantum randomness generated by the quantum computer 3200.

Note that in FIG. 31, each of the four quantum circuits 3400, 3410, 3420 and 3430 includes a dotted line 3301 which is analogous to the dotted line 3300 discussed above in relation to FIG. 30 (and also shown in FIG. 31). Thus the dotted lines 3301 represent another compiler instruction to provide a separation between the measurement selection (as per the gates) and the subsequent detection elements; in effect, for each quantum circuit, the compiler must ensure that all the measurements are completed before performing any of the detections. This separation helps to reduce measurement crosstalk (namely, signalling). Note that a dotted line 3301 between the measurement and detection would generally also be present in the implementation shown in FIG. 30, however such a line is omitted from FIG. 30 for reasons of clarity. It will also be appreciated that dotted lines 3300 and 3301 can be regarded as optimizations; however, one or both of these optimizations may be omitted in some implementations if so desired.

Figure 32:
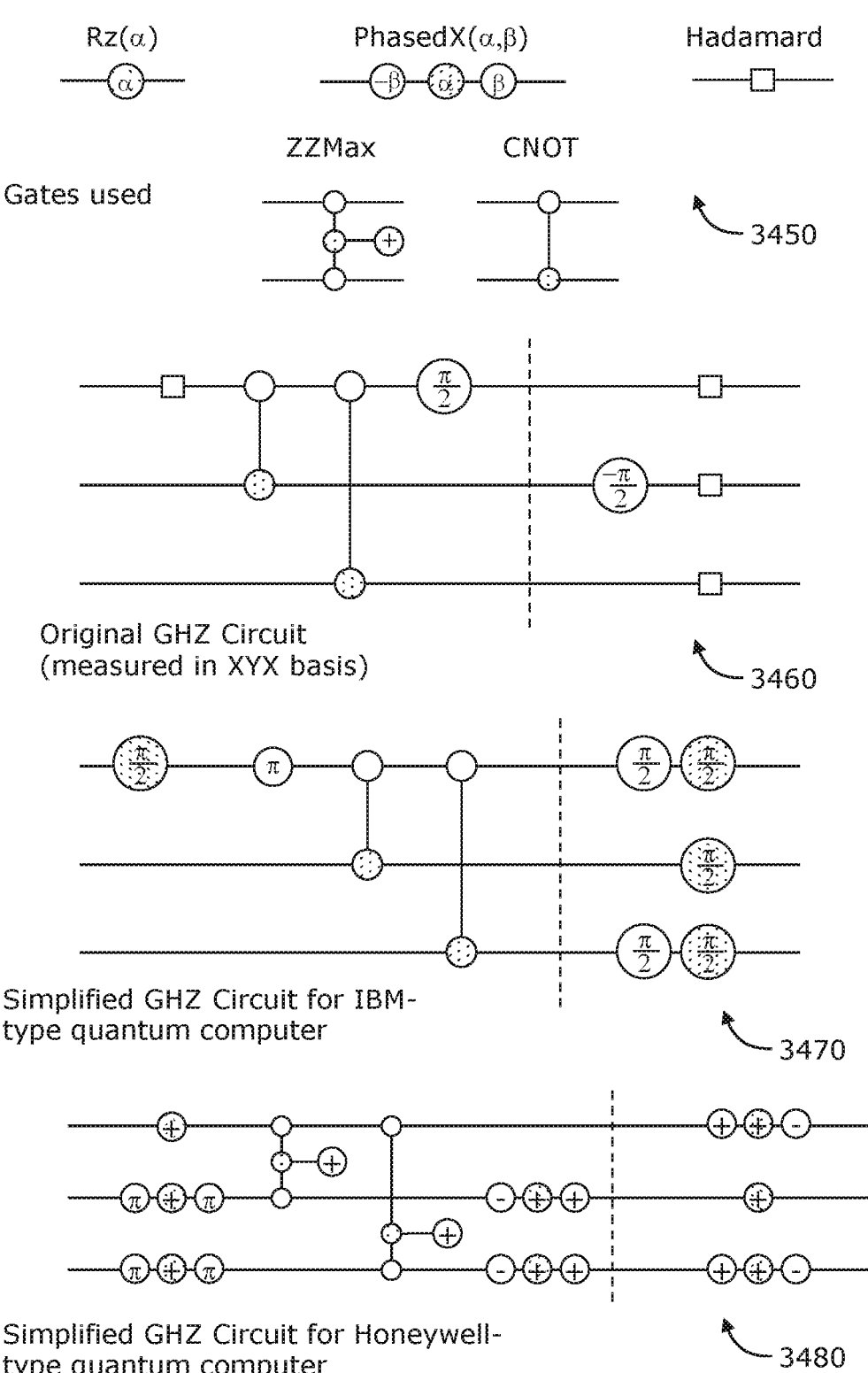
FIG. 32 is an illustration of optimisation or customization of the quantum circuits for use with particular implementations of the quantum computer of FIG. 29.

In FIG. 32, there are shown further quantum circuit implementations 3460, 3470, 3480 for use with the ARQ protocol described herein. However, it will be appreciated that the portion 3450 of FIG. 32 is not a circuit implementation per se, but rather a listing of gates used in the other implementations. The circuit 3460 in FIG. 32 generally corresponds to circuit the 3410 in FIG. 31. The remaining two circuits in FIG. 32 represent optimisations of circuit 3410/3460 as discussed in more detail below.

In some implementations, an increased degree of parallelisation may be achieved compared with implementations shown in FIGS. 30 and 31. For example, while some implementations of the quantum computer 3200 may use just three qubits to run each quantum circuit individually, other implementations of the quantum computer 3200 may have more than three qubits. In such a case, it is feasible to run multiple circuits temporally in parallel on one quantum computer by dividing the qubits into groups of three qubits, so that multiple quantum circuits can be executed simultaneously. This allows for generated seeds to be created in parallel.

In addition, rather than running one quantum circuit at a time and completely reinitialising the quantum computer 3200 between executing each successive quantum circuit, some quantum computers allow for conditional resets to be used. Such a facility allows many quantum circuits to be executed sequentially without invoking a time-costly procedure of re-initialisation and calibration between executing every quantum circuit.

In some implementations, quantum circuit optimization may be used when executing quantum circuits on the quantum computer 3200. Thus, FIG. 31 provides illustrations of basic functional quantum circuits 3400, 3410 (see also 3460), 3420, and 3430 that may be executed on the quantum computer 3200 to carry out the ARQ protocol in the cryptographic system 3000 described herein. The quantum circuit 3470 of FIG. 32 has been specifically adapted from the circuit 3410 for execution on an IBM-type Josephson junction cryogenically-cooled quantum computer. In contrast, the quantum circuit 3480 has been specifically adapted from the circuit 3410 for execution on a Honeywell-type ion-trap quantum computer. In practice, due to differences in quantum computing hardware, the native gate-set on for example a Honeywell ion trap quantum computer, is different from that on an IBM superconducting quantum computer. Thus, the quantum circuits used for implementing the system 3000 may be customized (and/or optimized) for the particular platform used for quantum computer 3200—e.g. specific gates may be implemented to reduce (for example, minimize) the number of gates used for a given hardware configuration. For achieving such optimization, the ZX-calculus may be used, for example to achieve quantum circuit implementations that are optimal in terms of single-qubit and two-qubit gate count.

When implementing the system 3000, it may be desirable to use the seeded extractor 3140 in different ways according to the relevant circumstances. Thus, a seeded extractor may perform an algorithm which is implemented on hardware, on software, or a combination of hardware and software. The seeded extractor may take as a first input a near-perfect string of bits (referred to as its seed 3930) and as a second input a weak or imperfect random bit string (such as from WSR 3100). The seeded extractor 3140 is then used to generate, from the two inputs, an output bit string of (near-)perfect bits. The length of the output corresponds approximately to the number of random bits (the min entropy) in the second input from WSR 3100.

Given that a strong seeded extractor may be used to provide an extractor output which is (near-)independent of the seed, the same seed 3930 may be used many times with fresh strings 3115 of randomness from a weak source (such as WSR 3100) to generate a much longer output. In practice, the cryptographic system 3000 may generate multiple output random bit strings for use as encryption keys within the system 3000.

In some implementations, it may be beneficial to use as the seeded extractor 3140 a two-source extractor. One input of the seeded extractor 3140 may receive the generated seed 3930 having (near) perfect randomness. The other input of the seeded extractor may be provided by a second output 3115 from the WSR 3100.

In some implementations, the system 3000 may contain two Dodis extractors, one acting as the 2-source extractor 3122, and the other acting as the seeded extractor 3140. As previously mentioned, a Dodis extractor is a strong extractor, whereby wherein the output of the extractor is independent of one of the two inputs thereto; in particular, the output could be made independent of the generated seed 3930, in effect allowing multiple keys to be generated from a given seed 3930. In this approach, each key 3050 is generated using a different input from the WSR 3100. One advantage of this approach is that it is easier to use the WSR 3100 (than the quantum computer 3200) to generate such multiple inputs.

Accordingly, a Dodis extractor may be used with the same seed many times (up to some predefined security parameter) to generate a much longer quantum-grade random bit string output for use in generating quantum-grade encryption keys in the system 3000. As discussed above, a Dodis seeded extractor takes two strings, one (near-)perfect and the other weak or imperfect, to generate an output quantum-grade random bit string that has near-perfect entropy. The Dodis extractor may be implemented using a convolution theorem on circulant matrices, which gives complexity of order O(n log n), where n is the input length of each source bit string. Such an implementation provides a considerable improvement over other public results. Such an implementation is quantum proof in the Markov model with a penalty in output length (see "Quantum-proof multi-source randomness extractors in the Markov model" by Arnon-Friedman et al, available from https://arxiv.org/pdf/1510.06743.pdf).

As noted above, one reason the Dodis extractor is attractive for use as a seeded extractor 3140 when implementing the system 3000 is because it is a strong extractor; this supports multiple uses of the extractor with a given seed 3930 to generate many quantum-grade encryption keys. In addition, the Dodis extractor generally provides a good trade-off between seed length and computational complexity.

Although use of the Dodis-type extractor is described above for use with the cryptographic system 3000, alternative types of extractor may be used in the system 3000, of which the following are examples:

(a) a Hayashi-type extractor as described in a scientific publication Hayashi, M. and Tsurumaru, T., 2016. *"More efficient privacy amplification with less random seeds via dual universal hash function"*, IEEE Transactions on Information Theory, 62(4), pp. 2213-2232;
   (b) a Toeplitz-type extractor as described in a scientific publication Krawczyk, H., 1995, May. *"New hash functions for message authentication"*, in International Conference on the Theory and Applications of Cryptographic Techniques (pp. 301-310). Springer, Berlin, Heidelberg;
   (c) a Trevisan-type extractor as described in a scientific publication Maurer, W., Portmann, C. and Scholz, V. B., 2012. *"A modular framework for randomness extraction based on Trevisan's construction"*, arXiv preprint arXiv:1212.0520; The Trevisan-type extractor's speedup comes from its parallelism, whereby each bit from the output block is extracted independently in a vectorised fashion. The Trevisan-type extractor can be sped up by using a Graphical Processing Unit (GPU) of a non-quantum computer.

The above citations (a)-(c) are all incorporated by reference herein in their entirety. Note that the above extractors generally require one input to have perfect entropy, so they are generally suitable for use as a seeded extractor 3140, but not as a two-source extractor 3122 in which both inputs have weak (imperfect) randomness.

Note that the above Hayashi, Toeplitz and Trevisan extractors are also strong extractors (like the Dodis extractor). The Hayashi-type and Toeplitz-type extractors are based on universal hashing and derive their security from the well-known leftover hash lemma (see https://en.wikipedia.org/wiki/Leftover_hash_lemma); they are secure against quantum side information without a penalty. Similarly, the Trevisan-type extractor is secure in the presence of quantum side information without a penalty. The Hayashi-type and Toeplitz-type extractors have been implemented with a complexity in the order of O(n log n), and the Trevisan-type extractor has been implemented with a complexity in the order of $O(n^2)$, where n is the input length of each source bit string of the WSR input. Although the Trevisian extractor has a higher complexity, it is amenable to hardware parallelism, since each bit from an output block can be processed independently, thereby supporting fast computation in practice.

In some implementations, a core of the Dodis-type, Hayashi-type and Toeplitz-type extractors represents a number theoretic transform (NTT), namely a numerically precise version of the FFT (Fast Fourier Transform). It is feasible, for example, to implement an NTT in the C computer language for use on a non-quantum computer, and in the Go+VHDL language for use on a FPGA (Field Programmable Gate Array). Both NTT implementations may be used to implement the most suitable theoretically known algorithms for Dodis-type extractors.

If multiple uses are made of a given strong seeded extractor for given extractor parameters, there is some composable 'error' associated with an output from the given strong seeded extractor. It is desirable for the error to be bounded, namely kept within defined limits, while allowing for multiple uses. To do this, extractor parameters may be calculated. For example, $2^{300}$ seeded extractions may be executed with a final quantum-grade random bit string output (of $2^{300}\times$ seeded extractor output length) which is indistinguishable from perfectly uniform random data up to a probability of $2^{-128}$.

With reference to FIG. 33, there is shown an example implementation for the cryptographic system 3000 having a two-tier implementation comprising a secure user environment 3500 and a server backend 3600. The secure user environment 3500 may be located within (e.g. downloaded to) a client device 3010 but may also be located on a server accessible to the user (for example, in a cloud computing configuration). The secure user environment includes a private source of randomness 3510, which may be implemented using a WSR 3100 as discussed above, and an original equipment manufacturer (OEM) crypto-library 3540. The latter includes one or more stored seeds held in database or other suitable (and secure) storage facility 3530 and an extractor 3520, which may be implemented for example in the same manner as the seeded extractor 3140 as discussed above. Note that in some implementations, the private source of randomness 3510 might also be included in the OEM crypto-library 3540.

The server backend 3600 comprises two main components, namely a proprietary backend 3610 and quantum computer 3200 (as discussed above). The proprietary backend 3610 acts as an interface for sending requests to, and receiving random bits strings in response to such requests from, the quantum computer 3200. The proprietary backend 3610 may also include a Bell tester 3124 (not shown in FIG. 33) which is responsible for confirming that that random bit strings received from the quantum computer 3200 violate the Bell inequality, and hence can be relied upon to provide a source of quantum randomness. In some cases, the operator of the quantum computer 3200 may also provide the proprietary backend 3610 (so this can be regarded as an integrated backend), while in other cases the operator of the quantum computer and the provider of the proprietary backend 3610 may be separate from one another.

The proprietary backend 3610 may also be used for provisioning (e.g. downloading from or by) the components of the secure user environment 3500 over a network to the client. Such components may include the secure user environment 3500 itself (although this may be provided separately, for example, by a particular hardware configuration), the private source of randomness 3510, the extractor 3520, and the seed database 3530. Depending on the particular configuration adopted, further components (not shown in FIG. 33) may also be downloaded from or by the proprietary back end 3610, such as the two-source extractor 3122 and/or the Bell tester 3124.

In operation of the cryptographic system 3000 of FIG. 33, the proprietary backend 3610 obtains a random bit string from the quantum computer 3200 which is combined with a weak source of randomness (such as 3100) using a two-source random extractor 3122 as described above to generate a seed 3930 which has near perfect randomness (as described above, e.g. in relation to FIG. 29). The proprietary backend 3610 then sends the generated seed 3930 to the user client 3010, in particular to the secure user environment 3500, for storage in the seed database 3530. The extractor 3520 then combines the random bit string, namely the seed 3930, from the seed database with the output from the private source of randomness 3510 to generate a quantum-grade random bit string as output 3136 which can be used (inter alia) for generating encryption keys 3550. The encryption keys may be distributed to a user 3010 using secure encryption techniques, for example as disclosed above in relation to FIG. 28.

In some implementations, the database 3530 might be used to hold only a single seed 3930—as noted above, such a seed may have (near) perfect randomness and may potentially be used to generate many random bit string outputs 3136 of the extractor 3520. However, in other implementations, the database 3530 might hold multiple seeds 3930— for example, if the extractor 3520 is not a strong extractor (so any given seed could then generally be used only once).

It will be appreciated that the configuration shown in FIG. 33 represents one of a number of different possible configurations which may be adopted. Examples of various configurations or implementations include:

(i) conducting all of the private (secure) processing (see FIG. 29) on an end user's side. The user 3010 therefore has or obtains (e.g. downloads) the secure private environment 3500 and a local min-entropy source 3510 (such as WSR 3100). In operation, a query may be sent to a remote proprietary quantum computer 3200 over an authenticated channel from the user 3010, the output from the quantum computer 3200 is then received back into the secure private environment, and the subsequent processing steps as described above with respect to FIG. 29 are then completed in private within the secure private environment 3500 using software, hardware, tools (or any combination thereof) to obtain some (near-)perfect and private quantum-grade random bit strings for use in generating quantum-grade encryption keys;

(ii) in some implementations, the interaction with the quantum computer 3200 may be performed solely or in part by the proprietary backend, which would then provide the first random bit string 3030 from the quantum computer to the secure user environment to feed into a two-source extractor 3122 (not shown in FIG. 33). The Bell tester 3124 which performs the certification of the first random bit string 3030 may in some cases be located in the proprietary back end or in other cases in the secure user environment. (It will be appreciated that in the former option, the proprietary backend 3610 can provide the secure user environment 3510 with information about the level of entropy in the first random bit string 3030, since this information can then be used by the two-source randomness extractor to help produce a seed 3930 of near perfect entropy.

(iii) in some implementations, the steps of the ARQ protocol described above may be completed primarily on the remote proprietary quantum computer side 3610 and an authenticated (near-)perfect seed 3930 supplied to the user. In this case the user may then use a strong seeded extractor (such as 3140) and a private WSR 3100 (the private source of randomness 3510) in the secure private environment 3500 to get a much longer and private near-perfect output 3136. This configuration can be mapped onto the arrangement for the cryptographic system 3000 illustrated in FIG. 33, in which a proprietary supplier equipped with a quantum computer 3200 sends the user one or more seeds 3930 of independent randomness and the client does further seeded randomness extraction on the user's side.

(iii) the quantum output is provided to a board or other device with a WSR 3100 thereon and the seed 3930 is created. Such a device may then obtain further WSR output which is provided, together with seed 3930, for use by a seeded extractor 3140 as described above).

(iv) the database 3530 may be used to store (potentially in encrypted form) the random bit strings 3136 output from the extractor 3520 (rather than storing seeds 3930 to use as the input to the extractor 3520). (The configuration and flow indicated in FIG. 33 can then be adapted accordingly). The output from the database, namely the stored random bits strings 3136 may be converted as desired into keys 3050 as and when needed.

(It will be appreciated that the above examples are not intended to be limiting and the skilled person will be able to develop many other modifications and configurations).

Some configurations may be implemented in the form of a cloud-hosted software-as-a-service (SaaS) platform which is configured to deliver one or more newly-generated cryptographic keys 3050 to one or more end customers 3010. The cryptographic keys are generated using entropic processes executed in one or more quantum computers 3200. The entropic processes use certain quantum random bit string generation algorithms that are executed using quantum gates of the one or more quantum computers.

A given end customer can request one or more new cryptographic keys by sending a message to the platform. In response to receiving the message, the platform generates one or more new quantum-grade cryptographic keys, encrypts the one or more new quantum-grade cryptographic keys (e.g. with a transport key as described above), and then sends the encrypted one or more new quantum-grade cryptographic keys back to the given end customer. In this configuration, the platform can be regarded as implementing the functionality shown for example in FIG. 29. The platform in effect represents a middle tier, corresponding to the private domain 3002, located (architecturally) between the client 3010 and the quantum computer 3200.

In the above approach, the one or more new quantum-grade keys may be sent in encrypted form from the SaaS platform so that only the given end customer can access the quantum-grade keys by decrypting them. The transport key used to encrypt the quantum-grade keys may be generated by the platform during registration of a new customer on the platform. The transport key may then be sent in a suitably secure manner to the customer, for example, by using public/private key cryptography, and/or in multiple XOR components through a variety of different mediums, such as SMS message, email, and/or printed on paper. The customer (user 3010) is then able to reconstruct the transport key by combining the XOR components.

In some configurations, some or all of the functionality of the SaaS platform for implementing the ARQ protocol may be provided in software form to a client 3010 for integration with existing end-customer systems. For example, some end customers may use a hardware security module (HSM) to protect their keys. In this approach, a customer may use the integrated systems to securely provision quantum-grade keys received from the platform into the customer's HSM.

An alternative approach is to integrate the ARQ protocol into a site or service providing the quantum computer 3200. In such a case, a user 3010 requests one or more keys 3050 from the site/service, which then performs all the processing associated with the ARQ protocol to return to the user the requested keys.

Irrespective of the particular configuration used to provide the ARQ protocol (or similar functionality) to a user 3010, e.g. whether the functionality is located at the client-side, at the quantum computer 3200, or as a standalone facility, the functionality may be provided as a 'black box'. In other words, the user may request and receive quantum-grade keys from the ARQ facility, but the internal implementation and operations of the black box may be kept hidden from a user and hence cannot be externally determined.

In some implementations, a communication connection between the client 3010 and the platform may be secured using a standard TLS (transport layer security) connection over the Internet or over any other network running the same or similar protocols. It will be appreciated that TLS is widely used, for example to provide HTTPS websites. Inside the TLS connection, communications are encrypted by using 256-bit AES (see https://en.wikipedia.org/wiki/Advanced_Encryption_Standard). TLS may be used to encrypt the quantum-grade keys sent from the platform to the client (such encryption may be instead of or in addition to any encryption performed by the platform itself). In addition, TLS protocols may be used to set up a transport key between the client and the platform if so desired.

In some implementations, the ARQ procedure implements two main algorithms (or groups of algorithms). The first algorithm is used to generate a random bit string (namely the seed 3930) from one or more quantum computers, which is then stored in a database 3530. Note that in some cases, the seed may be stored in encrypted format with the database 3530. In addition, some of the processing of the first algorithm may be performed outside the secure user environment, e.g. by the proprietary backend as described above. The second group of algorithms are used to extract one or more random bit strings (seeds) from the database and output corresponding random bits strings 3136 for use in the generation of quantum-grade keys.

The first algorithm includes (for example) executing a number of 3-qubit circuits on the quantum computer 3200 and obtaining a Mermin's inequality value to indicate how much entropy can be extracted from the results. The output from the quantum circuits is combined with a local private source of randomness and passed through a 2-source randomness extractor to produce the seed 3930 of near perfect entropy. Finally, the output from the 2-source extractor is again combined with the local private source of randomness and passed through a seeded extractor 3520 (corresponding to extractor 3140 in FIG. 29). The output from the seeded extractor is the random bit string to be saved into the above-mentioned database. The second group of algorithms are used to generate keys from the random bit strings, and hence act as a form of key generation system 3040 (see FIG. 28). The functioning of such a key generation system may be implemented, for example, using various known systems or algorithms, such as NTRU, Kyber CRYSTALS, Classic McEliece (see Wikipedia for more details, wherein further options are known to the skilled person). In this context, the random bit strings 3136 output from the extractor 3530 (or output from the database 3530 if the random bit strings 3136 are held (stored) there, can be regarded as key precursors (although they may also be used for any other desired purposes, such as Monte Carlo simulations).

Although use of a quantum computer 3200 is described above for implementing the system 3000, it will be appreciated that quantum optical hardware or any other appropriate quantum device may alternatively or additionally be used as a source of quantum entanglement to implement the random bit string generator 3020 that is configured in use to generate a quantum-grade random bit string 3930. Further details above such an implementation, including the quantum optical hardware, are provided below (inter alia with reference to FIGS. 1 to 27; note however these Figures are generally relevant to multiple different implementations described herein, not just the use of quantum optical hardware).

Further information about the cryptographic system 3000 such as shown in FIGS. 28, 29 and 33 can be found in the following description, see for example (without limitation) the sections: "Three-qubit protocol for high rate device-independent quantum randomness amplification" and "Classical post-processing for quantum randomness amplification".

The ARQ procedure described herein therefore provides (inter alia), at a high level, a method for generating (near-) perfect random bit strings from a weak source of randomness using a quantum process, such as a public quantum computer or other quantum device that produces some testable (certifiable) randomness. That is, the quantum process that generates this randomness can be certified given certain assumptions about the device. The (public) randomness from such a quantum computer can then be used to amplify a weak source of randomness to give (near-)perfect randomness.

The randomness from both the weak source of randomness (WSR) and the public quantum computer (QC) is measured in terms of entropy, which denotes how many truly random bits are contained in a bit string. The ARQ procedure gives a quantitative lower bound on the entropy from a QC, and thus allows randomness from the WSR to be amplified into a (near-)perfect source of randomness using a two-source extractor to produce the generated seed 3930. This generated seed can then be used as a seed in multiple uses of a strong seeded extractor 3140 to generate more (near-)perfect randomness from the WSR.

In some configurations, processing within the private domain 3002 (see FIG. 29) is implemented on a server or cloud, and the perfect randomness, such as in the form of keys 3050, is distributed to the user (client) 3010 using secure encryption techniques such as shown in FIG. 28. Other configurations that may be adopted according to the particular circumstances include: the processing within the private domain 3002 is performed on an end user's side— i.e. on one or more clients 3010 provided with a secure private environment and a local min-entropy WSR 3115 (such as discussed above in relation to FIG. 33). In such a configuration, a user 3010 queries a remote quantum computer 3200 over an authenticated channel and then implements the ARQ protocol in a private domain 3002 to obtain some (near-)perfect and private random bit strings 3136 as output. Note that the hardware and/or software implementation of the ARQ protocol may be provided or made available to the client 3010 by a third party with suitable expertise in quantum-grade cryptography. In some configurations, the functionality of the private domain 3002 may be partly or wholly implemented in some specialized hardware component, such as a board or other device that can be connected to a client 3010 to make a cryptographic system 3000 such as described herein available to the client.

FIG. 1 is a schematic diagram of an example of an apparatus 100 for certifying that a number has been produced by a quantum apparatus 102 in an independent manner, and of an example randomness extractor 110 configured to generate a random number 116 for use in a variety of downstream applications 120, 122, 124, 128. The randomness extractor receives input from a weak source of randomness 114 (denoted here and in the figure as WSR-2), which can be a classical apparatus for computing a pseudo-random number. In addition, the apparatus 100 also has a weak source of randomness 104 (denoted here and in the figure as WSR-1), which can be a classical apparatus for computing a pseudo-random number.

A weak source of randomness as used herein (e.g. in respect of WSR-1 104, WSR-2 114, and WSR 3100) refers to a source of randomness where the randomness is not certifiable as the result of, or being based on the presence of, quantum effects. The term "weak" does not itself connote that the source of randomness is somehow unsuitable or insufficient to meet industry standards of randomness. In some implementations, a weak source of randomness can be at least partly nondeterministic or even completely nondeterministic. Weak sources of randomness thus include sources that output noncertifiable nondeterministic random numbers. Weak sources of randomness are sometimes referred to simply as sources of randomness.

The quantum apparatus 102 comprises apparatus for generating a plurality of qubits and preparing the qubits in a particular quantum state, as well as apparatus for measuring the qubits in at least two different bases. The apparatus 100 has security test logics 106 for automatically certifying that a given plurality of qubit measurements 108 has violated a Bell inequality. The quantum computer 3200 and the Bell tester 3124 of FIG. 29 may correspond to the quantum apparatus and test logics 106 respectively.

As used herein, a Bell inequality refers generally to any inequality associated with measurements of quantum or classical systems, where violation of the inequality means that the measurements are consistent with the rules of quantum mechanics (e.g., entanglement or non-locality) and inconsistent with the rules of classical physics (e.g., local realism or hidden variables). A Bell inequality includes an inequality that is always satisfied by any local probability distribution for the measurement results of two parties, which is one that can be realized when each party's device has its own internal state. A Bell inequality includes any of the original inequalities derived by John Stewart Bell as well as inequalities derived by others such as, for example, a CHSH inequality (Clauser Home Shimony Holt inequality), a Leggett inequality, a Leggett-Garg inequality, and so forth. As further described herein, the violation of a Bell inequality guarantees that the output of the quantum apparatus 102 is from quantum effects, and therefore is independent of other sources including, e.g., a classical weak source of randomness.

Certifying that the qubit measurements 108 violate a Bell inequality indicates that the qubit measurements have been produced due to quantum effects, rather than classical effects, and it also indicates that the qubit measurements 108 are independent of any other classical weak source of randomness, such as WSR-2 114 in FIG. 1 and WSR-1 104. In this sense, certifying that qubit measurements 108 have been produced due to quantum effects certifies that the qubit measurements 108 incorporate quantum randomness. The certificate allows a user to trust the randomness of the output without access to the internals of the quantum apparatus 102 (and thus, e.g., without arranging for an expert to inspect the internal structure of the quantum apparatus 102 and test it).

The security test logics 106 can be implemented using any combination of one or more of: software, firmware, or hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs), Central Processing Units (CPUs), or any other type of hardware processor. In some implementations, an application programming interface (API) is provided so that the user can access the security test logics 106. For example, the user may utilize the API to run a test to determine that a given plurality of qubit measurements 108 has violated a Bell inequality (e.g., security test A described below) or that the quantum devices are non-signaling (e.g., security test B described below). The API may provide a test mode in which a user can access raw data from the apparatus 100 so that the user can perform any desired testing to determine that the apparatus 100 is running properly.

In the embodiment shown in FIG. 1, the set of qubit measurements 108 is of a fixed size that may not be appropriate for use in downstream applications 120, 122, 124, 128. Therefore, a randomness extractor is used in some embodiments to compute a number of appropriate size/length. Once a plurality of qubit measurements 108 has been obtained and certified as produced by quantum effects, the measurements 108 are input to a randomness extractor 110. Classical randomness extractors such as, e.g., Trevisan's extractor may be used. In some such embodiments, the randomness extractor 110 takes as input a pseudo-random number 112 from a weak source of randomness 114 as well as the certified qubit measurements 108. The randomness extractor computes a number as output which may be of any specified length. The number produced by the randomness extractor 110 has amplified randomness as compared with the pseudo random number 112 and is truly random because the inputs to the randomness extractor are certified as being independent of one another as explained in more detail below. The 2-source extractor 3122 of FIG. 29 may correspond to the randomness extractor 110.

In some embodiments, the number with amplified randomness 116 is input to one or more downstream applications. A non-exhaustive list of examples of downstream applications includes: computer security 120, where random numbers are often used as one-time pads (OTPs) that are pre-shared between entities and used for encryption; meteorological forecasting 122, where random numbers are sometimes generated and used to initialize values of parameters of weather system models; a telecommunication system 124, where random numbers are sometimes generated and used for resource allocation schemes; and a manufacturing control system 128, where random numbers are sometimes generated and used to model noise present in sensor readings. The apparatus 100 can comprise a network interface in communication with a network. The random number 116 may be input to the downstream applications via the network interface, for example, via a local network connection or via a cloud-based network connection. For example, the apparatus 100 may be installed locally in a user's facility and the random numbers 116 input to various user applications. In other embodiments, the apparatus 100 may be remote from the user's facility, for example, in a facility provided by the owner of the apparatus 100. The random numbers 116 can be communicated over a network (e.g., the Internet, a wide or local area network, a cloud computing network, etc.) to the user's downstream applications. Accordingly, the apparatus 100 may be installed at a single location or be installed in a distributed manner.

In light of results such as those developed by Santha and Vazirani 1986 ("*Generating quasi-random sequences from semi-random sources*" in Journal of Computer and System Sciences, 33, I(1): 75-87), classical methods of random number generation typically assume access to two independent sources of randomness and use a randomness extractor to compute nearly ideal random bits. However, an assertion that two sources of randomness are independent generally must rely on further assumptions. This is one of the main drawbacks of such classical methods; it is generally not possible to guarantee the two weak sources of randomness are independent, so such classical methods are not device-independent.

In contrast, the present technology is able to guarantee independence of the quantum apparatus 102 and WSR-2, the classical weak source of randomness 114. The violation of a Bell inequality guarantees that the output of the quantum apparatus 102 is from quantum effects, and therefore is independent of other sources including WSR-2, the classical weak source of randomness 114. Thus the randomness extractor 110 takes input from two sources which are certified as being uncorrelated sources. In this sense, the output signal 116 of the randomness extractor is truly random.

Commercialized quantum randomness generators have hitherto not displayed certifiable device independence since a human operator needs to inspect the randomness generator and confirm that it is using quantum mechanics. Such devices use a quantum prepare-and-measure scenario to exploit the operationally probabilistic nature of quantum mechanics to create strings of random numbers that are preferable in a number of ways to classical pseudo-random number generation methods. Commercialized quantum randomness generators perform measurements in a single quantum context in a way that makes them unsuitable for a device-independent realization. Existing quantum randomness generators are without any guarantees of security, and to verify that the devices are working as specified can be difficult, even for an expert. For example, in certain previously developed photonics-based systems, it is hard to verify that the reported measurement outcomes are genuine, given that measurement of the photon system destroys the photon as it is incident on the detector: in the absence of a guarantee that reported measurement outcomes are due to quantum effects, the device could be yielding a pre-generated, yet apparently random, string of bits that is known to an adversary.

Many existing quantum-based randomness generators offer a security guarantee where the guarantee is valid only if the device is discarded after each round of measurement, or only if a very large number of devices are used in parallel (growing with the number of random bits produced). These approaches are not good candidates for a commercial device.

Many existing quantum randomness generators are not tolerant to realistic noise levels from feasible quantum devices, and therefore are not a good candidate for practical uses.

An advantageous aspect of the apparatus 100 is its robustness to noise: the security test logic works correctly (and does not abort) provided merely that the quantum state and the quantum measurements that compose the quantum device have a low level of noise. In particular, the apparatus 100 is able to operate and certify its output even if the different quantum systems of quantum apparatus 102 are only approximately non-signaling and not strictly non-signaling. Implementing strictly non-signaling quantum systems within a single device is unlikely to be practical.

Various embodiments of a four-device and two-device quantum apparatus 102 described in this document are unique in their design and application. They use quantum systems to achieve results not feasible using classical resources. The embodiments described herein are realistically implementable for practical day-to-day use. The embodiments use a small, fixed number of quantum devices and are tolerant to realistic levels of noise in the quantum devices. In addition, the quantum states are produced by quantum circuits requiring only a few gates and with low circuit depth.

An apparatus 100 that is able to both generate true randomness and also certify in a device independent way that it is working as intended and producing random bits offers distinct advantages over a weak source of randomness in any environment in which an attack on random bits by an adversary is even a remote possibility. In addition, the ability to certify random numbers is expected to be important for legislative reasons in the financial industry. When Monte Carlo simulation models are used to calculate forecasts, currently the initial pseudorandom seeds used typically must be submitted to a regulator, but previously there has been no effective way to prove that these seeds were indeed chosen at random and were not, for example, chosen to influence the results in a particular way. The present apparatus 100 produces the required random bits alongside a certificate 108 of the presence of quantum effects and, in this sense, a certificate of true randomness. We describe various non-limiting examples of a process to amplify any weak source of randomness into a nearly ideal source of randomness using quantum-mechanical systems. The process has the following key distinguishing features:

The apparatus 102 gives the benefit of being device independent, meaning that the user does not have to trust the inner working of the device. This is because the security test logics, which perform statistical tests on the input/output of the device, give the user a certification that the output bits 108, 116 are indeed random. Apart from offering a certificate of randomness, the apparatus 102 is additionally secure in the sense that the output bits 108, 116 are unknown to anyone else apart from the user. The security or correctness given by the apparatus 100 does not rely on any computational complexity assumptions and, in at least this sense, is unconditional. The only assumption used for proving the correctness and security of certain embodiments of the apparatus 100 is that there cannot be any signaling from the device to non-trusted parties (such as an Eavesdropper). This is guaranteed, where appropriate, by shielding the device. The apparatus 100 avoids the need for a non-signaling assumption between the different parts of the device, in stark contrast with earlier work on device-independent randomness generation. This is achieved by introducing a new test (security test B) which passes even when the individual quantum systems are only approximately non-signaling. The apparatus is optionally used with classical random number generators, or classical pseudo-random generators. Because the output bits are completely independent of any other source of randomness in the universe, they are optionally used as a seed to a classical randomness extractor to generate a much larger sequence of random bits. This allows for substantially higher bit rates.

The apparatus 100 operates with around linear runtime on the length of the final bit string. In various examples, the apparatus uses 2 or 4 separated (approximately non-signaling) quantum devices to produce any number of random bits.

Figure 2A:
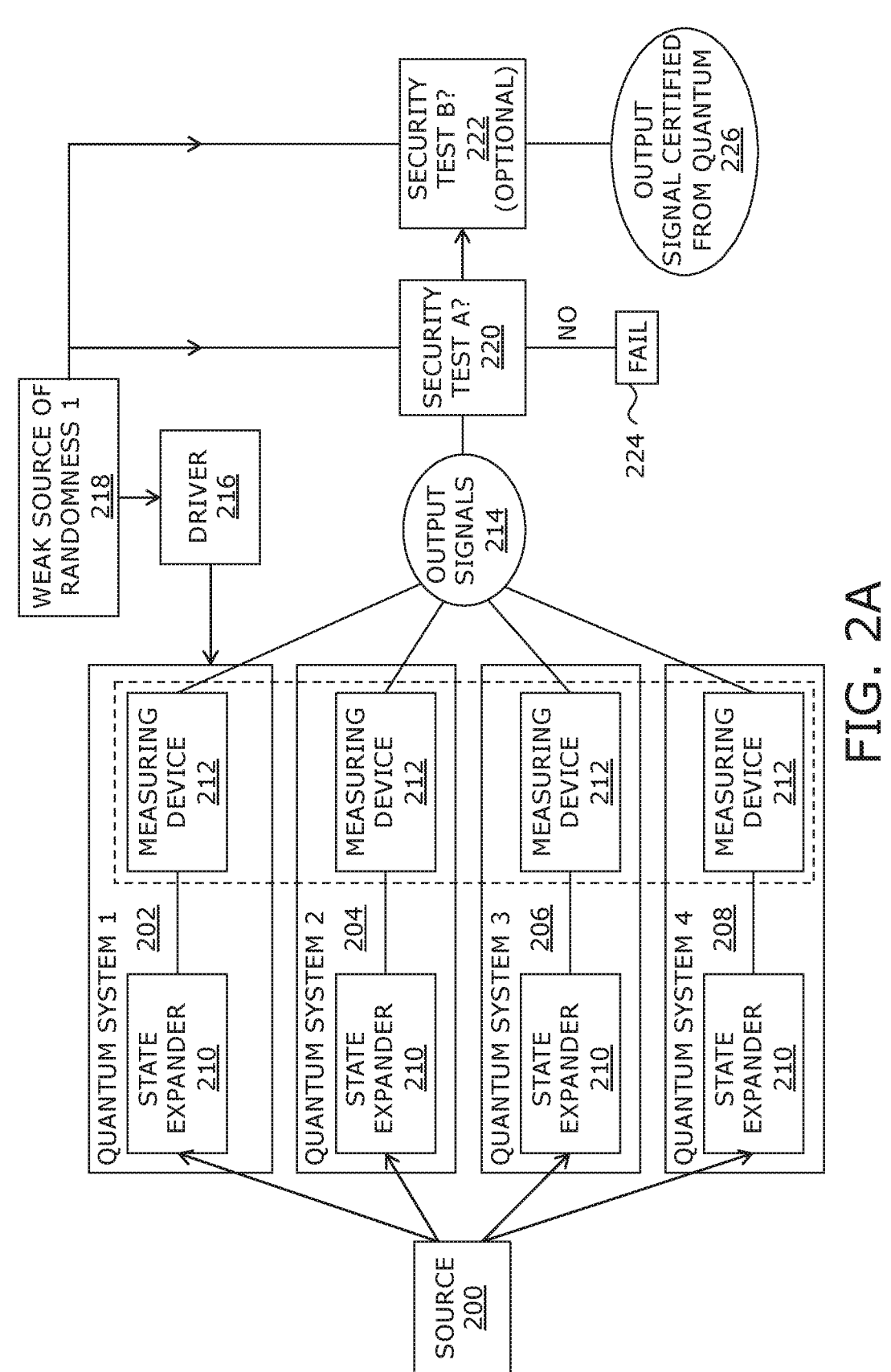
FIG. 2A is a schematic diagram of an example of a four-device quantum apparatus that may be used in the apparatus of FIG. 1.

FIG. 2A is a schematic diagram of an example four-device quantum apparatus for use as the quantum apparatus 102 of FIG. 1. It is also possible to use a two-device quantum apparatus (see, e.g., FIG. 3A) as the quantum apparatus 102 of FIG. 1. A benefit of the four-device quantum apparatus in this embodiment is that it is secure against attacks by an adversary using a convex mixture of a Popescu-Rohrlich (PR) box and a local distribution, whereas the two-device quantum apparatus is not. In at least some embodiments, the four-device quantum apparatus uses a simpler security test that the two-device quantum apparatus. Moreover, in at least some two-device embodiments, the two-device quantum apparatus prepares the qubits into a different quantum state than in the four-device quantum apparatus of at least some four-device embodiments. In at least some two-device embodiments, the two-device quantum apparatus gives sensor measurements that are certifiable as being from quantum effects, where the correctness of quantum mechanics is assumed as an axiom of the process for computing the certification. In at least some four-device embodiments, the validity of the certificate does not rely on the correctness of quantum mechanics as an axiom.

With reference to the example embodiment illustrated in FIG. 2A, there is an energy source 200 for emitting qubits and there are four quantum systems 202, 204, 206, 208 which receive input from the energy source 200. Each quantum system comprises a state expander 210 that prepares a qubit into a specified quantum state. Each quantum system comprises a measuring device 212 that detects qubits in one or more measurement bases. The measurement bases of the measuring devices 212 are configurable by a driver 216 according to pseudo-random values of measuring device settings generated by a weak source of randomness 218. The measuring devices 212 detect qubits received from the source 200 via the respective state expander 210.

The source 200 produces pairs of qubits each sent along a different channel. A channel can comprise a path from the source 200 through a state expander 210 to a detector in a measuring device 212. The paths are of substantially the same length so that the time taken for a qubit to travel along each path is substantially the same.

Emerging signals from each path are detected at detectors in the measuring device 212, and coincidences are identified. A coincidence can include detection of a qubit at more than one of the detectors at substantially the same time. For example, a coincidence can include detection of a qubit at two or more detectors in a specified time period. The specified time period can depend, at least partly, on flux of the pairs of qubits produced by the source 200. The specified time period may tend to be inversely related to the flux, e.g., the specified time period may be shorter when the flux of pairs of qubits is large (e.g., where there may be many detections per unit time), and the specified time period may tend to be longer when the flux of pairs of qubits is small (e.g., where there may be fewer detections per unit time). In some embodiments, the specified time period is in a range from about 1 ns to 1 ps, 1 ps to 1 ms, 1 ms to 0.1 s, or some other range. For example, the time period can be in a range of 5 to 15 ns, e.g., about 10 ns.

In some embodiments, an event where a qubit is detected is represented by a 1 (one) and an event where a qubit is not detected is represented by a 0 (zero). In this way the measuring devices 212 generate output signals 214 comprising a bit string. However, it is not essential to use a binary representation, and other representations are used for the output signals 214 in some embodiments.

The output signals 214 are checked using security test A 220 and optionally security test B. Security tests A and B are implemented using hardware in a preferred embodiment since hardware is typically more secure than software or firmware. However, it is not essential to implement security tests A and B using hardware only and other implementations of the security tests may be based partly or wholly on a software implementation.

Security test A checks whether the output signals 214 are from quantum effects or from classical effects by testing for violation of a Bell inequality. If security test A is passed there is certification 226 that the output signals 214 are from quantum effects and in this sense incorporate quantum randomness. If security test A is failed 224 then there is no certification and the output signals 214 are discarded. Because the source 200 and the quantum systems 202, 204, 206, 208 may be subject to noise, particles prepared in the quantum systems might not always be qubits and might sometimes be classical particles. Therefore, security test A is particularly beneficial because it gives robustness to noise (since it is a statistical test over many observations of detections of particles at detectors of the measuring devices) in addition to giving the ability to certify the output signals 214 as being quantum or not, without the need to inspect the innards of the quantum systems 202, 204, 206, 208.

Security test A involves monitoring emerging signals from each channel. For each detector, there is a unique path or channel that qubits may follow from the source 200 to the detector and the paths are arranged to be substantially the same length so that an entangled qubit in a superposition of states will reach multiple specified ones of the detectors at substantially the same time. The paths are configured to accept only qubits in particular polarizations and/or modes. By comparing times at which particles are detected at the detectors, it is possible to infer whether the particles are qubits with entanglement and superposition, or whether the particles are classical. More formally, in at least some embodiments, the security test A comprises measuring violation of a Bell inequality through the observations of the times at which particles are detected at different ones of the detectors.

Some four-device embodiments will now be described over the next several paragraphs without repeating at each step phrases such as "in some embodiments." The four quantum systems 202, 204, 206, 208 are four spatially separated parties with measurement settings $\{u_1, u_2, u_3, u_4\}$ and respective outcomes $\{x_1, x_2, x_3, x_4\}$. Each of the four quantum systems has a specified two-dimensional Hilbert subspace that is amenable to quantum control; each system is capable of storing one qubit. The physical realization of the qubit and its measurement apparatus follows one of many possible designs, including linear optics, ion traps, and superconducting qubits.

A Bell inequality includes an inequality that is always satisfied by any local probability distribution for the measurement results of two parties, which is one that can be realized when each party's device has its own internal state. This state may be correlated with the state held by the other party, but each of the systems they hold has its own separate description without the need to describe the pair of ensembles holistically. This means that in principle the apparent randomness found by measuring one of the subsystems can be thought of as stemming from ignorance about what state the subsystem is really in. However, entangled states in quantum mechanics give rise to probability distributions that are nonlocal. Since such distributions cannot be thought of as being caused by ignorance of what state each subsystem is in, since the subsystem cannot really be said to be in any state at all, the state must be described holistically. This is what opens the door to the possibility of true randomness, and hence the present technology seeks to measure the violation of a Bell inequality in order to be able to certify random bits which are output as the measurements from the measurement devices. While it is impossible to violate a Bell inequality classically, pure entangled quantum states, for specially selected measurements, can be found to violate a Bell inequality without any loopholes.

Security test B is optional and it checks whether the quantum systems are non-signaling (that is, the quantum systems 202, 204, 206, 208 do not influence one another). Security test B is performed after security test A since security test B is concerned with the non-signaling nature of the quantum systems when they operate as quantum systems and not with regard to any classical particles travelling through the quantum systems as a result of noise. Security test B involves making repeated measurements with the measuring devices 212 and testing to see if the measurement results are correlated between the quantum systems, even where the measurement bases are set in a way which is partly correlated between the measurement devices.

Figure 2B:
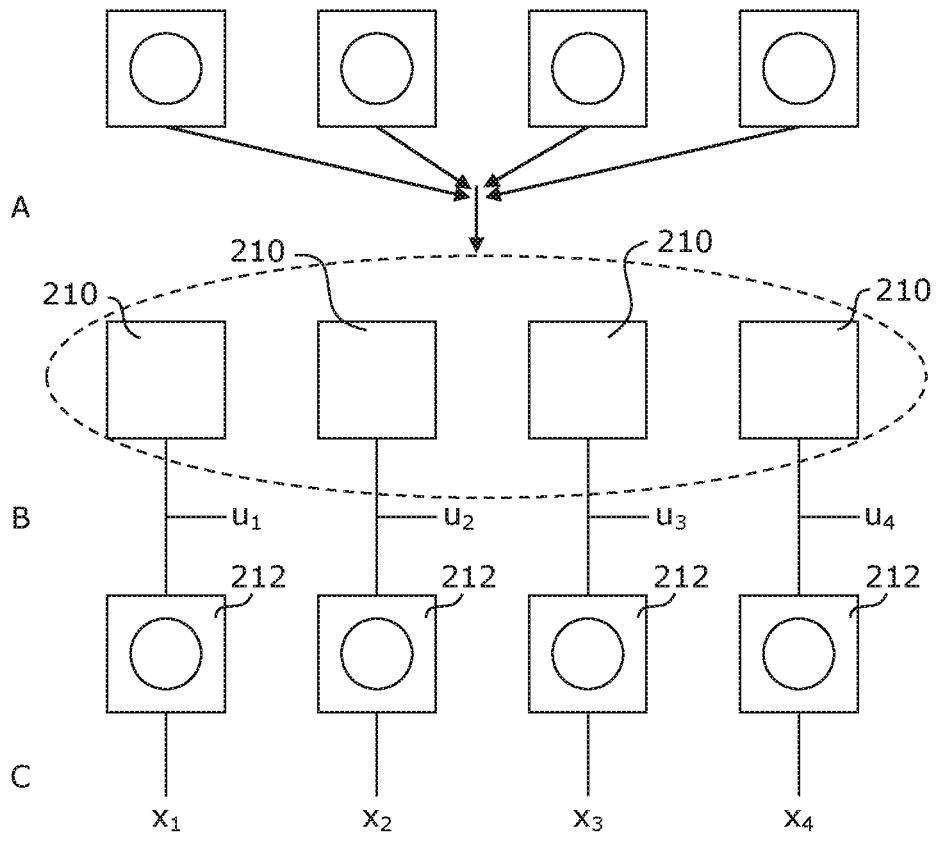
FIG. 2B is another schematic diagram of the four-device quantum apparatus of FIG. 2A.

FIG. 2B is another schematic diagram of the four-device quantum apparatus of FIG. 2A. The four state expanders are depicted as boxes 210 and these receive as input quantum particles represented by circles inside squares. Each state expander 210 is attached to a measurement device 212.

A method of operation for the four-device quantum apparatus of FIG. 2B comprises, in an operation A, making the state expanders attached to each measurement apparatus interact with one another by preparing the state of the quantum particles in the state expanders. This is represented in FIG. 2B by the dotted line around the boxes 210. This may be a probabilistic interaction rather than a deterministic interaction, in which case the process of preparing the state does not have fixed length.

In an operation B, once the correct entangled quantum state is prepared, the inputs $U_i$ are given to the four measurement apparatuses, and the quantum systems are measured. The inputs $U_i$ are measurement settings which are selected using a weak source of randomness and which are used to set measurement bases at the measurement devices 212. The measurement results are output (operation C) by the measurement devices 212 as indicated by the symbols $X_i$, in FIG. 2B.

Operations A to C shown in FIG. 2B are repeated. There is no interaction between the boxes between the $U_i$ being input, and the $X_i$ being output. Note that between operations A and B, the system is in a state that cannot be described as made up of individual states for its subsystems: the system is therefore described holistically between operations A and B.

Figure 2C:
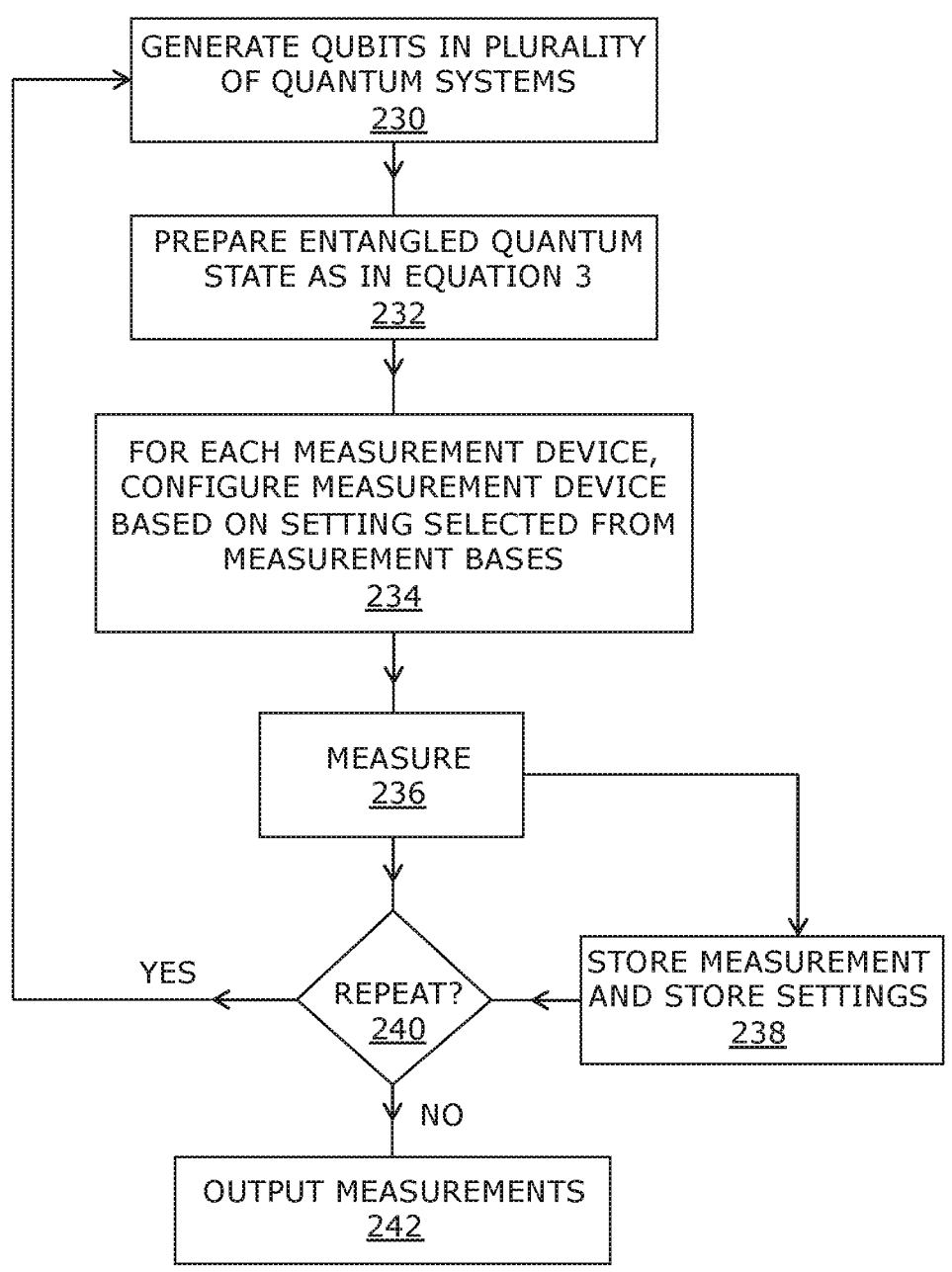
FIG. 2C is a flow diagram of an example method of operation of a four-device quantum apparatus such as shown in FIG. 2A or FIG. 2B.

FIG. 2C is a flow diagram of a method of operation of the four-device quantum apparatus of FIG. 2A and FIG. 2B. Qubits are generated 230 in a plurality of quantum systems such as four quantum systems. The qubits are prepared 232 in specific entangled quantum states, for example, as indicated in equation 3 below. This can be done using the state expanders. The four qubits are prepared so they interact in order to produce the specified quantum state for the device, which is of a type called an entangled state. This utilizes both two-qubit and single-qubit interactions. Settings of the measurement devices are configured 234 using input from a weak source of randomness. The weak source of randomness is used to configure settings independently for each measurement device 212. These settings are derived from the measurement bases used in the method of operation. For example, the weak source of randomness can be used to select a measurement setting from two measurement bases (e.g., the computational basis and Hadamard basis, which may each have two basis states or basis vectors) for each of four measurement devices 212. The measurement settings are used 234 to configure settings of the measurement devices. Each of the four qubits is measured according to its measurement setting. This may involve a change being made to the setting of detectors or transformation being applied to a qubit on a channel of a measurement device, depending on the precise implementation of the quantum device. Then, the qubit is measured. It is of note that this effectively destroys the quantum state. The detector then outputs a bit that contains the result of the measurement, x, and the next round of measurement begins. In an example, the settings include two possible orthogonal polarizations (such as horizontal and vertical) and two possible qubit modes. Once the settings have been configured, detectors in the measurement devices begin to sense detected particles received on the paths from the source to each detector. The measurement process 236 produces measurement results which are stored 238 together with the associated values of the settings of the measurement devices at the time of the measurement. A check is made 240 as to whether to repeat to obtain more measurements. The check involves checking criteria such as whether a specified time has elapsed, whether a specified number of measurement iterations has passed or whether a memory storing the measurements is full. Once the check at operation 240 indicates that no further repetitions are needed the stored measurements are output 242.

Further details of at least some four quantum device embodiments are now given.

Consider two strings of measurement settings given by:

$$U_0=\{\{0001\},\{0010\},\{0100\},\{1000\}\} \text{ and}$$

$$U_1=\{\{0111\},\{1011\},\{1101\},\{1110\}\},$$

where $U_0$ is a set of four possible measurement settings and $U_1$ is a different set of four possible measurement settings.

A Bell inequality used in the embodiment is the following:

$$B \cdot (P(x \mid u)) = \sum_{x,u} B(x, u)P(x \mid u) \geq 2, \tag{1}$$

where B is an indicator vector for the Bell inequality and P(x|u) is the conditional probability distribution of the outcomes or measured values x given inputs or measurement setting values u.

In some embodiments, B is an indicator vector with 2'×2' entries:

$$B(x,u) = \mathbb{1}_{\oplus_{i=1}^4 x_i=1} \mathbb{1}_{u \in U_0} + \mathbb{1}_{\oplus_{i=1}^4 x_i=0} \mathbb{1}_{u \in U_1} \qquad (2)$$

where the indicator function $\mathbb{1}_E$ equals 1 if the expression E is true and equals 0 otherwise.

In some embodiments, the Bell inequality indicator function B is implemented with a 16-by-16 array or matrix whose entries are each zero or one. The columns of the array represent possible configurations of the detectors and the rows of the array represent possible observations at the detectors. In some embodiments, there are 16 possible configurations of the detectors since there are four measuring devices, each having four detectors. Instead of an array or matrix, many other data structures can be used, such as bitmaps, hash tables, lookup tables, or search trees. Data structures that permit fast searching or look-up are preferable in some embodiments, as in some embodiments the array or data structure is used as a lookup mechanism in which the combination of the four input bits and four output bits are effectively used as a key to look up a value for the Bell inequality indicator function.

An example of the array is given as follows: Let the four input bits of the device be $V_1, \ldots, V_4$ and the four outputs $S_1, \ldots, S_4$. Then the function B(V, S) is defined as follows, where $\oplus$ denotes an XOR (exclusive or) operation:

$$B(V, S) = \begin{cases} 0 & \text{if } V \in U_0 \text{ and } S_1 \oplus S_2 \oplus S_3 \oplus S_4 = 0 \\ 1 & \text{if } V \in U_0 \text{ and } S_1 \oplus S_2 \oplus S_3 \oplus S_4 = 1 \\ 0 & \text{if } V \in U_1 \text{ and } S_1 \oplus S_2 \oplus S_3 \oplus S_4 = 1 \\ 1 & \text{if } V \in U_1 \text{ and } S_1 \oplus S_2 \oplus S_3 \oplus S_4 = 0 \\ 0 & \text{otherwise} \end{cases} \qquad (2b)$$

where $U_0$ and $U_1$ are defined above. Although there are 16 possible combinations of values of the detector settings, only 8 are used in this example for clarity. If, for example, the function B(V, S) is implemented as an array or matrix, the remaining 8 values of the detector settings may be padded with zeros.

Let $V^i$ and $S^i$ be the vectors of inputs/outputs of the i-th round of the protocol. The security test is to compute:

$$B' = \frac{1}{n} \Sigma_{i=1}^n B\left(V^i, S^i\right) \qquad (2c)$$

The use of the Bell inequality indicator vector provides an efficient and accurate way of assessing coincidences observed at the detectors. If a coincidence is observed at detectors on different channels in the same measuring device then the coincidence is classical noise. If a coincidence is observed at detectors in different measuring devices of a pair of measuring devices, then the coincidence is from quantum effects. The security logic performs a coincidence assessment using the array (or similar data structure) and the observed coincidences to see whether the outcome is less than 2 for each possible configuration setting. Since there are 16 possible configuration settings, the security logic looks for a coincidence assessment outcome of less than one-eighth (which is 2 divided by 16).

The quantum state used in the protocol is:

$$|\Psi\rangle = \frac{1}{\sqrt{2}} (|\phi_-\rangle|\tilde{\phi}_+\rangle + |\psi_+\rangle|\tilde{\psi}_-\rangle) \qquad (3)$$

where $$|\phi_-\rangle = \frac{1}{\sqrt{2}} (|0\rangle|0\rangle - |1\rangle|1\rangle)$$

$$|\psi_+\rangle = \frac{1}{\sqrt{2}} (|0\rangle|1\rangle - |1\rangle|0\rangle)$$

$$|\tilde{\phi}_+\rangle = \frac{1}{\sqrt{2}} (|0\rangle|+\rangle + |1\rangle|-\rangle)$$

$$|\tilde{\psi}_-\rangle = \frac{1}{\sqrt{2}} (|0\rangle|-\rangle - |1\rangle|+\rangle)$$

where, in at least some embodiments, $\{|0\rangle, |1\rangle\}$ is the computational basis (sometimes called standard basis) and, in at least some embodiments, $\{|+\rangle, |-\rangle\}$ is the Hadamard or Fourier basis given by $$|+\rangle = \frac{|0\rangle + |1\rangle}{\sqrt{2}} \text{ and } |-\rangle = \frac{|0\rangle - |1\rangle}{\sqrt{2}}.$$

The quantum state $|\Psi\rangle$ in this example is a uniform linear combination of two quantum states ($|\phi_-\rangle|\tilde{\phi}_+\rangle$ and $|\psi_+\rangle|\tilde{\psi}_-\rangle$) that are maximally entangled states of two qubits. There are several ways of generating the state $|\Psi\rangle$. For example, one possibility is to implement the quantum unitary that maps the product state $|0\rangle|0\rangle|0\rangle|0\rangle$ to $|\Psi\rangle$. To implement this example unitary, one can decompose it into simpler one-qubit and two-qubit unitaries using the Solovay-Kitaev construction.

The input $u_i$=0 corresponds to measurement in the X basis (or Hadamard or Fourier basis), while input $u_i$=1 corresponds to measurements in the Z basis (or computational basis) (for each of the inputs $i \in \{1, 2, 3, 4\}$). To measure in the Z basis, one might, for example, first apply the single qubit unitary that rotates to the Hadamard or Fourier basis and then measure in the computational basis. Under ideal conditions, the implementation of the Bell test above with such an entangled state and quantum measurements gives $$B \cdot \{P(x|u)\} = 0.$$

Figure 4:
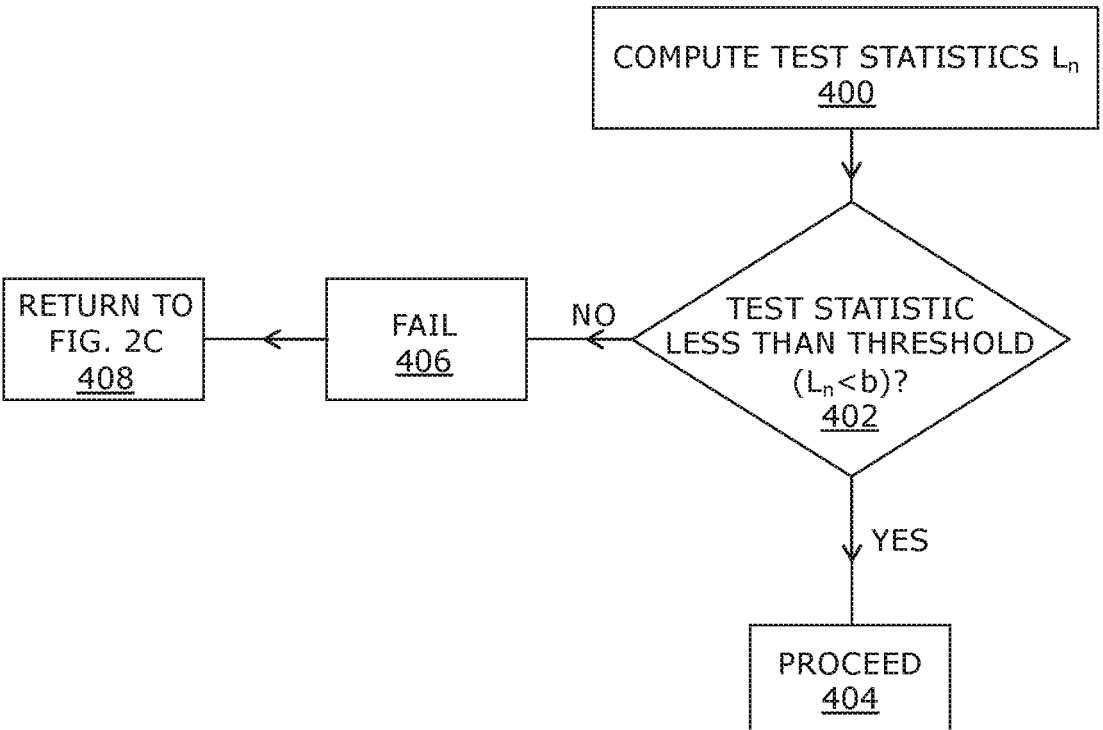
FIG. 4 is a flow diagram of an example security test A in the four-device case.
Figure 5:
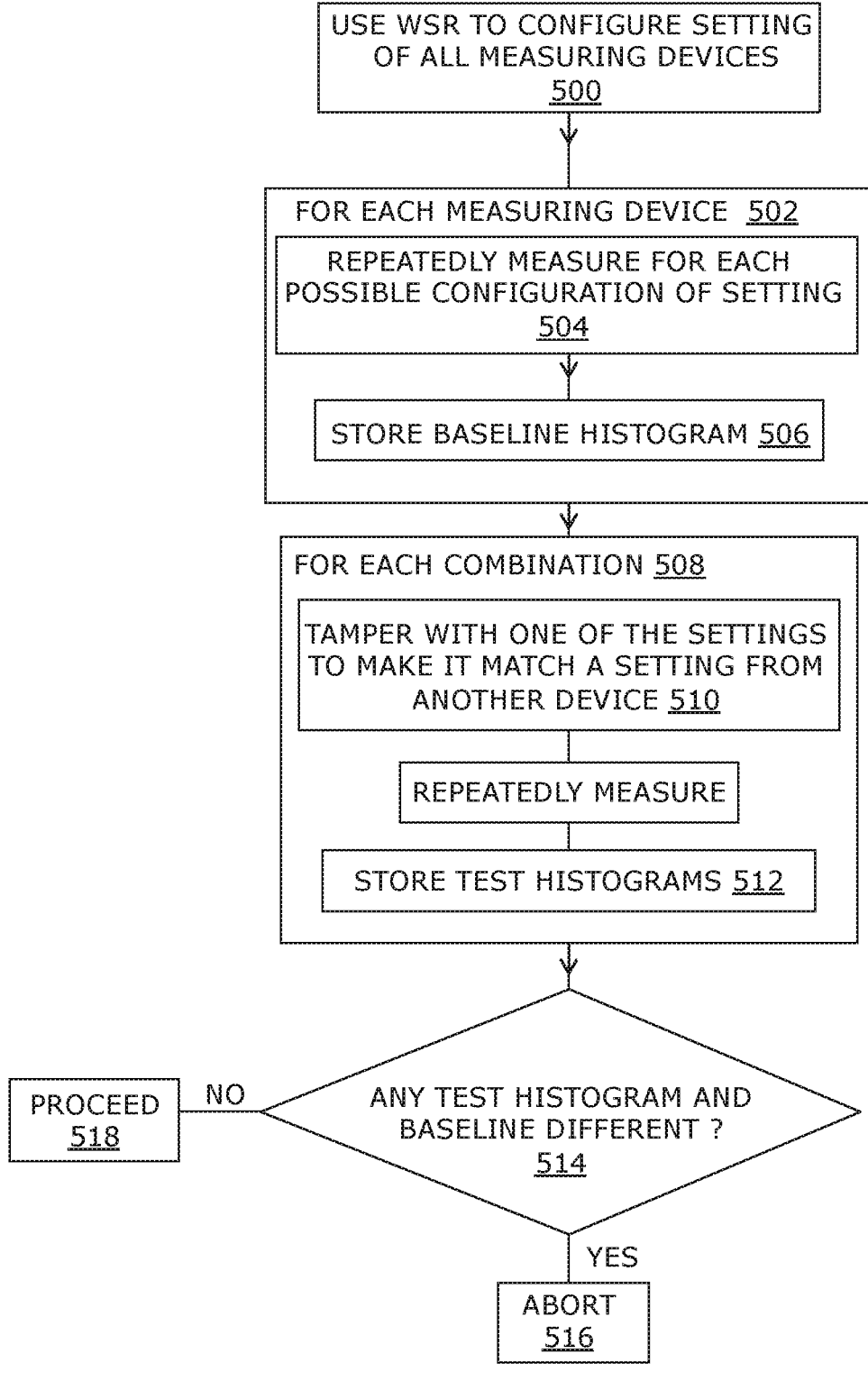
FIG. 5 is a flow diagram of an example security test B.

The security test A for the four-quantum device embodiment is now described formally with reference to FIG. 4.

The string from the weak random source $w_2$ is used to choose the inputs of the measurements in the Bell experiment described above; e.g., for each of the n realizations of the experiment, 4 bits from $w_2$ may be used to choose $(u_i)_j$, with j ranging from 1 to n. Then collect the outputs $(x_i)_j$, which concatenated together form the string $w_3$. A test statistic is computed 400 on the values of the outputs in the string $w_3$. The statistical test includes computing the function:

$$L_n \equiv \frac{1}{n} \sum_{j=1}^n B(x_j, u_j), \qquad (4)$$

which may be expressed in words as, a test statistic is computed as the reciprocal of the number of measurements, times the sum over the number of measurements of, the appropriate entry from the array of 16 by 16 values (or similar data structure) which is the Bell inequality indicator vector. The appropriate array entries are looked up using the observed measurement values and the settings of the detectors which were used to observe the measurement values.

If the computed value of the test statistic $L_n$ is less than a threshold b (see check 402 in FIG. 4) then the process proceeds 404. Otherwise, the process fails 406 and returns to operation 408 of FIG. 2C.

In summary, the process aborts unless $L_n$<b with b a free parameter that is chosen depending on the quality of the initial weak random source 218; the smaller the delta, the less noise the protocol can tolerate, but on the other hand it can amplify the randomness of weaker sources. For practical realization one might choose, e.g., b=0.01, which gives output random bits which deviate from truly random bits (in variational distance) by at most 0.0001 (which is negligible for most applications). At the same time the value of b=0.01 means that even with the accuracy currently achieved in linear optics, ion traps, and superconducting systems (measured in terms of fidelity of around 99.2 percent), it is possible to run the protocol successfully. In another embodiment, b=0.125 and the Bell inequality being tested for is that of equation 1 above. However, other values of the threshold b are used in some cases with the Bell inequality of equation 1 above, or with other Bell inequalities.

Quantum mechanics displays a property known as no-signaling, which means that although entangled states exist which produce nonlocal probability distributions, this non-locality cannot be harnessed in order to provide instantaneous communication between the parties possessing the quantum systems. Many Bell inequalities have the property that there exist other physical theories that lead to a larger Bell violation than quantum mechanics, even though they still obey the no-signaling principle. A famous example of this is the CHSH inequality, which admits a quantum maximum of $2\sqrt{2}$ compared to a classical value of 2; however, no-signaling theories that admit an implementation of the Popescu-Rohrlich (PR) box achieve a value of 4. If the correctness of quantum mechanics is not taken as an additional axiom for the present technology, then, seeing a CHSH valuation of $2\sqrt{2}$ cannot be seen as entirely safe, since there is a possibility that the quantum systems have been replaced by a convex mixture of a PR box and a local distribution. In theory, this could lead to 29% of the random bits being known to an adversary. While such attacks are perhaps unlikely, the four-device procedure is secure against them. This is because the Bell inequality used, in some embodiments, has the property that there do not exist any no-signaling theories that admit a larger violation than does quantum mechanics, and so attacks based on alternative physical theories are not viable. This is an example of quantumly accessible maximal nonlocality; it is a quantumly accessible example of logical nonlocality. It is of note that the no-signaling principle is guaranteed by Einstein's theory of special and of general relativity. The method used in the four quantum device may therefore be secured by general physical principles, rather than having to rely on the absolute correctness of quantum mechanics.

In the four-quantum device embodiment (and the two-quantum device embodiment) an example of the security test B is formally described as follows:

The security test B includes checking that the 4 different quantum systems are approximately non-signaling among themselves. To explain in a precise way what approximately non-signaling among themselves means, consider the probability distribution of outputs $x_1, \ldots, x_4$ conditioned on the inputs $u_1, \ldots, u_4$:

$$p(x_1,x_2,x_3,x_4|u_1,u_2,u_3,u_4)$$

The approximate non-signaling condition says that:

$$\sum_{x_2,x_3,x_4} p(x_1, x_2, x_3, x_4 \mid u_1, u_2, u_3, u_4) \approx \tag{5a}$$

$$\sum_{x_2,x_3,x_4} p(x_1, x_2, x_3, x_4 \mid u_1, u_2', u_3', u_4')$$

for any pair of measurement devices using measurement settings $u_1, \ldots, u_4$ at a first time and $u'_2, u'_3, u'_4$ at another time, and likewise for the three other combinations of pairs of measurement devices. That is, the marginal distribution of any measurement device is almost unaffected by the choice of measurements in the other measurement devices (technically it is assumed that the variational distance of all the marginals are the same up to some small error $\varepsilon$, which is a parameter of the test and is taken to be e.g. $\varepsilon$=0.02 in the implementations discussed above). A weak random source is used to generate $(u_i)_j$, which is input into the measurement device to configure the detector settings. The measured output is $(x)_j$. Then the apparatus computes the empirical distribution $q(x_1, x_2, x_3, x_4|u_1, u_2, u_3, u_4)$ based on the frequencies obtained. The process aborts unless $$\left\| \sum_{x_2,x_3,x_4} p(x_1, x_2, x_3, x_4 \mid u_1, u_2, u_3, u_4) - \right. \tag{5b}$$

$$\left. \sum_{x_2,x_3,x_4} p(x_1, x_2, x_3, x_4 \mid u_1, u_2', u_3', u_4') \right\|_1 \le \varepsilon,$$

for any $u_1, \ldots, u_4$ and $u'_2, u'_3, u'_4$, and likewise for the other quantum systems 2, 3, and 4.

In summary, with reference to FIG. 5B, the security test B comprises using a weak source of randomness 104 such as WSR-1 to configure measurement settings of all the measuring devices of the apparatus (block 500). For each measuring device 502, the security test B process repeatedly measures 504, for each possible configuration of settings of the measurement devices. A baseline histogram is stored 506 for each measuring device showing the frequency of detection of particles for each configuration of measurement settings.

For each combination of measurement settings 508, the process tampers with one of the settings to make it match a setting from another one of the measurement devices. Measurements are repeatedly taken and the results stored 512 in test histograms.

A check is made 514 to see if any test histogram of a measuring device is significantly different from the baseline histogram of that measuring device. If there is a significant difference then an alert or abort step 516 is taken since there is some degree of interaction between the measuring devices which indicates they are not non-signaling. Otherwise, the process proceeds 518 to certify the measuring devices as approximately non-signaling.

Figure 3A:
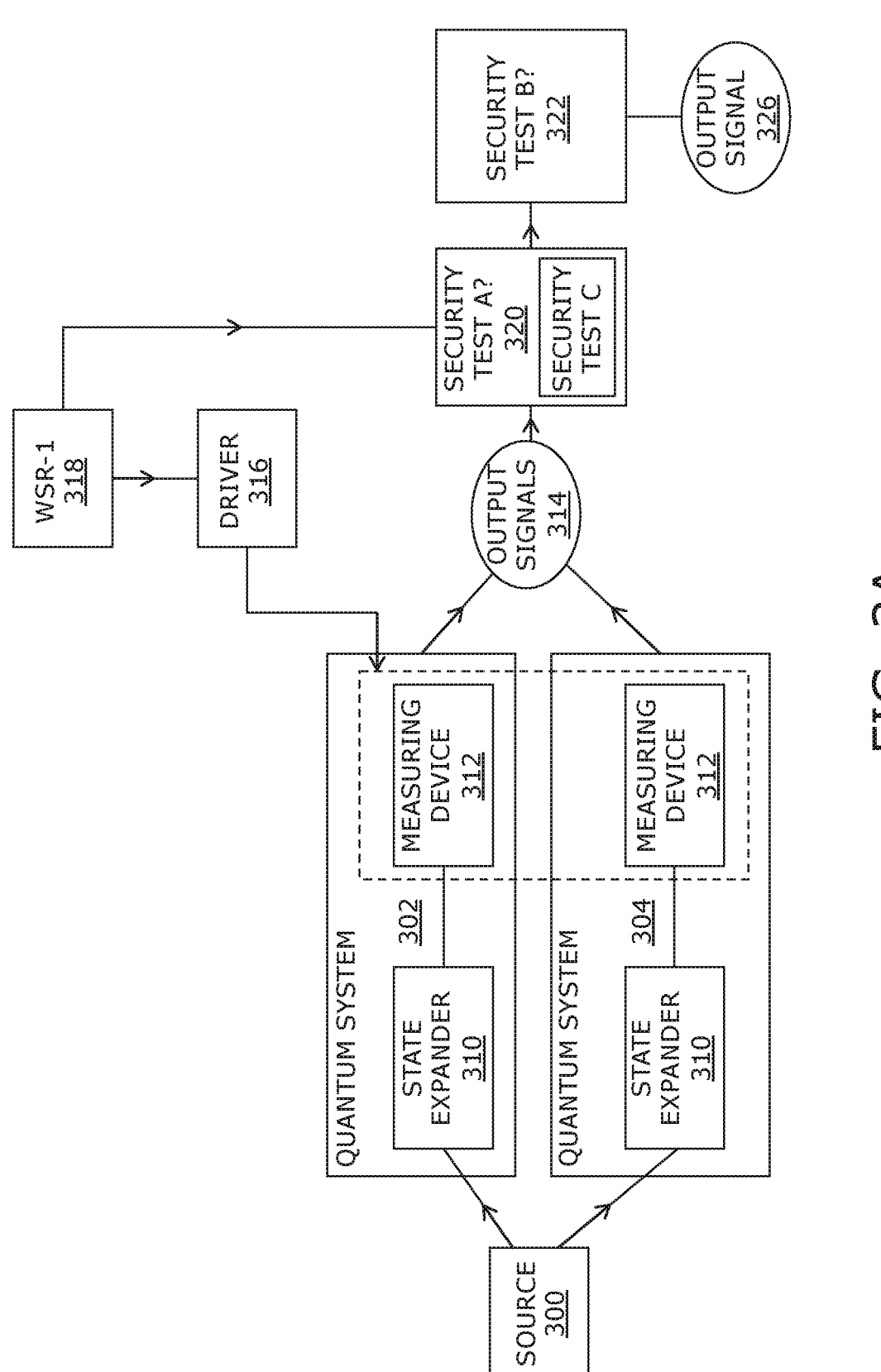
FIG. 3A is a schematic diagram of an example of a two-device quantum apparatus that may be used in the apparatus of FIG. 1.

In FIG. 3A, there is shown an example two-device quantum apparatus that is used as the quantum apparatus 102 of FIG. 1 in some embodiments. In the two-device quantum apparatus there are two quantum systems 302, 304 each comprising a state expander 310 and a measuring device 312. A source of qubits is connected to each of the state expanders 310 and generates qubits. The qubits travel into the state expanders 310 and the state of the qubits is prepared into a specified state as the qubits travel through the state expanders 310. The prepared state of the qubits is set out formally below. The measuring devices 312 each contain a plurality of detectors which detect qubits and which are configurable into one or more configurations according to values of settings generated by a weak source of randomness 318. The weak source of randomness 318 generates a random bit string (or other random numbers) and inputs those to a driver 316. The driver 316 drives the configuration of the detectors in the measuring devices 312 such as to change a value of a polarization and/or a value of a mode of the detectors. The weak source of randomness 318 (or the weak source of randomness 218 described with reference to FIG. 2A or the weak source of randomness 3100 described with reference to FIG. 29) can comprise one or more weak sources of randomness. Each weak source of randomness can generate one or more bits, and the random bit string can include bits from one, some, or all of these weak sources of randomness. For example, the weak source of randomness can include multiple (e.g., two or four) separate weak sources of randomness, with each separate source continuously generating a sequence of bits, which are read when needed by the quantum apparatus. In some implementations, some or all of the weak sources of randomness are provided by the user of the quantum apparatus. In some such implementations, the quantum apparatus may be configured such that the weak sources of randomness are swappable so that the user can swap different sources of randomness depending on the user's particular installation or application.

The prepared qubits travel from the state expanders 310 into the measuring devices 312. Each measuring device has a plurality of possible paths that particles are able to follow. Each path is from a state expander to a detector. The paths are substantially the same length so that the time taken for a qubit to travel along each path is approximately the same. Measurements are taken at each of the detectors at substantially the same time, and output signals 314 result which are, in some examples, in the form of bit strings with one bit per detector and where the bit is 1 to represent a detected particle and 0 to represent no detected particle. The output signals 314 are input to a component 320 which carries out the security test A. The component 320 receives information from the weak source of randomness 318 so that the component 320 knows the configuration settings of the measuring devices 312 which were used to obtain the output signals 314.

In some embodiments, the security test A implemented by component 320 is different from security test A of the four-device quantum apparatus because it implements an additional test denoted security test C.

If security test A is passed then security test B is optionally carried out using component 322. In some embodiments, security test B is the same as described above for the four-device quantum apparatus. The output signal 326 comprises the output signals 314 and information that the security test A (and optionally the security test B) has been passed. Thus, downstream systems have information certifying that the output signal 326 was generated by a quantum system and therefore has true randomness.

Figure 3B:
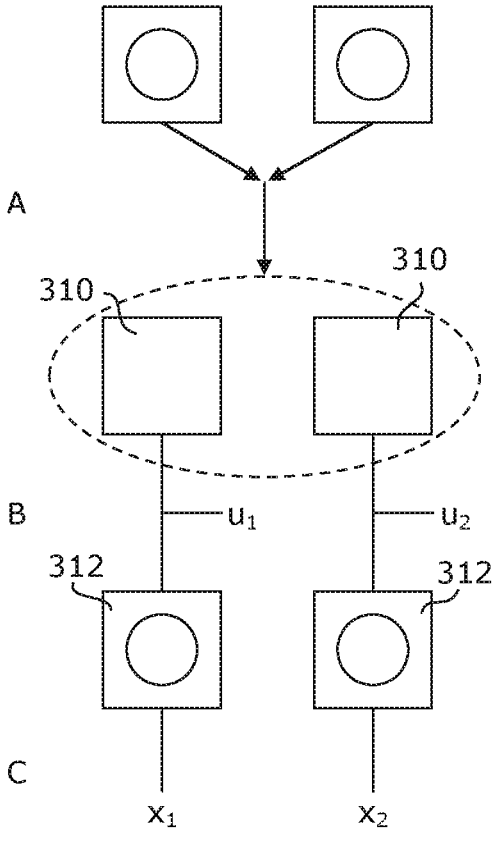
FIG. 3B is another schematic diagram of an example of a two-device quantum apparatus that may be used in the apparatus of FIG. 1.

FIG. 3B is another schematic diagram of the example two-device quantum apparatus for use in the apparatus of FIG. 1. In FIG. 3B, there are shown state expanders 310 and measurement devices 312. Qubits (represented by circles inside squares) are input to the state expanders 310 and the state expanders interact so that the qubits become entangled and placed in superposition (the state of the qubits prepared by the state expanders 310 in the two-device apparatus is given below). Detector settings $u_1$ and $u_2$ are input to the measurement devices 312 to set the configuration of detectors in the measurement devices according to the input from the weak source of randomness. The measurement devices measure particles which reach the detectors and output signals $x_1$, $x_2$.

In the case of the example two-device quantum system, the method of operation is very similar to that of the example four-device quantum system described above. However, in at least some embodiments, the state formed in operation A is different and the detector settings are different both in number and definition. Some two-device embodiments will now be further described over the next several paragraphs without repeating at each step phrases such as "in some embodiments."

Figure 3C:
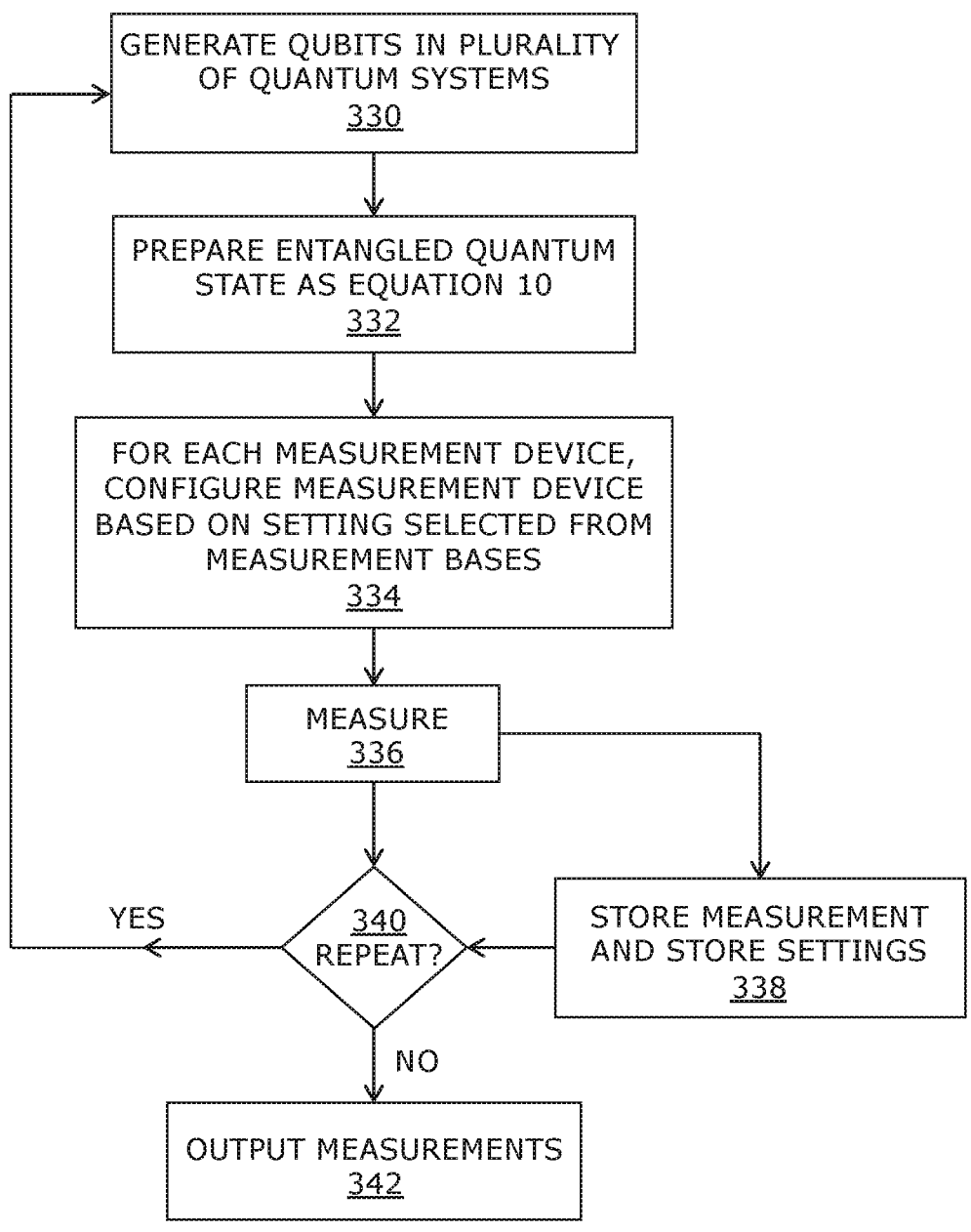
FIG. 3C is a flow diagram of an example method of operation of a two-device quantum apparatus such as shown in FIG. 3A or FIG. 3B.

The two-device quantum apparatus of FIGS. 3A and 3B involves measuring four qubits: two located at each of two physical devices (in contrast to an example four-device quantum apparatus with four physical devices). With reference to FIG. 3C, the procedure at the two-device quantum apparatus is as follows: Qubits are generated 330 in a plurality of quantum systems within two quantum devices 310. The two quantum devices 310 are interacted in order to form an entangled quantum state. The entangled quantum state is prepared 332 as defined in equation 10 below.

The weak source of randomness is used to configure settings independently for each measurement device 312. These settings are derived from the measurement bases available in the method of operation. For example, the weak source of randomness can be used to select a measurement setting from nine measurement bases for each of two measurement devices 312. The measurement settings are used to 334 configure settings of the measurement devices.

Measurements 336 are performed at the two measurement devices and the measurement results are stored 338 together with the values of the measurement bases (the settings). The procedure checks at an operation 340 whether to repeat and if so, the process repeats from operation 330. If the check at the operation 340 indicates not to repeat, the stored measurements and associated settings are output 342. The decision whether to repeat or not at operation 340 is made using criteria such as one or more of: a time interval, a number of repetitions, a number of stored measurements, an amount of available memory for storing the measurements.

The output measurements are checked against a Bell inequality. If the Bell inequality is violated the output measurements are known to be from quantum effects and are input to a randomness extractor as explained with reference to FIG. 1. If the Bell inequality is satisfied, the output measurements are known to be from classical effects and are rejected. Optionally, a further check (security test B) is completed, as explained below.

The Bell inequality to be tested may be expressed as:

$$B \cdot \{P(x \mid u)\} = \sum_{x,u} B(x, u) P(x \mid u) \geq 4 \tag{6}$$

where B is an indicator vector, comprising an indicator function for a set $S_B$. The indicator function is defined as:

$$B(x, u) = \begin{cases} 1 & \text{if } (x, u) \in S_B \\ 0 & \text{otherwise} \end{cases} \tag{7}$$

which may be expressed in words as, the value of an indicator function B given measurement value x and associated measurement setting value u is equal to 1 if the measurement value and measurement setting value are in the set $S_B$ i and otherwise the value of the indicator function is zero.

The set $S_B$ comprises the following set of 18 quantum states, presented here as un-normalised quantum states, which are collected into nine different bases denoted as $M_1$ to $M_9$ below. In this example, each channel is a path that a qubit may follow from the source to a detector and the channels are substantially the same length.

$$|v_1\rangle = |0\rangle \quad |v_2\rangle = |1\rangle$$

$$|v_3\rangle = |2\rangle + |3\rangle \quad |v_4\rangle = |2\rangle - |3\rangle$$

$$|v_5\rangle = |0\rangle - |1\rangle \quad |v_6\rangle = |0\rangle + |1\rangle - |2\rangle - |3\rangle$$

$$|v_7\rangle = |0\rangle + |1\rangle + |3\rangle + |4\rangle \quad v_8\rangle = |0\rangle - |1\rangle + |2\rangle - |3\rangle$$

$$|v_9\rangle = |0\rangle - |2\rangle \quad |v_{10}\rangle = |1\rangle - |3\rangle$$

$$|v_{11}\rangle = |0\rangle + |2\rangle \quad |v_{12}\rangle = |0\rangle + |1\rangle - |2\rangle + |3\rangle$$

$$|v_{13}\rangle = -|0\rangle + |1\rangle + |2\rangle + |3\rangle \quad |v_{14}\rangle = |0\rangle + |1\rangle + |2\rangle - |3\rangle$$

$$|v_{15}\rangle = |0\rangle + |3\rangle \quad |v_{16}\rangle - |1\rangle - |2\rangle$$

$$|v_{17}\rangle = |1\rangle + |2\rangle \quad |v_{18}\rangle = |3\rangle \qquad (8)$$

$$M_1 = \{v_1\rangle, |v_2\rangle, |v_3\rangle, |v_4\rangle\}$$

$$M_2 = \{|v_4\rangle, |v_5\rangle, |v_6\rangle, |v_7\rangle\}$$

$$M_3 = \{|v_7\rangle, |v_8\rangle, |v_9\rangle, v_{10}\rangle\}$$

$$M_4 = \{|v_{10}\rangle, |v_{11}\rangle, |v_{12}\rangle, |v_{13}\rangle\}$$

$$M_5 = \{|v_{13}\rangle, |v_{14}\rangle, |v_{15}\rangle, |v_{16}\rangle\}$$

$$M_6 = \{|v_{16}\rangle, |v_{17}\rangle, |v_{18}\rangle, |v_1\rangle\}$$

$$M_7 = \{|v_2\rangle, |v_9\rangle, |v_{11}\rangle, |v_{18}\rangle\}$$

$$M_8 = \{|v_3\rangle, |v_5\rangle, |v_{12}\rangle, |v_{14}\rangle\}$$

$$M_9 = \{|v_6\rangle, |v_8\rangle, |v_{15}\rangle, |v_{17}\rangle\} \qquad (9)$$

Thus, when a measurement device is configured for measurement base $M_1$ it is able to receive on channels 1, 2, 3, and 4 only. When a measurement device is configured for measurement base $M_2$ it is able to receive on channels 4, 5, 6, and 7 only; and so on for the other measurement bases.

A non-contextual hidden variable assignment to each of the possible measurements would mean an assignment of the values 0 and 1 to each of the vectors such that in each measurement basis there is exactly one vector with a value of 1 assigned to it. There are nine measurement bases, so there are an odd number of 1 assignments overall. However, note that each of the vectors appears in exactly two measurements, and so any assignment of 0 and 1 to the vectors must result in there being an even number of is contained within the measurement bases. Hence, such a non-contextual assignment is impossible: this is known as a proof of contextuality. Note that it was not necessary to consider the actual probabilities of getting any measurement outcome, or even their possibilities: this is an example of maximal contextuality which manifests itself in a state-independent fashion.

Both measurement devices 312 have all of the nine measurement bases $M_i$ available to them, and these are selected between at random. There are, then, eighty-one different possibilities for the valuation of u, which denotes the measurement device settings. Define the pair (x, u) to be in $S_B$ if outcome $x_1$ in $u_1$ is orthogonal to the outcome $x_2$ in $u_2$. Choosing the entangled state $$|\Psi\rangle = \frac{1}{2} \sum_{i=0}^{3} |i\rangle \otimes |i\rangle \qquad (10)$$

(which may be expressed in words as one half of the following sum: the tensor product of |0> with itself plus the tensor product of |1> with itself plus the tensor product of |2> with itself plus the tensor product of |3> with itself; |i> may represent a qubit on channel i) results in each of these measurement outcomes in the set $S_B$ being impossible, yielding a left-hand side of 0 for the Bell inequality (e.g., equation 6 above). Therefore, there is a maximal amount of nonlocality with respect to the set of non-signaling physical devices.

Figure 6:
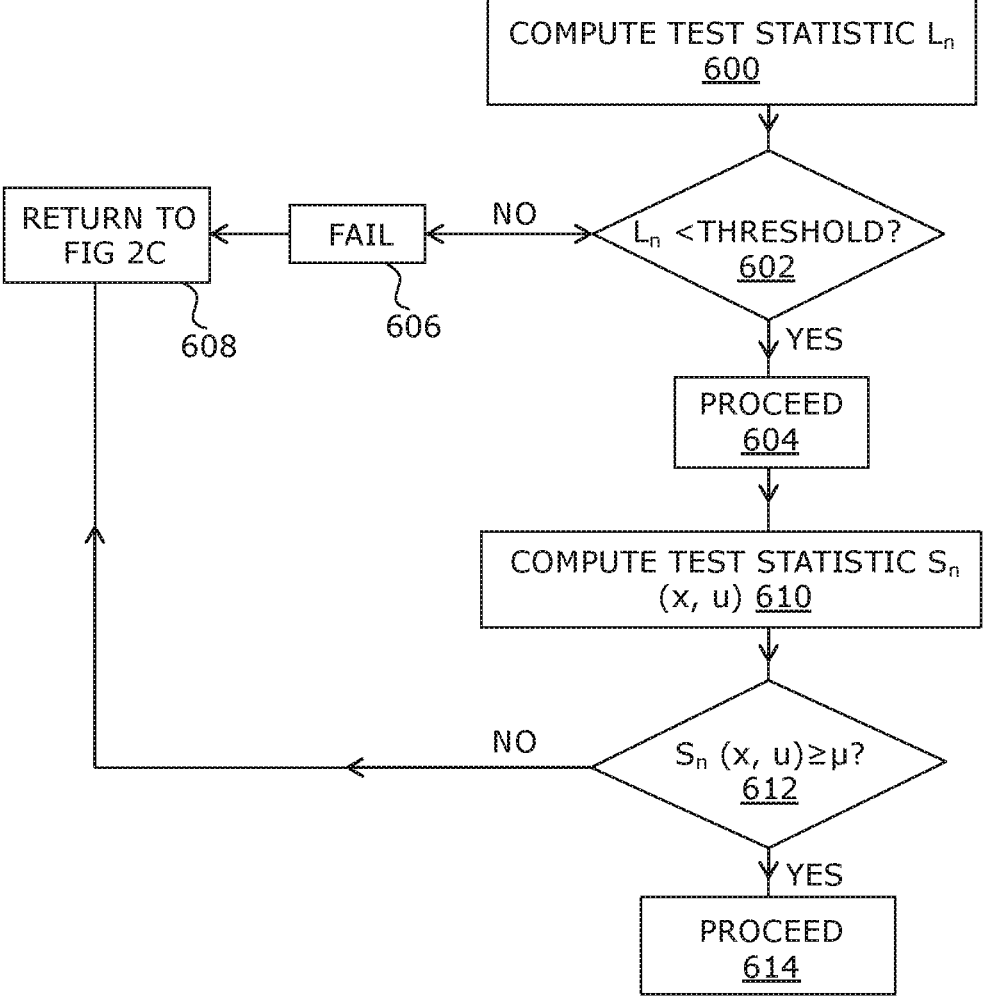
FIG. 6 is a flow diagram of an example security test A in the two-device case.

The security tests for the two-device quantum apparatus embodiments are now described with reference to FIG. 6. Security test A is completed by computing test Statistic $L_n$ at an operation 600. Security test A is the same as described above with reference to the four-device quantum apparatus embodiments. If the test statistic $L_n$ is lower than the threshold at a check 602, the process proceeds to security test C whereby test statistic $S_n(x,u)$ is computed 610. Using mathematical notation to describe security test A, the apparatus computes a test statistic defined by:

$$L_n \equiv \frac{1}{n} \sum_{j=1}^{n} B(x_j, u_j), \qquad (11)$$

The apparatus aborts (see fail box 606 of FIG. 6) the process unless $L_n < b$, where b is a free parameter chosen with regard to the quality of the initial weak random source 318. In an example b=0.125.

If the test statistic $L_n$ is less than the threshold b, the process proceeds to carry out an additional security test, referred to as security test C. Security test C comprises defining, for any fixed measurement setting u*, the random variable $D(x_j, u_j)$ to be:

$$D_j^u(x) = D(x_j, u_j) = \begin{cases} 1 & \text{if } (x_j = x^* \wedge u_j = u^*) \\ 0 & \text{otherwise} \end{cases} \qquad (12a)$$

where x* is a measurement result and u* is a prior-chosen measurement setting. Expressed in words, the random variable D, for an observed measurement and the corresponding detector setting, is equal to 1 if the observed measurement is equal to a specified measurement result and the measurement setting is the fixed measurement setting; otherwise D is zero. The values of the random variable D may be looked up from an array of zeros and ones where the array has one column for each combination of measurement settings and one row for each measurement value combination. The array is populated using the same principles as for the array described earlier in this document for the four quantum system apparatus embodiment. As before, other data structures such as hash tables may be used as well.

A test statistic for security test C is defined as:

$$S_n(x, u) = \frac{1}{n} \sum_{j=1}^{n} D(x_j, u_j) \qquad \text{(12b)}$$

which may be expressed in words as the test statistic for security test C is equal to the reciprocal of the number of measurements taken, multiplied by the sum, over the number of measurements taken, of the value of the random variable D corresponding to the observed measurement value and the corresponding value of the measurement setting. In some embodiments, the value of the random variable D is looked up in an array or other data structure providing a look-up mechanism, as described above.

A parameter is fixed at a value greater than zero ($\mu > 0$), and a check 612 is made whether the test statistic for security test C is greater than or equal to the value of parameter $\mu$, which is expressed mathematically as $S_n(x, u) \geq \mu$. When the test accepts (e.g., the test statistic for security test C is greater than the value of parameter $\mu$), this acts as a guarantee that the measurement devices 312 are correctly producing randomness for the input setting u* and the process proceeds 614. If, however, the test is not passed (e.g., the test statistic for security test C is less than the value of parameter $\mu$), the process is aborted and returns to operation 230 of FIG. 2C as indicated at box 608 of FIG. 6.

In summary, the security tests A and C, in the two-device embodiments, act as a test for a Bell inequality. If these tests are passed the measurement result from the detectors is certified as being generated from qubits and not from classical particles.

In another embodiment, the quantum apparatus 102 of FIG. 1 comprises a quantum system of only two qubits with four modes of freedom and has measurement devices which take only two different quantum measurements for each quantum system. In this case the security test A can implement a CHSH test. A CHSH inequality is useable in a proof of Bell's theorem.

More detail about the randomness extractor 110 of FIG. 1 is now given (as will be appreciated by the skilled person, much of this information is at least partly relevant to other extractors described herein, such extractors 3122 and 3140 shown in FIG. 29). In general, a randomness extractor 110 is a deterministic function that takes as input one or more strings of random bits and produces as its output signal 116 a completely random sequence of bits. The one or more input strings of random bits may be a string or strings of weakly random bits (for example, a string of weakly random bits may have a bias towards 0 rather than being uniformly random). A noncertifiable nondeterministic random number is an example of a weakly random number. In general, randomness extraction is impossible unless there are two or more sources, which, while they may not be perfectly random in their own right, are independent from each other. Classically, this is impossible to achieve in a device-independent way; however, the present technology certifies that the output string 108 given by the measurement results is independent from the weakly random number 112 (provided by WSR-2, a weak source of randomness 114) that is also sent to the randomness extractor 110. The assumption that WSR-2 can be thought of as a Santha-Vazirani source is enough to prove that the measurement outcomes 108 from the quantum apparatus 102 are completely independent of the weakly random number 112 that is sent directly from WSR-2 to the classical randomness extractor 110. The presence of quantum noise does not weaken this fact to an extent that it ceases to be applicable: even when accounting for noise the measurement results form a random source of very low min-entropy.

This means that the randomness extractor 110 only has to operate in a classical setting for which there exist known ways of extracting a truly random string. The guarantee of independence of the two inputs 108, 112 to the randomness extractor 110, while impossible to guarantee classically, has been made possible by harnessing the nonlocal measurement properties of the entangled quantum system in quantum apparatus 102. There are many such classical randomness extractors 110 including but not limited to: Von Neumann extractors, chaos machines, cryptographic hash functions. An example is the randomness extractor of Li ("*Improved constructions of two-source extractors*" Xin Li, S August 2015 arXiv:1508.01115), which gives a practical choice for the protocol. Other example randomness extractors which are suitable include the implementations of Trevisian's randomness extractor and/or the Toeplitz-hashing extractor as described in Ma, et al. "*Postprocessing for quantum random-number generators: entropy evaluation and randomness extraction*", Phys. Rev. A., vol. 87, issue 6, 22 Jun. 2013.

Figure 7:
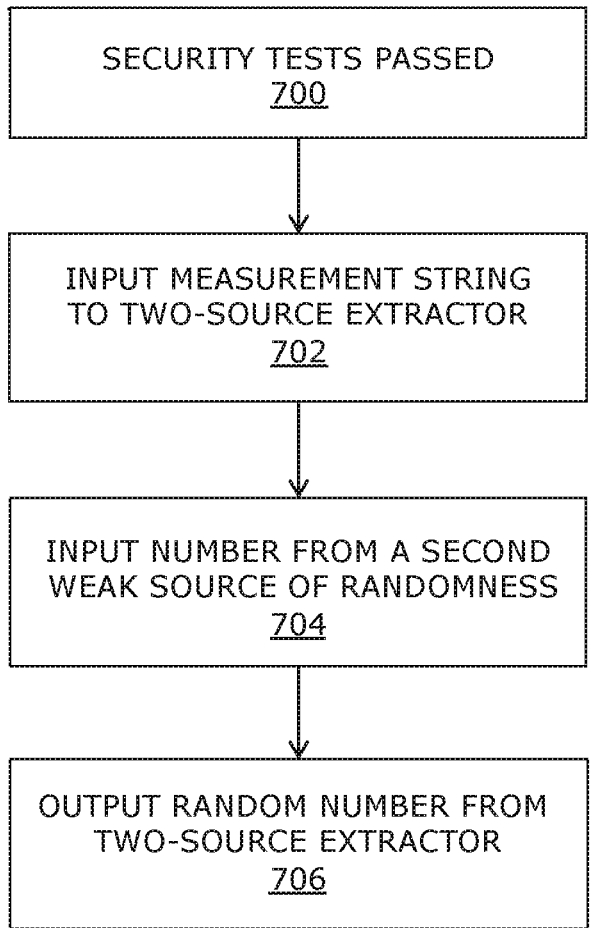
FIG. 7 is a flow diagram of an example method of operation of a randomness extractor such as in the arrangement of FIG. 1.

FIG. 7 is a flow diagram of an example method of operation of a randomness extractor 110 such as in the arrangement of FIG. 1; this method also generally applies to the operation of the two-source extractor 3122 of FIG. 29. At 700, if the measurements performed by the quantum apparatus pass the security tests, then a measurement string output by the quantum apparatus is certifiably produced by quantum effects. The measurement string can comprise the output string 108 described with reference to FIG. 1. As described herein, the security tests can include one or more of security test A, optional security test B, or security test C (e.g., for a two-device quantum apparatus). See, for example, the description of the security tests with reference to FIGS. 2A and 3A. At 702, the measurement string is passed to a two-source extractor. At 704, the two-source extractor receives an input from a second weak source of randomness (e.g., WSR-2 114). Because the security tests were passed at 700, it is certifiably known that the measurement string and the second weak source of randomness are independent. The two-source extractor combines these inputs, and at 706 outputs a random number. The random number can comprise a completely and certifiably random sequence of bits as described for example with reference to the output signal 116 of FIG. 1, the output signal 226 of FIG. 2A, or the output signal 326 of FIG. 3A.

The technology has been described so far in this document using general language, explaining the technology in terms of qubits, measurements, channels, quantum states and so forth. This is to highlight that the technology is implementable in a variety of different physical platforms. Three particular platforms which are suitable for implementing the technology are now given. The following three platforms are intended to illustrate, and not to limit, example implementations of the technology.

Optics

In optical systems for quantum information processing, the unit of light in a given mode, referred to as a photon, is used to represent a qubit. Operations via optical elements (beam splitters, mirrors and phase shifters) are used to implement quantum gates on the qubits. To prepare a state of many photonic qubits, the well-established procedure of optical parametric down-conversion is used. In optical parametric down-conversion, a beam of light is sent through a non-linear crystal, which then outputs twin photons whose polarization (or momentum) are entangled. Another approach is to generate single photons in a well-defined quantum state. Again, this can be done using optical elements. Another element that can be used for implementing a general quantum circuit are quantum gates (transformations of the quantum state of one or more photons). The basic principle is that using beam splitters and/or phase shifters one can construct any arbitrary 1-qubit unitary operation. For two-qubit gates, it is possible to use an optical device (e.g., with a Kerr non-linearity) or use measurements to simulate the non-linearity, as in the Kerr non-linearity scheme. Measurements of the photons may be performed with industrial-made photodetectors comprising a p-n junction that converts light photons into current.

In an example using optics, four individual photons are created, by producing four pairs with parametric down-conversion, and detecting one photon from each pair in order to herald the other. Then, the photons are made to interact using the scheme of Knill, Laflamme and Milburn "*A scheme for efficient quantum computation with linear optics*" Nature, 409(6816): 46-52. Alternatively the photons are made to interact via a nonlinear optical medium with a very large third-order nonlinear susceptibility $x^{(3)}$ value as described in Pritchard, Weatherill and Adams, "*Non-linear optics using cold Rydberg atoms*," in Annual review of cold atoms and molecules, 1 (301), 2013. This is repeated, if necessary, until the outcome of the interaction is the desired state. Each of the four measurement devices receives an input bit $u_i$, $i \in \{1, 2, 3, 4\}$, which selects a specific measurement setting. When each detector has received its input signal, it either adds a half-wave plate to the path of the incoming photon, or does nothing. Then, measurement takes place using an avalanche photodiode, and the outcome (having seen a photon, or having not) is output as the measurement result, $x_i$. These steps are repeated in the next rounds.

Ion Traps

The set-up may be a linear array of trapped atoms (e.g., by standing electromagnetic waves). Each ion stores one qubit in two ground state hyperfine levels. Hyperfine qubits are extremely long-lived (e.g., decay time of the order of thousands to millions of years) and stable in phase and frequency (being thus traditionally used for atomic frequency standards). Ionic qubit states are prepared in a specific qubit state using the well-known process of optical pumping.

Measurements can be done as follows. A laser is applied to the ion that couples only one of the qubit states. When the ion collapses into this state during the measurement process, the laser will excite it, resulting in a photon being released when the ion decays from the excited state. After decay, the ion is continually excited by the laser and repeatedly emits photons. These photons can be collected by a photomultiplier tube (PMT) or a charge-coupled device (CCD) camera. If the ion collapses into the other qubit state, then it does not interact with the laser and no photon is emitted. By counting the number of collected photons, the state of the ion may be determined with a very high accuracy (e.g., greater than about 99.9 percent).

Quantum gates can be implemented as follows. Single qubit gates can be implemented using magnetic dipole transitions or stimulated Raman transitions for hyperfine qubits and electric quadrupole transitions for optical qubits. Two qubit gates can be implemented by coupling the electronic state of the ions to the collective mol. Using the scheme of Cirac-Zoller, four entangled ions can be generated. The Cirac-Zoller scheme is set out in Cirac, J. I.; Zoller, P. (1995 May 15). "*Quantum Computations with Cold Trapped Ions*" Physical Review Letters. 74 (20): 4091-4094.

In an example using ion traps, four entangled ions are generated, each of the four measurement devices of the quantum apparatus of FIG. 2A receives an input bit $u_i$, $i \in \{1, 2, 3, 4\}$ which selects a specific measurement setting. To measure each of the four qubits stored in the ions, the apparatus either detects it using a CCD camera (if $u_i = 0$ and one wishes to measure in the computational basis) or first the apparatus applies a laser to rotate the qubit to the Fourier basis and then measures the ion with the CCD camera (in case $u_i = 1$). The detector then outputs a bit that contains the result of the measurement, $x_i$. These steps are repeated in the next rounds.

The randomness generation protocol can also be implemented in superconducting circuits.

Example of Quantum Apparatus Using Optical Systems

A detailed embodiment is now described with reference to FIGS. 8 to 12 in which the quantum apparatus 102 is implemented using optical systems. The following detailed description is intended to illustrate the embodiment described with reference to FIGS. 8 to 12 but not to limit the scope or the design of the apparatus.

A conventional laser can be used to produce photons, some of which are classical and some of which are entangled quantum photons. The photons from the laser are input to one or two pairs of parametric down-conversion waveguides so that the entangled quantum photons have more than one path to follow in the waveguides and so that the quantum photons interact. The parametric down-conversion waveguides make at least some of the photons interact because the scheme of Knill, Laflamme and Milburn "*A scheme for efficient quantum computation with linear optics*" Nature, 409(6816): 46-52 is used in this embodiment. As a result, the output from the waveguides comprises a stream of photons, some of which are classical photons and some of which are entangled and interacting in quantum states according to the Knill Laflamme Milburn scheme.

The stream of photons enters a plurality of measurement devices. Each measurement device has multiple possible paths that a photon may follow, each path ending in an avalanche photodiode or other photon detector. The paths are the same length. Thus, a quantum photon in superposition will travel along all paths available to it and reach each of the photon detectors at the end of those paths at the same time. By looking for coincidences at the detectors (where multiple detectors detect a photon at the same time) it is possible to find evidence of quantum photons in superposition. Classical photons are also able to travel down the paths in the measurement devices but are not in superposition. Therefore, by looking at the patterns of outputs at the detectors, evidence of classical photons is also found. Measurement settings of the detectors are changed in order to increase security and avoid any risk of malicious parties knowing the measurement settings and tampering with the results. Many millions of measurements may be taken in some implementations, and evidence for and against the presence of quantum photons can be aggregated before making a decision as to whether the outputs of the measurement devices are from a quantum system or not.

Figure 8:
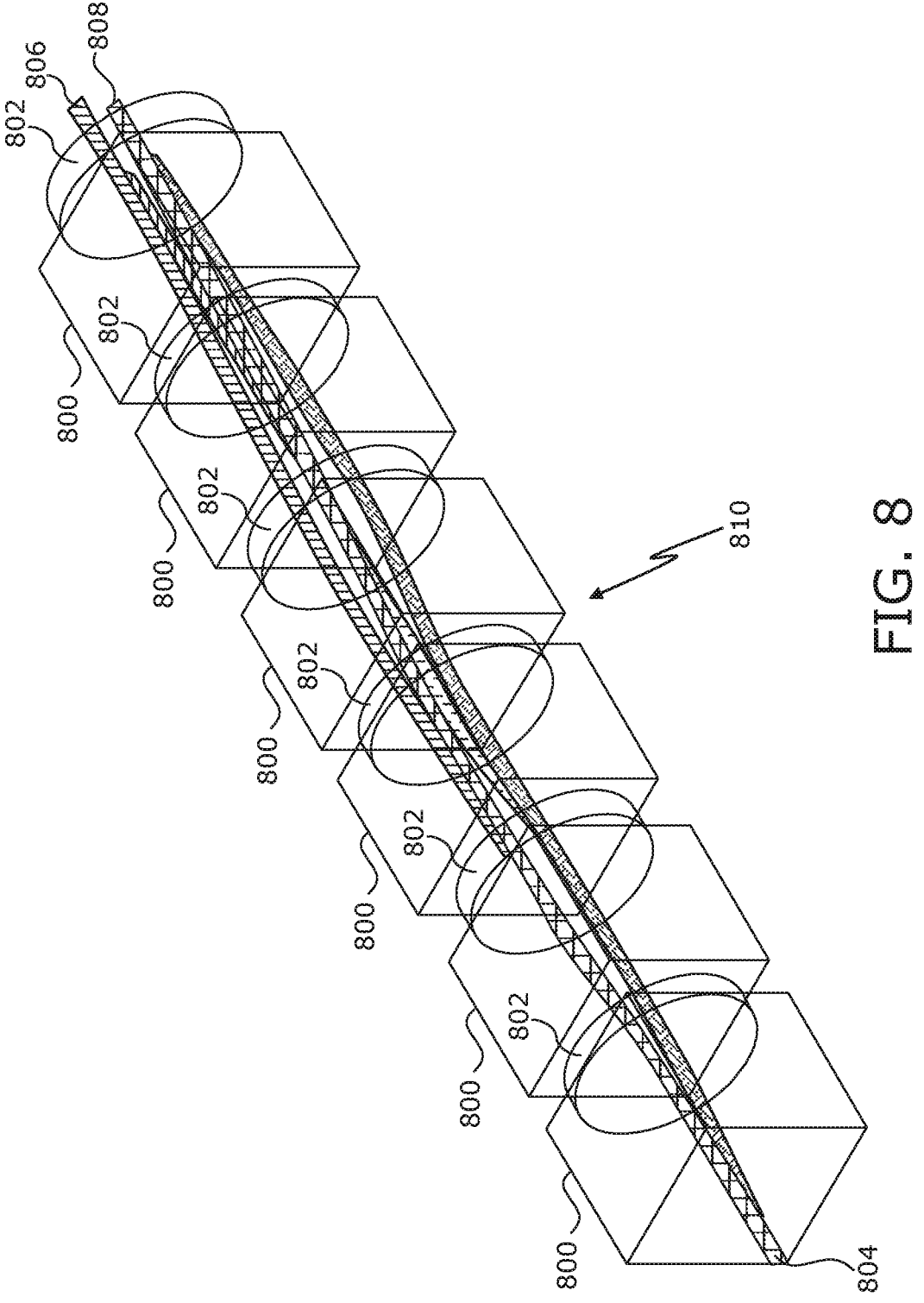
FIG. 8 is a perspective view of an example of a waveguide of an optical state expander.

In this example, the state expander 210 of FIG. 2A has two optical waveguides 810, and FIG. 8 is a perspective view of one such optical waveguide. The waveguide 810 is suitable for use in other types of quantum apparatus as well as that of FIG. 2A.

The state expander 210, in the optical case, can exploit the quantum superposition of an entangled photon. The state expander 210 can have at least one pair of waveguides, each waveguide 810 comprising a plurality of blocks 800 of light displacing material interspersed with a plurality of polarization modifiers 802. The waveguide 810 has an input 804 to receive a pair of entangled photons from a source, such as a laser. The photons are transmitted through the waveguide and deflected by the blocks 800 and polarized by the polarization modifiers 802. There are two outputs 806, 808 of the waveguide, one for each of two mutually orthogonal polarizations.

Each member of the pair of entangled photons has a polarization which is mutually orthogonal with respect to the other member of the pair. The input 804 is connected to the pair of waveguides (although only one waveguide is shown in FIG. 8) such that each waveguide receives one of the pair of entangled photons and guides the entangled photon within the waveguide through the blocks 800 of light displacing material and the polarization modifiers 802 to create a quantum superposition of the photon whereby there are a plurality of possible paths the photon follows within the waveguide along which polarization is changed. The plurality of possible paths are shown in more detail in FIG. 10.

Each waveguide 810 is sized and shaped such that, for each entangled photon a length of a path travelled by the photon through the waveguide is substantially the same irrespective of the mutually orthogonal polarizations of the entangled photons.

Each waveguide 810 has a pair of output optical fibres 806, 808, wherein each output optical fibre 806, 808 of a pair is configured to accept light which is polarized in one of the mutually orthogonal polarizations and to discard light which is polarized in the other mutually orthogonal polarization.

Figure 9:
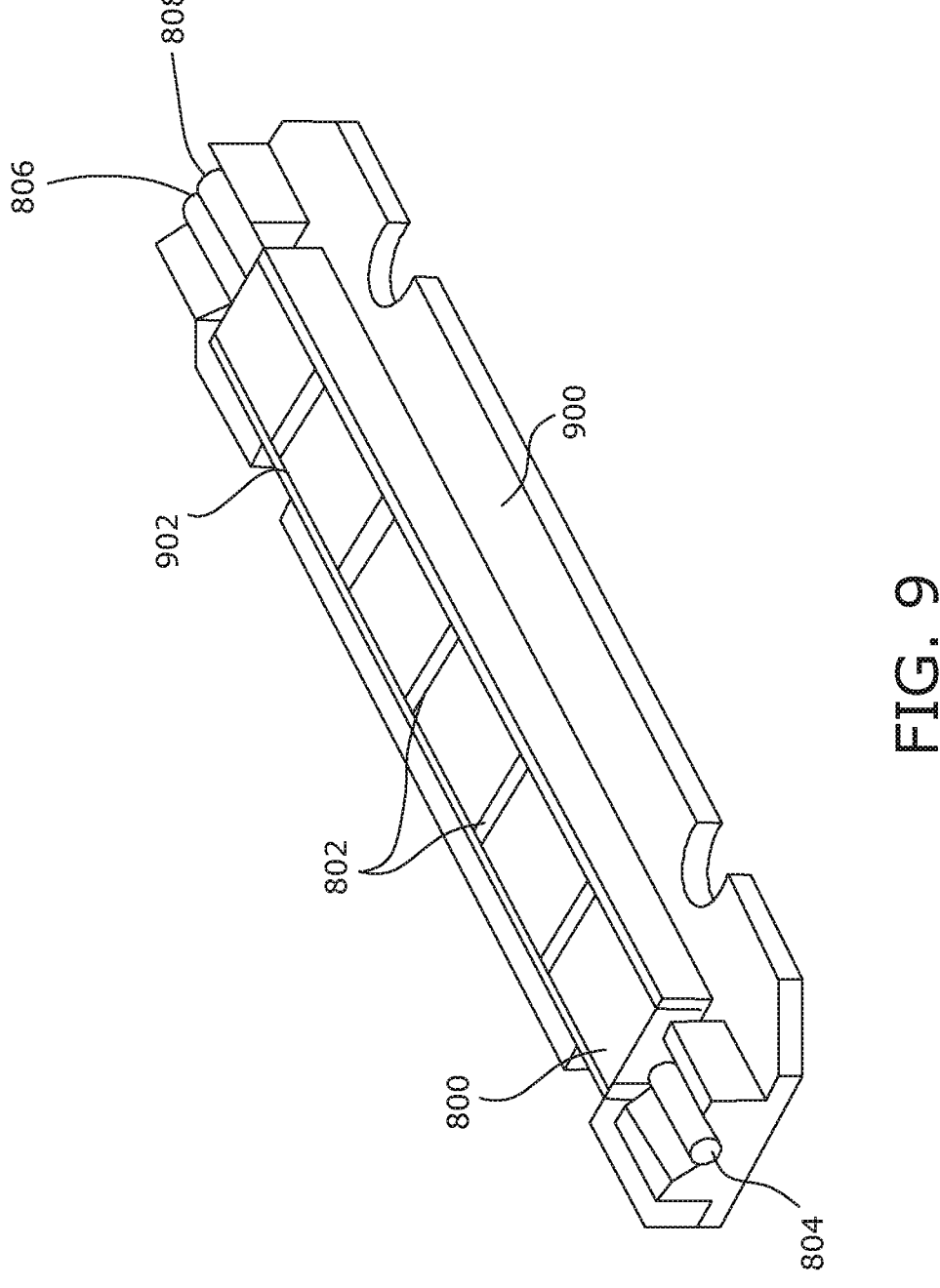
FIG. 9 is a perspective view of the waveguide of FIG. 8 installed in a housing and with a cover omitted.

In FIG. 9, there is shown the waveguide 810 in a housing (also referred to as a casing) 900 which has a longitudinal channel 902 sized and shaped to hold the waveguide such that the blocks 800 of light displacing material fit against the sides of the channel 902. The housing 900 has a removable cover which closes over the channel 902 once the waveguide is inside the channel. The housing 900 and cover act to protect the waveguide from environmental conditions such as humidity, dust, motion, temperature changes and other environmental changes. The casing can be formed from material which reduces the influence of atmospheric pressure, vibration, humidity on the waveguide.

Figure 10:
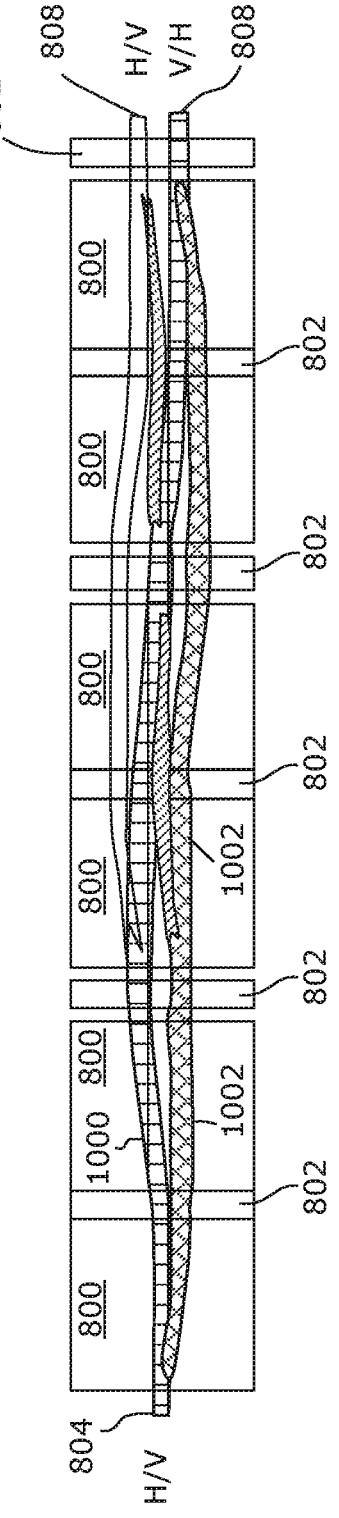
FIG. 10 is a schematic longitudinal cross-section through the waveguide of FIG. 8.

FIG. 10 is a schematic longitudinal cross section through the waveguide 810 of FIG. 8. In this example there are six blocks 800 of light displacing material although other numbers of blocks are used in other examples. In this example there are six polarization modifiers 802 although other numbers of polarization modifiers are used in other examples. In this example there is one polarization modifier at the output end of the waveguide 802 and the other five polarization modifiers are each between two different ones of the blocks 800. Horizontally polarized photons (denoted by H) entering the waveguide are deflected so as to have two possible paths 1000, 1006 through the waveguide. Vertically polarized photons (denoted by V) entering the waveguide are deflected so as to have two possible paths 1002, 1004 through the waveguide. Note that the plurality of paths through the waveguide are substantially the same length since all the paths pass through the waveguide which is of a fixed length.

Figure 11A:
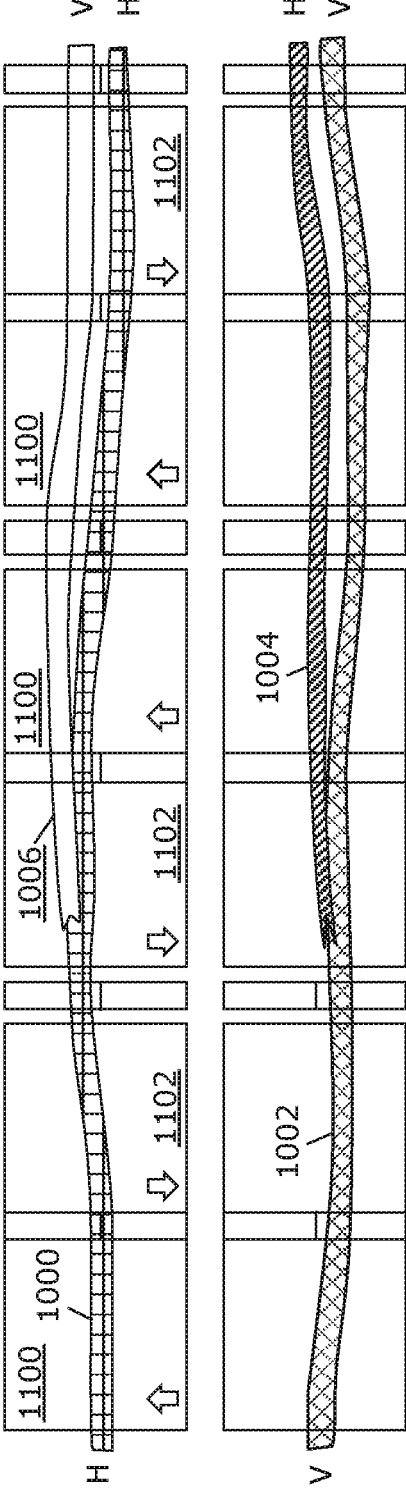
FIG. 11A is a schematic diagram to explain operation of the waveguide of FIG. 8.
Figure 11B:
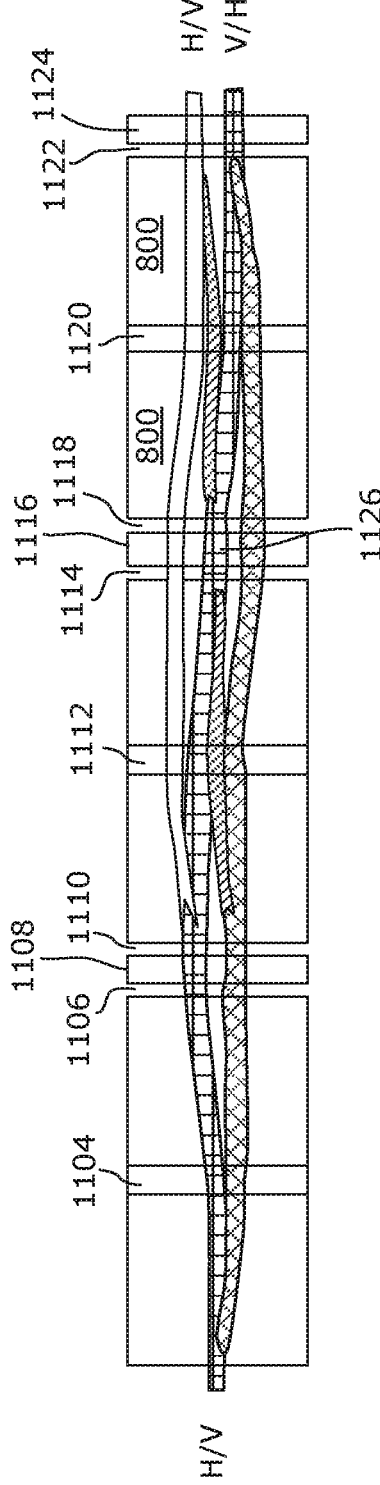
FIG. 11B is based on FIG. 8 but with reference numerals to indicate air gaps.

As shown in FIG. 11A, the blocks 800 of light displacing material comprise at least one block 1100 formed of a material which displaces light in a first direction (as indicated by the up arrow in blocks 1100 of FIG. 11A), and at least one block 1102 formed from material which displaces light in a second direction different from the first direction (as indicated by the down arrow in blocks 1102 of FIG. 11A). In FIG. 11A, the waveguide is shown as duplicated in order to aid understanding of the technology. The upper one of the waveguides in FIG. 11A shows a horizontally polarized photon entering the waveguide on the path 1000 and being deflected/displaced by the blocks such that the photon, where it is an entangled photon output from the laser, is able to follow two possible paths 1000 and 1006 through the waveguide simultaneously. The lower one of the waveguides in FIG. 11B shows the same situation for a vertically polarized photon entering the waveguide. Note that in reality the upper and lower waveguides of FIG. 11B are the same waveguide and the paths 1000, 1002, 1004, 1006 pass through a single waveguide as indicated in FIG. 10.

At least one block 1100 which displaces light in a first direction is made from an up-air crystal, and the at least one block 1102 which displaces light in the second direction is made from a down-air crystal. In this way displacement of the photons is facilitated which leads to creation of multiple possible paths for entangled photons from the laser to follow. An up-air crystal displaces light in a first direction away from a longitudinal axis of the waveguide. A down-air crystal displaces light in a second direction away from the longitudinal axis of the waveguide and substantially opposite to the first direction.

Preferably the plurality of blocks 800 of light displacing material are made of the same material since this facilitates manufacture. However, using the same material is not essential. A non-exhaustive list of examples of materials the blocks 800 are made from is one or more of: calcite or lithium niobate. In a preferred example the waveguide 810 comprises six blocks of light displacing material, as this gives a practical working solution that is relatively easy to manufacture. However, other numbers of blocks 800 are used in other examples.

In FIG. 11A the waveguide 810 is shown with six blocks of light displacing material made from up-air crystal and down-air crystal arranged in the following sequence from an output end of the waveguide to an input end of the waveguide: down-air crystal, up-air crystal, up-air crystal, down-air crystal, down-air crystal, up-air crystal. This arrangement is found to be particularly effective for providing multiple optical paths for qubits with quantum state suitable for the embodiments of FIG. 2A, and/or as defined in equation 3 above.

In the example of FIGS. 11A and 11B, the polarization modifiers are placed in the sequence of blocks of light displacing material in the following order from an output end of the waveguide to an input end of the waveguide and with or without the following air gaps: polarization modifier 1124, air gap 1122, down-air crystal, polarization modifier 1120, up-air crystal, air gap 1118, polarization modifier 1116, air gap 1114, up-air crystal, polarization modifier 1112, down-air crystal, air gap 1110, polarization modifier 1108, air gap 1106, down-air crystal, polarization modifier 1104, up-air crystal.

The polarization modifiers can be half wave plates some of which are separated from adjacent ones of the blocks of light displacing material by air gaps. Others of the polarization modifiers may be in contact with adjacent ones of the blocks of light displacing material. By selecting the location or size of the air gaps, the ability of the photons to diffract or be displaced within the waveguide is facilitated.

At least one of the polarization modifiers comprises a region 1126 through which light passes without modification of polarization. The region is configured such that light is transmitted with no polarization change. In the example of FIG. 11B, the region 1126 is in the third polarization modifier 1116 from the output end of the waveguide.

In some examples there is a cooling chamber holding the waveguides and configured to reduce the temperature of the waveguides to around minus twenty degrees Celsius during operation, since this reduces noise in the generated qubits (that is the waveguide 810 generates a higher proportion of qubits in the desired state as opposed to classical photons).

The state expander, in the optical embodiment just described, receives from a generator such as a laser, a pair of entangled photons each member of the pair having a polarization which is mutually orthogonal with respect to the other member of the pair. The state expander inputs the entangled photons to a pair of waveguides, such that each waveguide 810 receives one of the pair of entangled photons and guides the entangled photon within the waveguide along its length to create a quantum superposition of the photon, whereby there are a plurality of possible paths the photon follows within the waveguide along which polarization is changed. Each waveguide is sized and shaped such that, for each entangled photon a length of a path travelled by the photon through the waveguide is substantially the same irrespective of the mutually orthogonal polarizations of the entangled photons.

Figure 12:
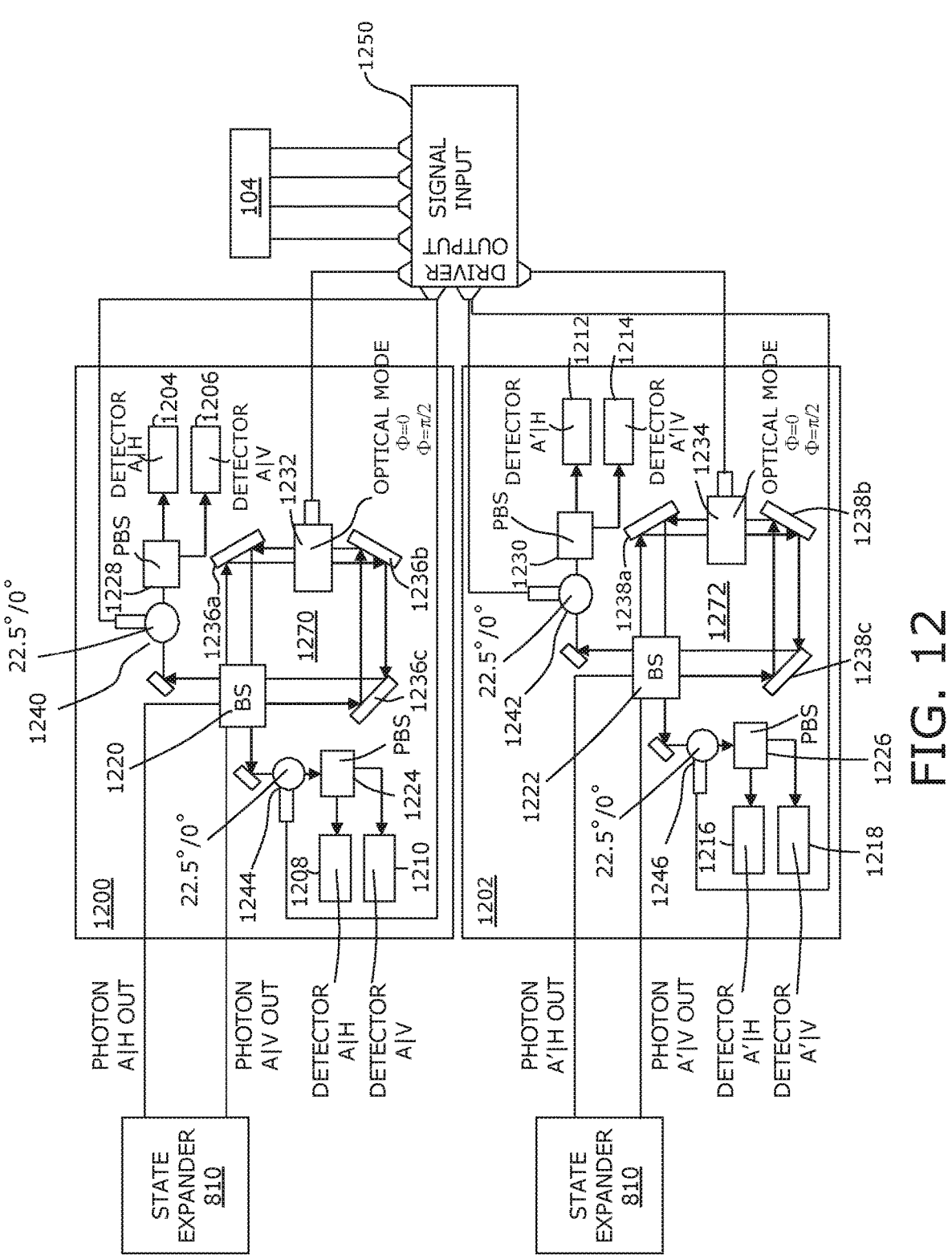
FIG. 12 is a schematic diagram of an example pair of measuring devices that may be used in the apparatus of FIG. 1, FIG. 2A, or FIG. 3A.

FIG. 12 is a schematic diagram of an example of a pair of measuring devices 1200 and 1202 for measuring particles received from state expanders 810. In this example, the measuring devices 1200 and 1202 are optical and the qubits are formed using photons as described with reference to FIGS. 8 to 11B. Note that FIG. 12 shows only one pair of measuring devices 1200 and 1202 although in practice, in the apparatus of FIG. 2A there can be four such measuring devices. Having said that, in the example of FIG. 3A there are only two such measuring devices.

Each measuring device 1200, 1202 has multiple possible paths that a photon may follow, each path ending in an avalanche photodiode or other photon detector. The paths are substantially the same length. Thus, a quantum photon in superposition will travel along all paths available to it and reach each of the photon detectors at the end of those paths at substantially the same time. By looking for patterns of coincidences at the detectors (where multiple detectors detect a photon at the same time) it is possible to find evidence of quantum photons in superposition which gives evidence of violation of a Bell inequality. Classical photons are also able to travel down the paths in the measuring devices but are not in superposition and give different patterns at the detectors than do quantum photons. Measurement settings of the detectors can be changed in order to increase security. Many millions of measurements may be taken and evidence for and against the presence of quantum photons can be aggregated to decide whether a Bell inequality is violated or not.

The pair of measuring devices 1200 and 1202 in FIG. 12 are part of an apparatus for detecting entangled photon pairs which are in superposition in a stream of photons comprising both entangled photon pairs and classical photons. Each measuring device 1200, 1202 has a plurality of detectors (1204, 1206, 1208, and 1210 for measuring device 1200 and 1212, 1214, 1216, and 1218 for measuring device 1202), wherein each detector is arranged to detect single photons. Each measuring device 1200, 1202 has a detector configuration apparatus to automatically configure, according to values of control parameters, for each detector, a measurement basis of the detector. In the example of FIG. 12, the detector configuration apparatus in measuring device 1200 comprises polarization modifiers 1240, 1244 and an optical mode setter 1232. The detector configuration apparatus in the measuring device 1202 comprises polarization modifiers 1242, 1246 and an optical mode setter 1234.

Each measuring device 1200, 1202 has a photon input from a corresponding state expander 810. Each photon input has two photon paths: one for each of two possible mutually orthogonal photon polarizations (e.g., horizontal (H) and vertical (V)), each photon path travelling to a different one of the detectors and wherein the photon paths within a single measuring device are substantially the same length. In FIG. 12, the photon input to the measuring device 1200 is denoted by A, and the photon input to the measuring device 1202 is denoted by A'. The polarization state of a photon is indicated using a vertical bar; for example, A|H represents a horizontal polarization state for the photon A, and A'|V represents a vertical polarization state for the photon A'.

In addition the photon paths of the measuring devices in the pair are substantially the same length. That is, the distance from the source to the detectors in measuring device 1200 is substantially the same as the distance from the source to the detectors in measuring device 1202 and also for the other two measuring devices which are not shown in FIG. 12 for clarity.

Each measuring device comprises two polarizing beam splitters (PBS) 1228, 1224, 1230, 1226 as well as one or more mirrors 1236, 1238. When photon A, which is vertically polarized (photon A|V in FIG. 12), enters the measuring device 1200, it is transmitted to a Sagnac loop 1270. The Sagnac loop 1270 in the measuring device 1200 comprises a beam splitter (BS) 1220 and three mirrors 1236a, 1236b, and 1236c, which form a Sagnac interferometer. The photon passes through the beam splitter 1220, reflects off the mirror 1236a and through the optical mode modifier 1232 which potentially changes the optical mode of the photon (depending on what the setting of the optical mode setter 1232 is), reflects off another mirror 1236b back into the beam splitter 1220 and reflects off a further mirror 1236c into a polarization modifier 1244. As the photon is already vertically polarized, if the polarization modifier 1244 does nothing, the vertically polarized photon passes into polarizing beam splitter 1224 before being detected by detector 1210 and not detected by the detector 1208. If the polarization filter 1244 is configured to change polarization of photons which pass through it, then the photon becomes horizontally polarized and is detected by the detector 1208. The input from the state expander 810 that gives a horizontally polarized photon (A|H) follows a path with the configurable polarization modifier 1240 and through configurable optical mode setter (modifier) 1232 to the detectors 1204, 1206. The measuring device 1202 functions generally similarly as described for the device 1200 when acting on the photon A' in the polarization states A'|H or A'|V. For example, the Sagnac loop 1272 in the device 1202 comprises the beam splitter 1222 and the three mirrors 1238a, 1238b and 1238c. As will be described with reference to FIGS. 13A, 13B, in other implementations, other types of interferometers (e.g., Mach-Zehnder interferometers) can be used in the measuring devices 1200, 1202. Different types of interferometers can be used in different measuring devices.

The measuring devices 1200, 1202 detect coincidences which are qubits detected at the detectors at the substantially the same time. The coincidences are assessed as described in more detail earlier in this document to see if a Bell inequality is violated. If a detector in a first one of a pair of the measuring devices detects a photon at a first time and a detector in the other one of the pair of the measuring devices detects a photon within a specified time of the first time (a coincidence), there is a likelihood that the detected photon is an entangled photon in superposition. For example, the specified time period can be in a range of 5 to 15 ns, e.g., about 10 ns.

However, if a detector in the single measuring device detects a photon at a first time and another detector in the single measuring device detects a photon within a specified time of the first time (a coincidence), there is a likelihood that the detected photon is a classical photon. Again, for example, the specified time period can be in a range of 5 to 15 ns, e.g., about 10 ns.

In each of the measuring devices 1200, 1202, there are four detectors comprising a first pair of detectors (1204, 1206 in measuring device 1200; 1212, 1214 in measuring device 1202) for each of two mutually orthogonal polarizations, and a second pair of detectors (1208, 1210 in measuring device 1200; 1216, 1218 in measuring device 1202) for each of two mutually orthogonal polarizations; where the first pair of detectors operates for a first optical mode and the second pair of detectors operates for a second optical mode. As described with reference to FIG. 12, the two mutually orthogonal polarizations can be horizontal (H) and vertical (V) polarizations.

The detector configuration apparatus comprises an apparatus to change a number of radians of a phase shift (also referred to as an optical mode) between two specified values (such as x radians and x/2 radians or another pair of phase shifts which are orthogonal), and to change a number of degrees of polarization between two specified values (such as horizontal and vertical, or zero degrees and 22.5 degrees, or another pair of polarization values), for use by individual ones of the detectors. The detector configuration apparatus receives the values of the control parameters from a first weak source of randomness 104 via a device driver 1250.

In an example the detector configuration apparatus receives the values of the control parameters as four bits since this is particularly efficient. However, other numbers of bits are used in other examples. In various implementations, the detector configuration apparatus can receive the four bits as a packet of four bits, four packets of one bit each, two packets of two bits each, or any other arrangement of bits. The detector configuration apparatus may have access to a stream of bits and access the control parameter bits from the stream as needed.

In an example an output of the measuring devices comprises, for each measurement device, two bits, each bit representing whether a photon was detected or not in a given measurement basis. In an example there are four measurement devices and the resulting 8 bit output of the measurement devices is converted into a 4 bit output using a look-up table.

In some embodiments there is a two-device photonics implementation of the examples of FIGS. 3A and 3C. In this case, the source 300 of FIG. 3A can be a laser which emits photons, some of which are classical and some of which are entangled quantum photons. There are two quantum physical apparatuses 302, 304 as illustrated in FIG. 3A, and each quantum apparatus is able to store two qubits in contrast to the embodiment of FIG. 2A. The apparatus 302 comprises a state expander 310 comprising two waveguides so that it is able to store two qubits. Moreover, the apparatus 304 also comprises a state expander 310 comprising two waveguides so that it is able to store two qubits. The waveguides can be implemented as described with reference to FIG. 8 to FIG. 11A and FIG. 11B. The quantum state of at least some of the photons stored in the state expanders 310 in the two-device photonics embodiment is different from that of the four-device photonics embodiment as described above in the examples which are not limited to any particular type of qubit implementation.

In the two-device photonics embodiment there are two measuring devices 312 as illustrated in FIG. 3A. The measuring devices are generally as illustrated in FIG. 12 although modified to enable nine different measurement bases for each detector. This can be done by using nine different polarization and/or optical mode settings.

Using the same principles as for the four-device photonics embodiment, patterns of detection events at the photon detectors of the measuring devices are recorded over many measurements at the photon detectors. The patterns of detection events are used as evidence for or against presence of qubits and violation of a Bell inequality. Optionally, a further check (security test B) is completed, as explained above.

As noted above, FIG. 12 is a schematic diagram of an example of a pair of measuring devices 1200 and 1202 for measuring particles received from state expanders 810. In this example the measuring devices 1200 and 1202 are optical and the qubits are formed using photons as described with reference to FIGS. 8 to 11B. Note that FIG. 12 shows only one pair of measuring devices 1200 and 1202, although in practice in the apparatus of FIG. 2A there can be four such measuring devices. In the example of FIG. 3A there are only two such measuring devices.

Figure 13A:
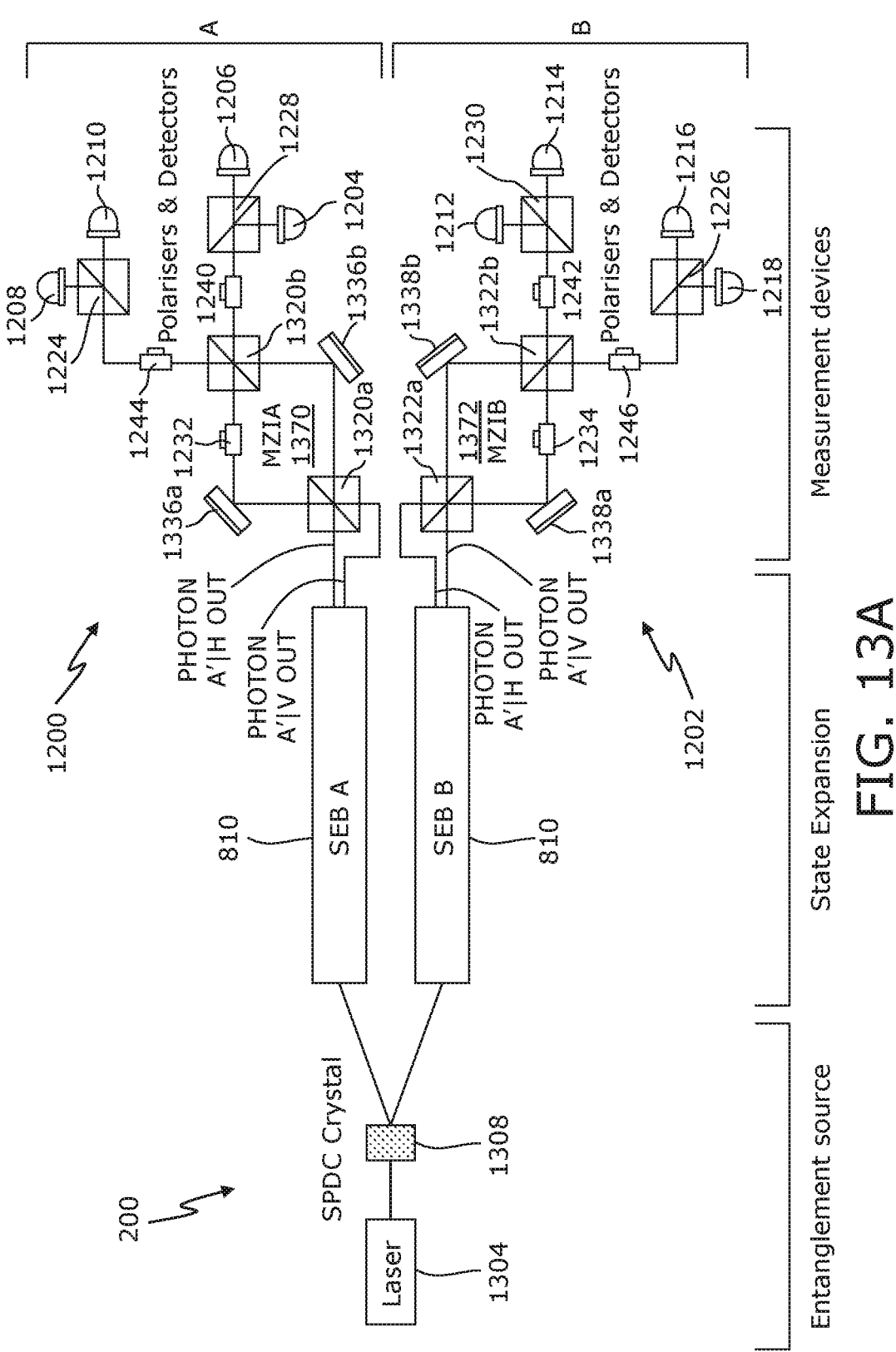
FIG. 13A is a schematic diagram of an example two-device quantum apparatus that may be used in the apparatus of FIG. 1, FIG. 2A, or FIG. 3A.

FIG. 13A is a schematic diagram of another example of a pair of measuring devices 1200 and 1202 for measuring particles received from the state expanders 810. In this example the measuring devices 1200 and 1202 are optical and the qubits are formed using photons as described with reference to FIGS. 8 to 11B. For example, the source 200 for emitting qubits comprises a laser 1304 and a nonlinear crystal 1308 for spontaneous parametric down-conversion (SPDC), which can generate a pair of entangled photons. The nonlinear crystal 1308 can comprise periodically poled lithium niobate (PPLN), beta-barium borate (BBO), potassium dihydrogen phosphate (KDP), or other crystal with sufficiently high second-order nonlinearity.

Note that FIG. 13A shows one pair of measuring devices 1200 and 1202, as per the example of FIG. 3A, while the apparatus of FIG. 2A has four such measuring devices. Many of the components shown in FIG. 13A are generally similar to corresponding components shown and described with reference to FIG. 12 and will not be described further here.

In the devices 1200, 1202 shown in FIG. 13A, Mach-Zehnder interferometers MZI A 1370 and MZI B 1372 are used in place of the Sagnac loop interferometers 1270, 1272, respectively, that were used in the corresponding devices 1200, 1202 shown in FIG. 12. Each Mach-Zehnder interferometer comprises two beam splitters and two mirrors in contrast to the Sagnac loops which comprise one beam splitter and three mirrors. For example, MZI A 1370 comprises beam splitters 1320a, 1320b and mirrors 1336a, 1336b, and MZI B 1372 comprises beam splitters 1322a, 1322b and mirrors 1338a, 1338b. Similar to the Sagnac loops 1270, 1272, the Mach-Zehnder interferometers 1370, 1372 can also include the configurable optical mode setters 1232, 1234, respectively.

The functionality of the devices 1200, 1202 shown in FIG. 13A is generally similar to the functionality of the corresponding devices 1200, 1202 shown in FIG. 12. For example, when photon A, which is vertically polarized (photon A|V in FIG. 13A), enters the measuring device 1200, it is transmitted to MZI A 1370. The optical mode modifier 1232 may potentially change the optical mode of the photon (depending on what the setting of the optical mode setter 1232 is). The photon passes through the beam splitter 1320b into polarization modifier 1244. As the photon is already vertically polarized, if polarization modifier 1244 does nothing, the vertically polarized photon passes into the polarizing beam splitter 1224 before being detected by the detector 1210 and not detected by the detector 1208. If the polarization modifier 1244 (e.g., a polarization rotator) is configured to change polarization of photons which pass through it, then the photon becomes horizontally polarized and is detected by detector 1208 (but not by the detector 1210). The input from the state expander SEP A 810 that gives a horizontally polarized photon (A|H) follows a path including configurable polarization modifier 1240 and through configurable optical mode setter 1232 to detectors 1204, 1206. The measuring device 1202 functions generally similarly as described for the device 1200 when acting on the photon A' in the polarization states A'|H or A'|V.

Figure 13B:
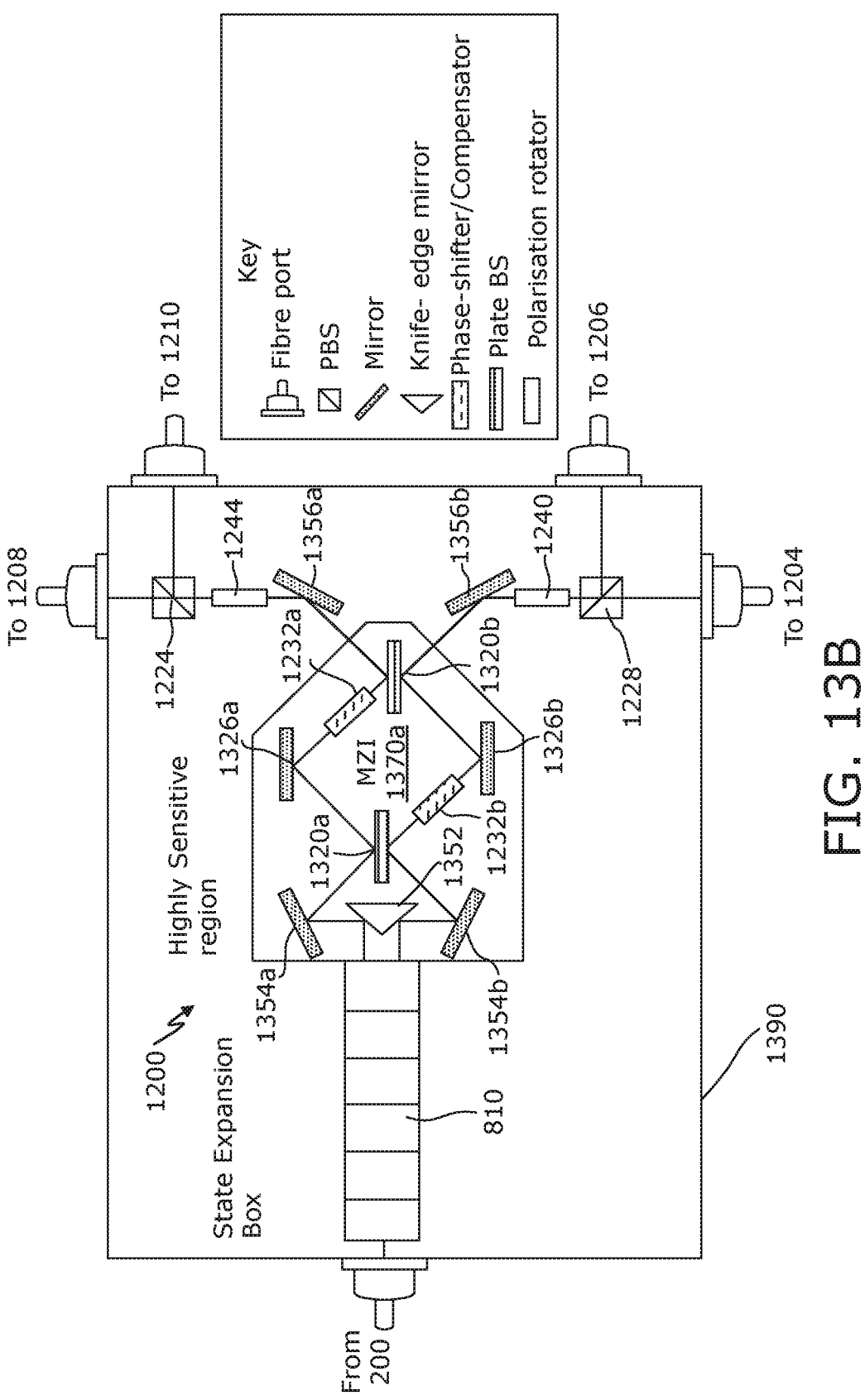
FIG. 13B is a schematic diagram of an example quantum apparatus including a Mach-Zehnder interferometer (MZI) that may be used in the apparatus of FIG. 1, FIG. 2A, or FIG. 3A.

FIG. 13B is a schematic diagram of another example of the measuring device 1200 for measuring particles received from the state expander 810. Note that only one measuring device is shown in FIG. 13B (two devices were shown in FIGS. 12 and 13A). The apparatus of FIG. 2 may use four such devices, and the apparatus of FIG. 3A may use two such devices. The measuring device 1200 of FIG. 13B is generally similar to the device 1200 shown and described with reference to FIG. 13A, for example, the measuring device 1200 of FIG. 13B also uses a Mach-Zehnder interferometer MZI 1370a (rather than a Sagnac loop).

As shown in FIG. 13B, photons from the source 200 enter the device 1200, are placed into the entangled quantum state by the state expander 810, and then pass to the measuring device 1200. In this embodiment, photons from the state expander 810 reflect from a knife-edge mirror 1352, then reflect from mirrors 1354a, 1354b so as to be incident onto MZI 1370a. The MZI 1370a comprises two plate beam-splitters 1320a, 1320b, and the two mirrors 1326a, 1326b. In this embodiment, two of the paths include optical mode selectors 1232a, 1232b, which may be phase shifters or phase compensators. Photons exiting the MZI 1370a reflect from mirrors 1356a, 1356b, pass through polarization modifiers 1240, 1244 (which may be polarization rotators), through polarizing beam splitters 1224, 1228, and then to the downstream detectors 1204, 1206, 1208, 1210.

In embodiments of the devices 1200, 1202, an advantage of using a Mach-Zehnder interferometer is that such interferometers are capable of manufacturing by silicon photonics techniques, which can provide a compact, stable, and robust setup.

Combined Mach-Zehnder Interferometer (MZI) and State Expander

In the embodiment shown in FIG. 13B, both the state expander 810 and the measuring device 1200 are both disposed in a housing 1390, which may advantageously provide improved thermal and mechanical stability as further described below. In embodiments of the apparatus shown in FIG. 12 or 13A, both of the state expanders 810 and their corresponding measuring devices 1200, 1202 may be disposed in a common housing or two housings can be used with each such housing containing a state expander and its corresponding measuring device.

FIG. 13B is an illustration of a highly sensitive region of the device 1200 (specifically between components 1354a/b and 1232a/b) where the photon wave function paths differ and where the different paths should be maintained to a high tolerance to achieve single photon interference. The following provides a description of non-limiting examples of optical path length, mechanical, thermal, and vibration tolerances that, alone or in any combination, advantageously may provide sufficiently high tolerance to achieve single photon interference in various embodiments.

Figure 14:
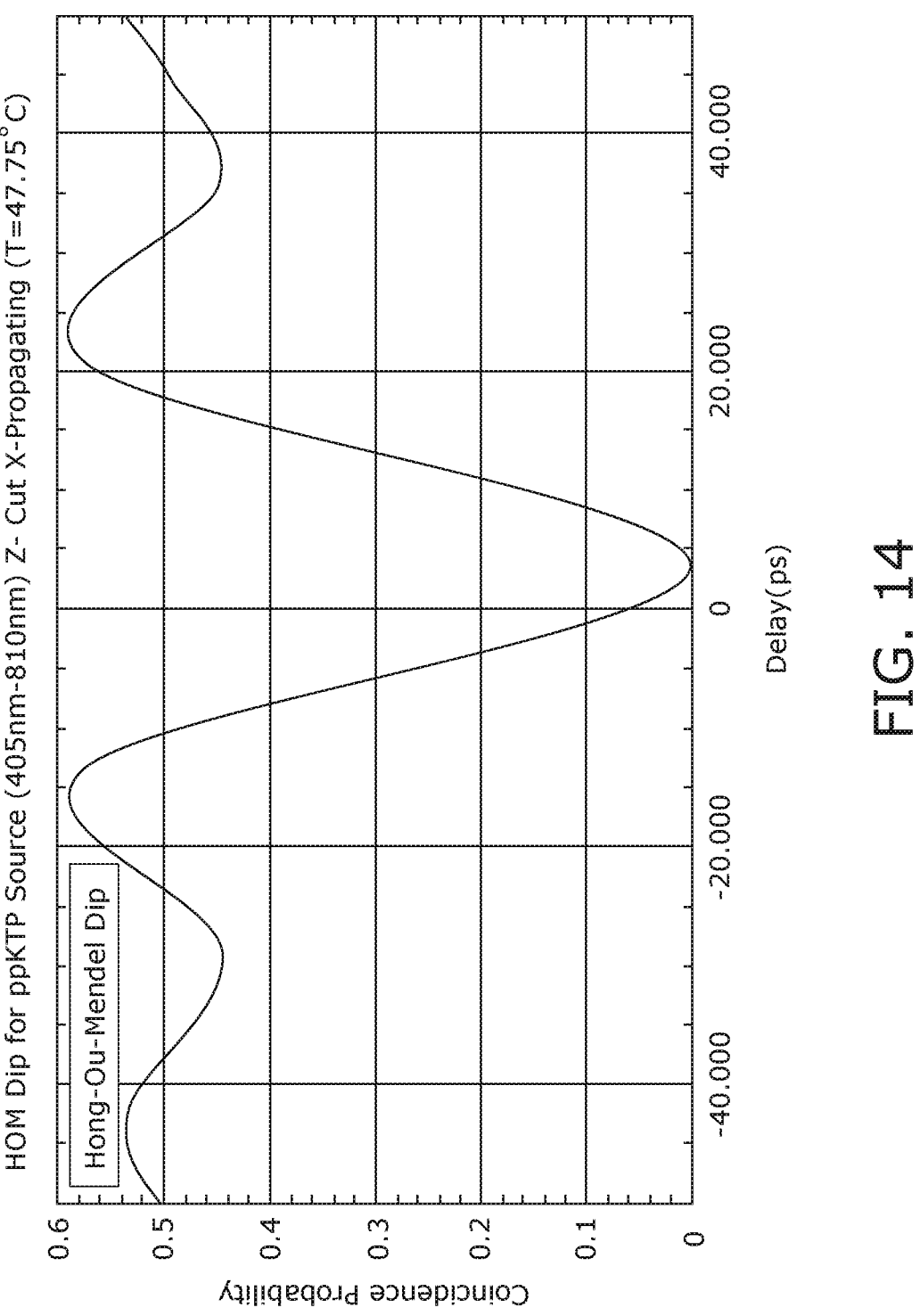
FIG. 14 is a plot of an example calculation of the Hong-Ou-Mandel (HOM) dip for a periodically poled potassium titanyl phosphate (KTP) waveguide that may be used in an optical state expander such as in FIG. 8.

FIG. 14 an illustration of an example calculation of the Hong-Ou-Mandel (HOM) dip for the waveguide used in an embodiment of the state expander 810 under ideal temperature conditions. In this example, the waveguide comprises periodically poled potassium titanyl phosphate (KTP). The spectral full-width-half-maximum (FWHM) of the pump for the laser 1304 is set to 10 pm, which is capable of providing very good HOM visibility (e.g., 0.996). The FWHM of the HOM dip is approximately 19 ps, which equates to a distance of approximately 5.7 mm.

For the measurement device to provide a region where single photon interference can occur, it may be advantageous to control distances much more accurately than this (e.g., much less than 5.7 mm), especially considering the wave-packet spreading that occurs in optical materials. Controlling this delay to within 1 ps (e.g., 0.3 mm) should provide maximum photon interference. This estimate for the delay assumes the ideal case where the pump is perfectly matched to the waveguide crystal and is of a very narrow line-width, the crystal is at the appropriate temperature, and very little spectral spreading of the photons occurs along the optical train. As a further conservative estimate, the tolerances should be within about 0.05 mm of each other, which is achievable possible with modern manufacturing techniques.

There are two parts to the dimensional tolerance. The first is the tolerable delay between the two arms of the interferometer over which we can consider the coherence length of the photon. The second is maintenance of the stability such that variations over the course of the measurement will not shift the path length of one arm relative to the other arm on the order of a quarter wavelength of the photon (e.g., about 202 nm). This may, in some implementations, be much more challenging, because thermal and acoustic fluctuations may be significant in the environment.

The mechanical design of the housing 1390 is only one component of the two arms of the MZI shown in FIGS. 13A and 13B. In these designs, the optical path lengths of the components and their tolerances can be considered. The components that may be significant in providing the two-photon interference include: Beam splitters (e.g., thickness tolerance of about 0.1 mm); Angular alignment of the knife-edge mirror 1352 and its angular orientation (in the embodiment shown in FIG. 13B); optical mode selector tolerances (e.g., optical compensators or optical phase-shifters); and mirror thicknesses.

Thermal fluctuations within the housing 1390 can be considered. Inside the housing there can be heat sources such as Peltier plates associated with phase shifters or polarisation rotators. Such heat sources may cause a thermal gradient between the two arms of the highly sensitive region of the Mach-Zehnder interferometer. Thermal tolerances will of course depend on the material used as well as the size, position, and temperature of the Peltier plates, along with the outside ambient temperature. However, in some implementations, the thermal gradient should not be such that a path difference between the two arms of the interferometer differs by more than a tolerance of about 50 nm. Accordingly, to achieve a desired thermal tolerance, the housing 1390 may contain Peltier plates, thermoelectric heaters or coolers, insulation, air or liquid cooling (e.g., liquid nitrogen), and so forth.

As with the temperature fluctuations, acoustic vibrations can cause a variation in the optical path length of the two arms of the interferometer during operation. Advantageously, acoustic vibrations should be isolated, and the variation in optical path caused by vibrations should not be more than 50 nm over the prescribed range of frequencies. A frequency of interest with respect to acoustic vibrations is expected to be high, as long as the path lengths of the interferometer arms remain constant during the time-of-flight (TOF) of the photon so that a good result for single-photon interference can be obtained. The TOF of a photon through the highly sensitive region is expected to be about 1 ns, roughly equating to a frequency of about 1 GHz. The sensitivity to low frequencies depends on the acoustic modes present in the device and housing. If the acoustic modes are oscillating in-phase, then they will not be sensitive to variations. However, if the acoustic modes are oscillating out of phase, they will be sensitive to all frequencies below 1 GHz, because all frequencies above 1 GHz should average out.

Due to the tolerances in the optical components being lower than the desired tolerances, some manual adjustment may be included in the design. Compensation tools to provide manual adjustment may include tools for positioning of the mirrors and beam splitters in the highly sensitive region in the direction normal to the surface of the plate of the mirror or beam splitter. The mirror mounts may comprise gimbal mounts, available from Thorlabs, Inc. Translational stages can be included in at least some of the mirror/beam splitter arrangements.

Accordingly, in various embodiments, the following tolerances may provide good single-photon interference in the interferometer: static common-path length tolerance: +0.05 mm; temperature tolerance: +50 nm difference between arms during operation of the interferometer; acoustic vibration tolerance: +50 nm difference between arms at all frequencies up to the TOF of a photon (e.g., 1 GHz).

Two-Qubit Optical QRNG Architecture for On-Chip Implementation

The quantum apparatus architectures and designs disclosed in this section, are examples for a 2-qubit quantum apparatus that exploits the quantum behavior of optical particles (photons) for generating quantum random bit strings. In some implementations, of these architectures, the quantum states needed for generating quantum random bit strings are prepared by routing photons through a network of optical components (e.g., waveguides, beam splitters, phase shifters, etc.). The architectures used in these examples may be used for on-chip implementation of self-testing and device independent quantum random number generators (QRNGs) described above. These architectures can be implemented based on different types of on-chip configurations, for example, based on hybrid and/or monolithic integration using a variety of optical components adapted to such integration methods. Such an on-chip implementation may significantly reduce the cost, complexity and the size the QRNG instrument. These architectures may also be implemented using free-space or fibre-optic optical devices and components. In some examples, one or more devices or sub-systems may be implemented on a chip while other components and modules of the system may be fabricated based on free-space and/or fibre-optic components. In general, any combination of on-chip (e.g., monolithic, hybrid integration and the like), free-space and fibre-optic devices may be used to implement any of the architectures disclosed and described in this section.

In addition to the advantages mentioned above, using these quantum apparatus architectures may improve the level of device independence of the random number generator and amplifier system. As described above, a weak random string (e.g., generated by a WSR), and a certified quantum random string (e.g., using a Bell test), which is generated independently of the weak random string, may be combined to generate a perfect or near perfect random string. Advantageously, in the QRNG system disclosed here, the independence of the weak random string, and the quantum random string may be tested. In addition, similar to the QRNGs described above, the QRNGs that employ the disclosed on-chip 2-qubit quantum apparatus, may be more secure against various threats (e.g., cyber-attacks and the like) as compared to some existing on-chip QRNGs. In other words attacks to these existing on-chip QRNGs cannot be detected while, the systems described herein may detect collective attacks to the QRNG system (e.g., the quantum apparatus of the QRNG) by quantifying the amount of intrinsic quantum randomness in the output string.

In some embodiments, the two-qubit quantum apparatus described herein may comprise an optical quantum state generator that provides entangled photons in quantum states that can be evaluated using a Bell test (e.g., the original Bell inequality or alternative inequalities such as CHSH), a measurement stage, and a test system where the selected Bell test is performed. In some embodiments, the optical quantum state generator may comprise a photon source generating "pump" photons and at least two optical components (e.g., nonlinear optical components) that may receive the pump photons and convert them to at least two photon-pairs (e.g., based on spontaneous four wave mixing, spontaneous parametric down-conversion, and other nonlinear processes) that may become path entangled while being transferred to a measurement stage. In some examples, the photon pair can be a degenerate photon pair (e.g., a two-colour photon pair comprising photons having different frequencies). In some such examples, the pump photons provided to the photon-pair generators, may be in a superposition quantum state and may cause the photon pair generators to generate two-colour photon pairs. By deterministically separating and directing photons having different colours (frequencies) in each photon-pair into different optical paths, path entangled photon pairs may be generated wherein detecting a photon having a first colour in a first path, guaranties that its counterpart photon having a second colour will be detected in a second path. In some embodiments, the measurement stage may comprise a plurality of interconnected tunable directional couplers (TDCs) that reroute the pairs of photons received from the quantum state generator into a plurality of optical paths each ending with a photon detector (e.g., a photon counter, a photomultiplier, a photodetector, and the like). The random selection of the measurement basis in the measurement stage can be implemented using two different configurations. A first configuration that supports passive random selection of a measurement basis for each measurement and a second configuration that supports active random selection a measurement basis for each measurement. In the passive configuration, for each measurement, the final quantum states of the photons (e.g., entangled photons) are measured in bases corresponding to randomly selected optical paths through which the photons are provided to the photon detectors. As such, in some embodiments, the passive configuration may not require an external random source for selecting the measurement bases. In the active configuration however, for each measurement, the final quantum state is measured in a basis selected by a weak source of randomness (similar to systems shown in FIG. 2A and FIG. 3A).

Both active and passive configurations are adaptable to on-chip fabrication; however, because the passive configuration may not require active optical switching, it may support higher qubit generation rates and can be implemented on a less complicated optical platform (e.g., substrates used for forming optical devices may include fewer materials and the materials used may be less complex) and using an easier and faster fabrication process (e.g., fewer material layers should be deposited and each layer can be deposited faster).

Both designs may use partially entangled states (instead of maximally entangled states), resulting in a higher level of device-independence. In other words, when the photons (e.g., two photons) provided by the quantum state generator are partially entangled, the quantum random strings generated upon measurement and verification of their quantum nature can be used to amplify a much weaker random source by a randomness extractor.

In addition, the disclosed passive quantum apparatus architecture has two notable advantages over existing quantum apparatus configurations employed in current QRNGs:

Architecture 1: Random selection of the measurement bases is a natural outcome of providing a plurality of optical paths each ending with a different photon detector. As such, the need for active selection of the measurement bases and the corresponding devices (e.g., using a weak source of randomness and a driver) is eliminated. Moreover, the absence of active optical components (e.g., electro-optical switches, and the like), expands the variety of substrate materials that can be used to form the apparatus, enables higher random number generation rates and reduces overall optical loss in the system (resulting in less power consumption).

Architecture 2: In addition to providing quantum random strings (using coincidence detection and subsequent validation using a Bell-type inequality), the passive architecture can provide random strings that may be used as a source of weak random strings required in the post processing stage for extracting the random numbers. In some examples, the random strings provided by the passive quantum apparatus may eliminate the need for an independent weak random source. Advantageously, in such examples, the number of off-chip components may be reduced resulting in a more compact QRNG instrument that can be fabricated more easily and at a lower cost.

General Passive 2-Qubit Optical Quantum Apparatus Architecture

Figure 15:
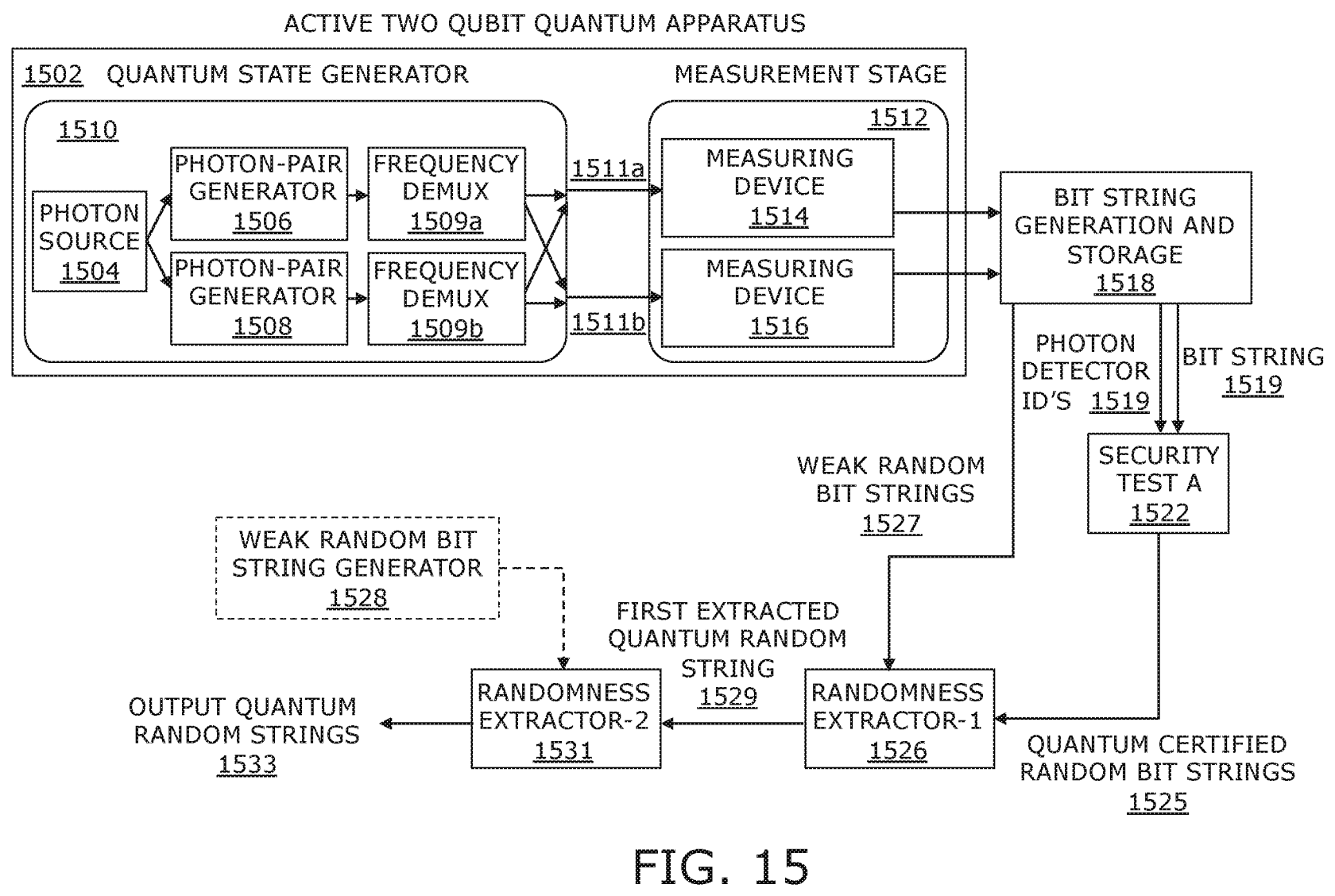

In FIG. 15, there is shown a block diagram that provides an illustration of building blocks and the operation of an example quantum random number generator and amplifier system, wherein the quantum apparatus 1502 may be implemented based on an embodiment of the above mentioned passive 2-qubit architecture or using any other suitable quantum apparatus, such as quantum computer 3200. The quantum apparatus 1502 comprises a quantum state generator 1510 which generates and prepares entangled photons serving as entangled qubits and a measurement stage 1512 that measures the qubits generated by the quantum state generator 1510.

In the example shown in FIG. 15, a photon source 1504 in the quantum state generator 1510 generates a stream of photons referred to as "pump photons" that may all have frequencies within a narrow frequency range. For example, the number of pump photons having identical frequencies may have a Lorentzian distribution as a function of wavelengths (or frequency) with a center wavelength between 400 nm and 1200 nm, or 1200 nm and 1600 nm, or 1600 nm and 2000 nm, or any other appropriate wavelength range. The full width half maximum (FWHM) of the corresponding frequency distribution may be in a range of 1 kHz to 100 kHz, or in a range of 100 kHz to 500 kHz or in a range of 500 kHz to 1 MHz, or any other appropriate frequency range. In some examples, the photon source 1504 may generate a pump photon stream with a periodically varying photon flux (e.g., periodic pulses with different temporal profiles). The stream of pump photons exiting the photon source 1504 may be divided into a first and a second pump photon streams. The first pump photon stream is transmitted to a first photon generator 1506 and the second pump photon stream is transmitted to a second photon pair generator 1508. The ratio between the photon flux entering the first photon pair generator 1506 and the photon flux entering the second photon pair generator 1508 (photon flux ratios) may be adjustable and may be chosen to be 50/50, 40/60, 30/70 or other suitable ratio. The quantum state of each pump photon may be expressed as a superposition quantum state, for example:

$$\alpha_p |a> + \beta_p e^{i\varphi_1} |a'> \tag{13}$$

where $|a>$ and $|a'>$ are the individual quantum states representing the states corresponding to pump photon transmission through a first optical path (e.g., ending with a first photon-pair generator 1506) or a second optical path (e.g., ending with a second photon pair generator 1508) respectively. $\alpha$ and $\beta$ are the superposition weight coefficients that can be adjusted by controlling the ratio between the photon fluxes provided to the two photon pair generators 1506/1508, and $\phi_1$ is the relative phase between the superimposed quantum states. In some examples, $\phi_1$ may be a controllable parameter (e.g., using an optical phase shifter).

In some examples, each photon pair generator 1506/1508 may generate a pair of photons upon receiving two or more pump photons. In these examples, the photons in each photon pair may be generated simultaneously and be entangled (e.g., frequency entangled). In some such examples, the generated photon pair can be a degenerate photon pair wherein the frequencies of the photons in a pair may be different; for example, one photon may have a frequency larger than the frequency of the pump photons and the other photon may have a frequency smaller than the frequency of the pump photons. The frequency of each photon in a photon pair may differ from the frequency of the pump photon by the same amount. For example, the frequency of a first photon, referred to as the signal photon, in a photon pair may be upshifted relative to the frequency of the pump photon and the frequency of the second photon, referred to as the idler photon, may be down-shifted relative to frequency of the pump photon by the same amount. In some embodiments, the two photons in each photon pair generated by one of the photon pair generators 1506/1508 may have the same frequencies. The photon pairs may be generated via a variety of nonlinear optical effects. For example, absorption of two pump photons may generate a degenerate photon pair with different frequencies (a two-colour photon pair) via spontaneous four wave mixing (SFWM). In some examples, the two photon pair generators 1506/1508 can be identical or near identical photon pair generators having the same physical and optical characteristics (e.g., within the uncertainty associated with fabrication process). In these examples, the photon pairs generated by the first photon pair generator 1506 and the photon pairs generated by the second photon pair generator 1508 can be in a superposition quantum state (e.g., superposition between being created in one photon pair generator or the other photon pair generator).

In some examples, the photons having different frequencies in each photon pair exiting each photon pair generator 1506/1508 are routed into different optical paths using two frequency demultiplexers (F-DEMUXs) 1509a/1509b. The first F-DEMUX 1509a divides the photon pairs received from the first photon pair generator 1506, and the second F-DEMUX 1509b divides the photon pairs received from the second photon pair generator 1508. In such examples, each F-DEMUX (1509a/1509b) may divide the received stream of photon pairs into two streams of photons each stream of photons comprising photons having same or substantially the same frequencies. In a preferred embodiment, the photons exiting the two F-DEMUXs 1509a+1509b may be routed into four distinct optical paths. In some examples, these optical paths may have equal optical path lengths. In some examples, these four optical paths may be arranged such that the streams of photons having the same or substantially the same frequencies are merged and output from the quantum state generator 1510 as a single photon stream. In the example shown in FIG. 15, the high frequency photons (e.g., signal photons) of the photon pairs generated by the photon generators 1506/1508 may be transmitted through a first output 1511a and the low frequency photons (idler photons) of the photon pairs generated by the photon generators 1506/1508 may be transmitted through a second output 1511b. The photons received from these two outputs may be entangled photons (e.g., path entangled photons). The first output 1511a provides a first quantum bit (qubit) and the second output 1511b provides a second qubit. For example, the collective quantum state of the photons output from the first 1511a and second 1511b outputs of the quantum state generator 1510 may be expressed as:

$$\alpha|ab>+\beta e^{i\varphi 2}|a'b'> \tag{14}$$

where |ab> is the quantum state of the signal and idler photons generated by the first photon pair generator 1506, |a'b'> is the quantum state of the signal and idler photons generated by the second photon pair generator 1508. $\alpha$ and $\beta$ are the superposition weight coefficients. In some examples, $\phi_2$ is the relative phase between the superimposed states and is equal to $\phi_1$ in Equation 13. As such $\phi_2$ may be adjusted by controlling the relative phase between the pump photons provided to one of the photon-pair generators and those provided to the other photon-pair generator. In some embodiments, $\alpha$ and $\beta$ can be adjusted by controlling the ratio between the pump photon fluxes provided to the first 1506 and the second 1508 photon pair generators respectively. In some such embodiments, $\alpha_p$ in Equation 13 is equal to $\alpha$ in Equation 14 and $\beta_p$ in Equation 13 is equal to $\beta$ in Equation 14. If $\alpha$ is equal to $\beta$, the two qubits output from the quantum state generator are maximally entangled and if $\alpha$ is different than $\beta$, the two qubits generated by the quantum state generator are partially entangled.

The entangled photons generated by the quantum state generator 1510 may be provided to a measurement stage 1512 where their quantum state is measured. In some embodiments, the measurement stage 1512 may comprise two identical measuring devices 1514/1516, each comprising a plurality of optical paths, each optical path ending in a photon detector. In some such embodiments, the optical paths may have substantially equal optical path lengths. In some embodiments, the optical paths within each measuring device may be reconfigurable. In some examples, each measuring device 1514/1516 may only receive photons having substantially identical frequencies from one of the outputs 1511a/1511b of the quantum state generator 1502. For example, the first measuring device 1514 may receive signal photons from the first output 1510a and the second measuring device 1516 may receive idler photons from the second output 1510b. When a photon is received by a photon detector, the photon detector generates an output signal (a detector signal). The output signals generated by all photon detectors in both measuring devices may be measured continuously by an electronic signal processor. In some examples, the output signals may be analyzed by a processor using a set of instructions stored in non-transitory memory.

The outcomes of these measurements can be categorized as three types of events:

Event 1: A single click event, wherein during a coincidence window, only one photon detector in one of the measuring devices 1514/1516 provides one output signal indicating the detection of one photon, Event 2: A coincidence, wherein during a coincidence window, each of two photon detectors, each in a different measuring device, provides an output signal indicating a simultaneous detection of two photons having different frequencies, Event 3: A double click event, wherein during a coincidence window, each of two photon detectors in the same measuring device provides an output signal indicating a simultaneous detection of two photons having identical or substantially identical frequencies.

A coincidence window may be a time interval determined by the uncertainties associated with the detectors and the measurement circuits that collect the measured data. Essentially, two output signals generated by two photon detectors during a coincidence window may be considered to indicate simultaneous arrival of two photons each detected by one photon detector. In some examples, the coincidence window will be calculated to factor in uncertainty in optical path lengths. In some other examples, the coincidence window will be calculated to factor timing jitter and/or resolution of the electronic circuits, clock cycle and the like. In some examples, the coincidence window may be limited by the resolution of the electronic system (e.g., an FPGA) used to measure and process the signals provided by the photon detectors. In some such examples the resolution of the electronic system may be between 1 ns and 5 ns, 5 ns and 10 ns, or 10 ns and 20 ns. In some other examples, the size of the coincidence window, may be affected by unwanted differences in optical path length ending with different detectors. In yet other examples, the coincidence window may be limited by the dead time of the photon detectors.

A coincidence event can be associated with the collapse of the quantum state of an entangled photon pair representing a pair of qubits (e.g., entangled qubits). The quantum nature of a coincidence can be verified using a Bell inequality implemented as a security logic (as described above in the context of a four-device quantum apparatus). A double click event can be a classical event and may be associated with classical noise in the system (e.g., thermal noise or other types of noise in the photon detector or in the signal processor). In some cases, more than two photon detectors may generate output signals in a coincidence window. Similar to double-click events, such events may also be associated with a classical event. In this passive architecture, the randomness of the measuring bases (measurement settings) is intrinsically provided by the availability of a plurality of optical paths (e.g., comprising of a plurality of 50/50 photon splitters) ending with a plurality of photon detectors in the measurement stage 1512. A detection of a photon by each photon detector, receiving photons from a subset of optical paths, may indicate measurement in a specific measurement basis. In some embodiments, a detection of a photon by a pair of photon detectors in the same measuring device may indicate measurement in a single measurement basis wherein the detection of a photon in each photon detector represents one measurement outcome out of two possible outcomes associated with the corresponding measurement basis. In some preferred examples, the measurement basis associated with each pair of photon detectors in a measuring device may be selected by a user (e.g., by reconfiguring one or more optical paths providing photons to said pair of photon detectors). For example, the measurement device may be tuned so that detection of a photon by a photon detector in a specific pair of photon detectors, in the same measuring device, indicates measurement in the computational, Hadamard or other basis formed by a specific combination of these two bases. In some examples, different pairs of detectors may measure the quantum states of the photons in different bases. This passive scheme for random selection of the measurement basis distinguishes the quantum apparatus of FIG. 15 from those presented in FIGS. 2A and 3A as well as the active 2-qubit architecture described above, in which the measurement bases are randomly selected based on the input received from a driver 216/316 fed by a weak source of randomness 218/318 (neither of which is present in the passive architecture).

The coincidences associated with the detection of two photons having different frequencies during a coincidence window may indicate the collapse of an entangled quantum state to the states represented by one of the selected measurement basis. The collapse of an entangled state to a specific state (resulting in detection of a coincidence) is a quantum random event; so, a series of such events, verified by a security test, may constitute a string of quantum random bits and be used to generate quantum random bit strings. The single click events are also random events that are potentially originated from a quantum phenomenon (e.g., selection of one path out of two paths available in a 50/50 optical splitter), however since there are not associated with the collapse of an entangled quantum state, their quantum nature cannot be verified using a Bell test. As such, the single click events may be used to generate weak random strings. Thus, the two measuring devices 1514/1516 may provide random bits that may be used to generate weak random strings and also random qubits that, upon verification by a security test, may be used as quantum random strings.

In some examples, the signals associated with double-click events and those associated with the detection of more than two photons in a coincidence window may be discarded and the signals associated with single-click events and coincidences may be provided to a bit string generation and storage device 1518. In some embodiments, the bit string generation and storage device 1518 may use the single click events to generate weak random bit strings 1527.

Similar to the procedure described above and shown in FIG. 2C, a plurality of coincidence measurements provided by the two measuring devices 1514/1516 may be stored in the bit string generation and storage device 1518 together with the associated values of the measurement settings (e.g., the basis used to measure the quantum states of the received photons) at the time of the measurement. Here the measurement setting is specified by the photon detectors from which the signals are received and therefore may be transferred as photon detector IDs. In some examples, once a specified number of measurements are obtained, the stored measurements (e.g., photon detector IDs 1517 and bit strings 1519) may be transmitted to a security test unit where security test A 1522 may be performed on the received random bit string using the received photon detector IDs.

In some embodiments, the coincidence measurements may be transferred to the security test unit as random strings 1519 with specified length (e.g., defined by a user, stored in a memory). For example, the length of a random string can be in a range of 10 to $10^3$, in a range of $10^3$ to $10^5$, in a range of $10^5$ to $10^7$ or in a range of $10^7$ to $10^9$ bits. Security test A 1522 may verify the quantum nature of the received string of random bits e.g., using a Bell inequality (analogous to the Bell tester 3124 of FIG. 29). In some examples, using a Bell inequality, the security test A may evaluate the degree of randomness and/or the degree by which the randomness may be associated with quantum events (sometimes referred to as "quantumness"). In some examples, the security test A may also verify the non-signaling nature of the generation and measurement procedures that generated the qubits in the bit string. In a preferred embodiment, security test A is implemented using hardware since hardware is typically more secure than software or firmware, however, other embodiments may implement security test A using both hardware and software or potentially using software only. The system may include one or more processors configured to compute security test A from the stored measurements (e.g., using a set of instructions stored in a non-transitory memory). The processor can be configured to generate and output a certificate certifying that the measurements are from a quantum system if the value of a computed test statistic is, for example, below a certain threshold. The same or another certificate may be generated certifying that the measurements are non-signaling or partially non-signaling. These tests are described below with more details.

In some embodiments, once a string of quantum random bits is evaluated and/or certified (e.g., as being quantum bits associated with coincidences generated by a non-signaling quantum system), the string (analogous to bit string 3030 in FIG. 29 when verified by Bell tester 3124) may be provided as the first source to a first two-source randomness extractor 1526 (analogous to the extractor 3122 of FIG. 29). The first two-source randomness extractor 1526 may be configured to generate a first extracted quantum random string 1529 (analogous to the seed 3930 of FIG. 29) using the quantum certified random bit string 1525 and the first weak random bit string 1527 (analogous to the bit string 3115 of FIG. 29) generated by combining the single click events detected by each measurement device 1514/1516. In some examples, the first extracted quantum random string 1529 may be a perfectly random string. As mentioned above, in some examples, the certification of the random string may include evaluating the degree of randomness and/or the degree of quantumness of the quantum certified random bit string 1525. Advantageously, in some such examples, the degree of randomness and/or the degree of quantumness of the quantum certified random bit string 1525 may be used during the extraction process to generate a perfectly random string.

Given the relatively low rate of bit streams generated by the quantum apparatus 1502 (and all quantum random qubits generators in general), the first extracted quantum random string 1529 generated by the first randomness extractor 1526 may be provided at a rate that is lower than the required rate for many downstream applications. For example, the bit rate of the first extracted quantum random string 1529 may be less than 1 kb/s or less than 1 Mb/s while the required rates are typically in a range of Mb/s to Gb/s or even larger rates. As such, in some embodiments, a second randomness extractor 1531 (analogous to the seeded extractor 3140 of FIG. 29) may be used to extract an output quantum random bit string 1533 (analogous to the output 3136 in FIG. 29) using the first extracted quantum random string 1529 and a second weak random string (analogous to the bit string 3115 of FIG. 29), for example, provided by a weak source of randomness (WSR) 1528 (analogous to the WSR 3100 of FIG. 29). In some such examples, the WSR 1528 may exploit classical and/or quantum phenomena to generate the weak random string. The rate of generation of output quantum random bit string 1533 may be sufficiently large for usage in variety of downstream applications. In some embodiments, the second randomness extractor 1531 may increase the random bit generation rate by amplifying the first extracted quantum random string 1529. For example, the first extracted quantum random string 1529 may be a perfectly random but short string of random bits (referred to in FIG. 29 as a seed). The second randomness extractor 1531 may use the second weak random string (provided by WSR 1528) and the first extracted quantum random string 1529 to generate an output quantum random bit string 1533 that is also perfectly random but much longer the first extracted quantum random bit string 1529. Thus, advantageously, the second randomness extractor 1531 may increase the random bit generation rate while preserving perfect randomness.

Example Procedure for Passive Optical Quantum Apparatus

Figure 16:
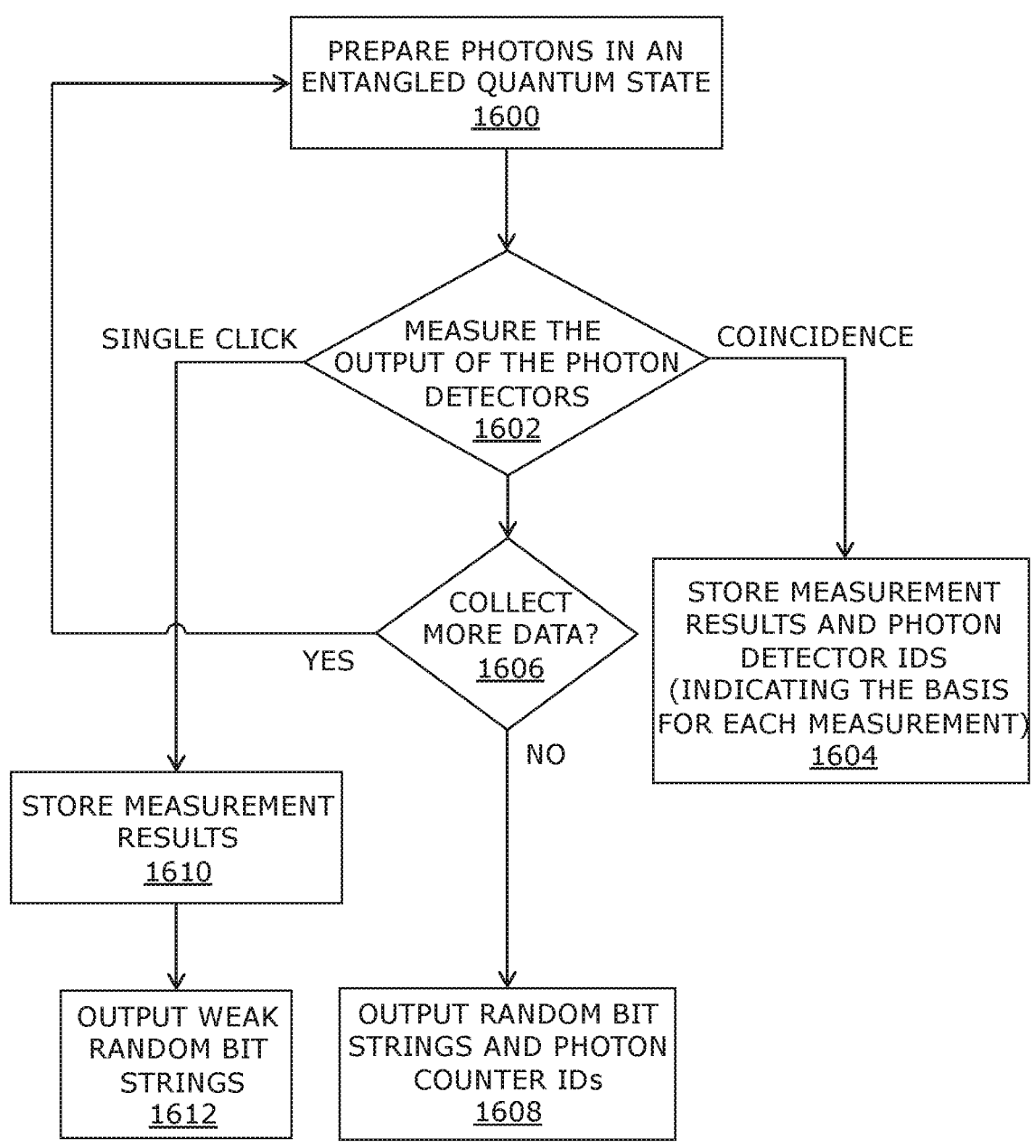
FIG. 16 is a flow diagram of an example method of operation of the bit string generation and storage system in a two-qubit quantum random number generator system based on a passive quantum apparatus.

FIG. 16 is a flow diagram of an example method of operation of the bit string generation and storage system in a two-qubit quantum random number generator system based on a passive quantum apparatus (e.g., the system shown in FIG. 15). The photons may be prepared 1600 in specific entangled quantum states, for example, as indicated in Equation 14 above. In some embodiments, the entangled photons can be prepared in the specific quantum state using degenerate photon pair generation via a non-linear optical phenomenon (e.g., spontaneous four-wave mixing) and path entanglement. The output signals of the photon detectors in two measurement devices 1514/1516 are measured 1602 and analyzed. If the two signals are generated by two photon detectors in two different measurement devices within time interval shorter than the coincidence window (indicating a coincidence event), the signals can potentially be associated with the collapse of an entangled state and therefore are stored 1604 (for example in a memory of the device) together with identifiers associated with the photon detectors that generated those signals (the photodetector identifiers indicate the measurement for the signal). For a specific configuration of the measurement devices, the measurement basis for each measurement can be determined based on the photon detector that generates the measured signal. A check is made 1606 as to whether to obtain more measurements. The check involves checking criteria such as whether a specified time has elapsed, whether a specified number of measurements have been collected (e.g., the number of measured bits exceeds 100 Mb) or whether a memory storing the measurements is full. If the check 1606 indicates the need for further measurements, new entangled photon pairs will be prepared 1600 by the quantum state generator 1510 and a new cycle begins. Once the check 1606 indicates that no further measurements are needed, the stored measurements are output 1608. The single click events (all signals received with a relative delay larger than the coincidence window) may be treated as weak random events and may be stored 1610 in a memory and provided as weak random strings 1612 to the randomness extractor (e.g., the first randomness extractor 1526 in FIG. 15). The memory that stores single click events may be the same or different from the memory that stores the coincidences. As described above, the randomness extractor may combine weak random strings with the random strings whose randomness and privacy are quantified (referred to as "quantum random string") in order to generate substantially perfect random strings. The double click events may be discarded as classical random events.

Security Test A for a Passive Optical Quantum Apparatus

Figure 17:
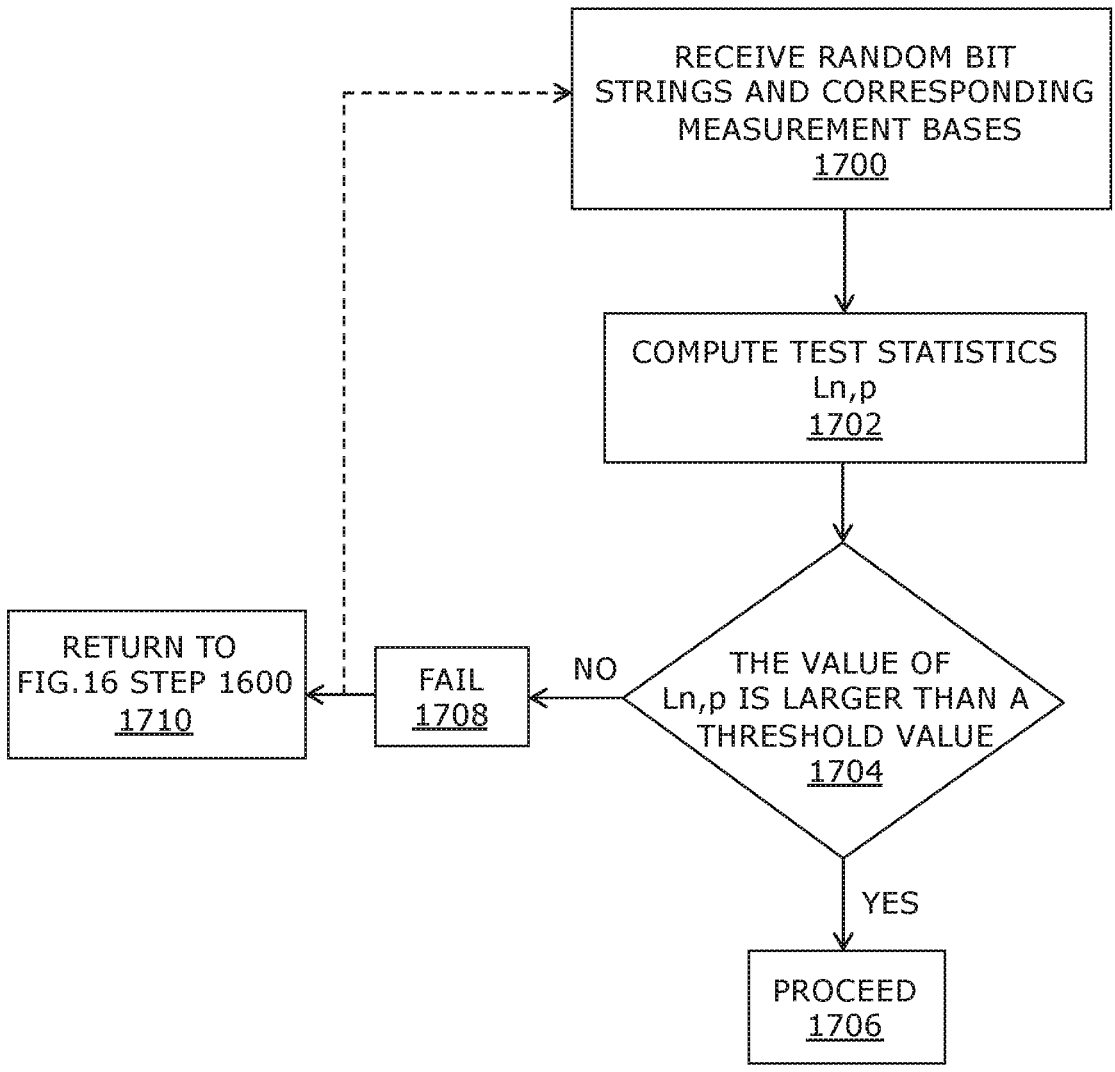
FIG. 17 is a flow diagram of an example security test A for evaluating the quantum nature of the measurements generated by a passive 2-qubit quantum apparatus shown in FIG. 15.

Similar to 4-qubit and 2-qubit systems described above, security test A may determine whether a plurality of qubit measurements violate a Bell inequality, for example, through a process shown in FIG. 17. In some examples, a Bell inequality can comprise any inequality used to determine whether a set of measurements is consistent with measuring specific quantum states (e.g., entangled quantum states) supported by quantum mechanics. A Bell inequality includes any of Bell's original inequalities, a CHSH inequality (Clauser Home Shimony Holt inequality), or any other such inequality. Violation of a Bell inequality demonstrates that the corresponding measurements are associated with collapse of entangled states into specific measurement bases according to rules of quantum mechanics. Firstly, a random bit string along with measurement bases associated with the bits in the random bit string may be received 1700, for example, from the bit strong generation and storage device 1518. The length of the random string that is specified by the user may be in a range of $10^3$ to $10^5$, in a range of $10^5$ to $10^7$, or in a range of $10^7$ to $10^9$ bits. In some examples, each value of a bit in the received random bit string may correspond to an output signal generated by one or more photon detectors. The measurement basis for each bit in the random bit string is determined based on the ID of the photon detector from which the bit is measured. Next, secondly, a statistical test is computed 1702 on the values of the bits associated with coincidence events (for examples, bits stored in block 1604 of FIG. 16) and the measurement basis for each bit. In some examples, the statistical test may include computing a function $L_{n,p}$ for the bit string that is defined based on the number of bits in the string, the measurement basis for each bit and the measured value of each bit. If the computed value of the function $L_{n,p}$ is above a threshold value 1704 (e.g., more than 2), the process proceeds 1706. Otherwise, the process fails 1708 and returns 1710 to step 1600 in FIG. 16, wherein another random bit string is generated, stored 1604 and transferred 1700 to the security test stage. In some examples, a sufficient number of measured bits and bases may be stored in the storage 1518 (e.g., a non-transitory memory of the device) to generate two or more random bit strings. In these examples, if the security test fails for a first random bit string 1708, a second random bit string may be transferred from the storage 1518 to security test stage in step 1700. In some other implementations, Ln,p may be defined such that, at a step 1704, a value of Ln,p less than a threshold value indicates that the processes can proceed 1706.

The exact functional form of Ln,p depends on the specific Bell inequality used for the security test. The specific Bell inequality may be selected based on the two-qubit quantum state that is prepared by the quantum state generator 1510. For example, for a maximally entangled state (e.g., generated by evenly splitting the pump 1504 power between the two photon pair generators 1506/1508), a CHSH inequality may be used while for a partially entangled state (e.g., generated by unevenly splitting the pump 1504 power between the two photon pair generators 1506/1508), a different inequality may be used. In some embodiments, the two qubits generated by the quantum state generator 1510 are maximally entangled and their 2-qubit quantum state can be expressed as:

$$\frac{1}{\sqrt{2}}(|0>|0>+|1>|1>) \qquad (15)$$

where |0> and |1> represent the two possible quantum states for each qubit. Equation 16 below is an example of the $L_{n,p}$ function that may be used for computing the test statistic for evaluating a random bit string comprising coincidences associated with measuring a plurality of 2-qubit quantum states similar to the 2-qubit quantum state of Equation 14 or 15:

$$L_{n,p}=\Sigma_{a,b,x,y\in\{0,1\}}(-1)^{a+b+xy}P_{AB|xy}(ab|xy) \qquad (16)$$

Here a and b are the measured values of the qubit A and qubit B respectively (each measured by one of the measurement devices 1514/1516). x and y are the measurement bases used for measuring a and b respectively. The sum ($\Sigma$) is made over the number of bits in the received random bit string. In some examples an inequality of the form, $L_{n,p} \geq V_{th}$ indicates that the CHSH inequality has been violated (for example $L_{n,p} \geq 2$ may indicate measurements associated with entangled states). So $L_{n,p} \geq$ Vth may be considered as the condition for verifying the quantum nature of the random string generated by the coincidence events resulting from measuring the photons prepared in the entangled quantum state expressed in equation 14 or 15.

In some examples, a passive quantum apparatus may not include a separate security test (e.g., security test B described above) to determine whether the two measuring devices 1514/1516 are non-signaling between themselves. In these examples, the threshold value $V_{th}$ in security test A may be modified to account for the residual increase in the violation of the selected Bell inequality due to signaling between the two measuring devices. In this case, non-signaling may be defined as a signaling level smaller than a defined limit.

Implementation of a Passive Optical 2-Qubit Quantum Apparatus

Figure 18:
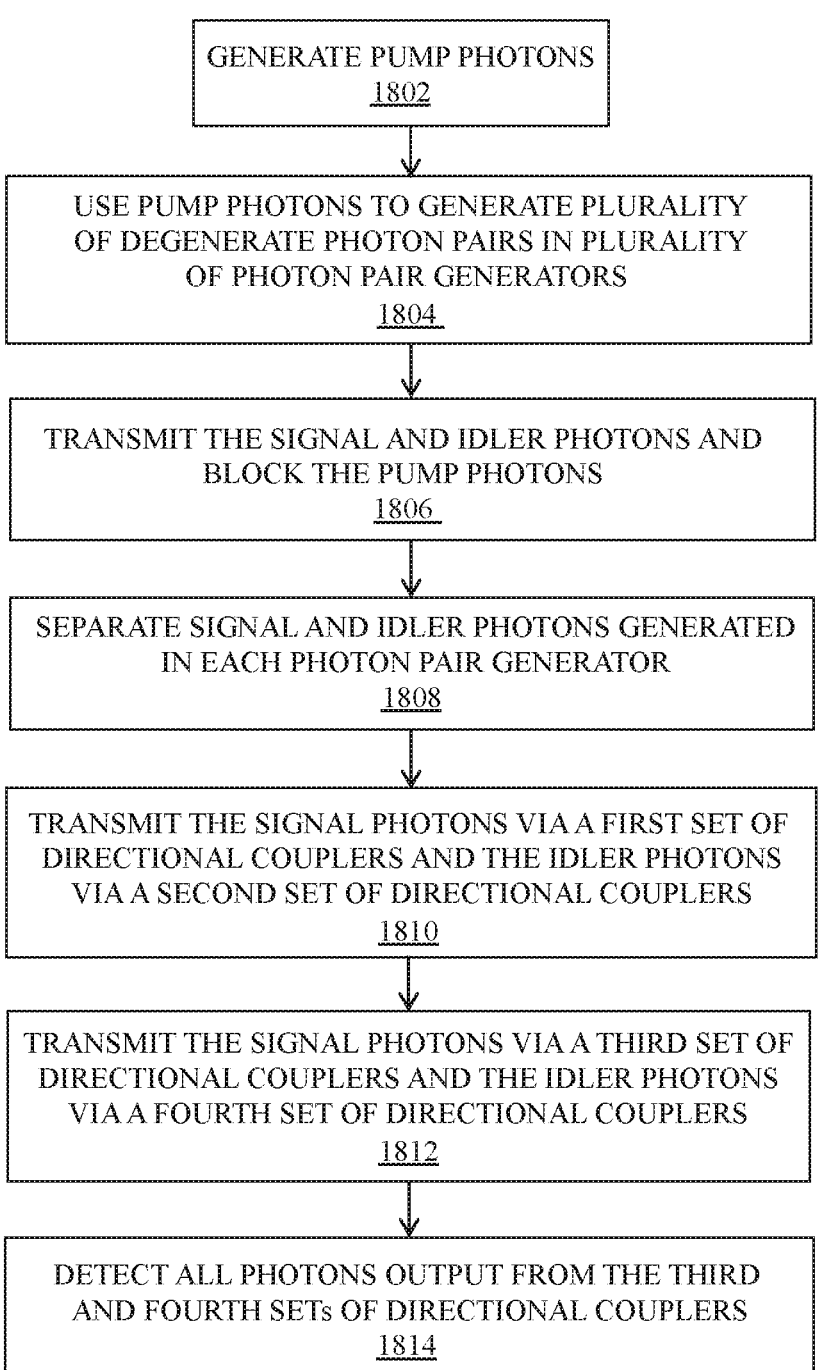
FIG. 18 is a flow diagram illustrating the operation of an example passive two-qubit optical quantum apparatus.

FIG. 18 is a flow diagram illustrating the steps that may be required for generating and measuring quantum states (e.g., entangled quantum states) in an example passive optical quantum apparatus. At a block 1802, photons may be generated by a photon source and fed to a plurality of photon pair generators (block 1804), wherein each photon pair generator generates a pair of nondegenerate photons (referred to as signal and an idler photons). At a block 1806, the signal and idler photons received from each photon pair generator may be transmitted and the pump photons may be blocked (e.g., using an optical filter). At a block 1808, the signal and idler photons may be separated and rerouted to different optical paths (e.g., using directional couplers or add-drop filters). At a block 1810, signal photons may be transmitted via a first set of directional couplers and the idler photons may be transmitted via a second set of directional couplers. At a block 1812, signal photons may be transmitted via a third set of directional couplers and the idler photons may be transmitted via a fourth set of directional couplers. Finally, at a block 1814, all photons output from all directional couplers in the third and fourth sets of directional couplers may be detected (e.g., by two sets of photon detectors). In some preferred embodiments, the directional couplers or other types of optical components used to separate or reroute the signal and idler photons may be tunable (e.g., the relative phase and/or amplitude of the separated and/or rerouted photons may be tunable).

In some examples, the steps shown in FIG. 18, may be performed by passing photons emitted from the photon source through a plurality of optical components, wherein each optical component has one or more input ports and one more output ports (e.g., waveguides, beam splitters, beam combiners, phase shifters, interferometers, directional couplers and the like) via a plurality of optical paths each ending with a photon detector. Some of these optical components may support nonlinear optical interactions (e.g., the photon pair generators), where the frequencies of the output photons are substantially different from those of the input photons (e.g., spontaneous four-wave mixing, spontaneous parametric down-conversion, and the like). The photon detector may generate an electrical signal proportional to the number of photons received per unit time. In some embodiments, the photon detector may be a single photon detector. The quantum states of the resulting photons are essentially quantum states of entangled photons pairs which have been generated, for example, via one or more nonlinear optical interactions and routed through a plurality of different optical paths that may have the same optical path length.

Each optical path may comprise a plurality of optical path segments wherein each segment connects the optical components performing the subsequent steps shown in FIG. 18. In some examples, the optical paths may have substantially the same total optical path length from the photon source to each one of the photon detectors. In some other examples, all the optical path segments connecting the optical devices performing one step to optical devices performing the subsequent step in the procedure shown in FIG. 18 may have substantially equal optical path lengths. For example, the optical path length of the optical path segments between the source that generates the photons (at the block 1802) and each one of the photon pair generators used at the block 1804 may be substantially equal. As another example, optical path lengths of all optical path segments between the directional couplers used to perform step 1810 and those used to perform step 1812 may be substantially equal.

In some embodiments, the photon source can be a pulsed or continuous wave (CW) laser source with a centre wavelength between 400 nm and 800, or 800 nm and 1200 nm, or 1200 nm and 1600 nm or 600 nm and 2000 nm, and a linewidth in a range of 1 to 100 kHz, or in a range of 100 kHz to 500 kHz or in a range of 500 kHz to 1 MHz. Advantageously, near-infrared photon sources (e.g., having wavelengths between 1300 nm and 1600 nm) may enable usage of commercially available low-cost optical components and well-developed on-chip optical devices (e.g., optical devices used in silicon photonic technology). Alternatively, visible photon sources (e.g., having wavelengths between 400 nm and 700 nm) may allow usage of highly efficient single photon detectors. The laser source can be an on-chip or off-chip laser source. In some embodiments, the laser source can be a semiconductor laser course. In other embodiments, the laser source can be a fibre laser, a solid-state laser or any other type of laser.

In some preferred embodiments, the quantum optical circuit may comprise a network of tunable directional couplers (TDCs), photon pair generators (PPGs), wavelength demultiplexers (WDs), optical filters and photon detectors (PDs) connected via optical waveguides.

A TDC can be a 4-port optical device with two input ports and two output ports where each photon entering one of the input ports may be directed to one of the two output ports with a probability that can be selected by design or actively adjusted. For example, in some TDCs the probability of transmission of a photon input from one of the input ports to a first or a second output port may be adjusted by a control signal (e.g., an electrical current or voltage applied on the device). A TDC can be implemented based on a variety of optical configurations and using a variety of optical materials. Examples of optical configurations include: photonic crystals, microring resonators, Mach-Zehnder interferometers and the like. In a preferred embodiment, a TDC can be an on-chip device attached to or fabricated on (e.g., monolithically) a substrate formed from one or more materials. In some other embodiments, a TDC can be a fibre-coupled device wherein the input and output ports are coupled to fibre-optic waveguides (e.g., single mode fibres).

A waveguide can be a two-port device with one input port and one output port directly connected through a single optical path. A waveguide may support one or more transverse optical modes. In a preferred embodiment, the waveguides used to connect any two optical components of the quantum optical circuit may only support a single transverse mode (commonly known as a single mode waveguide). In a preferred embodiment, a waveguide can be an on-chip device fabricated on (e.g., monolithically) a substrate formed from one or more materials. In some other embodiments, a waveguide can be a fibre-optic waveguide (e.g., a single mode optical fibre).

A PPG can be a two-port device with one input port and one output port, wherein the frequency of the photons exiting the output port may be different from the frequency of the photons entering the input port. The photons exiting the output port may be generated by the photons entering the input port via a nonlinear optical phenomenon within the PPG. For example, two photons having the same frequencies may enter the input port and two photons with different frequencies that are also different from the frequency of the photons entering the PPG may exit the output port. In some embodiments, a PPG can have a plurality of input ports and output ports, wherein the photons exiting one or more output ports may have a frequency different from the frequency of the photons entering one or more input ports. For a selected nonlinear optical phenomenon, the PPG can be implemented based on a variety of optical configurations and using a variety of optical materials. Examples of optical configurations include: photonic crystals, waveguides (e.g., long waveguides, spiral waveguides), microring resonators, Fabry-Perot resonators, and the like. In a preferred embodiment, a PPG can be an on-chip device attached to or fabricated on (e.g., monolithically) a substrate formed from one or more materials. In some other embodiments, a PPG can be a fibre-coupled device wherein the input and output ports are coupled to fibre-optic waveguides (e.g., single mode fibres).

A WD can be a three-port device with one input port and two output ports, wherein the photons entering the input port having a first frequency exit from a first output port and the photons entering the input port having a second frequency different from the first frequency exit from the second output port. The WDs can be implemented based on a variety of optical configurations and using a variety of optical materials. Examples of optical configurations include: photonic crystals, directional couplers, directional filters based on microring resonators, and the like. Examples of optical materials include: silicon, silicon nitride, silicate glasses, fluoride glasses, polymers, and the like. In a preferred embodiment, a WD can be an on-chip device attached to or fabricated on (e.g., monolithically) a substrate formed from one or more materials. In some other embodiments, a WD can be a fibre-coupled device wherein the input and output ports are coupled to fibre-optic waveguides (e.g., single mode fibres).

A photon detector (PD) can be an optoelectronic device with an optical input port and an electrical output port, wherein an electrical output (e.g., current or voltage) is generated proportional to the photon flux received by the input port. For example, a photon detector can be a photon counter that generates a distinct electric signal in the output port for each photon received at its input port such that the number of photons received is equal to the number of generated electric signals. In some embodiments, the photon detector can be a semiconductor photon detector (e.g., an avalanche or a p-i-n photodiode). In some other examples, the photon detector can be a photomultiplier tube.

An example system is now described with reference to FIG. 19 in which a 2-qubit quantum apparatus is implemented using the aforementioned optical devices. The following detailed description is intended to illustrate the example described with reference to FIG. 19 but not to limit the scope or the design of the apparatus.

General Implementation of a Passive Optical 2-Qubit Quantum Apparatus

Figure 19:
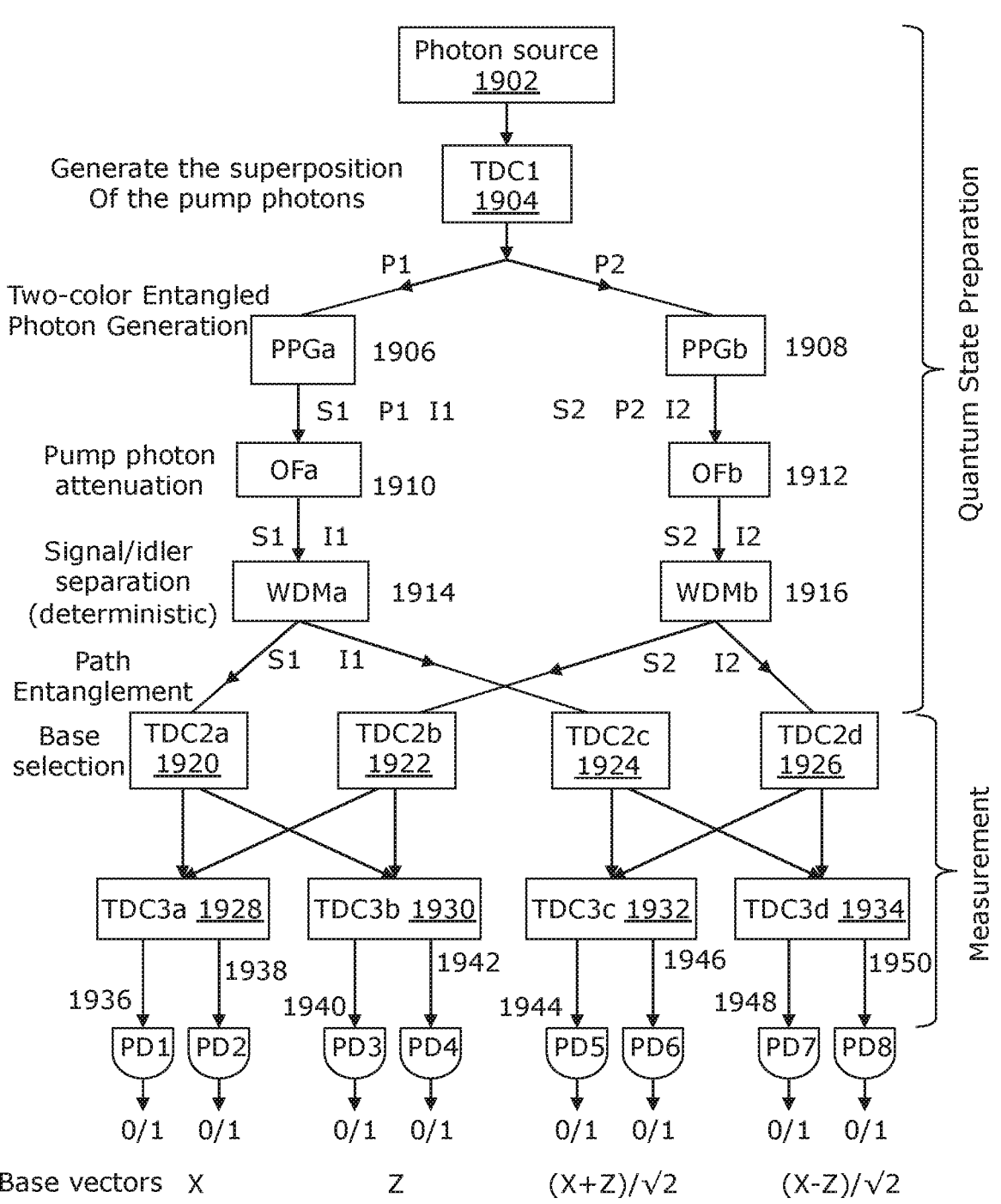
FIG. 19 is a block diagram of an example passive two-qubit optical quantum apparatus for generating and measuring quantum states that may be used in the two-qubit quantum random number generator architecture shown in FIG. 15.

The diagram in FIG. 19 is an example of a quantum optical circuit for generating and measuring quantum states that can be used in the self-testing 2-qubit quantum random number generator architecture shown in FIG. 15. In this example, a photon source 1902 generates a stream of pump photons. These photons may have well-defined polarization states (e.g., they may be linearly, circularly or elliptically polarized). The photons generated by the photon source 1902 may be provided to a first tunable directional coupler (TDCI) 1904 that randomly directs the photons to two optical paths wherein for each photon the ratio between the probability of being directed to a first optical path to the probability of being directed to a second optical path (splitting ratio) can be adjusted. For example, the splitting ratio can be 50/50 (the probability of going to each optical path is equal) or 40/60, or 30/70. In some embodiments the properties of the subsequently generated entangled photon pairs may be determined by the splitting ratio of TDC1 1904. For example, a ratio of 50/50 may be associated with the generation of maximally entangled states while other ratios may be associated with the generation of partially entangled pairs. As mentioned above, random number generation and amplification using partially entangled states may enhance the degree of device independence in a QRNG system. The photons output by TDC1 1904 are fed to two photon pair generators (PPGs), wherein the first optical path from TDC1 1904 to the first PPG (labeled PPGa) 1906 and the second optical path from TDC1 to the second PPG (labeled PPGb) 1908, have substantially equal optical path lengths. In each one of the PPGs, a portion of the received pump photons may be converted to two new single-frequency photon streams. The frequency of photons in one of the new streams may be larger than that of the pump photons while the frequency of photons in the other stream may be smaller than that of the pump photons. For example, the wavelength of the photons in the first and second generated streams may be down and up-shifted by the same amount relative to the wavelength of the pump photons. The up-shifted and down-shifted photons are referred to as "signal" and "idler" photons respectively. In each PPG, the signal and idler photons may be generated via a nonlinear optical process (e.g., spontaneous four-wave mixing or SFWM). In some embodiments two pump photons may be absorbed to generate one "signal" photon and one "idler" photon. The photons exiting each PPG are provided to an optical filter (OF), wherein the probability of transmission of pump photons can be significantly smaller than that of the signal and idler photons. For example, the transmission probability of the pump photons may be smaller by a factor of 10, 100 or 1000. As such, the number of pump photons in the photon stream transmitted through the or each OF may be significantly smaller than the transmitted signal and idler photons. In some embodiments, the optical path length between PPGa 1906 and OFa 1910 may be substantially equal to the optical path between PPGb 1908 and OFb 1912. The photons are transmitted through each OF to a separate wavelength division multiplexer (WDM) that directs the signal and idler photons to two different optical paths using a deterministic optical process. As such, the photons directed to each optical path have identical frequencies. The two streams of photons exiting each WDM are sent to two TDCs. For example, in the configuration shown in FIG. 19, the signal and idler photons exiting WDMa 1914 may be transmitted to TDC2 a 1920 and TDC2c 1924 respectively. Similarly, the signal and idler photons exiting WDMb 1916 may be transmitted to TDC2 b 1922 and TDC2d 1926 respectively. As such, a first pair of TDCs (e.g., TDC2 a and TDC2 b in FIG. 19) receive the signal photons and the second pair of TDCs (e.g., TDC2c and TDC2d in FIG. 19) receive the idler photons. In some embodiments, all optical paths through which the photons are sent from WDMa 1914 and WDMb 1916 to TDC2 a 1920 to TDC2d 1924 (a total of four optical paths), may have the same optical path length. The photons transmitted through each pair of TDCs receiving the photons of the same frequency (either idler or signal), are provided to a second pair of TDCs such that each TDC of the second pair of TDCs receives photons from each TDC of the first pair of TDCs. For example, in the configuration shown in FIG. 19, TDC3 a 1928 and TDC3b 1930 each receives signal photons both from TDC2 a 1920 and from TDC2 b 1922. Similarly, TDC3c 1932 and TDC3d 1934 each receives idler photons both from TDC2c 1924 and from TDC2d 1926. In some embodiments, the lengths of all optical paths (a total of four optical paths) from the first pair of TDCs (e.g., TDC2 a and TDC2 b) to the second pair of TDCs (e.g., TDC3 a and TDC3b) are substantially equal. Finally, each TDC in a second pair of TDCs directs the received photons to a pair of PDs via two optical paths that may have the same optical path length. For example, the two outputs from TDC3 a 1928 are provided to PD1 1936 and PD2 1938, and the two outputs from TDC3b 1930 are provided to PD3 1940 and PD4 1942, etc. As such, two pairs of PDs detect the photons received from each pair of TDCs receiving photons with identical frequencies. For example, PD1 1936, PD2 1938, PD3 1940 and PD4 1942 detect signal photons exiting TDC3 a 1928 and TDC3b 1930. Similarly, PD5 1944, PD6 1946, PD7 1948, and PD8 1950, detect signal photons exiting TDC3c 1932 and TDC3d 1950. Accordingly, the PDs may be divided into two groups each comprising four PDs; a first group that detect signal photons and a second group that detect idler photons. Detection of a photon by a PD in a pair of PDs receiving photons from a single TDC3 indicates a measurement in a specific base. The specific base associated with the detection of photons by a PD of a PD pair is determined by the configuration of the corresponding TDC3 that feeds the said PD pair.

In some embodiments, all TDC2's in FIG. 19 may be configured to send every photon received into two identical optical paths with equal probabilities independent of the photon frequencies. In other words, the stream of idler or signal photons received by each one of four TDC2's may be split with a 50/50 ratio into two streams providing photons (with identical frequencies) to the next device at identical rates. In such configurations, the electric signals generated by each PD represent quantum state measurements performed in a basis determined by the splitting ratio of the TDC3 that feeds that PD. Thus the measurement basis associated with each PD may be selected by tuning the splitting ratio of the TDC3 that feeds it. For example, if the splitting ratio of TDCa 1928 is tuned to be 50/50, the measurements performed by PD1 1936 and PD2 1938 may represent measurements in the X basis while if the splitting ratio of TDCa 1928 is tuned to be 100/0, the measurements performed by PD1 1936 and PD2 1938 may represent measurements in the Z basis. Accordingly, measurements performed by PDs fed by a TDC3 tuned to a splitting ratio between 50/50 and 100/0 may represent a combination of the X basis and Z basis, wherein the specific combination may be determined by the specific splitting ratio of the TDC3.

In some examples, the splitting ratio of a TDC3 may be tuned such that, the electric signals generated by the PD that receives photons from that TDC3 represents quantum state measurements performed in X (Hadamard), Z (computational), $(X+Z)/\sqrt{2}$, $(X-Z)/\sqrt{2}$ or other bases. For example, if a first TDC3 is tuned to have a splitting ratio of 50/50, the PD that receives photons from the first TDC3 represents quantum state measurements performed in X basis and if a second TDC3 is tuned to have a splitting ratio of 100/0, the PD that receives photons from the second TDC3 represents quantum state measurements performed in Z basis. In some examples, if a TDC3 is tuned to have a splitting ratio between 100/0 and 50/50, the PD that receives photons from the TDC3 represent quantum state measurements performed in a basis that may be a combination (e.g., a linear combination) of X and Z bases. In some embodiments, PD1 1936 and PD2 1938 may represent the two possible outcomes for measuring photons quantum state in the X basis, PD3 1940 and PD4 1942 may represent the two possible outcomes for measuring photons quantum state in the Z basis, PD5 1944 and PD6 1946 may represent the two possible outcomes for measuring photons quantum state in the $(X+Z)/\sqrt{2}$ basis, and PD7 1948, and PD8 1950 may represent the two possible outcomes for measuring photons quantum state in the $(X-Z)/\sqrt{2}$ basis.

The randomness of the measurement bases in the aforementioned passive embodiments is a result of photons being randomly routed through different optical paths between TDC2s and TDC3s. As such, by continuously measuring electric signals generated by all PDs, the quantum state of the received photons is measured in a basis that is randomly selected as photons are transmitted to one or more PDs via randomly selected optical paths.

In some embodiments, the optical paths lengths of all optical paths starting from any of the two PPGs and ending with any one of the PDs are substantially equal.

In such embodiments, three categories of photon detection events may be identified:

Category 1) Single click events, wherein only one photon is detected by one of the PDs in any group.

Category 2) Double click events, wherein two photons are detected by two PDs in one group. In other words, the detected photons are either two signal photons or two idler photons.

Category 3) Coincidences, wherein two photons are detected by two PDs each belonging to a different group (receiving photons from two TDCs that provide photons with different frequencies). In other words, one of the detected photons is a signal photon and the other is an idler photon.

The coincidences may potentially represent true quantum events corresponding to measuring a specific quantum state of an entangled photon pair (e.g., the state defined by Equation 14). As shown in the system illustrated in FIG. 15 and the procedure illustrated in FIG. 19, the single click events may be provided to a randomness extractor and the coincidences and corresponding measurement bases may be first stored and then provided to a security test system where the quantum nature of the measured data is evaluated by statistical tests as described above.

Example On-Chip Implementation of a Passive Optical 2-Qubit Quantum Apparatus

Figure 20:
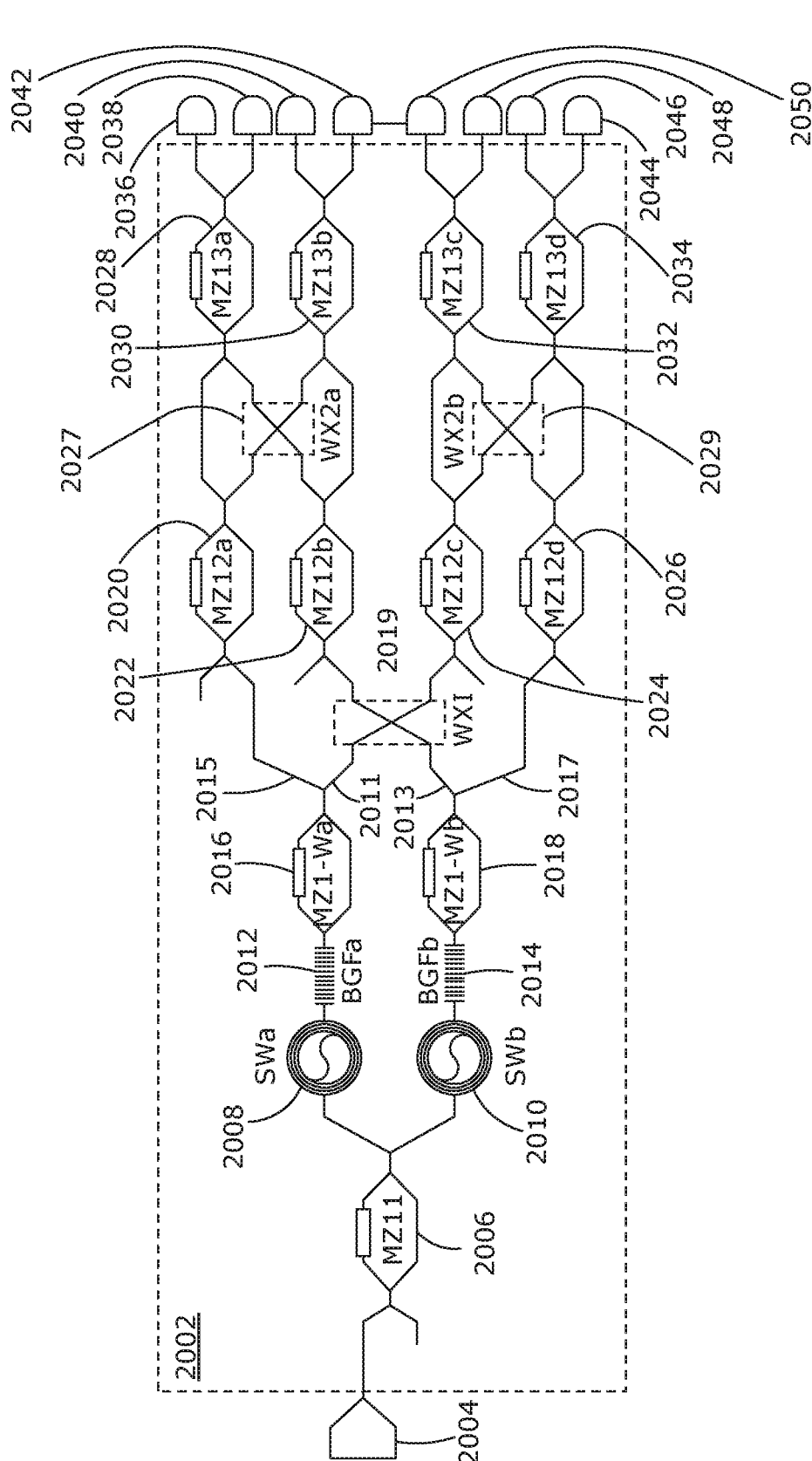
FIG. 20 is a block diagram illustrating an example implementation of the passive optical quantum apparatus configuration illustrated in FIG. 19, based on optical components that can be monolithically fabricated on a chip.

The architecture and the examples described above may be implemented based on a variety of schemes and optical components (e.g., free space, fibre-optics and integrated). However, as described earlier, the simplicity of the proposed architecture makes it particularly suited for making integrated or monolithic quantum apparatus. In FIG. 20, there is shown an implementation of the optical quantum apparatus configuration illustrated in FIG. 19 and described above, based on optical components that can be monolithically fabricated on a chip (e.g., a Silicon photonic chip). The specific on-chip optical components selected for the following on-chip implementation do not limit the on-chip implementation of the disclosed architecture that may be constructed using other on-chip optical components.

In the implementation shown in FIG. 20, on-chip tunable Mach-Zehnder Interferometers (MZIs) are used as TDCs and WDs, on-chip spiral waveguides are used as PPGs, on-chip Bragg gratings (BGs) are used as OFs and on-chip single mode waveguides are used as the interconnecting waveguides. In some examples, all the on-chip optical components may be monolithically fabricated on a chip.

In some embodiments, an on-chip MZI can be a 4-port optical device comprising two input ports and two output ports that are optically connected via a pair of on-chip directional couplers and a pair of optical waveguides each called an arm of the MZI. In some examples, MZI can be a monolithic component where all of its segments are waveguides formed on a single layer. In some examples, the relative optical phase between the photons transmitted through two different arms can be controlled by an electric signal (e.g., current or voltage). In some examples, the MZIs and phase shifters can be rapidly reconfigured (kHz rate) with high precision.

In some examples, the MZIs can be thermally controlled MZIs (e.g., the MZI used in Wang et al., Science 360, 285-291, 2018), wherein the relative optical phase between the two MZI arms is controlled by an electrical heating element disposed on or near one of the arms. The electric current may control the relative optical phase between the two arms based on thermo-optic effects. In some other examples, the MZIs can be electro-optically controlled MZIs, wherein the relative optical phase between the two MZI arms is controlled by the electric field between two conductive electrodes disposed on or near one of the arms. The electric field may control the relative optical phase between the two arms based on the electro-optic effect. The electric current may be provided to the heating element or the electrodes via two or more wires or conductive strips integrated with the MZI.

In some examples, a subset of MZIs may be configured to function as TDCs wherein photons entering one of the MZI's input ports is directed to each one of the two output ports with a probability depending on the controllable relative optical phase between the two arms.

In some examples, a subset of MZIs may be asymmetric MZIs configured to function as WDs, wherein photons having two different wavelengths entering one of the input ports are divided into two streams of single wavelength photons each output by a different output port.

In some embodiments, each on-chip PPG can be a spiral shaped monolithic waveguide having a total length between 10 and 100 microns, 100 microns and 1 mm, 1 mm and 5 mm, and 5 mm and 1 cm. In some examples, the spiral waveguides may be similar to spiral waveguides known by those skilled in the art.

In some embodiments, each on-chip BG can be a straight waveguide with periodically varying width. In some examples, the BGs may be similar to BGs known to those skilled in the art.

In some examples the waveguides connecting all the above mentioned on-chip optical components can be a single mode waveguide (e.g., ridge waveguide, rib waveguide, photonic crystal waveguide, and the like). In some examples, the waveguides may be similar to waveguides known to those skilled in the art.

Examples of optical materials that can be used as the structural materials for all of the above-mentioned optical components (i.e., MZIs, PPGs, BGs, and waveguides) may include: Silicon, silicon nitride, silicate glasses, fluoride glasses, polymers, III-V compound semiconductors and the like.

In this specific implementation, the photon source and the PDs are off-chip devices that are optically coupled to the on-chip waveguides. A variety of well-established coupling methods may be used to couple light from an off-chip source to the on-chip waveguides and from the on-chip waveguides to the off-chip PDs. Examples of coupling methods include, but are not limited to, using vertical grating couplers (VGCs) and direct coupling through a cleaved facet of the chip.

In some embodiments, the photon source and the PDs may be fibre-coupled devices. In these embodiments, the optical fibres coupled to the photon source and the PDs may be optically coupled to the on-chip waveguides using the aforementioned optical coupling methods. In some such examples, the VGCs may be the same as or similar to VGCs known to those skilled in the art. VGCs may be used for optical coupling of the off-chip fibre-coupled photon sources and the PDs to the on-chip waveguides and components.

In some other embodiments, the photon source may be an on-chip device and the PD may be an off-chip device. For example, the photon source may be integrated on the chip using flip-chip bonding. In yet other embodiments, both the photon source and PDs may be on-chip devices. For example, the photon source and the PDs may be integrated on the chip using flip-chip bonding. In some examples, PDs can be monolithically fabricated along with other components on the chip.

In some examples, the photon source can be a CW laser such as a solid state laser (e.g., ND:YAG laser), a fibre laser or a semiconductor laser (e.g., DFB laser). The CW laser may be a narrow linewidth CW laser with a linewidth between 1 kHz and 1000 kHz.

In some other examples, the photon source can be a pulsed laser such as a pulsed solid state laser, a pulsed fibre laser or a pulsed semiconductor laser.

The photon flow and quantum state preparation in the optical on-chip implementation shown in FIG. 20 is similar to the procedure described in detail for the general optical implementation shown in FIG. 19, in which the optical components may represent off-chip and/or on-chip optical devices. In what follows, an optical connection between two components may be a junctionless continuation of a waveguide transmitting photons from one optical component to another optical component with minimal loss.

An off-chip photon source 2004 (e.g., a laser source) provides a flux of photons to a waveguide optically connected to one of the input ports of the on-chip MZI1 2006. For example, the photon source 2004 can be a fibre-coupled photon source (e.g., a fibre-coupled laser) that is optically coupled to the waveguide via a vertical fibre-to-chip grating coupler. In some examples, one or more off-chip optical components (e.g., lenses, lensed fibres and the like) may be used to enhance the efficiency of the optical coupling between the fibre-coupled photon source and the waveguide. In some other examples, the photon source 2004 may be an on-chip device.

Each output port of MZI1 is optically connected to a spiral waveguide of a pair of spiral waveguides (SWa 2008 and SWb 2010), wherein the two-colour photon pair is generated (each pair comprising, a signal and an idler photon), for example, via a SFWM process. The output port of each spiral waveguide is connected to the input port of a Bragg grating filter of a pair of Bragg grating filters (SWa 2008 to BGFa 2012 and SWb 2010 to BGFb 2014) that attenuates the flux of pump photons while transmitting the signal and idler photons with minimal attenuation. The output of each Bragg grating filter is connected to one of the input ports of an MZI of a pair of MZIs (BGFa 2012 to MZI-Wa 2016 and BGFb 2014 to MZI-Wb 2018) configured to function as a WD wherein the signal photons are directed to the first output port of each MZI and the idler photons are directed to the second output port of the same MZI. MZI-Wa 2016 and MZI-Wb 2018 are configured and positioned such that their distal output ports, 2015 and 2017 and their proximal output ports 2011 and 2013 provide photons with different frequencies. For example, the signal photons exiting BGFa 2012 and BGFb 2014 may go through the top port 2015 of MZI-Wa 2016 and top port 2013 of MZI-Wb 2018 respectively. Similarly, the idler photons exiting BGFa 2012 and BGFb 2014 may go through the bottom port 2011 of MZI-Wa 2016 and the bottom port 2017 of MZI-Wb 2018 respectively. The distal ports (2015 and 2017) of MZIa 2016 and MZIb 2018 are connected to two straight waveguide sections. The proximal output ports (2011 and 2013) of MZI-Wa 2016 and MZIWb 2018 are connected to two waveguide sections that cross each other through an on-chip waveguide crossing WX1 2019 configured/designed to allow two streams of photons to cross with minimal cross-talk. The two outputs of the waveguide crossing 2019 are connected to another two straight waveguide sections. As such after the crossing, the signal photons which originated from the two spiral waveguides are transferred to two waveguide sections positioned side by side and the idler photons are transferred to another two waveguide sections positioned side-by-side. The outputs of these four waveguide sections are each connected to one of the input ports of one MZI out a set of four MZIs (MZI2a 2020, MZI2b 2022, MZI2c 2024, and MZI2d 2026) that may be configured to reroute photons received from one of their input ports to each one of their output ports with equal probability. The second input port of these MZIs may be left unconnected. Alternatively, these MZIs may only have one input port and two output ports. In the example shown in FIG. 20, the signal photons are fed to MZI2a 2020 and MZI2b 2022 and idler photons are fed to MZI2c 2024 and MZI2d 2026. The output ports of each pair of MZI2s (e.g., MZI2a 2020 and MZI2b 2022) receiving photons with identical frequencies are connected to the input ports of a second pair of MZIs (e.g., MZI3a 2028 and MZI3b 2030) such that each input port of an MZI in the second pair is connected to one of the output ports of a different MZI in the first pair. Such a connection between two pairs of MZIs may be provided through two straight waveguides and a waveguide crossing. For example, in FIG. 20, the first output port of MZI2a 2020 is optically connected to the first input port of MZI3a 2028 via a straight waveguide and the second output port of the MZI2a 2020 is optically connected to the first input port of the MZI3b 2030 via a waveguide crossing WX2a 2027. Similarly, the first output port of MZI2b 2022 is optically connected to the second input port of MZI3b 2030 via a straight waveguide and the second output port of the MZI2a 2020 is optically connected to the second input port of the MZI3b 2030 via the waveguide crossing WX2a 2027. The connection between MZI2c 2024 and MZI2d 2026 (that provide idler photons) to MZI3c 2032 and MZI3d 2034 are similar to the connection between MZI2a and MZI2b (that provide signal photons) to MZI3a and MZI3b. Finally, each one of the two output ports of the last MZI's (MZI3's) is coupled to a PD. As such, four pairs of PDs receive the photons output by the last four MZIs (MZI3a 2028, MZI3b 2030, MZI3c 2032, MZI3d 2034). The first PD pair 2036/2038 receive photons from MZI3a 2028, the second PD pair 2040/2042 receive photons from MZI3b 2030, the third PD pair 2044/2046 receive photons from MZI3c 2032, and the fourth PD pair 2048/2050 receive photons from MZI3d 2034.

The PDs in this specific implementation are off-chip components. In some examples of this implementation, the PDs are fibre-coupled PDs wherein each PD is coupled to an optical fibre and the optical fibre is coupled to one of the output ports of one of the MZIs from the set of four output MZIs (i.e., MZI3a, MZI3b, MZI3c, MZI3d) via an on-chip vertical grating coupler. In some other examples of such an implementation, an additional optical filter may be used between each MZI port and the PD receiving photons from that port. This additional optical fibre may improve the performance of the system by further suppressing the pump photon flux remaining after BGFa 2012 and BGFb 2014.

General Active 2-Qubit Optical Quantum Apparatus Architecture

Figure 21:
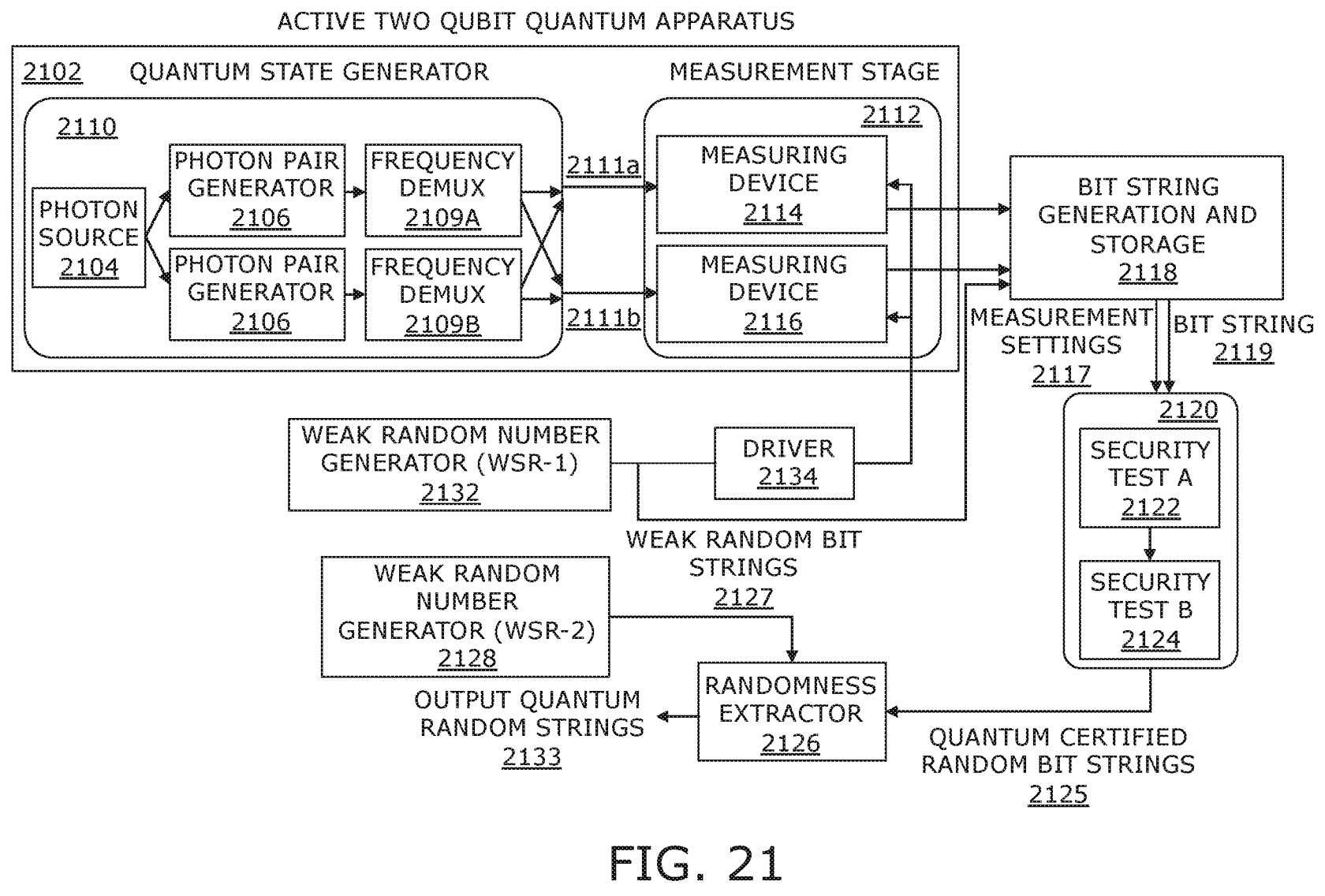

The block diagram shown in FIG. 21 provides an illustration of the building blocks and operation of an example of a quantum random number generating and amplifier system, wherein the quantum apparatus 2102 may be implemented based on an embodiment of the above-mentioned active 2-qubit architecture. The quantum apparatus 2102 comprises a quantum state generator 2110 which generates and prepares entangled photons serving as entangled qubits and a measurement stage 2112 which measures the qubits generated by the quantum state generator 2110.

In the example shown in FIG. 21, a photon source 2104 generates a stream of photons referred to as "pump photons" that may all have frequencies within a narrow frequency range. For example, the number of pump photons having nearly identical frequencies may have a Lorentzian distribution as a function of wavelength (or frequency) with a center wavelength in a range of 800 nm to 1200 nm, or in a range of 1200 nm to 1600 nm or in a range of 1600 nm to 2000 nm. The full width half maximum (FWHM) of the corresponding frequency distribution may be in a range of 1 kHz to 100 kHz, or in a range of 100 kHz to 500 kHz or in a range of 500 kHz to 1 MHz. In some examples, the photon source 2104 may generate a pump photon stream with a periodically varying photon flux (e.g., periodic pulses with different temporal profiles). The stream of pump photons exiting the photon source 2104 may be divided into first and second pump photon streams. The first pump photon stream is transmitted to a first photon pair generator 2106 and the second pump photon stream is transmitted to a second photon pair generator 2108. The ratio between the photon flux entering the first photon pair generator 2106 and the photon flux entering the second photon pair generator 2108 (photon flux ratio) may be adjustable and may be chosen to be 50/50, 40/60, 30/70 or any other desired ratio. The collective quantum state of pump photons provided to the first 2106 and second 2108 photon pair generators may be expressed as a superposition quantum state similar to the quantum state expressed by Equation 13 above.

In some examples, each photon pair generator 2106/2108 may generate a pair of photons upon receiving two or more pump photons. The photons in each photon pair may be generated simultaneously and may be an entangled photon pair. In some such examples, the generated photon pair can be a degenerate photon pair, wherein the frequencies of the photons in a pair may be different. For example, one may have a frequency larger than the frequency of the pump photons and the other may have a frequency smaller than the frequency of the pump photons. The frequencies of each photon in a photon pair may be different from the frequency of the pump photons by the same amount. For example, the frequency of a first photon in a photon pair may be upshifted relative to the frequency of the pump photons and the frequency of a second photon in the photon pair may be down-shifted relative to the frequency of the pump photons by the same amount. In some embodiments, the two photons in each photon pair generated by one of the photon pair generators 2106/2108 may have different frequencies. The photon pairs may be generated via variety of nonlinear optical effects. For example, absorption of two pump photons may generate a degenerate photon pair with different frequencies (a two-colour entangled pair) via spontaneous four wave mixing (SFWM). In some examples, the two photon pair generators 2106/2108 can be identical photon pair generators having the same physical and optical characteristics. In these examples, the photon pairs generated by the first photon pair generator 2106 and the photon pairs generated by the second photon pair generator 2108 can be in a superposition quantum state (e.g., a superposition between being created in one photon pair generator or the other photon pair generator).

In some examples, the photons having different frequencies in each generated photon pair exiting each photon pair generator 2106/2108 are routed onto different optical paths using two frequency demultiplexers (F-DEMUX) 2109a/2109b. The first F-DEMUX 2109a divides the photon pairs received from the first photon pair generator 2106 and the second F-DEMUX 2109b divides the photon pairs received from the second photon pair generator 2108. In such examples, each F-DEMUX (2109a/2109b) may divide the received stream of photon pairs into two streams of photons, each stream of photons comprising photons having the same or substantially the same frequency. In one embodiment, the photons exiting the two F-DEMUXs 2109a, 2109b may be routed onto four distinct optical paths. In some examples, these optical paths may have equal optical path lengths. In some examples of the quantum state generator 2102, these four optical paths may be arranged such that streams of photons having the same or substantially the same frequency are merged and output from the quantum state generator 2102 as a single photon stream. In the example shown in FIG. 21, the high frequency photons (e.g., signal photons) of the photon pairs generated by the photon generators 2106/2108 may be transmitted through a first output 2111a and the low frequency photons (e.g., idler photons) of the photon pairs generated by the photon generators 2106/2108 may be transmitted through a second output 2111b. The quantum states of photons received from these outputs may be entangled states associated with photons having different frequencies and routed through different paths. So effectively, the photons that were originally created in a superposition state are transformed into two path entangled qubits (by the F-DMUXs and the optical path configuration). The first qubit is provided by the first output 2111a and the second qubit is provided by the second output 2111b of the quantum state generator 2102. In some examples, the collective quantum state of the photons output from the first 2111a and second 2111b outputs may be expressed using Equation 14 above.

In some embodiments, the measurement stage 2112 may include two identical measuring devices 2114/2116, wherein each measuring device 2114/2116 comprises a plurality of configurable optical paths, wherein each optical path ends at a photon detector. In some such embodiments, the optical paths may have substantially equal optical path lengths. In some examples, each measuring device 2114/2116 receives photons only from one of the outputs 2111a/2111b of the quantum state generator 2102. For example, the first measuring device 2114 may receive signal photons from the first output 2111a and the second measuring device may receive idler photons from the second output 2111b.

In some embodiments the outputs of all photon detecting devices in both measuring devices 2114/2116 may be measured during a given time period referred to as "measurement cycle". In some examples, the measurement cycle may be limited by the detector dead time. In these examples, the photon flux may be selected according to the dead time of the photon detector so that, during the period of time the photon detector is on-state, it can detect single photons. In some embodiments, the specified time period is in a range from about 1 ns to 1 µs, 1 µs to 1 ms, 1 ms to 0.1 s, or some other range. For example, the time period can be in a range of 5 ns to 15 ns, e.g., about 10 ns. In some examples the dead time of a photodetector may be the time required for the photon detector to switch from an "off" state, for example following the detection of a photon or coincidence, to an "on" state wherein the photon detector may again detect photons.

In some embodiments, each measuring device 2114/2116 may include at least one tunable optical device that enables selecting the optical path configuration within the measuring device using one or more external control signals. The optical path configuration in each measuring device may correspond to measuring the quantum state of the received photons in a specific basis. For example, detection of a photon by a measuring device 2114/2116 with a specific optical path configuration selected by a control signal may indicate measurement in the computational basis, Hadamard basis, a basis formed by a specific combination of these two bases or other some basis. In some such embodiments, a random control signal may change the optical path configuration within each measuring device 2114/2116 for each measurement cycle. In these embodiments, the measurement basis for each measuring device 2114/2116 during each measurement cycle is randomly selected. In some examples, the measurement basis for the first measuring device 2114 may be randomly selected from a first pair of measurement bases (e.g., computational basis or Hadamard basis) and the measurement basis for the second measuring device 2116 may be randomly selected from a second pair of measurement bases (e.g., each basis being a specific combination of computational basis and Hadamard basis).

If only one photon detector in the measurement stage 2112 provides a signal during a coincidence window within a measurement cycle, such an event is considered a single click event. If two photon detectors in the same measuring device provide signals in a coincidence window, such an event is considered a double click event. If two photon detectors in two different measuring devices provide signals during a coincidence window, such an event is considered a coincidence. The coincidences associated with the detection of two photons having two different frequencies at substantially same time potentially indicate the collapse of the entangled quantum state to the state represented by one of the selected measurement bases. Once the quantum nature of a random string comprising coincidences is verified by a security logic test, that random string may be considered as a quantum (quantum-grade) random string (e.g., after also optionally passing a non-signaling test). In contrast, the quantum (or classical) nature of single and double click events cannot be verified and therefore they may not be used for generating the quantum random string.

In some embodiments, the control signals for both measuring devices may be provided by a first weak random number generator or weak source of randomness (WSR-I) 2132. The weak source of randomness 2132 generates a random bit string (or other forms of random numbers) and inputs those to driver 2134 that provides them as control signals to the measuring devices 2114/2116. In some other examples, the control signals for each measuring device 2114/2116, may be provided by two different weak sources of randomness. Each weak source of randomness 2132 can comprise one or more weak sources of randomness. Each weak source of randomness can generate one or more bits, and the random bit string can include bits from one, some, or all of these weak sources of randomness. For example, the weak source of randomness can include multiple (e.g., two or four) separate weak sources of randomness, with each separate source continuously generating a sequence of bits, which are read when needed by the quantum apparatus. In some implementations, some or all of the weak sources of randomness are provided by the user of the quantum apparatus. In some such implementations, the quantum apparatus may be configured such that the weak sources of randomness are swappable so that the user can swap different sources of randomness depending on the user's particular installation or application.

In some examples, a plurality of quantum random bits provided by the two measuring devices may form a random bit string that is stored in the bit string generation and storage device 2118 together with the associated values of the measurement settings at the time of the measurement. Here the measured output for each measurement cycle comprise the output signals generated by the photon detectors and the measurement setting is specified by the optical path configuration within the measuring devices and therefore the control signal received from WSR-1 2132 during the corresponding measurement cycle. Firstly, a check is made as to whether to repeat to obtain more measurements. Secondly, once the check indicates that no further repetitions are needed, the stored bit strings 2119 and measurement settings 2117 are sent out to the security test unit 2120 where security test A 2122 and, optionally, security test B 2124 may be performed. (Note that Bell test 3124 in FIG. 29 represents a form of security test unit 2120, typically security test A 2122). Security test A 2122 may verify the quantum nature of the received strings of random bits and security test B 2124 may verify the non-signaling nature of the generation and measurements procedures that have generated the quantum bits in the random bit string. In a preferred embodiment, security tests A and B are implemented using hardware since hardware is typically more secure than software or firmware. However, security tests A and/or B may be implemented using hardware, firmware, software, or any desired combination thereof, according to the circumstances of any given implementation. The system may include a processor configured to compute security test A and, if needed, security test B from the stored measurements. The processor can be configured to generate and output a certificate certifying that the measurements are from a quantum system if the value of the computed test statistic is, for example, above a threshold value. The same or another certificate may be generated certifying that the measurements are non-signaling or partially non-signaling. These security tests are described below with more details. Once the quantum nature of the string of random bits is certified, the quantum certified random string (a string of qubits) 2125 is provided to the randomness extractor 2126. The randomness extractor 2126 may also receive weak random strings from one or more weak sources of randomness. In the example shown in FIG. 21, the randomness extractor 2126 is a two-source extractor (analogous to the two-source extractor 3122 shown in FIG. 29) that generates the output signal 2133 using the received certified quantum random bit string 2125 provided by the quantum apparatus 2102 and a weak random bit string 2127 provided by a second weak source of randomness (WSR-2) 2128 (analogous to WSR 3100 in FIG. 29). In some examples, the WSR-1 2132 and/or WSR-2 2128 may exploit classical and/or quantum phenomena to generate the weak random strings.

Example Procedure for Active Optical Quantum Apparatus

Figure 22:
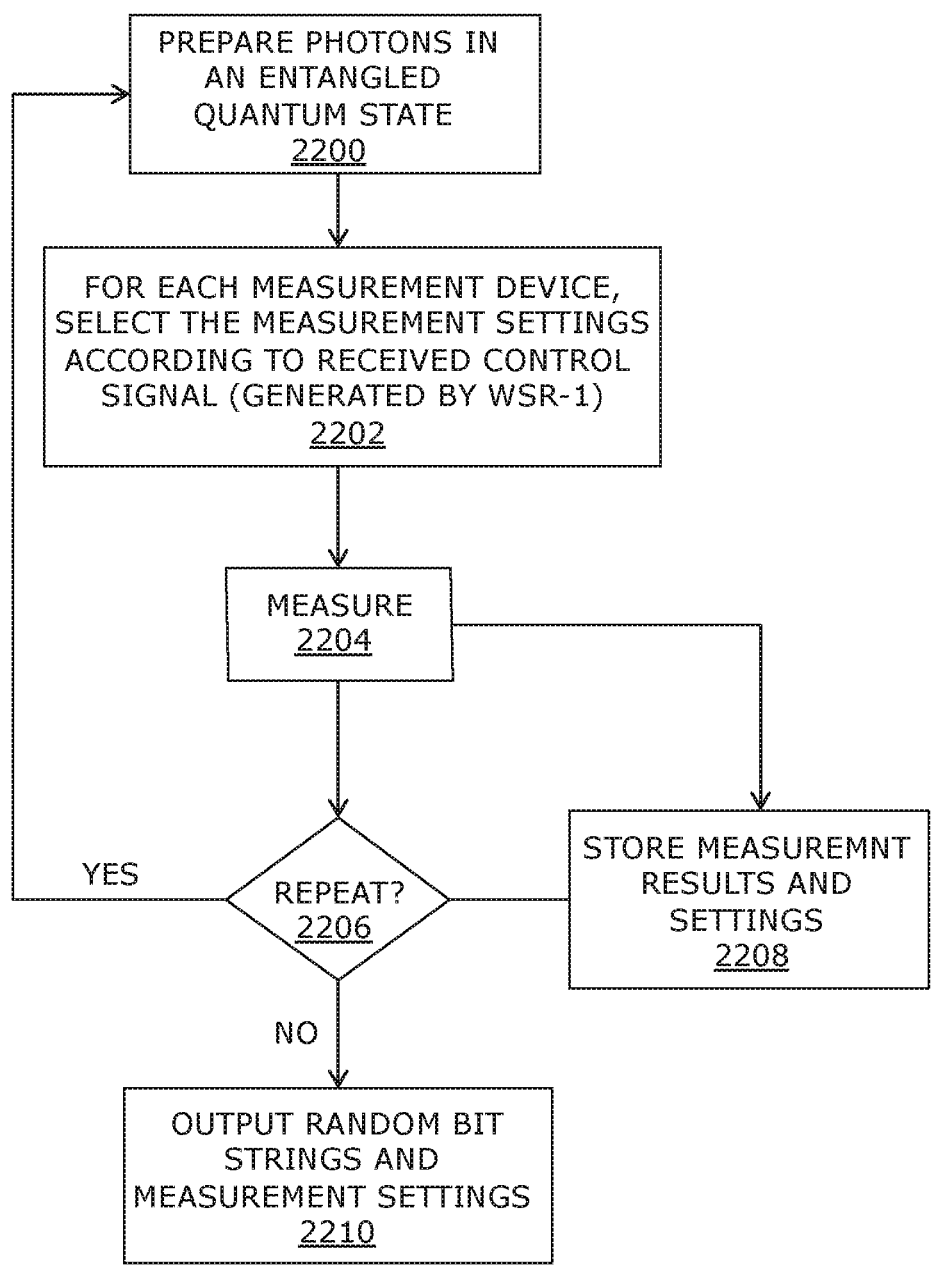
FIG. 22 is a flow diagram illustrating an example method of operation of the bit string generation and storage system in a two-qubit quantum random number generator based on an active quantum apparatus.

FIG. 22 is a flow diagram illustrating an example method of operation of the bit string generation and storage system of FIG. 21 in a two-qubit quantum random number generator based on an active quantum apparatus. The photons may be prepared 2200 in specific entangled quantum states, for example, as indicated in Equation 14 above. In some embodiments, the entangled photons can be prepared in the specific quantum state using degenerate photon pair generation via a non-linear optical phenomenon (e.g., spontaneous four-wave mixing and the like) and path entanglement. The control signal (a random string) provided by the weak source of randomness 2132 may be used to configure the measurement settings 2202 independently for each measuring device 2114/2116 during each measurement cycle. The outputs of the photon detectors in two measurement devices 2114/2116 are measured 2204 during a measurement cycle. For each measurement setting, the detection of photons by one or more photon detectors in a measuring device indicate measuring the quantum state in a specific basis. For example, the random bit string provided by the weak source of randomness 2132 can be used to select a measurement basis from two measurement bases (e.g., the computational basis and Hadamard basis) for the first measurement device, and another measurement basis from two other bases (e.g., two combinations of computational basis and Hadamard basis) for the second measuring device. Once the measurement settings have been configured, the photons are measured 2204 by the two measuring devices, wherein one or more photon detectors output a signal upon detection of a photon, and the next round of measurement begins. So during each measurement cycle, each of the two measuring devices may output a signal representing a measurement in a certain basis according to its measurement setting. If the two photon detectors in two different measuring devices both generate a signal in a coincidence window, those signals may be considered as coincidences and are stored 2208 together with the measurement settings of both measuring devices at the time of measurement. A check is made 2206 as to whether to repeat the process and obtain more measurements. The check involves checking criteria such as whether a specified time has elapsed, whether a specified number of measurement iterations has passed or whether a memory storing the measurements is full. If the check 2206 indicates the need for further measurements, new entangled photon pairs will be prepared 2200 by the quantum state generator 2110 and the measurement cycle begins. Once the check 2206 indicates that no further repetitions are needed, the stored measurements are output 2210. If during a coincidence window, only one photon detector in any measuring device or two photon detectors in one measuring device generate signals, these signals are ignored as classical events.

Security Test A for an Active Optical Quantum Apparatus

Figure 23:
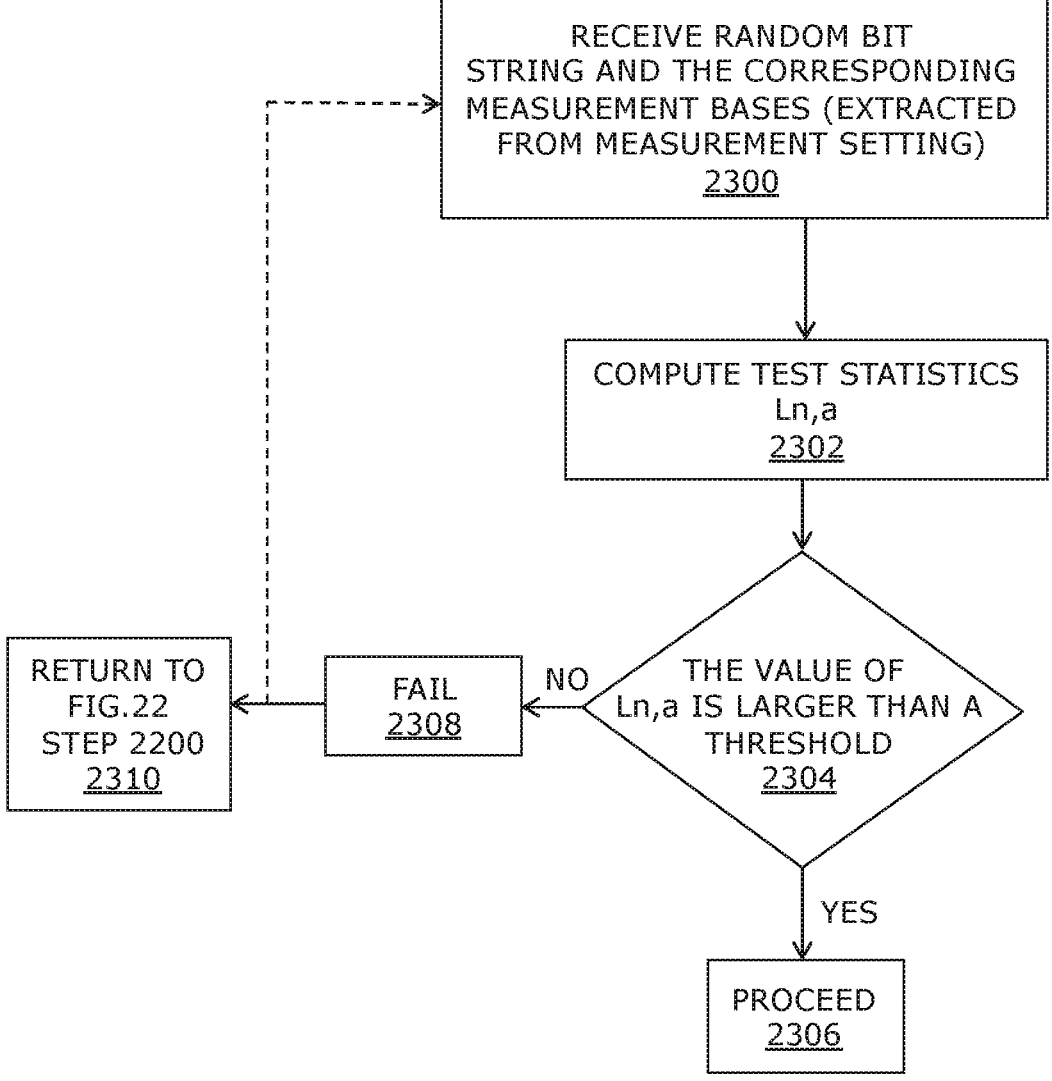
FIG. 23 is a flow diagram of an example security test A for evaluating the quantum nature of the measurements generated by an active 2-qubit quantum apparatus shown in FIG. 21.

Similar to the passive case, in some examples, security test A determines whether a plurality of qubit measurements violate a Bell inequality through a process shown in FIG. 23. In some embodiments, the process can be similar to the process shown in FIG. 17 for the passive quantum apparatus, except that the measurement basis for each qubit is determined based on the value of the random control signal received by the corresponding measuring device for the measurement cycle during which the qubit was measured. Firstly, a bit string along with measurement setting associated with each bit in the random bit string are collected 2300 from the storage and output generation stage 2118. Each bit in the received random bit string may correspond to a coincidence. The measurement basis for each bit in the random bit string may be determined based on the measurement setting of the measuring devices from which the coincidence signals are received. Secondly, next, a statistical test is computed 2302 based on the values of the bits in the received bit string and the measurement basis for each bit. In some examples, the statistical test may include computing a function $L_{n,a}$ for the bit string that is defined based on the number of bits in the string, the measurement basis for each bit and the measured value of each bit. In some examples, $L_{n,a}$ may be similar to $L_{n,p}$ defined above in Equation 16. If the computed value of the function $L_{n,a}$ is above a threshold value 2304 (e.g., more than 2), the process proceeds 2306. Otherwise, the process fails 2308 and returns to operation 2200. The processing of FIG. 22 can be repeated, wherein another random bit string will then be generated, stored 2208 and transferred 2300 to the security test stage. In some examples, a sufficient number of measured bits and bass may be stored in the storage 2118 (e.g., a non-transitory memory of the device) to generate two or more random bit strings. In these examples, if the security test fails for a first random bit string 2308, a second random bit string may be transferred from the storage 2118 to the security test stage in a step 2300. In some other implementations, $L_{n,a}$ may be defined such that at step 2304, a value of $L_{n,a}$ less than a threshold value indicates that the processes can proceed 2306.

Security Test B for an Active Optical Quantum Apparatus

Figure 24:
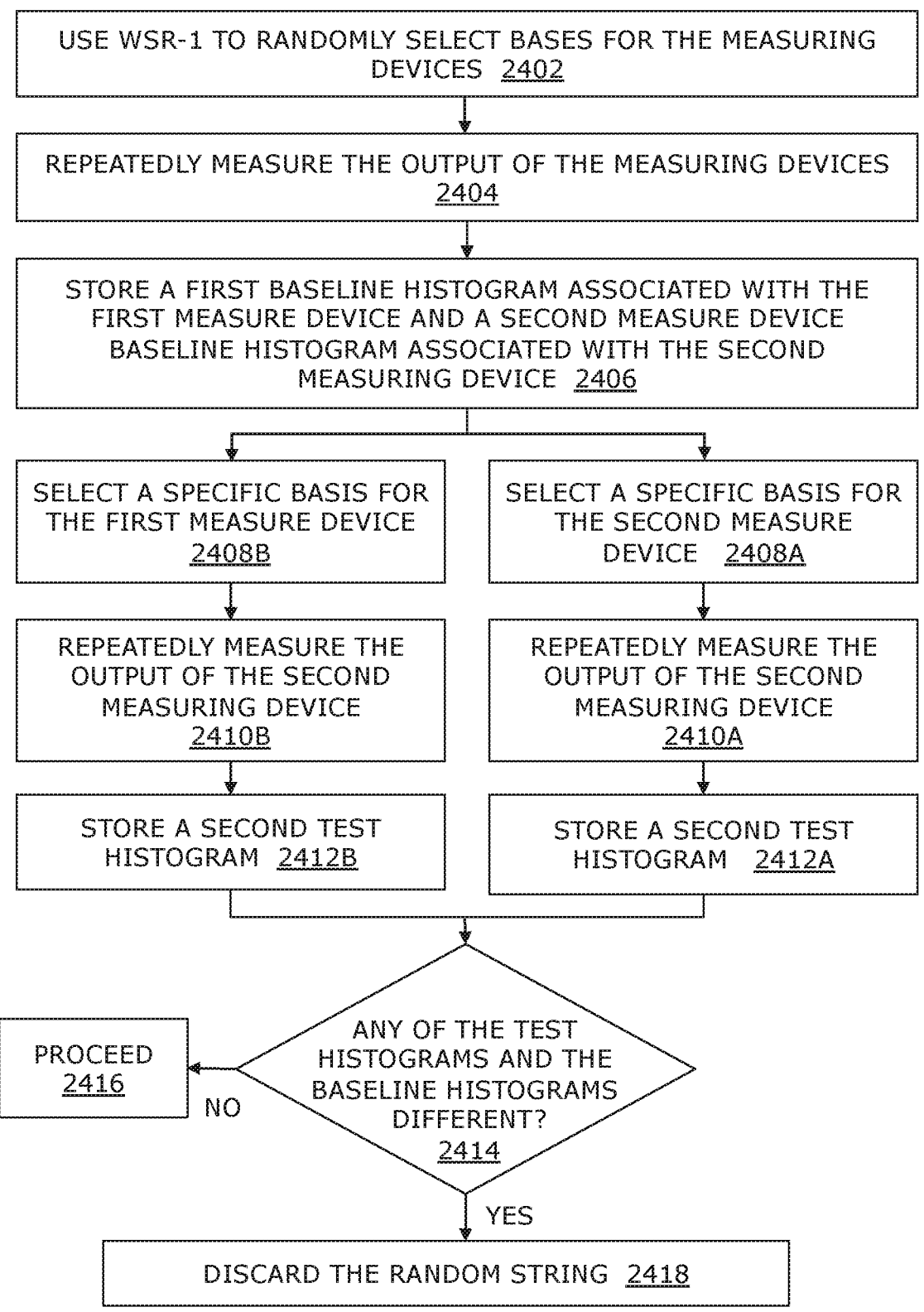
FIG. 24 is a flow diagram illustrating an example of procedure in a security test B for a two-qubit quantum random number generator based on an active quantum apparatus.

As mentioned above, security test B determines whether the two different measurement devices are approximately non-signaling between themselves. In some embodiments, a security test B for the active quantum apparatus architecture (e.g., the architecture shown in FIG. 21) can be similar to the security test B described above with reference to FIG. 5. In some other embodiments, a slightly different variation of the process illustrated in FIG. 5 may be used. In FIG. 24, there is provided an illustration of a flow diagram for an example security test B that may be used in the quantum random generator system shown in FIG. 21. With reference to FIG. 24, at block 2402 a weak source of randomness (e.g., WSR-1 2132) may be used to configure measurement settings of the two measuring devices (e.g., 2114 and 2116) of the active two-qubit quantum apparatus (2102). At block 2404 the output of each measuring device may be repeatedly measured to generate a first baseline histogram for the first measuring device and a second baseline histogram for the second measuring device. At a block 2406, the baseline histograms are stored (e.g., in a non-transitory memory of the device). Next, at blocks 2408A and 2408B, a specific measurement basis is selected for one of the measuring devices while the measurement basis for the other measuring device varies randomly using, for example, the same weak source of randomness used in the block 2402. At blocks 2410A and 2410B, the output of each measuring device with a randomly selected measurement basis is repeatedly measured to generate a first test histogram for the first measuring device (block 2412A) and a second test histogram for the second measuring device (block 2412B). Finally, at a step 2414, all the test and baseline histograms for each measuring device are compared to check if a test histogram of a measuring device is significantly different from the baseline histogram of that measuring device. If no difference is detected between the test histograms and the base histograms, the measuring devices are determined to be non-signaling and the system proceeds (e.g., by passing the certified quantum random bit string to the randomness extractor 2126). If two or more test and baseline histograms are at least partially different, indicating there is some degree of interaction between the measuring devices, the random string will be discarded. In some examples, upon determining that the two measuring devices are not non-signaling, the system may generate an alert and abort.

In yet other embodiments, instead of performing a separate test for verifying that the two measuring devices are non-signaling between themselves, during security test A the threshold value of the Bell test may be modified to account for the residual increase in the violation of the selected Bell inequality due to signaling between the two measuring devices. Using this approach, the level of signaling between the two measuring devices can be evaluated. In this case, non-signaling may be defined as a signaling level smaller than a predefined limit. In these examples, the security test B 2124 may be eliminated from the active 2-qubit quantum apparatus shown in FIG. 21.

Implementation of an Active Optical 2-Qubit Quantum Apparatus

Figure 25:
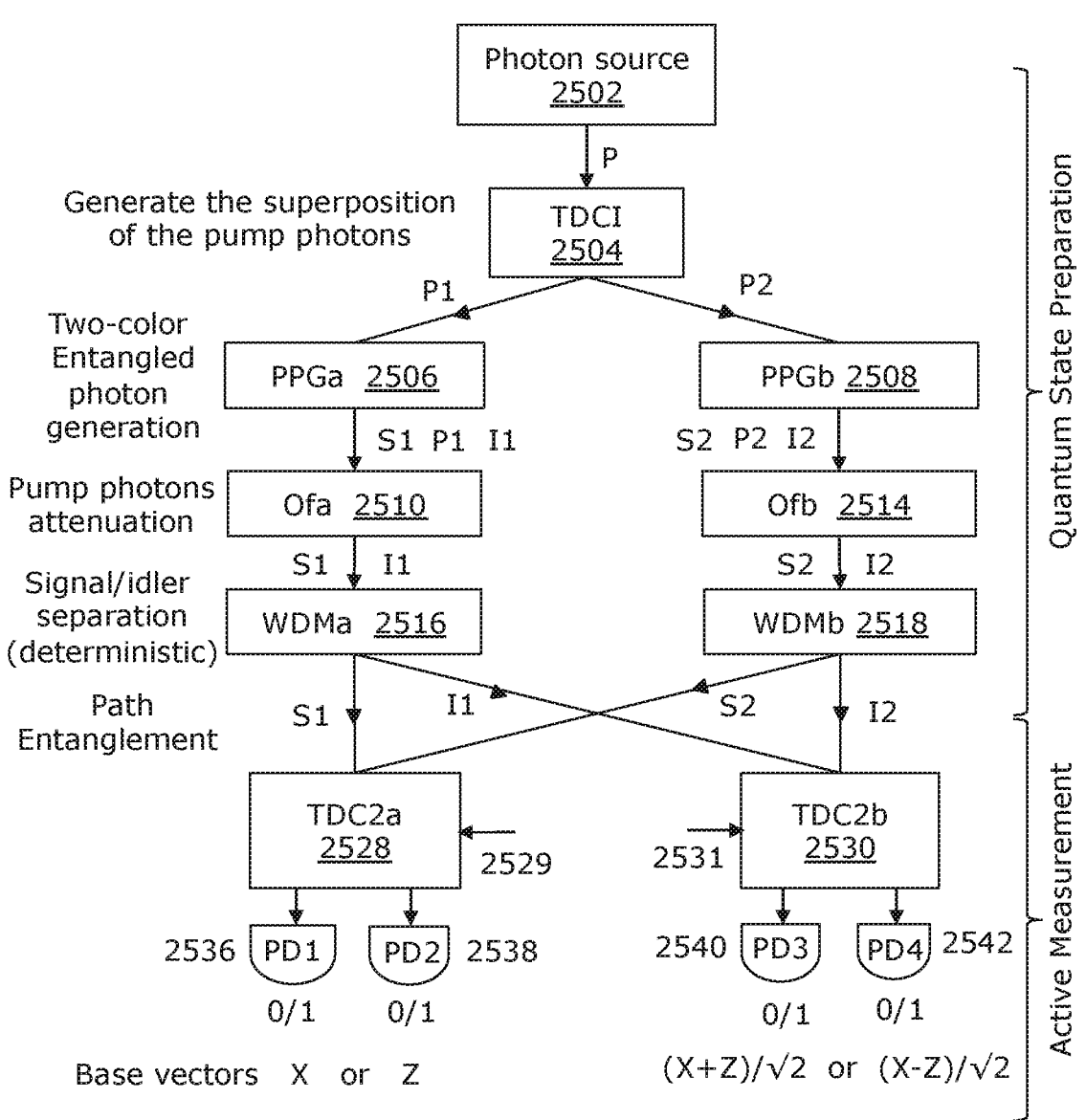
FIG. 25 is a schematic diagram of an example of an active two-qubit optical quantum apparatus for generating and measuring quantum states that can be used in the two-qubit quantum random number generator architecture shown in FIG. 21.

The diagram in FIG. 25 is an example of a quantum optical circuit for generating and measuring quantum states that can be used in the active 2-qubit quantum random number generator architecture shown in FIG. 21. The photons used in this circuit may have well-defined polarization states (e.g., they may be linearly, circularly or elliptically polarized). The photons generated by the photon source 2502 may be provided to a first tunable directional coupler (TDCI) 2504 that randomly directs the photons to two optical paths wherein for each photon the ratio between the probability of being directed to a first optical path to the probability of being directed to a second optical path (splitting ratio) can be adjusted. For example, the splitting ratio can be 50/50 (the probability of going to each optical path is equal) or 40/60, or 30/70. In some embodiments the properties of the subsequently generated entangled photon pairs may be determined by the splitting ratio of TDC1 2504. For example, a ratio of 50/50 may be associated with generation of maximally entangled states while other ratios may be associated with generation of partially entangled pairs. As mentioned above, advantageously, using partially entangled states may enable implementing a randomness amplification protocol that supports generation of perfectly random amplified random strings. The photons output by TDC1 2504 are fed to two photon pair generators (PPGs) wherein the first optical path from TDC1 2504 to the first PPG (labeled PPGa) 2506 and the second optical path from TDC1 to the second PPG (labeled PPGb) 2508, have substantially equal optical path length. In each one of the PPGs, a portion of the received pump photons may be converted into two new single-frequency photon streams. The frequency of photons in one of the new streams may be higher than that of the pump photons while the frequency of photons in the other stream may be smaller than that of the pump photons. For example, the wavelength of the photons in the first and second generated streams may be down and up-shifted by the same amount relative to the wavelength of the pump photons. The up-shifted and down-shifted photons are referred to as "signal" and "idler" photons respectively. In each PPG, the signal and idler photons may be generated via a nonlinear optical process (e.g., spontaneous four-wave mixing or SFWM). In some embodiments two pump photons may be absorbed to generate one "signal" photon and one "idler" photon. The photons exiting each PPG are provided to an optical filter (OF), wherein the probability of transmission of pump photons can be significantly smaller than that of the signal and idler photons. For example, the transmission probability of the pump photons may be smaller by a factor of 10, 100 or 1000. As such, the number of pump photons in the photon stream transmitted through each OF may be significantly smaller than the transmitted signal and idler photons. In some embodiments, the optical path length between PPGa 2506 and OFa 2510 may be substantially equal to the optical path between PPGb 2508 and OFb 2514. The photons transmitted through each OF are fed to a wavelength division multiplexer (WDM) that directs the signal and idler photons to two different optical paths such that the photons directed to each of the two optical paths emerging from each WDM have the substantially the same frequency. The separation of signal and idler photons in each WDM is a deterministic process. The four streams of photons provided by WDMa 2516 and WDMb 2518 are transmitted to TDC2 a 2528 and TDC2 b 2530, such that each pair of photon streams having the same frequency is transmitted to one TDC. For example, in the configuration shown in FIG. 25, the signal photons exiting WDMa 2516 and WDMb 2518 may be transmitted to TDC2 a 2528. Similarly, the idler photons exiting WDMa 2516 and WDMb 2518 may be transmitted to TDC2 b 2530. In some embodiments, all optical paths through which the photons are sent from WDMa and WDMb to TDC2 a to TDC2d (a total of four optical paths) may have the same or substantially the same optical path length. Each one of the TDC2s can be configured by a respective control signal 2529/2531, for example, provided by a weak source of randomness (WSR). In some embodiments, both control signals 2529/2531 may be provided by a single WSR. In some other embodiments, the control signal 2529/2531 may be provided by two independent WSRs. Finally, the photons transmitted through each TDC receiving photons of the same frequency (either idler or signal photons) are provided to a pair of PDs via two optical paths that may have the same optical path length. For example, the two outputs from TDC2 a are provided to PD1 and PD2 and the two outputs from TDC2 b are provided to PD3 and PD4. As such the PDs in a PD pair (PD1/PD2 or PD3/PD4) detect photons with identical frequencies. In the example shown in FIG. 25, PD1 2536 and PD2 2538 detect signal photons exiting TDC2 a 2528, and PD3 2540 and PD4 2542 detect idler photons exiting TDC2 b 2530. Detection of a photon by a PD in a pair of PDs receiving photons from one of the TDC2s indicates a measurement in a specific basis determined by the control signal provided to the TDC2 that feeds the PD pair. As such, during each measurement cycle, the quantum state of the photons provided to each pair of PDs may be measured in a different basis depending on the magnitude of the control signal provided to the TDC2 which feeds the pair of PDs at the time of photon detection. In the example shown in FIG. 25, the measurement basis associated with detection of photons in PD1 or PD2 may be selected by the control signal 2529 provided to TDC2A 2528. Similarly, the measurement basis associated with detection of photons in PD3 or PD4 may be selected by the control signal 2531 provided to TDC2 b 2530. In some examples, the measurement basis for the first pair of PDs 2536/2538 can be X or Z and the measurement basis for the second pair of PDs 2540/2542 can be $(X+Z)/\sqrt{2}$ or $(X-Z)/\sqrt{2}$.

In some embodiments, the optical paths lengths of all optical paths starting from any of the two PPGs and ending with any one of the PDs are substantially equal to another. In some other embodiments, the optical paths lengths of all optical paths starting from the first TDC (TDC1 2504) following the photon source 2502 and ending with any one of the PDs are substantially equal to one another. In yet other embodiments, all the optical path segments starting from the optical devices having the same type and ending with optical devices of the same type have an equal optical path length.

In some examples, the duration of each measurement cycle may be limited by the detector dead time. In these examples, the photon flux may be selected according to the dead time of the photon detector so that during the period of time the photon detector is in on-state it can detect a single photon. In some embodiments, the specified time period is in a range from about 1 ns to 1 μs, 1 μs to 1 ms, 1 ms to 0.1 s, or some other range. For example, the time period can be in a range of 5 ns to 15 ns, e.g., about 10 ns. ("ns" is an abbreviation for nanosecond, "μs" is an abbreviation for microsecond, "ms" is an abbreviation for millisecond).

In such embodiments three categories of photon detection events may be identified:

Event type 1: Single click events, wherein only one photon is detected by one of the PDs in any PD pair.

Event type 2: Double click events, wherein two photons are detected by two PDs in one PD pair. In other words, the detected photons are either two signal photons or two idler photons.

Event type 3: Coincidences, wherein two photons are detected by two PDs each belonging to a different PD pair (receiving photons from two TDCs that provide photons with different frequencies). In other words, one of the detected photons is a signal photon and the other is an idler photon.

As mentioned above, the coincidences may potentially represent true quantum events corresponding to measuring a specific quantum state of an entangled photon pair (e.g., the state defined by Equation 14). The single click and double click events may also be associated with a quantum phenomenon, but unlike coincidences, their quantum nature cannot be verified (therefore they cannot be used to generate certified random quantum bit strings). As shown in the system illustrated in FIG. 21 and procedure illustrated in FIG. 22, the coincidences and corresponding measurement bases may be stored and transferred to a security test system 2120 where the quantum nature of the measured data is evaluated by statistical tests as described above.

Example On-Chip Implementation of an Active Optical 2-Qubit Quantum Apparatus

Figure 26:
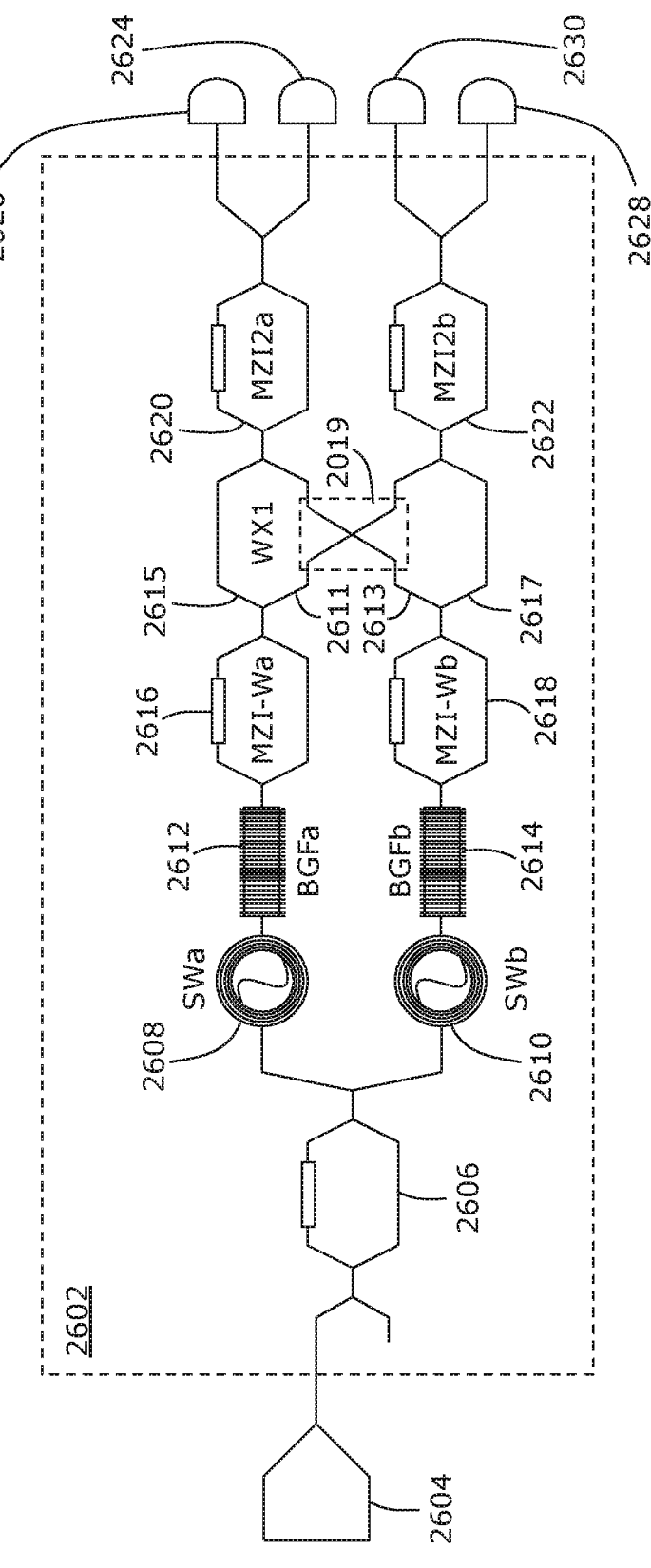
FIG. 26 is a schematic diagram of an example implementation of the active optical quantum apparatus configuration illustrated in FIG. 25, based on optical components that can be monolithically fabricated on a chip.

FIG. 26 shows an implementation of the optical quantum apparatus configuration shown in FIG. 25 and described above, based on optical components that can be fabricated on a chip (e.g., a Silicon photonic chip). In some examples, these optical components can be the same type of optical components described above for the on-chip implementation of the passive 2-qubit quantum apparatus with reference to FIG. 19. The specific optical devices selected for this implementation do not limit the monolithic implementation; these components can be replaced by other components using a similar architecture and providing the same functionality.

The photon flow and quantum state preparation in the optical on-chip implementation shown in FIG. 26 are similar to the procedure described in detail for the general optical implementation shown in FIG. 25, in which the optical components were not limited to on-chip optical devices. In this example, an off-chip source 2604 provides a flux of photons to one of the input ports of the MZI1 2606 through an optical coupler. In some other examples, the photon source 2604 may be an on-chip device. The optical coupler may be any component configured to couple light from the source 2604 to a waveguide connected to one of the input ports of MZI1 2606 (e.g, a vertical grating coupler). In some examples, the coupler may include off-chip components (e.g., optical fibre, lenses, and the like). Each output port of MZI1 is optically connected to a spiral waveguide (SWa 2608 or SWb 2610) in which a photon pair is generated (e.g., each pair comprising a signal and an idler photon). The output port of each spiral waveguide is connected to the input port of a Bragg grating filter (BGFa 2612 and BGFb 2614) that attenuates the flux of pump photons while transmitting the signal and idler photons with minimal attenuation. The output of each Bragg grating filter (BGFa 2612 and BGFb 2614) is connected to one of the input ports of an MZI (MZI-Wa 2616 and MZI-Wb 2618) configured to function as a WD, wherein the signal photons are directed to the first output port of each MZI and the idler photons are directed to the second output port of the same MZI. MZI-Wa 2616 and MZI-Wb 2618 are configured such that their distal output ports, 2615 and 2617 and the two proximal output ports 2611 and 2613 provide photons with different frequencies. For example, the signal photons exiting BGFa 2612 and BGFb 2614 may be transmitted through the top port 2615 of MZI-Wa and the top port 2613 of MZI-Wb respectively. Similarly, the idler photons exiting BGFa 2612 and BGFb 2614 may go through the bottom port 2611 of MZI-Wa 2616 and bottom port 2617 of MZI-Wb 2618 respectively. The distal ports 2615/2617 of MZIa 2616 and MZIb 2618 are connected to the two distal input ports of a pair of MZIs 2620/2622 (MZI2a and MZI2b). The proximal output ports 2611/2613 of MZI-Wa 2016 and MZIWb 2618, are connected to two waveguide sections that cross one another through an on-chip waveguide crossing (WXI) 2019 configured/designed to allow two streams of photons to cross each other with minimal cross-talk. The two outputs of the WX1 2019 are connected to the proximal ports of MZI2a

2620 and MZI2b 2622. As such the signal photons originating from the two spiral waveguides are transmitted to the input ports of MZI2 2620 and the idler photons are transmitted to the input ports of MZI2b 2622. Each one of the output ports of MZI2a and MZI2b is coupled to a PD. As such, each pair of PDs receives photons having the same frequency output by one MZI. In the example shown, signal photons output from MZI2a are provided to a first pair of PDs (2626 and 2024) while the idler photons output from MIZ2b are provided to a second pair of PDs (2628 and 2030). In some examples, the PDs may be on-chip devices that are optically connected to the output ports of MZI2a/ MZI2b 2620/2622 through a straight on-chip (e.g., monolithic) waveguide. In some other examples, the PDs may be off-chip devices that are optically coupled to output ports of MZI2a/MZI2b 2620/2622, for example, through a vertical grating coupler or through edge coupling (if edge coupling is used a coupling lens may be used to enhance the coupling efficiency). In some such examples, an additional optical filter may be used between each MZI port and the PD receiving photons from that port. This additional optical fibre may improve the performance of the system by further suppressing the pump photon flux remaining after BGFa 2612 and BGFb 2614.

Three-Qubit Protocol for High Rate Device-Independent Quantum Randomness Amplification In some embodiments, a 3-qubit QRNG protocol may be used for device-independent quantum random number generation (QRNG). Advantageously, a 3-qubit QRNG protocol (herein referred to as 3-qubit protocol) may be implemented using platforms that are less complex compared to those used for implementing the existing protocols (e.g., the 2-qubit and 4-qubit protocols described above), and yet support high random number generation rates relevant for commercial applications (e.g., cryptography). In some examples, a 3-qubit protocol may be implemented using a general purpose quantum apparatus (e.g., a quantum computer) to generate quantum certified random strings (e.g., perfect random strings or nearly perfect random strings) without being affected by the noise that may exist in such general purpose quantum apparatus and independent of the some or all physical characteristics of the general purpose quantum apparatus. In some embodiments, the high rate of random bit generation enabled and supported by a 3-qubit QRNG protocol, may enable usage of the corresponding quantum-certified QRNGs in applications that cannot use quantum-certified QRNGs with lower bit rates. In some examples, a 3-qubit QRNG protocol may be used by a random number generating system to amplify a weak source of randomness (a process known as "randomness amplification").

In some embodiments, the 3-qubit QRNG protocol may comprise: generating weak random strings (e.g., classically generated random strings or random strings that cannot be certified using a quantum test), generating three qubit entangled states (e.g., three qubit Greenberger-Home-Zeilinger states), testing the quantum nature of quantum states using a statistical test tailored for evaluating the quantum nature of a three-qubit entangled quantum states (e.g., based on a violation of a Bell inequality), and extracting perfect or nearly perfect random strings using weak random strings and the quantum certified random strings (e.g., generated by measuring three-qubit entangled quantum states) using a randomness extraction/amplification protocol or process. In some examples, the extraction amplification process may be designed and optimized for amplifying certified quantum random strings generated using 3-qubit quantum states.

Examples of such extraction amplification processes and protocols and a statistical test tailored for evaluating the quantum nature of three-qubit entangled quantum states are discussed below and in Appendix A.

Similar to protocols disclosed herein, the 3-qubit QRNG protocol is based on physical assumptions as opposed to computational ones, in other words the security of the system emerges from principles of information theory. In some examples, a QRNG system based on a 3-qubit protocol may provide certified random strings even if one or more devices in the system are faulty and/or untrusted. In some embodiments, additional security features may be implemented, for example, the system may stop if one or more security tests reveal that the system is being tampered with.

Some of the advantages of a QRNG system that uses a 3-qubit QRNG protocol may include: a reduced number of components required to implement the protocol in cases where a specific apparatus is made to implement the protocol, tolerance to a higher level of noise (e.g., noise in general purpose systems), enabling bit rates that are high enough for many applications (e.g., applications currently not benefiting from the security and level of randomness provided by a quantum random number generator), supporting or enabling a tunable security level, improved level of security and privacy (e.g., using additional security tests), and better tolerance to imperfections (e.g., imperfections associated with fabrication and assembly).

In some embodiments, the 3-qubit protocol may include all or some of the features and elements previously described with respect to 2-qubit or 4-qubit protocols and include additional features. Some such embodiments may be used to design and fabricate quantum random number generation (QRNG) systems with reduced complexity and improved bit rates. In some embodiments the advantages of a QRNG system based on a 3-qubit protocol may include but are not limited to: a reduced number of components required to implement the protocol, tolerance to a higher level of noise, supporting higher bit rates, tunable security, improved level of security and privacy (e.g., using additional security tests), and better tolerance to imperfections (e.g., imperfections associated with fabrication and assembly).

In some embodiments, the 3-qubit QRNG protocol may be implemented using a general purpose quantum system such as a quantum computer. In some other embodiments, the 3-qubit protocol may be implemented using a single-purpose quantum system designed and optimized for implementing the 3-qubit QRNG protocol.

In some examples, the 3-qubit protocol may allow generating provable quantum randomness used for sampling (e.g., needed in Monte Carlo methods), by using quantum computers either remotely or locally (or using a single-purpose device specific to the task). In some such examples, the higher level of noise tolerance using a 3-qubit protocol for random number generation may enable implementing the protocol using a quantum computer that typically has a higher level of noise compared to a quantum apparatus of a QRNG system designed and optimized for implementing the 3-qubit protocol.

In some embodiments, the 3-qubit protocol may allow generating certified cryptographically secure random numbers, either with a single-purpose system designed for implementing the protocol to perform a specific task or with a quantum computer. In some other examples, the 3-qubit protocol may be implemented using a multi-purpose quantum computer (e.g., as set of instructions executed by the quantum computer). All or some of the implementation of the 3-qubit protocol may be enabled by the explicit nature of the protocol and provable security level supported by the protocol. It should be appreciated that the ease of implementation and the generation of random bit strings at commercially relevant rates make the 3-qubit protocol advantageous over existing protocols and technologies available for device-independent quantum cryptography. Additionally, the unprecedented level of security may simplify the fabrication process for QRNGs that implement the 3-qubit protocol.

In some examples, the reduced complexity and reduced number of components may result in a system volume significantly smaller than that of systems designed and built based on a 4-qubit QRNG protocol. In some applications, a reduced size and volume may be a critical factor for commercialization of a QRNG system.

In some embodiments, similar to the above mentioned protocols (e.g., 2-qubit and 4-qubit protocols), a QRNG system based on the 3-qubit protocol may comprise: one or more weak sources of randomness (e.g., classical or quantum), a quantum apparatus configured to generate potentially quantum random bit strings by generating and measuring three qubit entangled states, a security test system configured for testing the quantum origin of the measurements, a randomness extractor (e.g., a two-source randomness extractor) configured to extract random strings (e.g., perfect or nearly perfect random strings) using weak random strings and the quantum certified random strings (e.g., generated by measuring three-qubit entangled quantum states).

In some examples, the quantum apparatus may generate entangled states comprising three entangled states, allowing to continuously witness and certify the quantum nature of the device and the measurements, in turn allowing generation of certified random strings, a task that cannot be achieved with standard approaches to quantum random number generation or with other existing approaches to randomness generation.

In some examples, the security test system may comprise at least a security test A that evaluates the quantum nature of bit strings generated by the quantum apparatus (e.g., using a statistical test based on a Bell inequality). In some embodiments, the security test system may include a security test B that determines whether the quantum systems are non-signaling between themselves. In yet other embodiments, the quantum nature of the bit strings may be evaluated using security test A combined with a security test C. In some embodiments, the security tests A, B and C may have all or some of the features described with respect to security test A and B for a 4-qubit system and security tests A, B and C for a 2-qubit system. In some embodiments, one or more security tests in the security test system may be used to evaluate the privacy level of the system and detect cyber-attacks.

In some examples, using the security system and the randomness extractor may use statistical tests and randomness extraction procedures or protocols tailored and optimized for evaluating the quantum nature of three-qubit entangled quantum states and amplifying certified quantum random strings generated using 3-qubit quantum states. Examples of such statistical tests and randomness extraction procedures or protocols are discussed below and in Appendix A.

In some embodiments, the quantum apparatus may comprise three quantum systems that generate, for example, three-particle entangled states (e.g., three entangled photons) and measure them using randomly selected measurement bases.

Figure 27:
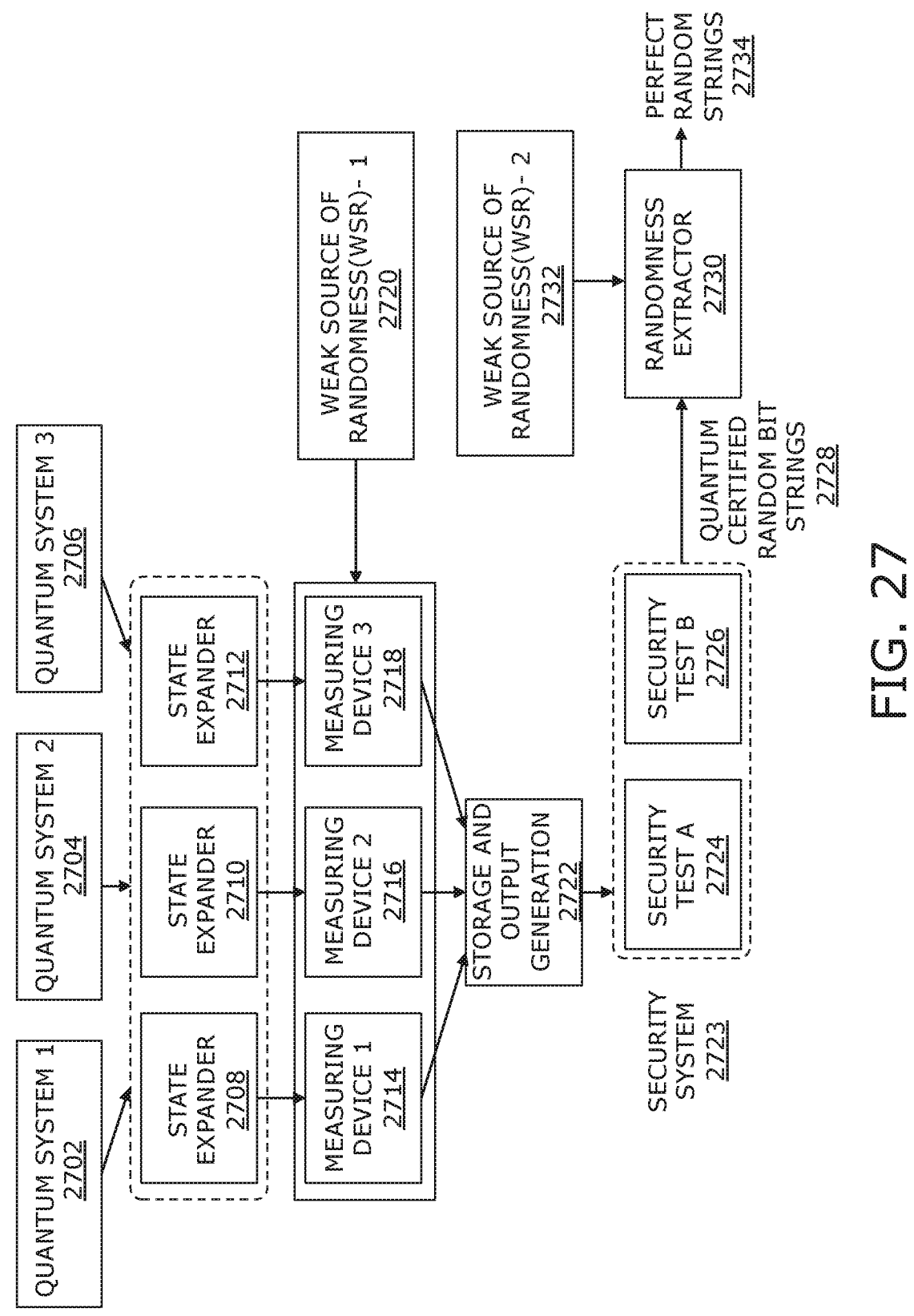
FIG. 27 is a schematic diagram of an example of a three-qubit quantum random number generator system.

In FIG. 27, there is shown a schematic diagram of an example three-device quantum apparatus for use as the quantum apparatus with a 3-qubit protocol. In the examples shown, three quantum systems 2702/2704/2706 (e.g., optical quantum systems) may generate three quantum particles (e.g., photons) in specific quantum states. Three state expanders 2708/2710/2712 may receive the quantum particles from the quantum systems 2702/2704/2706 and transform their quantum state into a 3-qubit entangled state (e.g., Greenberger-Home-Zeilinger states). Subsequently three measuring devices 2714/2716/2718 may be used to measure the quantum state of the particles received from the state expanders 2708/2710/2712 in bases randomly selected using weak random strings received from a first weak source of randomness 2720. In some examples, the measurement results may be received by a storage and output generation system 2722 where they are stored and then output as random strings. The random strings output by storage and output generation system 2722 may be transmitted to a security system 2723 comprising security test A 2724 (analogous to Bell tester 3124 in FIG. 29) that evaluates the quantum origin of the corresponding measurements and optionally a security test B 2726 that may verify that the quantum systems and measuring devices are nonsignaling. In some cases, once the quantum origin of a random sting is verified (analogous to the bit string 3030 in FIG. 29 when the Bell test has been verified), it may be transmitted as a quantum certified random bit string 2728 to a randomness extractor 2730 (analogous to the 2-source extractor 3122 of FIG. 29) that uses the quantum certified random bit string 2728 and a weak random bit string received from a second weak source of randomness 2732 (analogous to WSR 3100 in FIG. 29) to generate a perfect or nearly perfect random bit string 2734. In some embodiments, the first weak source of randomness 2720 may also provide weak random strings to the randomness extractor 2730. In some such examples, the second weak source of randomness 2732 may be eliminated from the system.

The 3-qubit generation and amplification protocol may be implemented using superconducting circuits, ion traps or optical systems. In some embodiments, the 3-qubit protocol may enable quantum random bit generation to be implemented using an optical 3-qubit quantum apparatus wherein only two qubits out of three qubits are hyperentangled (e.g., both polarization and path entangled). In some such embodiments the state of the third qubit can be measured in just the polarization basis with no need for path entanglement.

Optical Implementation of a Three-Qubit ORNG Protocol Based on Hanburv-Brown and Twiss Type Interferometer As mentioned above, in some embodiments the 3-qubit generation and amplification protocol may be implemented using optical systems. For example, a 3-qubit protocol may be implemented using optical architectures based on free space, fibre-based or on-chip optical components. The optical architectures used for implementing the 3-qubit protocol may use one or more optical arrangements and/or optical components used in the optical architectures described above with respect to 2-qubit or 4-qubit QRNG systems (e.g., the arrangements shown in FIG. 12, 13, 19, 20, 25 or 26).

In some embodiments, the 3-qubit protocol may be implemented using an optical 3-qubit quantum apparatus. For example, in the optical 3-qubit quantum apparatus, the polarization basis may be rotated from linear to diagonal (45 degrees) and back on a linear basis. In some examples, the optical arrangement for measuring the quantum state in a 3-qubit quantum apparatus may comprise a half-wave plate (HWP), a polarizing beam splitter (PBS) and two detectors in a so called Hanbury-Brown and Twiss, or Hanbury-Brown-Twiss (HBT) interferometer. In some such examples, using a Hanbury-Brown-Twiss (HBT) interferometer or setup for testing a Bell inequality may reduce the complexity of the 3-qubit entangled quantum states required for generating and certifying quantum randomness. In some examples, an HBT or HBT-type interferometer may be used for measuring and evaluating the quantum nature of the measurements (e.g., in a QRNG based on the 3-qubit protocol) using methods and techniques described in the publication titled "Bell's inequality and classical probability in a two-photon correlation experiment" (by Ou, Z. Y. and Mandel, L., Physical review letters, 61(1), p. 50, 1988) and the publication titled "*Experimental tests of realistic local theories via Bell's theorem*" (by Aspect, A., Grangier, P. and Roger, G., Physical review letters, 47(7), p. 460, 1981). In some such embodiments, only two qubits out of three qubits may be hyperentangled photons (e.g., both polarization and path entangled). In these embodiments, the photons associated with the first and second qubits may be prepared as hyperentangled states wherein the two photons are both path entangled and polarization entangled, and the state of the third qubit may be prepared such that the third photon is only measured in the polarization basis with no need for path entanglement.

Advantageously, having only two hyperentangled in a QRNG system that uses one or more HBT interferometers in its quantum apparatus (e.g., in the measuring devices of the quantum apparatus), reduces the complexity of the optical arrangement (e.g., by reducing the optical components and simplifying the optical alignment process) and facilitating the quantum state measurement process. In some cases, a reduction in complexity, such as a lower number of parts, may reduce the cost of building an optical QRNG system based on 3-qubit QRNG protocol compared to QRNG systems designed and built based on other QRNG protocols. Advantageously, the reduced complexity may also reduce maintenance costs and increase the robustness of the QRNG system designed and built based on the 3-qubit QRNG protocol. More details about 3-qubit QRNG systems that use HBT or HBT type arrangements and methods in their quantum apparatus may be found in Appendix A.

Classical Post-Processing for Quantum Randomness Amplification

As described above the 2-qubit, 4-qubit and the 3-qubit quantum randomness generation amplification protocols may use a randomness extractor to amplify a weak source of randomness into a nearly ideal source of randomness using certified quantum random strings generated by a quantum apparatus and certified by one or more security tests.

In some examples, an optimized randomness extractor (e.g., a two-source randomness extractor) or optimized randomness extraction scheme may be designed and optimized for randomness extraction when one of the randomness sources (e.g., the quantum source of randomness) is slow compared to the other source of randomness (e.g., a weak source of randomness). In some such examples, the near linear complexity of the post processing using such an optimized randomness extractor allows rapid randomness generation rates. Such optimized randomness extractors or optimized randomness extraction protocols can be purely classical, but still improve the overall efficiency of a QRNG system. In yet other examples, an optimized randomness extractor or optimized randomness extraction scheme may be designed and optimized for randomness extraction using quantum certified random bit strings generated using a 3-qubit protocol (e.g., the 3-qubit protocol described above).

In some embodiments, an optimized randomness extraction scheme or protocol may be implemented using a classical computer. For example, an optimized randomness extraction protocol may be a set of machine-readable instructions stored in a memory of a classical computer and executed by a processor of a classical computer. In some examples, the execution of instructions associated with the optimized randomness protocol may transform partially random and private strings using fresh strings from an imperfect randomness generator (e.g., a weak source of randomness) into an output that is provably near-perfect and private. In some such examples, the partially random and private strings may be generated using a quantum apparatus.

In one aspect described herein, an optimized randomness extraction scheme may be an optimized combination of other schemes (e.g., existing schemes) for randomness extraction and the corresponding implementations (e.g., an optimization and explicit implementation of two different two-source randomness extractors). In some such examples, an optimized randomness extraction scheme may be an optimization and explicit implementation of two strong two-source randomness extraction schemes (e.g., two different schemes) allowing the user or the QRNG system to select the scheme most suitable for a specific application. In some examples, the optimized randomness extraction scheme may be a strong seeded randomness extraction scheme.

In some examples, the specific combination of the randomness extraction schemes may be optimized for randomness extraction using quantum certified random bit strings generated using a 3-qubitprotocol (e.g., the 3-qubitprotocol described above). In some such examples, an optimized randomness extractor may be a combination of two strong seeded randomness extractors.

In some cases, an optimized randomness extraction scheme or a randomness extractor that uses such scheme may be also optimized to generate secure amplified random bit strings in the presence of quantum adversaries, i.e. adversaries that have access to all quantum resources (quantum-side information, quantum computers, and the like).

In different embodiments, the advantage of optimized randomness extraction schemes and their implementations as randomness extractors (e.g., as two source randomness extractors) may include but is not limited to:

Scheme 1: Generating longer random bit strings with smaller error.

Scheme 2: Generating longer random bit strings from a small initial perfect bit string (e.g., a certified quantum bit string generated using a 3-qubit quantum apparatus) and a long bit string (e.g., a weak random bit string) from the second and faster source of randomness (e.g., a weak source of randomness). This feature is particularly relevant when the initial perfect random seed is hard and/or slow to generate as is the case for the field deployable QRNG systems based on device-independent randomness amplification protocols that use a Bell test for quantum certification.

Scheme 3: A combination of features (1) and (2) described above makes a two-source extractor a highly efficient extractor. Using such combination as a randomness extractor, the generation rate of truly random bit strings is not limited by the low bit rate of the slower randomness source (e.g., the quantum apparatus) anymore. Instead, the generation of the truly random bit strings may be limited by the speed of the computational platform (e.g., one or more hardware processors and memories) used to implement the optimized randomness extractor.

Advantageously, the speed of the computational platform is much higher than the speed of a slow source of random numbers (e.g., a QRNG generating quantum certified random strings). For example, the computational platform may be a classical computer that executes instructions corresponding to the optimized randomness extraction scheme. The speed of such classical computers can be increased using parallelized architectures (e.g., employing multiple processors) and in some examples using specific post-processing methods, to support generation of truly random bit strings at unprecedented rates. The complexity of the optimized randomness extractor can be minimal (for example in the order of $nX \log(n)$ where n is the size of the input random string), allowing high rates of randomness generation to be attained (compared with a complexity of the order of $n^3$ for a so-called Trevisan based implementation for example).

Advantageously, in some examples, the optimized randomness extraction scheme or protocol may enable generating near-perfect or perfect random strings at rates as high as 10-20 Mbits/sec (a rate that is much higher than rates supported by many existing QRNG systems). In some such examples, such a high rate may be limited by the speed of the classical computer used to implement the optimized randomness protocol (rather than the output of the quantum device used to produce a certified quantum-grade random bit string). In some such examples, the optimized randomness extraction protocol may be parallelized to further improve the generation rate of the near-perfect or perfect random strings.

In some embodiments an optimized two-source extractor may generate a string of "perfectly" random bits using two independent, but weakly random bit strings. In some cases, a "weak" string may be a bit string that is not perfectly random. A "perfect" random bit string is a bit string which cannot be distinguished from the one coming from a perfect source of randomness. For example, a "perfectly" random bit string cannot be distinguished from the uniform probability distribution with probability greater than a security parameter that can be made arbitrarily small. In some examples, a two-source extractor or an optimized two-source extractors may transform two independent imperfect randomness sources into a perfect one.

In some examples, a seeded extractor may generate a perfectly random bit string using a weakly random bit string and a perfect bit string. In some such examples, a longer perfect random bit string may be generated from an initial seed of perfect random bits and an auxiliary weakly random bit string.

More details about the optimized randomness extraction schemes and protocols may be found in Appendix A, which is hereby incorporated by reference.

APPENDIX A

The approach described herein accepts that building a perfect RNG per se is challenging, and instead provides a scheme in which an imperfect source of randomness is amplified in a way that the output is provably perfectly random and private. Following this approach, it is then sufficient to build an imperfect random number generator, the amplification scheme taking care of making the output provably perfectly random and private. However, it is known that an imperfect source of randomness alone (in particular, a Santa-Vazirani source) cannot be amplified using a classical process [4]. This changes with access to quantum resources [5], which support device-independent randomness and privacy amplification. That is, a single imperfect RNG is amplified to generate provably uniform private numbers [6-13]. The device-independent approach allows one to certify the random and private nature of the output without modelling the internal functioning of the quantum device, which can be seen as a black box and therefore can be trusted with minimal added assumptions (see [14] for a review). This is an important feature in the field of quantum technologies, where devices are notoriously noisy and cannot be trusted to function perfectly.

Techniques for device-independent randomness and privacy amplification have been developed in [5, 10, 11, 13]. A fully explicit protocol (also referred to here as the ARQ protocol) is developed herein for both device-independent randomness and privacy application. This protocol can be optimised for real-world quantum devices and has security which holds against an all-powerful adversary that only respects the laws of quantum mechanics and is otherwise unbounded. Features disclosed herein include:

optimising the Bell inequality and statistical analysis for real-world quantum devices, using three quantum bits in an enabled state.

maximising noise tolerance of the protocol.

optimising randomness extractors for randomness amplification, including providing a randomness extractor with near linear complexity, thereby allowing output rates of several Mbits/s using a standard personal laptop computer or similar.

Also disclosed herein is a real-world example of the usefulness and accessibility of quantum technologies, including:

showing that today's quantum computers can be used to run a reliable Bell test under minimal added assumptions using methods to account for undesired signalling (cross-talk) in devices which do not close the locality loophole. At a high level, the method amounts to trusting that the quantum computer has not been purposely build to trick the user, but otherwise allows for the device to remain mostly uncharacterised.

a software implementation is provided using IBM-Q experience quantum computers. High Bell inequality values were obtained with this implementation, allowing the protocol to be run to generate random numbers for cryptography.

By way of background, see [5] for proof-of-concept relating to randomness amplification; see [6] for obtaining noise resistance and the possibility to amplify imperfect sources with arbitrary bias (albeit in a form unsuited for practical implementations); see [7]-[9] for considerations of imperfect RNGs (again in a form unsuited for practical implementations, albeit some potential practical applications are described in [10-13].

The protocol disclosed herein:

can be optimised for running on real-world devices such as quantum computers.

provides near linear complexity for randomness post-processing (rather than generic polynomial complexity for some other approaches)

has been implemented using the Number Theoretic Transform (NTT) to guarantee information-theoretic security;

provides an efficient implementation in which randomness generation rates go linearly with the runtime of the quantum device (the protocols from [10-12] are sublinear at best and hence inefficient; it might be possible to implement the protocol in [13] with similar efficiency.

performs both randomness and privacy amplification (this is also the case in [13]).

Figure 34:
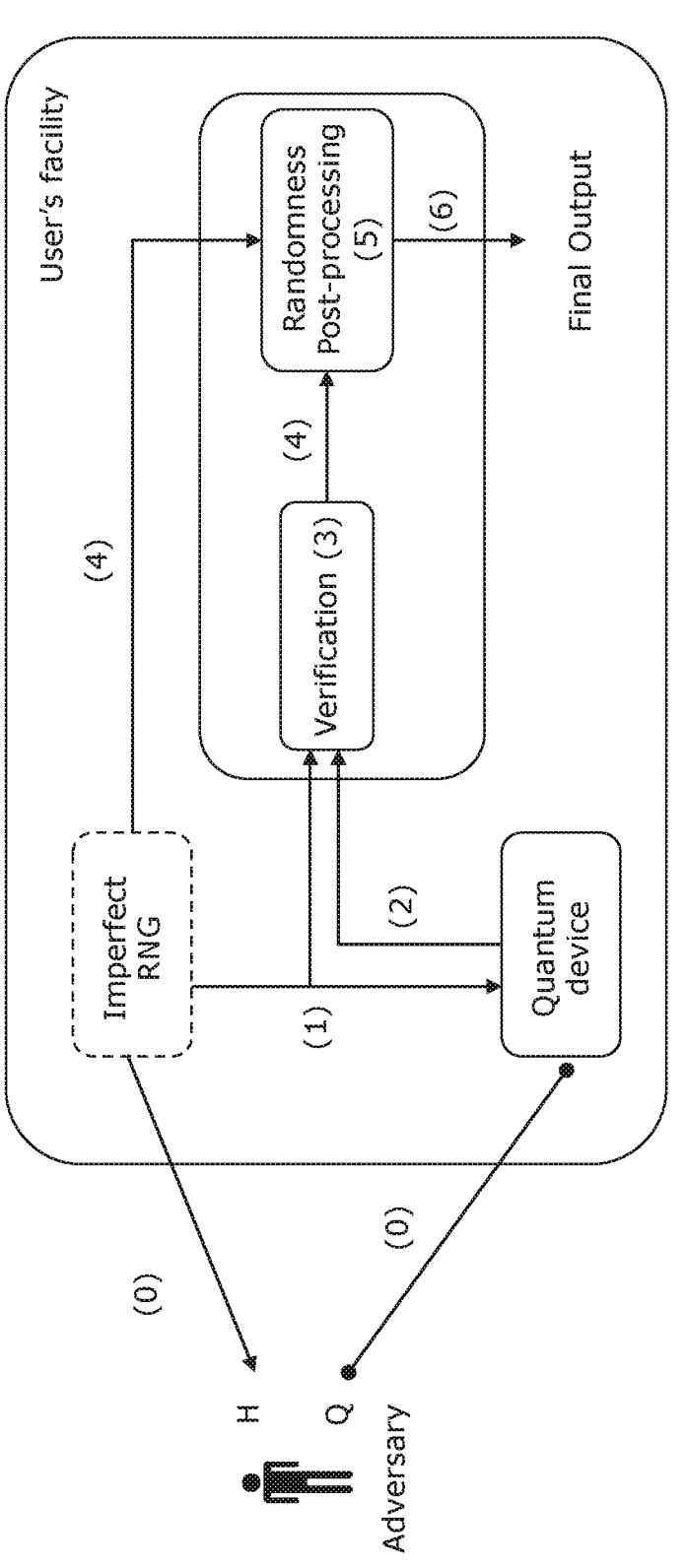
FIG. 34 is an illustration of a setup for device-independent randomness amplification and optionally privatisation as disclosed herein.

In FIG. 34, there is shown the setup for one example of device-independent randomness amplification—this set up is generally the same as in previous work [5, 10, 11, 13]. The quantum device and optionally the imperfect RNG involve quantum hardware. The user's facility is assumed to be in a safe environment shielded from the outside once the protocol starts. The protocol goes as follows: 0) before beginning the protocol, the adversary may have received numbers generated by the imperfect RNG, this is the history H. The adversary may also have built the quantum device with which it might still be correlated, for example by storing systems Q that are entangled with it.

1) the imperfect RNG serves to challenge the quantum device by repeatedly sending it inputs.

2) the quantum device generates outputs to each of the inputs.

3) a verification is performed on the input-output statistics which servers to certify the quantum and random nature of the device.

4) upon successful verification, the outcomes of the quantum device and a fresh string of numbers from the imperfect RNG are sent to the randomness post-processing step.

5) algorithms process the two strings of numbers and output a provable near-perfect random and private string of numbers, the final output of the protocol [6], To run the protocol described herein, three main resources are involved: (i) an initial imperfect RNG; (ii) a quantum device capable of running a Bell test, and (iii) a classical computer for storing data, for the verification step and for the randomness post-processing. The imperfect RNG may, for example, be based on a classical chaotic process from the avalanche effect in a reverse-biased diode or a commercially available QRNG based on photons going through a beam-splitter. As noted above, the present implementation uses, for the quantum device, quantum computers available from the IBM-Q experience (and a laptop computer for the classical computer).

The first part of the protocol involves collecting data to analyse the behaviour of the quantum device. For this, the quantum computer is driven with different settings (inputs) and its response (outputs) saved for later analysis. In an example implementation, one circuit (among eight ($2^3$) possibilities) is generated and sent to the machine to implement, and the generated outcomes are then saved for later analysis. After sufficiently many rounds of such interactions with the quantum device, one can build a faithful input-output probability distinction for the device that represents the behaviour of the device and will serve for the verification. Note that this is the only step of the protocol which requires a quantum device (using quantum hardware).

The second part of the protocol involves analyzing the collected data to characterise the quantum device, since modulo certain loopholes, there exist certain input-output statistics that can only be obtained if the device truly relies on quantum processes. Observing such a quantum signature therefore serves as a certificate that the underlying process in the device is truly quantum. In turn, one can also certify that the outcomes of the device contain some private randomness. Note that with this approach, the user does not assume that the device is quantum, but instead verifies this from the responses (outputs) of the quantum device. Moreover, the verification does not rely on modelling precisely the internal functioning of the device, which is rather treated as a black box. This approach may be referred to as device-independent certification. Contrary to a standard RNG, device independent implementations allow for unavoidable imperfections in the quantum device, which may even have been build by an adversary.

The third and last part of the protocol involves extracting the private randomness that has been certified based on the outcomes of the quantum device; this is performed by a classical computer. The outcomes from the quantum device, which are only partially private and random, are then processed by algorithms (referred to as an extractor) on the classical computer together with a fresh string from the imperfect RNG in order to transform these partially random and private strings into an output that is provably (near) perfect.

It is noted that the concept of randomness occurs in numerous disciplines. In the present context, the most stringent definition is adopted—randomness for cryptography. Randomness in a cryptographic setting means unpredictability of the generated outcomes to any external observer (adversary). Unpredictability involves two concepts, uniformity and privacy. Thus, even if used in a safe environment protected from the outside, a device generating a predetermined sequence of numbers would not make a good RNG. The same applies to random numbers that are only unpredictable before they are generated but are then known to an adversary once generated. In both cases, the numbers are not suited for cryptographic use. Random numbers that are useful for cryptography, because of these strong requirements, can also be used in all other applications, e.g. mathematical simulations, computations, gambling, etc.

As a security criterion that is also quantum proof, we therefore ask that:

$$\frac{1}{2}\left\|\rho_{UE} - \mathbb{1}_U \otimes \rho_E\right\|_1 \le \varepsilon_{sec} \tag{1}$$

in which $\mathbb{1}_U$ denote the (normalised) identity state on the user's side, from which the final output of the protocol is obtained, and $\|\cdot\|_1$ is the trace distance. Condition (1) reflects the requirement that the adversary's system E is uncorrelated to the system U held by the user and that the state of the user also is the uniform one, i.e. having privacy and randomness as discussed above. The security parameter $\varepsilon_{sec} \in [0, 1]$ quantifies how indistinguishable the actual state $\rho_{UE}$ is to the ideal one—$\mathbb{1}_U \otimes \rho_E$—even to an adversary possessing information H and Q about the devices—and is a very small number. Note that the adversary is only assumed to respect the laws of quantum physics and is otherwise unbounded—the adversary may, for example, possess a powerful quantum computer. Note also that this security definition is composable ([16]), which means that the generated random numbers can safely be used in another protocol without comprising their security.

The first building block of the protocol is the imperfect random number generator (RNG), which outputs sequentially, i.e. output bits $r_i \in \{0, 1\}$ with $t(r_i) < t(r_{i+1})$ representing the time at which each bit is generated. Note however that the bits are not assumed to be perfectly random and/or private. The starting assumption is that each bit is only somewhat random, conditioned on the previously generated bits and/or on information H an external observer has about the RNG device. The quality of such an imperfect RNG is quantified by the parameter $\varepsilon_{SV}$ such that:

$$\frac{1}{2} - \varepsilon_{SV} \le p(r_i \mid \vec{r}_{i-1}, H) \le \frac{1}{2} + \varepsilon_{SV} \forall i \tag{2}$$

where $\vec{r}_{i-1} = (r_{i-1}, r_{i-2}, \ldots, r_1)$ are all the bits that were previously generated and $p(r_i \mid \vec{r}_{i-1}, H)$ denotes the probability of guessing bit $r_i$ conditioned on the history H and the previously generated bits. Such a source of randomness is also called a Santha-Vazirani (SV) source in the literature. A known result [4] is that it is impossible to amplify such an SV source without additional assumptions—that is, it is impossible to process the outcomes of the SV source with $\varepsilon_{SV} > 0$ into an output string with $\varepsilon' < \varepsilon_{SV}$. However, the inability to amplify a single imperfect RNG changes when using quantum resources.

Additionally, the SV source is not assumed to be private. A public source of randomness is one that not perfectly predictable before the numbers are generated, but once generated these are possibly known to anyone. Such numbers are not useful for cryptography. A protocol for randomness and privacy amplification processes the outcomes of a public and imperfect RNG with parameter $\varepsilon_{SV} > 0$ into a final output that is provably (near) perfectly random and private, i.e. with $\varepsilon_{SEC} \to 0$. For this an additional quantum device (such as quantum computer 3200) is utilised, as illustrated in FIG. 35.

Figure 35:
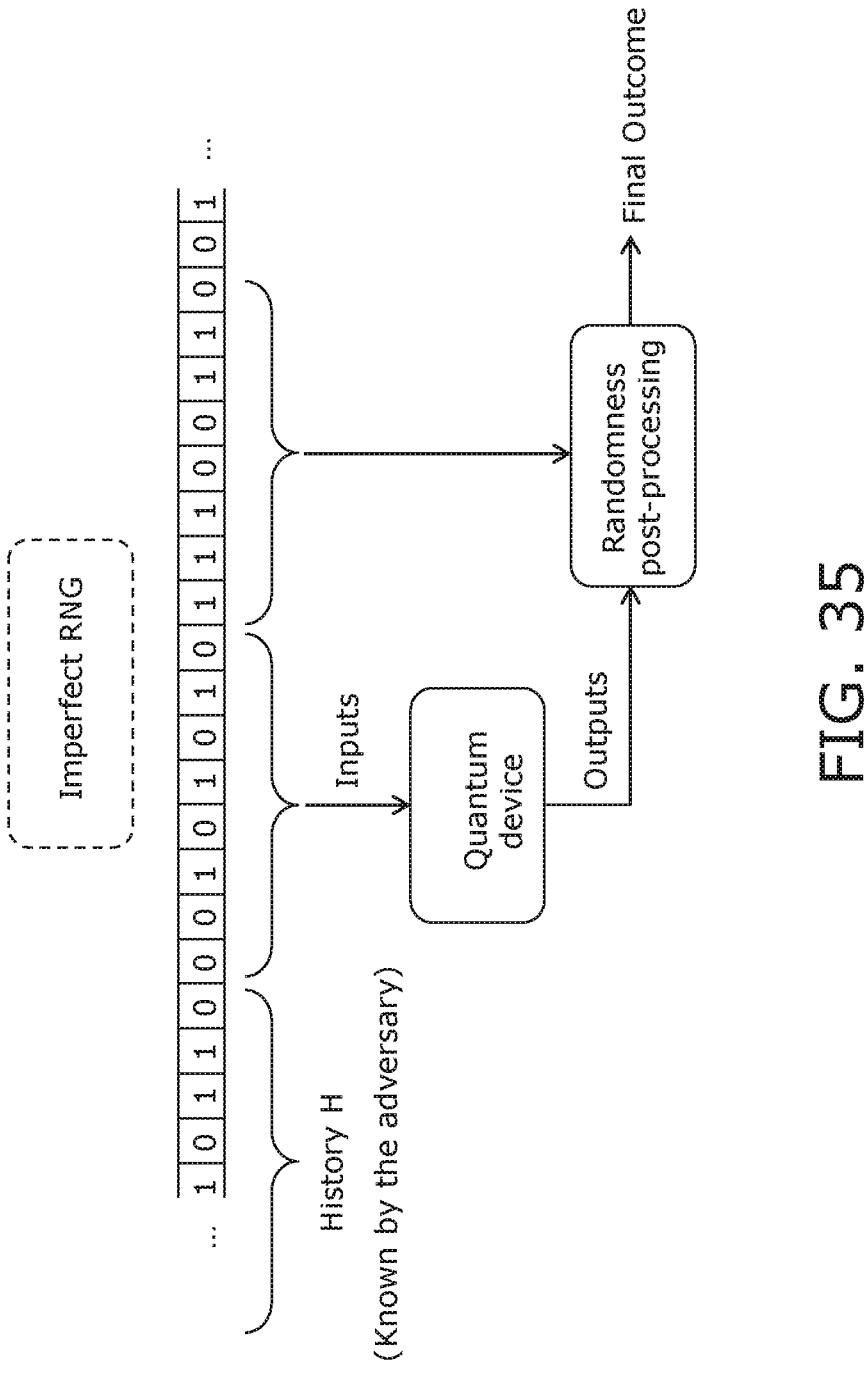
FIG. 35 is a schematic illustration of the use of the output of the WSR during the ARQ ("Applied Randomness using Quantum") protocol as disclosed herein.

In FIG. 35, there is shown an illustration of a randomness and privacy amplification protocol, in which the imperfect RNG is used twice: firstly to generate the inputs to drive the quantum device and then, secondly, as input to the randomness extractors. In general, it is assumed that an external adversary had access to the imperfect RNG prior to the beginning of the protocol and hence holds information H about it (see FIG. 34). The quantum device might have been constructed using that information.

The quantum device represents the central building block of a device-independent randomness amplification protocol, together with the certification process associated with it. The quantum device can be considered as having three parts that are shielded from one another or separated so that communication is impossible between them during an interaction round (see FIG. 36). The three parts are labelled A, B and C and these are seen as black boxes; their internal functioning is not known. The protocol involves interacting with these three boxes in order to verify that true quantum nature by making their outcomes exhibit correlations that can only be achieved with quantum resources. To do so, the verifier (user) sends inputs to the black boxes which generate outputs. The inputs to the three boxes A, B, C are labelled, respectively x, y, z and the generated outputs of each box are labelled a, b, c respectively. In an example setup, all variables are bits, i.e. x, y, z, a, b, c $\in \{0, 1\}$. After many rounds of such interactions with the three boxes, one can estimate the joint conditional probability distribution:

$$\vec{P}_{obs} \equiv \{p(abc|xyz)\}_{x,y,z}^{a,b,c} \tag{3}$$

which is also called the observed behaviour of the device. In the device-independent approach of the protocol, all analysis is performed working on the observed behaviour $\vec{P}_{obs}$, without any description of the internal functioning of the boxes A, B, C. The quantum device is therefore constructed to produce outputs which prove to a subsequent verification or test stage (such as Bell tester 3124 in FIG. 29) that the operation does indeed rely on a quantum process. This verification is performed by evaluating a Bell inequality. An ideal implementation would be loophole free in order to eliminate any possibility of tricking the verification process.

Figure 36:
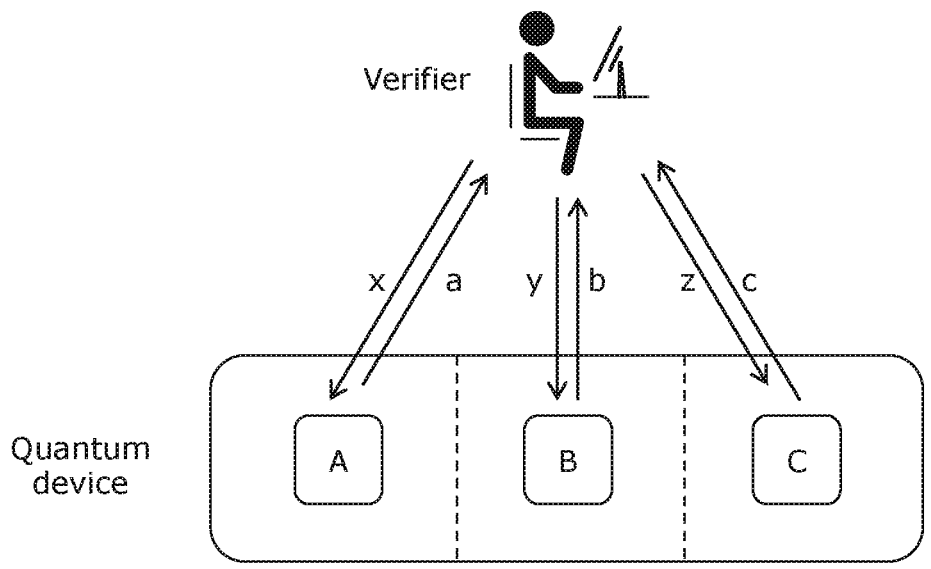
FIG. 36 is a schematic illustration of a user confirming and quantifying quantum behaviour by a quantum device as disclosed herein.

As show in FIG. 36, the verifier (user) makes rounds of interactions with the quantum device in order to analyse the behaviour of the quantum device. The quantum device is made of three separate parts A, B, C that are kept from communication with each other during each interaction round (as indicated by the dashed lines in FIG. 36). In each round, each of the three parts of the quantum device is driven with a fresh input (x, y, z respectively) and generates an output (a, b, c respectively) which is recorded. After sufficiently many rounds, one can build a faithful statistical model of the input-output distribution: $\vec{P}_{obs} \equiv \{p(abc|xyz)\}_{x,y,z}{}^{a,b,c}$ of the three parts—termed its behaviour. The behaviour is then analysed to certify the randomness in the outcomes of the quantum device.

In one example, the Bell test is performed using the Mermin inequality [17], namely:

$$M_{obs} \equiv M(\vec{P}_{obs}) = \langle A_0 B_1 C_1 \rangle + \langle A_1 B_0 C_1 \rangle + \langle A_1 B_1 C_0 \rangle - \langle A_0 B_0 C_0 \rangle \le 2 \quad (4)$$

where $$\langle A_x B_y C_z \rangle \equiv \sum_{a,b,c=0,1} (p(a \oplus b \oplus c = 0|xyz) - p(a \oplus b \oplus c = 1|xyz))$$

and $\oplus$ denotes the sum modulo 2.

The violation of the Mermin inequality $M_{obs} > 2$ is only possible when the three boxes share quantum systems in an entangled state on which measurements are performed. This therefore certifies the true quantum nature of the quantum device from the observed statistics, and this provides the device-independent properties of the present protocol. The advantage of using the Mermin inequality [4] for this test is that an ideal, noiseless quantum device can reach the algebraic maximum M=4, which allows the amplification of a somewhat random imperfect RNG with $\varepsilon_{SV} > 0$. This property allows the present protocol to amplify the full range $\varepsilon \in [0, \frac{1}{2}[$ to generate perfect randomness from any imperfect RNG which is not completely deterministic, i.e. $\varepsilon_{SEC} < \frac{1}{2}$.

In turn, from the violation of the Bell inequality, it is also possible to bound the predictive power that any external observer has about the outcomes of the boxes. This predictive power is formalised by the maximum guessing probability: $P_g(g=(ab)|x, y, z, Q)$ that an external observer manages to guess $g=(a,b)$ the outcomes a and b—even if holding quantum information Q about it (see FIG. 34). Note that this guessing probability only concerns the outcomes of the quantum device and is different from the security of the final outcomes of the protocol as per Equation 1 above. In the protocol, greater randomness is generated from two out of the three available outcomes, and the third outcome (c) is used to build the behaviour of the boxes only.

In [18], it was shown that for an observed value $M_{obs}$ $$(5)$$

$$P_g(M_{obs}) \equiv P_g(g = (ab)|x, y, z, Q) =$$

$$\begin{cases} \frac{3}{4} - \frac{M}{8} + \sqrt{3}\sqrt{\frac{M}{8}\left(\frac{1}{2} - \frac{M}{8}\right)} & \text{if } M \ge 3 \\ \frac{3}{2} - \frac{M}{4} & \text{if } 2 < M \le 3 \end{cases}$$

Note that Equation 5 above holds for all input triplets (x, y, z).

So far it has been implicitly assumed that the inputs (x, y, z) were chosen perfectly at random. This is not the case if one only has access to an imperfect RNG, which moreover might be corrected to the quantum device through the adversary information H and Q. Following the techniques of [10], the observed Mermin value $M_{obs}$ based on using an imperfect RNG can be compared with $M_U$, namely what would have been obtained using a perfect RNG, The result is that one can use the following bound on the value for the Mermin inequality, accounting both for the effect of an imperfect randomness RNG of quality and $\varepsilon_{SV}$ finite statistical effects:

$$M_U \ge 4 - \frac{4 - M_{obs} + \Delta_f}{8\left(\frac{1}{2} - \varepsilon_{SV}\right)^3}. \quad (6)$$

where $\Delta f$ is the width of the statistical confidence interval for the estimation test, i.e. the term accounting for finite statistics.

The previous section explained how the outputs of the quantum device could be certified to contain some randomness and privacy. In this subsection, it is evaluated how such partial randomness accumulates through multiple rounds of the data collection process.

a) identically and independent distributed rounds. In the case that the different rounds of interaction with the quantum device can be assumed to be independent and identical (the so-called IID assumption), then the probability $P_g(g=(a^n, b^n)|M_U, H, Q)$ of guessing the outcomes $(a^n, b^n)$ generated by n uses of the quantum device is simply the product of guessing the probabilities $P_g(g=(ab)|M_U, H, Q)$ as per Equation 5 of the outcomes generated at each round.

$$p_Q{}^{IID}|n| \equiv P_g(g=(a^n b^n)|M_U, H, Q) = (P_g(g=(ab)|M_U, H, Q))^n. \quad (7)$$

b) accounting for memory based quantum attacks (MBQA). In the most general case, the adversary is allowed what we call memory-based quantum attacks (MBQA). Indeed, assuming that a device built by an adversary behaves identically and independently each round might be a significant assumption. To generalize the results to MBQA, we apply techniques using the entropy accumulation theorem in a cryptographic setting as developed in [19, 20] to the Mermin inequality and the guessing probability described above—see [15] for more details.

The final result is that the guessing probability $P_g(g=(a^n, b^n)|H, Q)$ in n uses of the quantum device is upper bounded as:

$$p_Q[n] \equiv P_g(g=(a^n b^n)|H, Q) \le 2^{-nt + v\sqrt{n}} \quad (8)$$

where v and t are related to the single round guessing probability (as per Equation 5) and other parameters. This guessing probability can be understood as one that would be obtained assuming IID rounds (as per Equation 7) (giving $2^{-nt}$), but with a penalty multiplicative term $2^{v\sqrt{n}}$ accounting for the most general attacks by the adversary and memory effects in the device. These results are optimized for the setup of the present protocol, see [20] for more details.

Whenever the verification has been successful, a last step of the protocol is to turn the raw string of numbers that are hard to guess into bits that are indistinguishable from random numbers by any physical means. This is achieved by post-processing with a randomness extractor (from the theory of pseudo-randomness in theoretical computer science [21]). Randomness extractors are generally polynomial time classical algorithms which take multiple sources of weakly random numbers and turn them into a shorter string of information-theoretically secure random bits (see [22, [23]). Consequently, this post-processing step can be performed without further use of any quantum hardware.

For the present application, randomness extractors are employed that are secure against potential attacks from quantum adversaries, i.e. malicious third parties that have quantum technologies at hand to allow them to store information in a quantum memory [24]. Not all randomness constructions fulfil this string security requirement [25] and for that reason the present approach is based on a quantum-secure Markov chain framework developed in [26]. This allows the building of a secure randomness extractor even in the presence of a quantum adversary. For full technical details about the randomness post-processing described herein, reference is made to [15].

Figure 37:
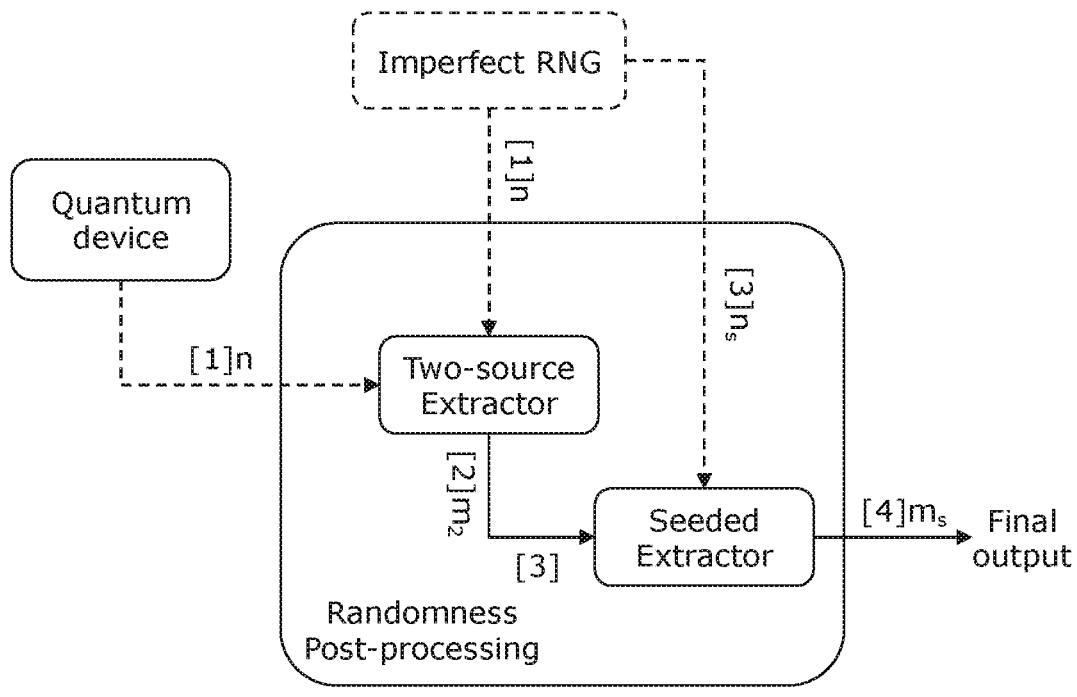
FIG. 37 is schematic illustrations of an implementation of the flow of randomness processing performed by a classical computer as disclosed herein.

In FIG. 37, there is shown an illustration in more detail of the post-processing flow (corresponding to Box 5 in FIG. 34) to produce randomness (but not yet privacy) amplification. All steps in this processing are performed on a classical computer:

1) the outcomes of the quantum device together with a string of numbers from the imperfect RNG are processing by a two-source extractor. The two incoming bit strings are only somewhat hard to guess but not perfectly random in an information-theoretic sense— indicated by the dashed lines.

2) the two-source randomness extractor transforms the two input string into a string of physically secure random numbers, as indicated by the solid line.

3) the generated string of physically secure random numbers together with a string of numbers from the imperfect RNG are processed by a seeded randomness extractor.

4) the seeded randomness extractor outputs an extended, final string of physically secure random numbers.

Figure 38:
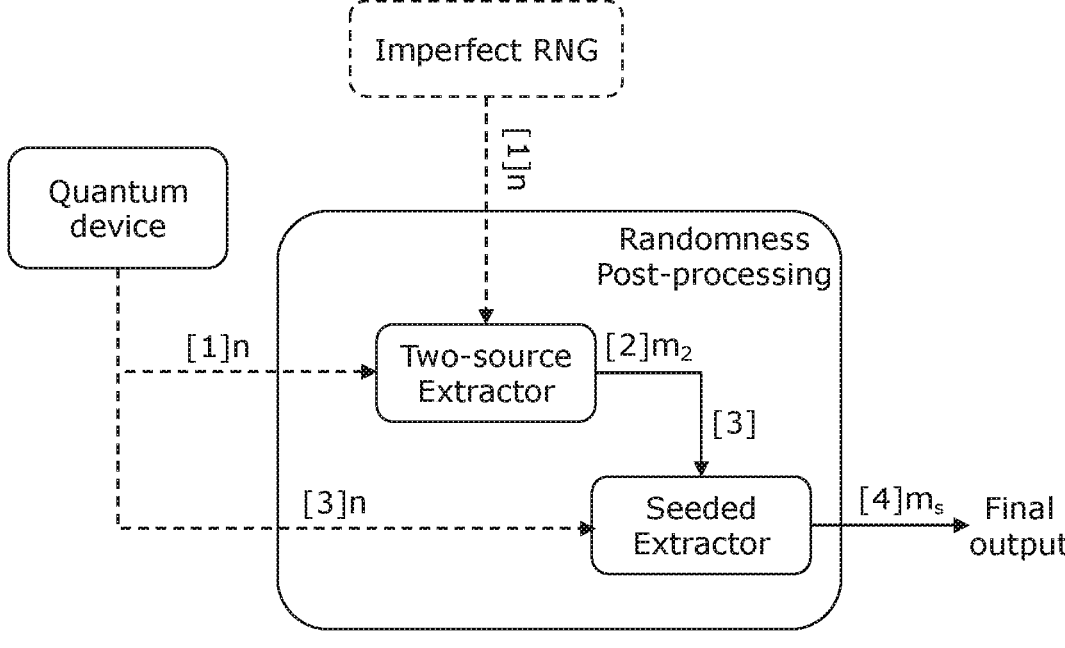
FIG. 38 is a schematic illustration of an implementation of the flow of randomness processing and privatisation performed by a classical computer as disclosed herein.

Two slightly different tasks can be distinguished from one another:

a) randomness amplification from private, imperfect RNGs as depicted in FIG. 37.

b) randomness and privacy amplification from public, imperfect RNGs as depicted in FIG. 38.

For both tasks, the theoretical approach set out in [10] has been followed, together with the statistical analysis from [13].

For randomness amplification as in FIG. 37, the imperfect RNG is assumed to be private. Firstly, the outcomes of the quantum device together with an additional string of bits from the imperfect RNG are fed into a two-source randomness extractor. Secondly, the resulting short string of near-perfect private and random bits is extended by means of a seeded randomness extractor using the bits from the imperfect RNG. For randomness and privacy amplification as in FIG. 38, the RNG is no longer assumed to be private. The first step of the protocol is identical, but for the second step the resulting string of near perfect private and random bits is extended by employing a seeded randomness extractor that uses the outcomes of the quantum device.

In FIG. 38, there is shown the randomness post-processing (Box 5 in FIG. 1) for randomness and privacy amplification. All steps are performed on a classical computer as follows:

[1], [2] and [4]—same as described above for the randomness amplification of FIG. 37.

[3] the outcomes of the quantum device, together with the generated string of physically secure random numbers, are processed by a seeded randomness extractor.

For a software implementation of this processing, it is important to use procedures that can be efficiently implemented. In particular, appropriate security parameters for realistic quantum hardware suggest a need for input blocks of at least approximately $n \approx 10^7$ bits in order to achieve a non-zero output size [15]. In such a situation, for the post-processing to be done on a standard laptop computer, an algorithm of linear runtime (or close thereto) is highly desirable. Importantly, the complexity of some theoretically available randomness extractor schemes have been improved from a generic polynomial dependence to a quasi-linear time $O(n \log (n))$ (for input size n).

Explicit implementations of these algorithms based on Number Theoretic Transforms (NTT) [27] are provided. In contrast to alternative schemes based on the fast Fourier transform (FFT) [see [28, appendix C], the NTT has the advantage of being information-theoretically secure and therefore preventing potential attacks stemming from rounding issues related to the finite implementation of an FFT.

The software implementation of these randomness extractors reaches rates of the order of several Mbits/sec using a standard laptop machine with input blocks of $n \approx 10^7$ bits, and lengths of up to the order of $n \approx 10^9$ bits have been successfully processed on such a machine.

As mentioned above, an imperfect RNG can be modeled as a Santha-Vazirani source with parameter $\varepsilon_{SV} > 0$. Hence any n raw bits generated by the imperfect RNG can be guessed by an adversary with a probability $p_{SV}[n]$ which is at most:

$$p_{SV}[n] \leq 2^{-n \cdot \log(1/2 + \varepsilon_{SV})^{-1}}. \tag{9}$$

(where logarithms herein are always taken in base 2). Thus, the probability of guessing an n-bit string generated by an SV source decreases exponentially with n.

One two-source extractor utilized herein is a Dodis type of extractor [see 29] and the implementation employs near optimal cyclic shift matrices for the construction [29, section 3.2]. For two n-bit input sources with a guessing probability of $p_{SV}[n]$ and $p_Q[n]$ respectively, the constructed two-source extractor is secure against a quantum adversary and has output size:

$$m_2[n] = \frac{1}{5}\left(\left(-\log(p_{SV}[n] \cdot p_Q[n]) - \log\frac{1}{\epsilon_{sec}^8} + 10 - 4\log 3\right) - n\right), \tag{10}$$

where $\varepsilon_{SEC} > 0$ denotes the security parameter of the output string. That is, for sufficiently large block sizes n, this extractor produces nearly perfect randomness approximately when the sources satisfy the following quality:

$$p_{SV}[n] \cdot p_Q[n] \lesssim 2^{-n \cdot c} \text{ for some constant } c > 1. \tag{11}$$

Further details can be obtained from [15].

By way of example, in the statistical analysis there are the following guessing probabilities:

$$p_{SV}[n] \leq 2^{-n \cdot c_{SV}} \text{ and } p_Q[n] \leq 2^{-n \cdot c_Q} \text{ with constants } c_{SV},$$
$$c_Q > 0 \tag{12}$$

It is assumed that an output string of perfectly random numbers has a size (length) of approximately the following:

$$m_2[n] \approx \frac{c_{SV} + c_Q - 1 - \xi}{5} \cdot n. \tag{13}$$

with $\xi > 0$ a free parameter relating the output size $m_2[n]$ to the security parameter of the extractor: $\varepsilon_{sec}[n] \approx 2^{-\xi \cdot n/8}$. For example, an observed Bell value $M_{obs} = 3.35$ gives $c_Q \approx 0.22$ and when combining this with an imperfect RNG of quality $\varepsilon_{SV} = 0.036$ ($C_{SV} = 0.9$) we find for the linear output rate:

$$m_2[n] \approx \frac{0.9 + 0.22}{5} \cdot 2n = 0.05 \cdot n. \tag{14}$$

A significant technical step for the implementation of a Dodis extractor is efficient finite field multiplication in the binary Galois field GF $[2^n]$. For this, the scheme proposed in [28, Appendix D] may be employed; this is based on the efficient algebra of circulant matrices via the NTT, resulting in the quasi-linear complexity O(n log(n)) for certain input sizes n. Even though this comes at the cost of some polynomial time pre-processing based on prime testing, this additional one-time step runs immediately in practice for the relevant range of parameters (see [15] for further details.

The second two-source extractor provided herein is based on [28] that is known to be secure against quantum adversaries [28, Section III.D]. Some of the concepts of [28] were developed for quantum key distribution networks, but can be adapted to the present context. In particular, for an ns-bit input source with a guessing probability $p[n_s]$ and a seed of $m_2 = n_s - m_s$ bits of perfect randomness, the output size is:

$$m_S[n_S] = -\log p[n_S] - 2\log\frac{1}{\varepsilon_{sec}} - \log\left\lceil\frac{n_S - d_S}{m_2}\right\rceil, \tag{15}$$

where $\varepsilon_{sec} > 0$ denotes the security parameter of the output string. This leads to linear output rates as long as there is a guess probability:

$$p_S[n] \le 2^{-n \cdot c} \text{ for some } c > 0. \tag{16}$$

Here, the input source of quality $p_s[n]$ may come either from the imperfect RNG or from the quantum device, i.e. depending on the application: $p_S[n] \in \{p_{SV}[n], p_Q[n]\}$ (see [28] for further details].

By way of example, for a source we choose:

$$m_S = \alpha \cdot m_2 \text{ for some multiple } \alpha \in N \text{ with } \alpha \le \left\lfloor\frac{1}{1-c}\right\rfloor \tag{17}$$

$$\text{and error } \varepsilon_{sec} \le \sqrt{\alpha - 1} \cdot 2^{-m_2(1+\alpha(c-1))/2}.$$

For example, having c=9/10 leads to $\alpha \le 10$ and for $\alpha = 9$ we get an output size $m_s = 9 \cdot m_2$ with error $\varepsilon \le 10^{-150}$ for the seed size $m_2 = 10^4$.

Following [28], the implementation herein is again based on the efficient algebra of circulant matrices via the NTT leading to quasi-linear complexity O($n_s$ log($n_s$)) for certain input sizes ns (see also [15]).

For both of the randomness extractors utilized herein, linear output rates (m[n]∝n) are obtained, see Equations 13 and 17. This comes from the statistical bounds on the guessing probability decreasing exponentially with the input block size n.

Although the approach described herein is highly efficient, it is not suited to the amplification of arbitrarily weak sources of randomness. In such circumstances, other extractors may be more appropriate. Thus, for the two-source extractor, the approach of [31, Theorem 1] works for sources with lower quality than the Dodis approach of [10]. In theory, this should translate into a higher noise tolerance of the quantum hardware used. In practice, it is found that for two n-bit input sources with a guessing probability of $p_{SV}[n]$ and $p_Q[n]$ respectively, the constructed two-source extractor secure against quantum adversaries has for any $\delta > 0$ with:

$$p_{SV}[n] \le 2^{-n \cdot (1/2+\delta)} \text{ roughly an output size } m_2[n] = \frac{\delta}{18.5} \cdot (-\log p_Q[n]) \tag{18}$$

for a security parameter $\varepsilon_{sec} \le \sqrt[4]{3} \cdot 2^{-1/8} \cdot 2^{-m_2[n]/8}$ of the output string. Note that in principle, this allows for an arbitrarily low value in the guessing probability $p_Q[n]$ of the quantum source (see [15]).

For the seeded extractor, Trevisan-based extractors [30] are known to be quantum-proof and work with exponentially shorter seed sizes $m_2 \approx \log(n_s)$ compared to the Hayashi-Tsumumaru construction with $m_2 = n_s - m_s$. For some settings, this allows in principle the extraction of higher rates of randomness. Unfortunately however, Trevisan-based extractors generally have a cubic runtime O($n^3$) in the input size $n_s$, although optimized implementations of Trevison constructions are available in [33].

In particular, the setting of randomness and privacy amplification (see FIG. 38) employing a noisy quantum device generating outcomes $p_Q \le 2^{-n \cdot c_Q}$ for $c_Q < \frac{1}{2}$, requires a seeded randomness extractor that can extract from such a weak source. This is not the case for the implemented Hayashi-Tsurumaru construction, but can be achieved with an off-the-shelf Trevisan construction from [33].

It is desirable to improve further on the parameters of the implemented randomness extractors. For the two-source extractor, Raz's construction is (on paper) outperformed by a two-source extractor from [23], but the practical efficiency may be different. This extension might allow the use of arbitrarily low quality SV sources. For the seeded extractor, it would be good to show that current constructions are secure against quantum adversaries, see [34] for an overview.

We now consider results that can be obtained with the protocol implemented herein. An important measure is the overall efficiency of the protocol $$\eta = \frac{m_2}{n},$$

i.e. the total output size of the protocol $m_2$ divided by the total number of rounds n. The results are given at the output of the two-source extractor based on [29], which can be further expand by means of a seeded extractor. The generation rates of an implementation will then by the product of the repetition rate of the quantum device with the efficiency of the protocol. This efficiency is plotted in FIGS. 39 and 41 for other different parameters. The range of parameters $\varepsilon_{sv}$ of the imperfect RNG that can be amplified is also shown in FIG. 8, also for different sets of parameters and assumptions.

Figure 40:
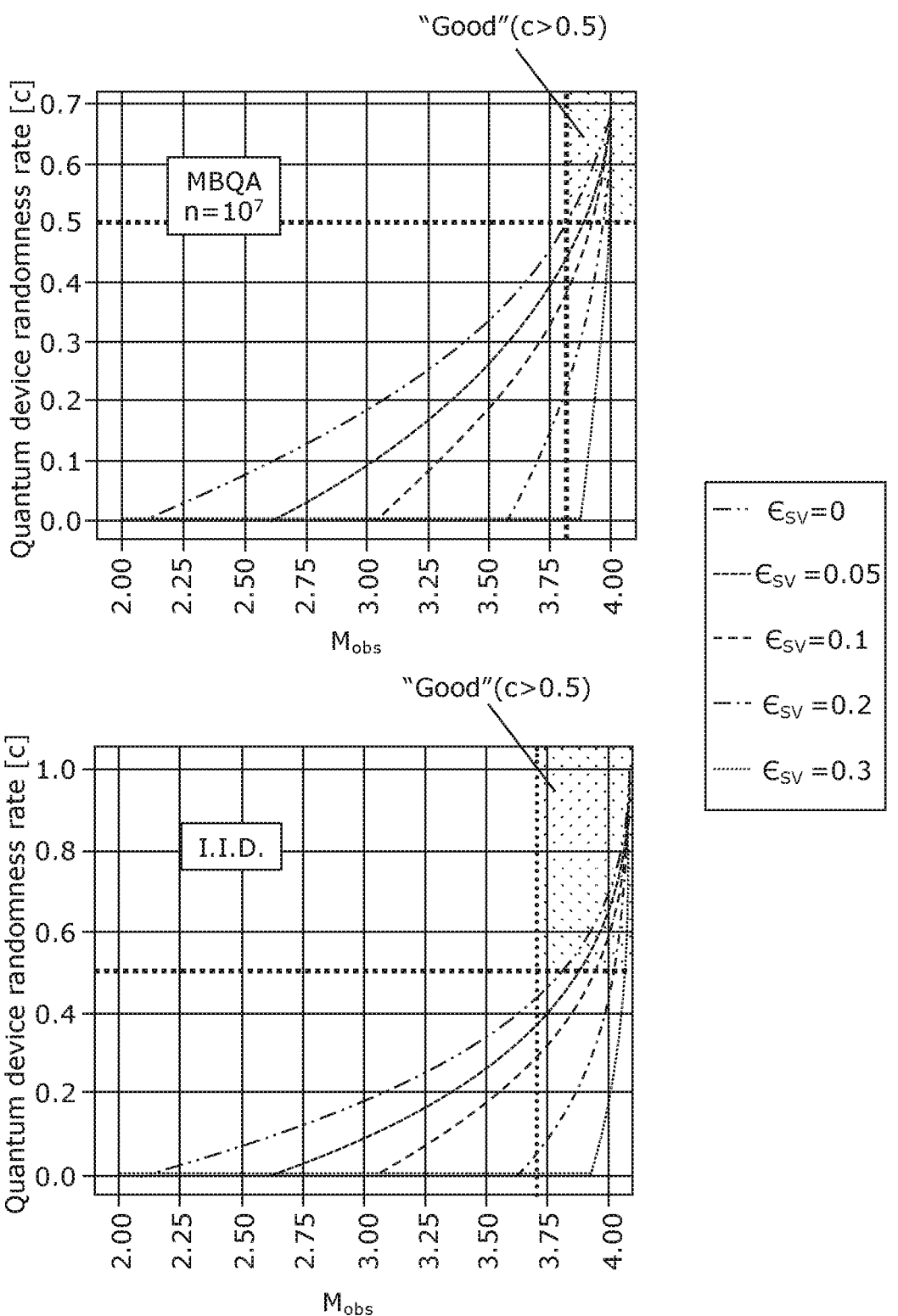
FIG. 40 is a plot showing the randomness rates per bit of the outputs of the quantum device as a function of the Bell (Mermin) value as disclosed herein.

FIG. 40 shows the randomness of the outcomes of the quantum device in function of the observed Mermin value $M_{obs}$ for different values of $\varepsilon_{sv}$.

All the results are given for the task of randomness and privacy amplification using reasonable choices of parameters relevant for likely applications, e.g. $\varepsilon_{sec} \leq 10^{-7}$. In addition, a plot is provided which described the maximum $\varepsilon_{sv}$ that can be amplified if using our implemented two-source extractor and the one based on [31] (which does not have quasi-linear complexity, but can amplify larger $\varepsilon_{sv}$ (see FIG. 42).

As an example, the maximal violation of the Mermin inequality was in [35] dating back to 2006 with $M_{obs}$=3.57. This already allows the amplification of an imperfect RNG of parameter $\varepsilon_{sv} \leq 0.1$ (i.e. approximately 74% random) with the extractor implemented herein, which is based on [29], and with $\varepsilon_{sv} \leq 0.207$ (i.e. approximately 50% random) with the Raz extractor [31]. Using the extractor implemented herein and $\varepsilon_{sv}$=0.05 (i.e. approximately 86% random), this gives an overall protocol efficiency between $\eta$=6.5% and $\eta$=7.5% depending on the number of rounds and whether the IID assumption is made.

With a good, likely single-purposed, device achieving $M_{obs}$=3.8, one would be able to amplify an imperfect RNG with $\varepsilon_{sv} \leq 0.16$ (i.e. approximately about 60% random) and the extractor implemented herein. The Raz' extractor would sill give $\varepsilon_{sv} \leq 0.207$ as for $M_{obs}$=3.57. With $\varepsilon_{sv}$=0.05, the efficiency of the protocol implemented here in between $\eta$=12.5% and $\eta$=14.5% depending on the number of rounds and whether the IID assumption is made.

Returning now to FIGS. 39 to 42, FIG. 39 is an illustration of a protocol efficiency 1 (final output size per round) of the protocol implemented herein as a function of the number of rounds used by the quantum device with $\varepsilon_{sv}$=0.05 (an imperfect random RNG, approximately 86% random). $M_{obs}$=3.35 is the value obtained from the quantum computer and $M_{obs}$=3.8 corresponds to a 'good', likely single-purposed, non-loophole free implementation which would allow appending the seeded extractor with near linear complexity. The IID lines assume that the rounds are identical and independent, while MBQA represents most general memory based quantum attacks. (For practice relevance, everything relating to FIG. 39 was done with $\varepsilon_{sec} \leq 10^{-7}$ and $\Delta f=10^{-3}$).

FIG. 40 is an illustration of randomness rates per bit of the outputs of the quantum device—i.e. the value c when $p_Q[n] \leq 2^{-n \cdot c}$, the probability of guessing the outcomes—as a function of the observed Bell value $M_{obs}$ for different $\varepsilon_{sv}$. The left-hand plot of FIG. 7 shows identical and independent rounds (IID), and the right-hand plot of FIG. 7 shows MBQA=memory-based quantum attacks with n=10$^7$. The region in which the quantum device becomes 'good' enough ($p_Q \leq 2^{n \cdot c}$ with c>0.5) to applied the implementation described herein of a seeded extractor is high-lighted in blue (i.e. the top-right corner portion in both cases).

Figure 41:
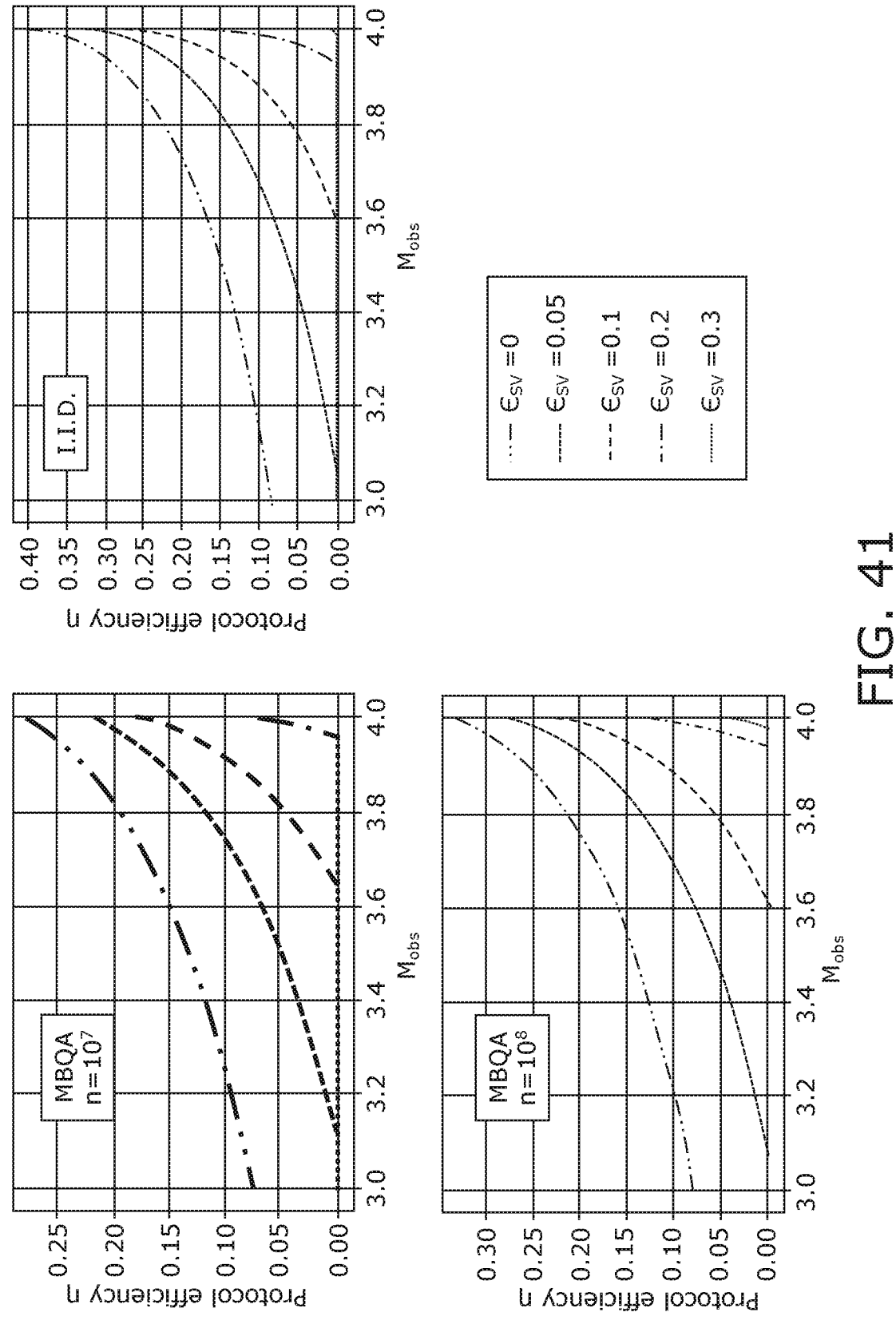
FIG. 41 is a plot showing the variation of protocol efficiency as a function of the Bell (Mermin) value as disclosed herein.

FIG. 41 is an illustration of the protocol efficiency $\eta$ (final output size per round) of the protocol described herein as a function of the observed Bell value $M_{obs}$ for different statistical analysis and different $\varepsilon_{sv}$. MBQA was performed with n=10$^7$ (top left) and with n=10$^8$ (top right). The maximum rate at the output is 0.4 because of the parameters of the two-source extractor.

Figure 42:
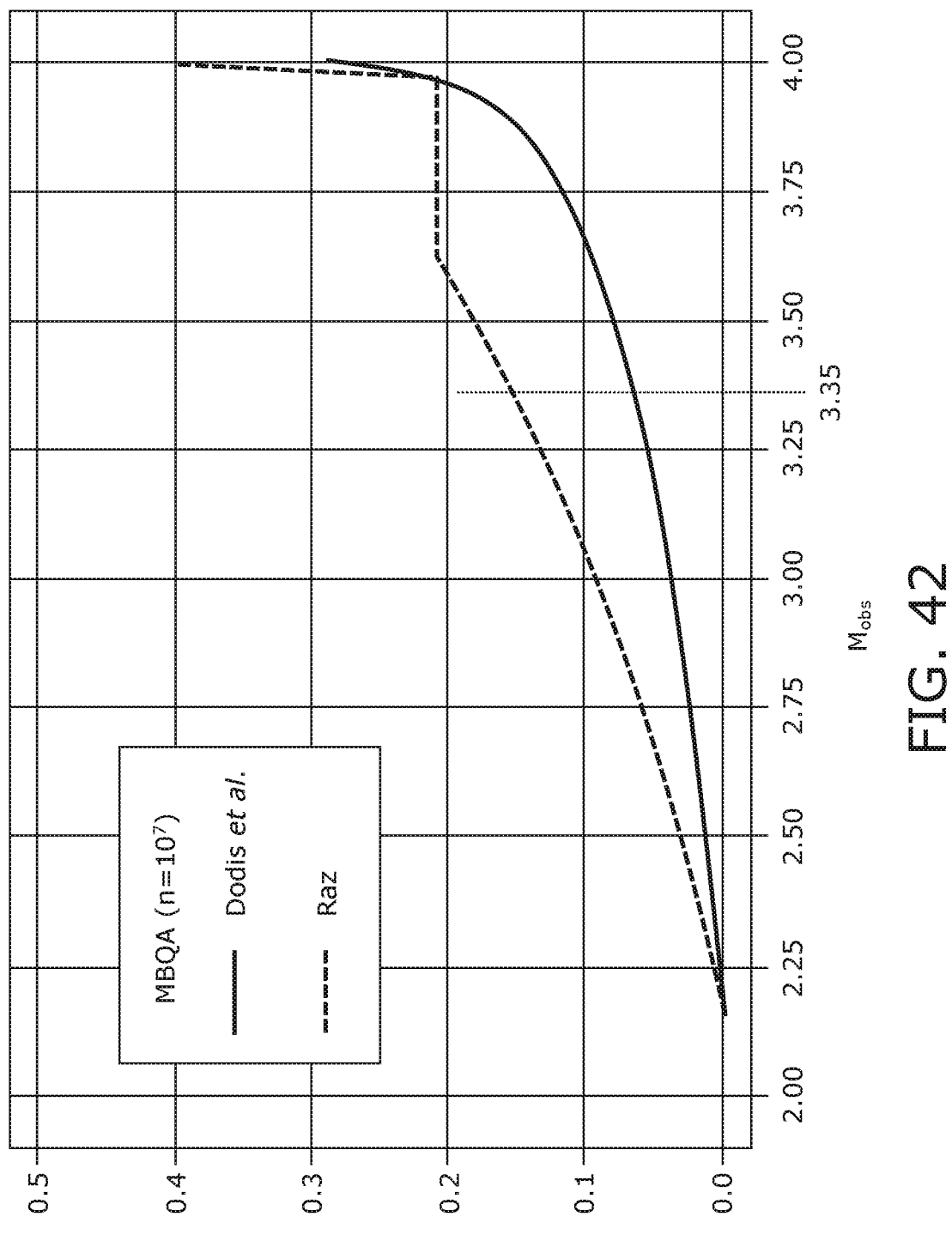
FIG. 42 is a plot showing the minimum entropy that can be amplified using different two-source randomness extractors.

FIG. 42 is an illustration of the maximum $\varepsilon_{sv}$ that can be amplified when using different two-source randomness extractors as a function of the observed Bell value $M_{obs}$. The solid line shows the situation when using the extractor implemented herein with near-linear complexity based on Dodis [29], while the dotted line shows the situation using Raz' construction. In the latter, the plot shows an interesting region in which $\varepsilon_{sv}$ remains constant although the quality of the quantum device improves. This is due to the construction which (roughly) requires $c_1 > \frac{1}{2}$ and $c_2 > 0$ with $c_1 \in \{c_Q, c_{SV}\}$ (remembering that c is defined as $p_Q < 2^{-n \cdot c_Q}$ and $p_{SV} < 2^{-n \cdot c_{SV}}$. Therefore, before roughly $M_{obs}$=3.6, the only constraint on $$\varepsilon_{SV} < 2^{-c_{SV}} - \frac{1}{2}$$

is to allow for non-vanishing rates at the output of the quantum device. Between Mobs=3.6 and Mobs=3.9, the quantum device has non-vanishing rates for $c_{SV} < 0.5$ but is itself too low $c_Q < 0.5$ to be the 'good' source. At around M=3.9 this changes and $c_Q > 0.5$, allowing $c_{SV} < 0.5$ and $\varepsilon_{sv}$ to get larger.

In Table 1 below, there is provided a summary of one example of the protocol as disclosed herein:

TABLE 1

Randomness and privacy amplification protocol

1. Data collection
During n rounds, do:

| | |
|---|---|
| a. | Generate 3 bits x, y, z with the imperfect RNG. |
| b. | Drive the quantum device with settings x, y, z and collect the 3 outcomes bits a, b, c. Save the 6 bits of that round. |

2. Verification

| | |
|---|---|
| a. | Compute the observed behaviour $P_{obs} \equiv \{p(abc \mid xyz)\}_{x, y, z}^{a, b, c}$ and observed Bell value $M_{obs} = M(P_{obs})$ using (4). |
| b. | If $M_{obs}$ is sufficiently high, continue to randomness post-processing, otherwise abort. |

3. Randomness post-processing

| | |
|---|---|
| a. | Collect two out of the three outcomes, say a and b, for each of the n round. |
| b. | This bit string, of size 2n, is sent to a two-source extractor together with a fresh string of 2n bits from the imperfect RNG. |
| c. | The two-source extractor outputs an $m_2$-bit string of physically secure random numbers. |
| d. | (Optional) The $m_2$-bit string is further expanded by sending it to a seeded extractor re-using the string of outcomes from the quantum device. |

An ideal implementation of the ARQ protocol would use a quantum device running a loophole free Bell test, however, such a device is notoriously hard to build and would achieve Bell inequality violations that are not useful in practice. In contrast, there are already available a wide range of usable quantum technologies, including quantum computers which are waiting for real-world applications. Superconducting quantum computers, for example, offer features such as not opening the so-called detection loophole, which is very advantageous in the context of Bell tests.

Under minimal assumptions, today's quantum computers can be trusted to run faithful Bell tests—included the ARQ protocol described herein. This includes (if desired) accounting for some signalling effects, such as cross-talk, in the statistical analysis. At a high level, this amounts to trusting that the quantum computer has not been purposely built to trick the user, but allows for unavoidable imperfections in the implementation. Furthermore, by optimizing the circuit implementation and other parameters to the specific hardware of the quantum computer, the quantum computers from the IBM-Q experience have been able to provide high Bell inequality values, and hence are well-suited to running the protocol described herein.

On more detailed inspection, quantum computers are not built purposely for the task of running Bell tests and in particular open the so-called locality loophole. Indeed, in a superconducting quantum computer, all the qubits are close to one another and in particular cross-talk can occur. In a loophole free implementation, the qubits are separated and the experiment synchronized such that there is no time for possible communications between the different parts of the quantum device during a measurement round. Herein we term possible undesired communication between subparts as signalling, with crosstalk being a particular type of it. To account for signalling in the Bell tests, such undesired effects may be included in the statistical analysis; this implies making an additional assumption about the quantum device.

It is important that the Bell test is run on a device that is trusted to be a quantum device. Although the device might be noisy or mostly uncharacterized, if the Bell test is run, for example on a classical computer simulating a quantum device, there is no way for the user to distinguish it from a fair Bell experiment. Such a simulator would violate the following assumptions, which are that the effect of signalling (such as cross-talk) is random (not tailored to a specific Bell inequality), or is not random but fixed to be the same each time (or is a combination of the two above properties). In practice, a user may be able to check against any violation of the above assumptions, e.g. by visual inspection of a quantum computer, and/or by using a quantum computer available from a trusted (and authenticated) provider.

In order to assess the signalling effects implied by the above assumptions, a worst-case approach is examined to apply the largest hit on the generated randomness that could follow from the assumptions. The signalling effect under the first assumption (randomness) actually increase the amount of generated randomness that can be certified, and hence the worst-case situation is when such signalling does not occur. This is a positive sign that if random forms of cross-talk diminish in quantum computers, the efficiency of the protocol disclosed herein will increase. The signalling effect under the second assumption (fixed) is negative on the amount of randomness that can be certified, but because of its fixed amount this can be quantified and therefore bounded from the observed statistical behaviour of the device. This contribution is then accounted for in a worst-case manner: the Bell value and the number of rounds that can be used for certifying randomness diminish. In the final assumption (both forms of crosstalk, random and fixed), this therefore amounts to taking a hit from fixed signalling alone.

Figure 43:
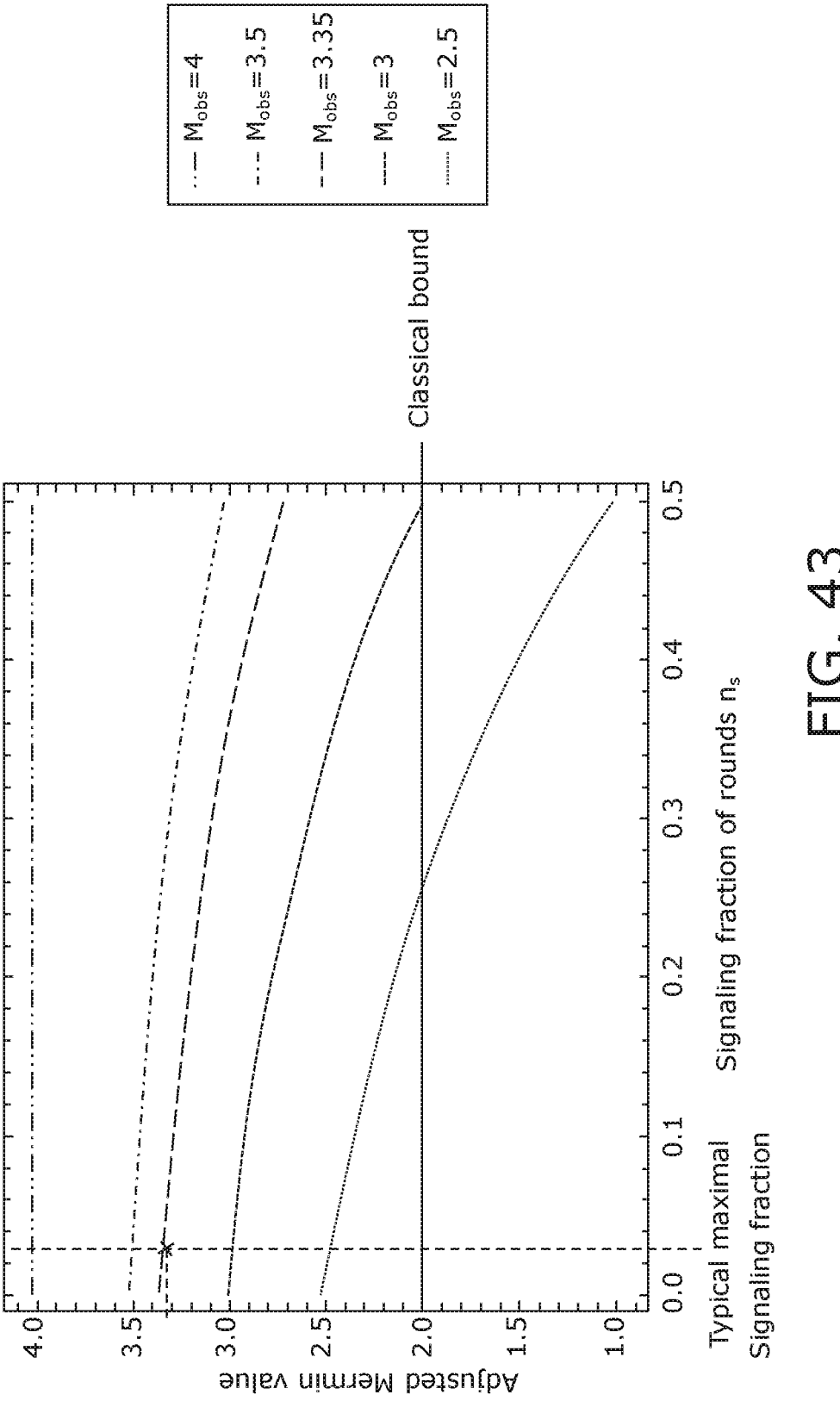
FIG. 43 is a plot showing an adjustment of the Bell value to account for signalling effects as disclosed herein.

Experimental results have been obtained and the hit from signalling in quantum computers is low and, although slightly reducing the efficiency of the protocol (as expected), this does not impact on the capacity of quantum computers to run the protocol disclosed herein. The impact of fixed signalling in a superconducting quantum computer ("Ourense" from the IBM-Q experience) are plotted in FIG. 43, which shows adjusting the Bell value to account for fixed signally effects (as per the second assumption). The green (middle) curve corresponds to the observed Bell inequality value obtained from the Ourense quantum computer. A typical maximum amount of signalling fraction 0.03 ($n_s$) was observed (another IBM-Q quantum computer, "Valencia", was found to have only about half this signalling amount). Quantum randomness can then be certified in a fraction ($1-n_s$) of the rounds, because randomness can only be certified in rounds when no signalling occurs.

The assumptions adopted to obtain these results are reasonable assuming that the quantum device was not built in a malicious way, which is reasonable, especially in the context of devices that are readily available to other users running other quantum algorithms. Accordingly, the approach described herein is able to generate certified randomness using a non-malicious but otherwise mostly uncharacterized quantum device.

In order to use quantum computers to perform the Bell test as per Equation 3, an implementation has been selected with circuits first preparing the so-called Greenberger-Horne, Zeilinger state of three qubits [36]: $|GHZ>=1/\sqrt{2}(|000>+i|111>)$. The prepared state is then measured with the Pauli X or Y measurement on each qubit, depending on the circuit that is chosen. It has been found that these states and measurements allow for a simple circuit implementation that in turn leads to a high Bell inequality violation. The physical qubit and gate implementation of the circuits were then optimized for the quantum computers available on the IBM Q experience using the compiler t|ket [37], and this has allowed high Mermin inequality states to be achieved. All implemented circuits (after optimization) have minimal depth 6, prepare the same quantum state (only the measurements are different) and run on the optimal physical qbits for each machine.

Figure 44:
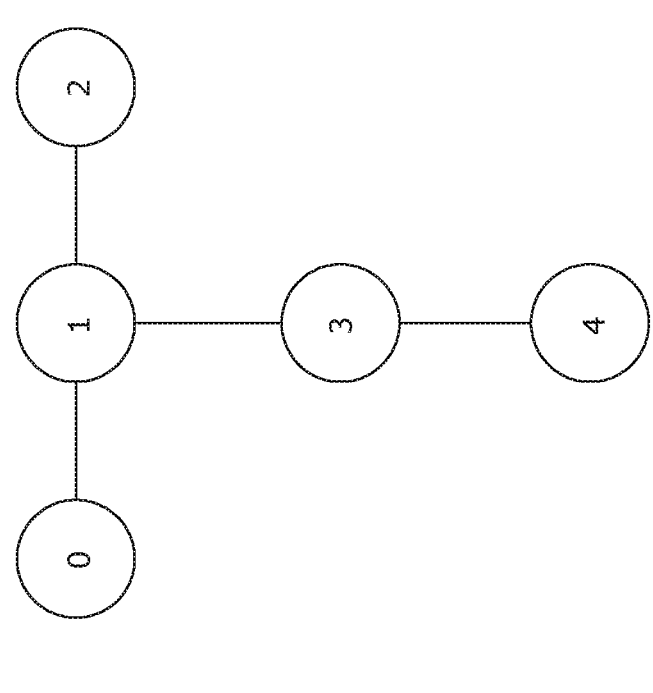
FIG. 44 is a diagram showing a quantum circuit that was implemented on an IBM quantum computer as disclosed herein.
Figure 44:
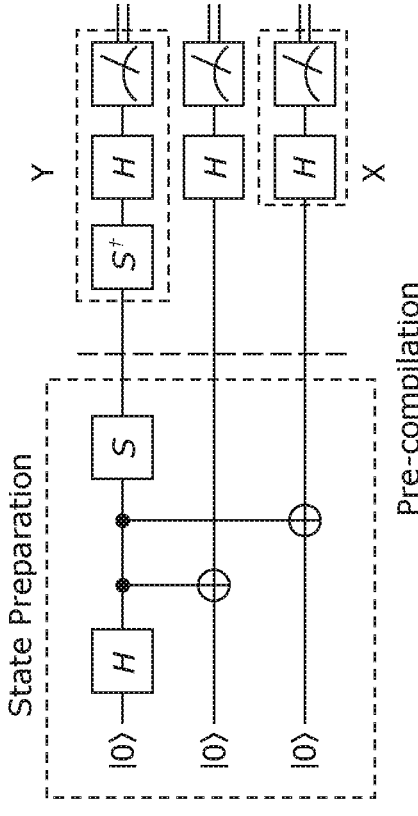
Figure 44:
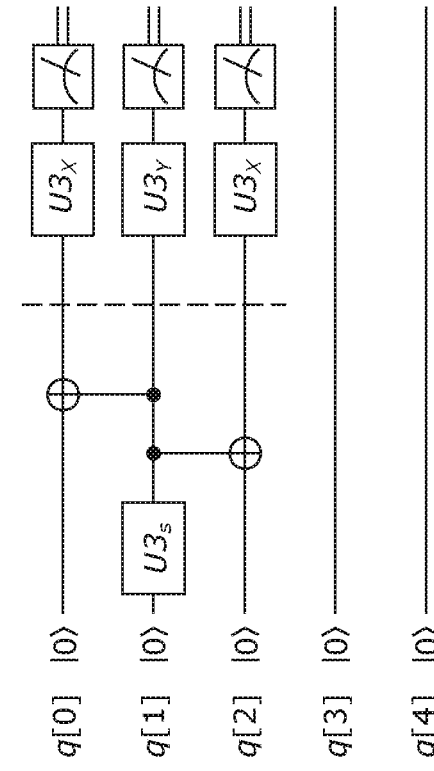

This part of the procedure is illustrated in FIG. 44, the left portion of which shows one circuit before and after optimization. The physical qubit layout of these machines is shown in the right portion of FIG. 44 and it is the same for both machines (Ourense and Valencia). The best physical qubits that were chose for the implementation by t|ket were qbits 0, 1, 2 on both machines.

More particularly, the left portion of FIG. 44 provides an illustration of one of the eight circuits that are implemented on the IBM quantum computers (before and after optimization with t|ket [37]). The state preparation (inside the dashed line box of the pre-optimisation diagram) was fixed to be the same on all circuits, as indicated by the vertical dashed line. The three input bits (x, y, and z) serve to encode the circuit (among 8) implemented and the measurements on this circuit return three output bits (a, b, c). The input-output statistics are tested by evaluating the Mermin inequality as explained above. The right portion of FIG. 44 provides an illustration of the physical layout of the qubits on the IBM quantum computers (Ourense and Valencia as mentioned above). In both machines, the qubits chosen via optimization were qubits 0, 1 and 2.

The highest Mermin value was obtained on Ourense ($M_{obs}=3.35$) and a good value was also found on Valencia ($M_{obs}=3.11$); both of these are 5-qubit machines. Many other machines were also found to give Bell values. The best performing machines tended to be the ones with a lower number of qubits, which helps to minimize the required resources.

TABLE 2

| | | Observed Mermin values and maximum $\varepsilon_{SV}$ on quantum computers | | | | | |
| | $M_{obs}$ | IID & Ext$_1$ (n → ∞) | MBQA & Ext$_1$ (n = $10^7$) | MBQA & Ext$_1$ (n = $10^8$) | IID & Ext$_2$ (n → ∞) | MBQA & Ext$_2$ (n = $10^7$) | MBQA & Ext$_2$ (n = $10^8$) |
|---|---|---|---|---|---|---|---|
| Ourense | 3.35 | 0.073 | 0.067 | 0.071 | 0.156 | 0.149 | 0.134 |
| Valencia | 3.11 | 0.054 | 0.040 | 0.052 | 0.118 | 0.110 | 0.116 |

In Table 2, there is shown the Mermin values that were obtained ($M_{obs}$) and the maximum $\varepsilon_{sv}$ that can be amplified with non-zero rates at the output of the entire protocol using the specified quantum computers Ourense and Valencia. Numerous experiments with large numbers of rounds (typically $n \approx 10^7$) were performed to collect a large quantity of statistics in a reasonable time. The Bell inequality values obtained on the two specified quantum computers are high compared with other values generally available in the literature.

In Table 2, there are shown results with different assumptions, different two-source randomness extractors, and number of rounds ($n=10^7$ or $n=10^8$). The main results are based on 50 experiments of size $10^7$. IID indicates an assumption that the rounds were identical and independent in the statistical analysis; MBQA indicates most general memory based quantum attacks, as described above. $Ext_1$ indicates use of the Dodis [29] extractor implemented as described herein; $Ext_2$ indicates use of Raz' extractor [31]. The values were computer using reasonable parameters for practical implementations, e.g. imposed $\varepsilon_{sec} \leq 10^{-7}$.

In Table 2, there is further shown that the maximum $\varepsilon_{sv}$ values can be amplified using different assumptions and different two-source extractors. These have been computer in order to obtain non-zero rates at the output of the randomness post-processing (without involving a seeded extractor). When running a Bell experiment with $n=10^8$ on the quantum computer Ourense and using the Dodis two-source extractor implemented as disclosed herein, the maximum $\varepsilon_{sv} \leq 0.071$, i.e. a source that is roughly 80% random only (and not private). The protocol described herein can in principle amplify an imperfect RNG with parameter $\varepsilon_{sv} \leq 0.154$, i.e. a source that is roughly 62% random if using the extractor based on Raz' construction [31].

Figure 39:
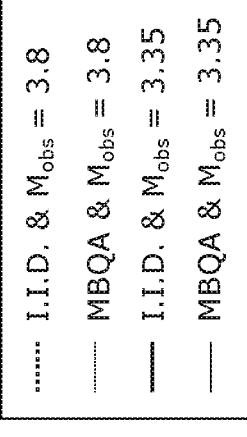
FIG. 39 is a plot showing the variation of protocol efficiency with number of rounds of measurement on a quantum device as disclosed herein.
Figure 39:
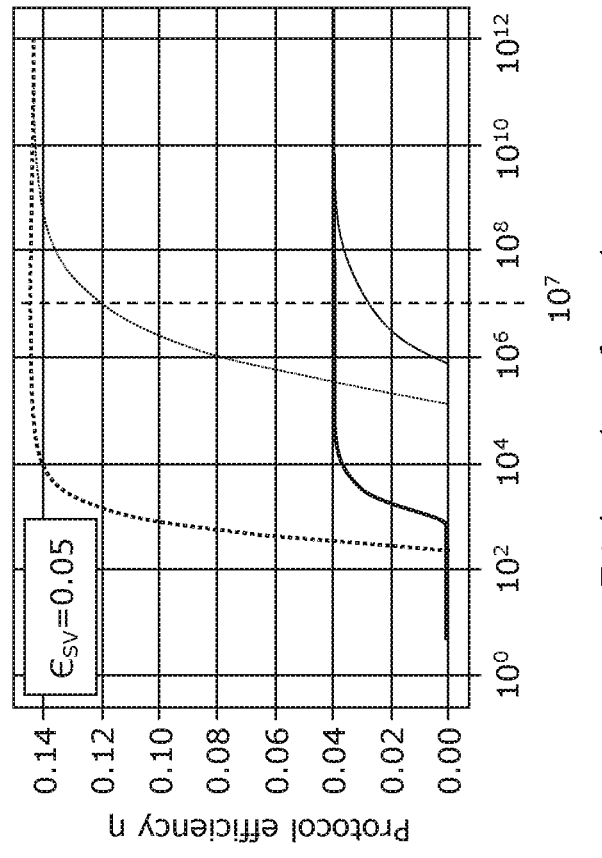
Figure 45:
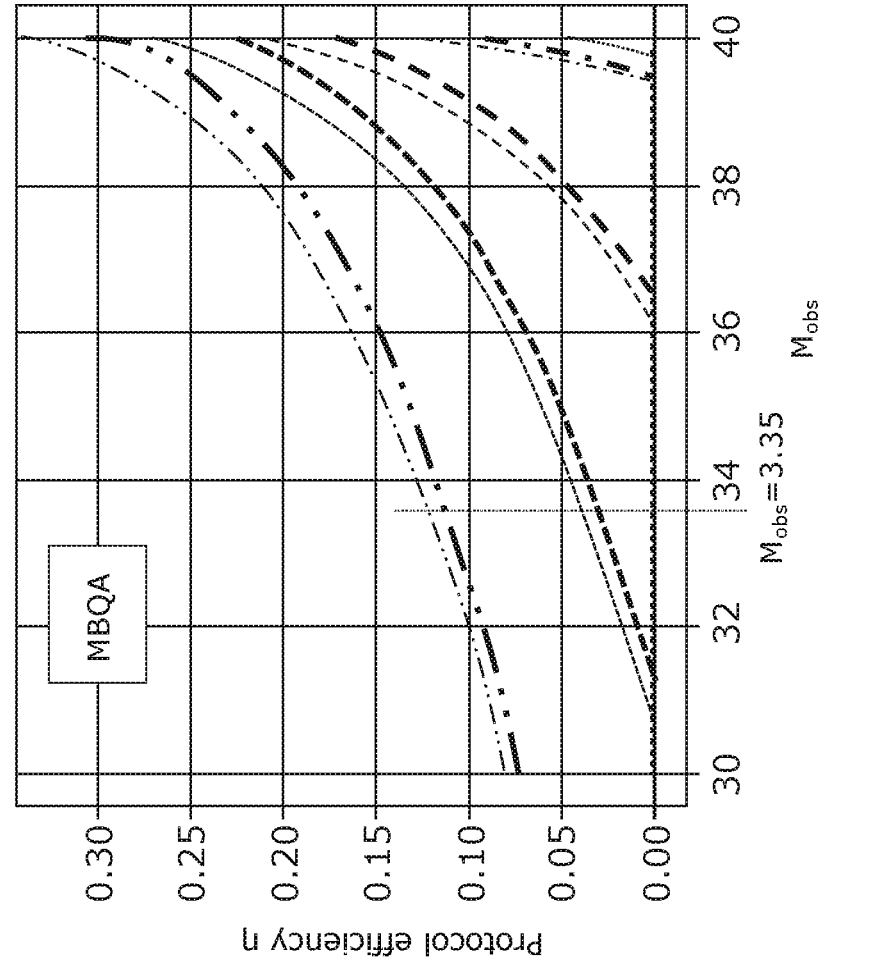
FIG. 45 is a plot showing the variation of protocol efficiency as a function of the Bell (Mermin) value as disclosed herein.

The overall efficiency of the protocol $\eta$—i.e. the final output size of the protocol divided by the total size of the circuits—is plotted in FIG. 45 and is given for the strongest adversary using memory based quantum attacks (MBQA). (The plot in FIG. 39 is an illustration of the difference in efficiency when using the assumption that the rounds of the Bell test are identical and independent (IID) instead). In general terms, the efficiency of the protocol disclosed herein is between 3% and 4% for $\varepsilon_{sv}=0.05$ depending on the assumptions and parameters. For example, for $n=10^7$ circuits on a quantum computer, 3.105 bits of perfect randomness can be obtained, i.e. $\varepsilon_{sec} \leq 10^{-7}$, which is very close to perfectly provide and random. Running instead $n=10^8$ circuits instead, $4 \cdot 10^6$ output bits can be obtained (hence the efficiency is slightly higher).

With reference to FIG. 45, there is shown the protocol efficiency $\eta$ (final output size per round) of the protocol described herein (for the output of the 2-source extractor, not the seeded extractor) when run on the Ourense quantum computer with $M_{obs}=3.35$ and different imperfect randomness biases $\varepsilon_{sv}$. The right-hand table in FIG. 45 keys the results in the case of memory-based quantum attacks (MBQA) for $N=10^7$ (left) and $N=10^8$ (right); with $\varepsilon_{sv}=0.05$, the efficiency is roughly $\eta=3\%$ and $\eta=3.5\%$ for $N=10^7$ and $N=10^8$ respectively; in comparison, $\eta$ can reach 4% as a maximum under the IID assumption (see FIG. 39).

One important quantity is the speed at which the quantum computer can performed different circuits. The generation rates for the protocol described herein are direction proportional to the time taken to run (say) $10^7$ circuits. Currently, the quantum computers of the IBM-Q experience have an artificially fixed repetition rate of $r=2.10^3$ circuits per second, which limits the generation rates for the protocol. In this situation, with an efficiency of the protocol of about $\eta=4\%$ for $M_{obs}=3.35$ on the computer Ourense, this gives an output rate of about $\eta \cdot r=100$ bits per second. Note however that this is not a fundamental limitation. The protocol described herein typically involves performing 3 CNOT gates, which on this type of quantum computer takes roughly $10^{-6}$ seconds. This could in principle take the output rate up to about 50 kbits per second. In addition, one can append a seeded extractor if so desired to increase the overall output rate.

By way of a sanity check, the statistical tests of the NIST [39] and DieHard suites were performed on 5 samples containing 1 Gb of generated randomness from the protocol described herein running on the quantum computers; as expected, these statistical tests were passed well. For this, parameters were chosen that looked particularly beneficial for the generation rate at the cost of reducing its statistical properties, and even in this case the results still passed well, which implies that the results will also have excellent statistical properties for other choices of parameters.

For the tests, a randomness only amplification was performed (not privacy) and in using the randomness generated, the IID assumption was made, together with an assumption on the imperfect RNG, namely $\varepsilon_{sv}=0.0176$ ($c_{sv}=19/20$). The output $m_2$ from the two-source randomness extractor was then further expanded, giving an output 20 times larger (other expansion factors such as $\geq 5$, $\geq 10$, $\geq 20$, $\geq 50$, $\geq 100$, $\geq 200$, $\geq 500$, or $\geq 1000$ might alternatively be adopted). The parameters of the randomness post-processing were set such that the final output had distance to the uniform distribution at most $\varepsilon_{sec} \leq 10^{-30}$.

The imperfect RNG used in the above testing was based on a classical chaotic process from the avalanche effect in a reverse-biased diode which gave good results when tested, but did pass some tests "weakly". When testing the randomness generated at the end of the amplification protocol, there was far less tests that were only passed "weekly"—thereby indicating from a statistical perspective that there was an improvement in the quality of the random numbers being generated.

The ARQ protocol disclosed herein may be ported to other platforms—i.e. different from standard quantum computers. One option is to implement the protocol on ion-traps based devices which are known to have very high fidelities (about 99% for measurements, gates, etc). This will lead to much higher observed Bell inequality violations. These machines also have virtually no cross-talk. Although these devices are notoriously slow, this would still give interesting results, e.g. amplifying a very high $\varepsilon_{sv}$. Another possibility is to port the protocol to a single-purpose photonic device, which is expected to achieve high Mermin values and better repetition rates, which may make it better suited to certain use cases.

It will be appreciated that Appendix A, including the accompanying Figures, has described certain specific implementations, and should not be understood as limiting the overall teachings and scope of the present application.

The present disclosure elucidates many different components in different configurations, examples, and embodiments, such as various quantum devices and various protocols that can be run in conjunction with such quantum devices. It will be appreciated by the skilled person, that many additional combinations of features and components can be readily achieved based on these teachings. For example, while certain protocol implementations may be described in conjunction with certain quantum devices, those protocol implementations can generally run on other quantum devices, and conversely those quantum devices can generally support other protocol implementations. Furthermore, alternatives may be provided for each of various features within an overall implementation, and it will be understood that generally any alternative for a given feature can be combined with any alternative for another feature (unless there are clear reasons preventing such a combination).

As a specific example, any of the protocol implementations described herein might potentially be utilized with any of the on-chip quantum device implementations described herein and/or may use a passive or active specification of measurement bases for measuring quantum states to produce an output bit stream showing quantum behaviour.

The present disclosure elucidates security tests A, B and C. The Bell tester 3124 described herein provides one potential implementation of security test A; other implementations are provided, see for example FIGS. 6, 17, 23. Security test B relates to signalling, such as cross-talk between different outputs (detectors) of a quantum device. In many cases test B may be omitted, for example if the quantum device is designed or measured to have low cross-talk, or by a slight modification of test A (by adjusting the Bell value) that in effect takes into account any signalling. Test C is more restricted in relevance to certain implementations of the quantum device, and can be omitted for many other implementations.

Terminology

It will be understood that photons having the "same frequencies/wavelength", "identical frequencies/wavelength" and "equal frequencies/wavelength" may be used interchangeably to describe a plurality of photons having frequencies that may be different by an amount less than the linewidth or the full width half maximum (FWHM) of the photon source that generates them or feeds the nonlinear medium that generates them.

"Configuration," "design," and "architecture" may be used interchangeably to refer to a specific arrangement of modules and components and/or the specific interconnection among them in a system (e.g., a quantum apparatus of a QRNG).

The term "computer" or "computing-based device" is used herein to refer to any device with processing capability such that it executes instructions. Those skilled in the art will realize that such processing capabilities are incorporated into many different devices and therefore the terms "computer" and "computing-based device" each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible, non-transitory storage medium, e.g., in the form of a computer program comprising computer program code adapted to perform the operations of one or more of the methods described herein when the program is run on a computer and where the computer program may be embodied on a non-transitory computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. No single feature or group of features is necessary or indispensable to every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, blocks, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A; B; C; A and B; A and C; B and C; and A, B, and C. Conjunctive language such as the phrase "at least one of X, Y, and Z," unless specifically stated otherwise, is otherwise understood with the context as used in general to convey that an item, term, etc. may be at least one of X, Y, or Z. Thus, such conjunctive language is not generally intended to imply that certain embodiments require at least one of X, at least one of Y, and at least one of Z to each be present.

The operations of the methods described herein may be carried out in any suitable order, or simultaneously where appropriate. Additionally, individual blocks may be deleted from, combined with other blocks, or rearranged in any of the methods without departing from the scope of the subject matter described herein. Aspects of any of the examples described above may be combined with aspects of any of the other examples described to form further examples without losing the effect sought.

It will be understood that the above description is given by way of example only and that various modifications may be made by those skilled in the art. The above specification, examples, and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

Various example implementations of the invention are set out in the following clauses A to F:

A. An apparatus for generating a random bit string by generating and measuring entangled photons, the apparatus comprising:

a quantum state generator configured to generate entangled photons;

an optical path arrangement configured to couple the entangled photons from the quantum state generator to at least one pair of measuring devices, each measuring device comprising:

a plurality of measurement paths, each measurement path ending with a detector and configured to measure the quantum state of a photon propagating along the measurement path, in a measurement basis, wherein measuring the quantum state of the photon comprises detection of the photon by a detector, wherein the entangled photons are randomly routed to one of the plurality of measurement paths without active switching; and a detector output configured to generate a detector signal when a photon is received by the detector, wherein generation of the detector signal is indicative of collapse of the quantum state of the received photon into the measurement basis associated with the detector;

an electronic processor configured to:

receive a first detector signal from a first detector in a first measuring device corresponding to reception of the first photon by the first detector;

receive a second detector signal from a second detector in a second measuring device corresponding to reception of the second photon by the second detector;

determine that the first detector signal and the second detector signal are coincident when the first detector signal and the second detector signal are received within a coincidence window; and in response to determining that the first detector signal and the second detector signal are coincident, transmit the first detector signal and the second detector signal to a security test system configured to determine a level of violation of a Bell inequality for a plurality of received coincident detector signals; and a two-source extractor configured to receive a plurality of coincident detector signals selected at least partly based on the level of violation of the Bell inequality for the plurality of coincident detector signals, and generate a random bit string.

B. The apparatus of clause A, wherein the entangled photons are partially entangled photons.

C. The apparatus of clause A, wherein the entangled photons are path entangled photons.

D. The apparatus of clause A, wherein the entangled photons comprise a pair of entangled photons having different frequencies.

E. The apparatus of clause A, wherein a weak random string is generated at least partially based on the detector signals that are not coincident.

F. The apparatus of clause A, wherein a certificate is generated for the random bit string based on the level of violation of the Bell inequality.

Various example implementations of the invention are set out in the appended claims.

What is claimed is:

1. A system for providing a random bit string for use in one or more cryptographic applications, the system comprising:

an electronic processor that executes specific computer-executable instructions stored in a non-transitory memory to provide a two-source randomness extractor and a seeded randomness extractor, wherein the specific computer-executable instructions when executed cause the electronic processor to at least:

receive, by the two-source randomness extractor, from a first source of randomness a first input comprising a first random bit string having an input length, represented by n, a first min-entropy, and a first min-entropy rate;

receive, by the two-source randomness extractor, from a second source of randomness a second input comprising a second random bit string having a second min-entropy and a second min-entropy rate;

generate and output, by the two-source randomness extractor, a third random bit string derived from the first and second random bit strings, the third random bit string having a third min-entropy rate which has been amplified to be greater than at least the first min-entropy rate;

receive, by the seeded randomness extractor, from the second source of randomness, a fourth random bit string having a fourth min-entropy, wherein the fourth min-entropy is less than a third min-entropy of the third random bit string;

receive, by the seeded randomness extractor, the third random bit string as a seed; and generate, by the seeded randomness extractor, a fifth random bit string using the third and fourth random bit strings;

wherein a length of the third random bit string, represented by m, is asymptotically proportional to a sum of the first and second min-entropies minus the input length (n); and wherein the two-source randomness extractor has a complexity of order equal to or less than n×log (n); and a key generation system that receives the fifth random bit string and uses the fifth random bit string to generate a cryptographic key used in encryption or decryption of data.

2. The system of claim 1, wherein the system is configured to receive the first random bit string over a public network from a source which is remote from the system, wherein the system is configured to authenticate communications including the first random bit string received from the source over the public network.

3. The system of claim 1, further comprising a test system comprising a hardware processor that receives the first random bit string and to confirm quantum behavior of the first random bit string using a Bell test to confirm presence of quantum entanglement as part of generation of the first random bit string, wherein the Bell test is evaluated against a Mermin inequality.

4. The system of claim 3, wherein the test system further determines a level of entropy in the first random bit string, and wherein the two-source randomness extractor uses the determined level of entropy to generate the third random bit string having near-perfect entropy.

5. The system of claim 4, wherein the test system is further configured to determine a level of entropy in the first random bit string; and wherein the two-source randomness extractor is configured to use the determined level of entropy to generate the third random bit string having near-perfect entropy.

6. The system of claim 3, wherein the first random bit string is derived from measurement of states prepared by a quantum device.

7. The system of claim 6, wherein each of the states to be measured comprises three qubits, wherein each of the states to be measured is a Greenberger-Home-Zeilinger state.

8. The system of claim 6, wherein the test system is configured to provide a measurement basis to the quantum device for making each state measurement, each measurement basis being taken from a set of multiple possible measurement bases, and wherein the test system uses the measurement bases and outcomes of the respective measurements of the states prepared by the quantum device to confirm quantum behavior in the generation of the first random bit string.

9. The system of claim 6, wherein the test system is configured to perform multiple rounds of measurement of a state prepared by the quantum device, wherein a number of rounds is at least $10^5$, $10^6$, $10^7$ or $10^8$.

10. The system of claim 6, wherein the first source of randomness comprises a quantum processing arrangement configured to run a plurality of quantum circuits on a quantum computer, and wherein the plurality of quantum circuits is customized to run on a given quantum computer.

11. The system of claim 10, wherein a quantum circuit of the plurality of quantum circuits: (i) prepares a state involving multiple qubits; (ii) performs a measurement on the prepared state, the measurement being taken from a set of multiple possible measurements; and (iii) outputs the measurement, comprising measured states of the qubits, at an end of the quantum circuit as a measurement result.

12. The system of claim 1, wherein the two-source randomness extractor is a strong extractor, such that secrecy of the third random bit string, is independent of secrecy of the first random bit string or secrecy of the second random bit string.

13. The system of claim 1, wherein the length (m) of the third random bit string is further proportional to the input length (n), and wherein the third random bit string has near-perfect entropy.

14. The system of claim 13, wherein the near-perfect entropy of the third random bit string is subject to a protocol error which reflects a probability that an adversary could distinguish the third random bit string from a perfectly uniformly random bit string, wherein the probability is less than $2^{-32}$, less than $2^{-64}$, less than $2^{-128}$ or less than $2^{-256}$.

15. The system of claim 1, wherein
multiple fourth random bit strings are used in succession with the seed to produce multiple respective fifth random bit strings.

16. The system of claim 1, wherein the seeded randomness extractor is a strong extractor, such that the fifth random bit string is independent of any one of the third and fourth random bit strings, such that multiple fifth random bit strings are produced from the seed in combination with multiple respective fourth random bits strings without compromising secrecy of the seed, and wherein a number of fifth random bits strings that are produced from the seed is limited by a security parameter.

17. The system of claim 16, wherein the system is configured to save the multiple fifth random bit strings into a database for use in creating cryptographic keys, where the database is included in said system.

18. The system of claim 1, wherein the seed has near-perfect entropy, and wherein the near-perfect entropy of the seed is subject to a protocol error which reflects a probability that an adversary could distinguish the fifth random bit string from a random bit string that is perfectly uniformly distributed, wherein the probability is less than $2^{-32}$, less than $2^{-64}$, less than $2^{-128}$ or less than $2^{-256}$.

19. The system of claim 1, wherein the two-source randomness extractor is implemented using a number theoretic transform (NTT).

20. The system of claim 1, wherein at least one of the two-source randomness extractor and the seeded randomness extractor is implemented as a Dodis type extractor.

21. The system of claim 1, wherein the two-source randomness extractor comprises the seeded randomness extractor or shares an implementation with the seeded randomness extractor.

22. The system of claim 1, wherein the second source of randomness comprises a first private random number generator that produces the second random bit string and outputs the second random bit string to the two-source randomness extractor.

23. The system of claim 22, wherein the system further comprises a second private random number generator that produces the fourth random bit string and outputs the fourth random bit string to the seeded randomness extractor, wherein the second private random number generator is the first private random number generator or shares an implementation with the first private random number generator.

24. The system of claim 23, wherein at least one of the first and second private random number generators comprises at least one of: a weak source of randomness; a source of imperfect randomness; a deterministic source of random numbers; a source of pseudo-random numbers; a source of random numbers that does not exhibit quantum behavior; or any combination thereof.

25. The system of claim 22, wherein at least one of the second random bit string and the fourth random bit string is produced by a block min-entropy source, wherein each block, comprising a fixed number of bits in the random bit string, has a certain amount of min-entropy, even when conditioned on an adversary knowing all previous blocks and having a complete model of operation of the block min-entropy source.

26. The system of claim 25, and wherein the block min-entropy source is a Santha-Vazirani source.

27. The system of claim 1, wherein the system is implemented within at least one of a trusted execution environment and a separate hardware module or separate chip of a computer.

28. A method of operating a system for providing a random bit string for use in one or more cryptographic applications, wherein the method comprises, by an electronic processor that executes specific computer-readable instructions stored in a non-transitory memory:

configuring a two-source randomness extractor to at least:

receive a first input comprising a first random bit string having an input length, represented by n, and first min-entropy and first min-entropy rate;

receive a second input comprising a second random bit string having a second min-entropy and second min-entropy rate;

generate and output a third random bit string derived from the first and second random bit strings, the third random bit string having a third min-entropy rate which has been amplified to be greater than both the first min-entropy rate and the second min-entropy rate;

receive a fourth random bit string; and generate a fifth random bit string using the third random bit string and the fourth random bit string; and configuring a key generation system to at least:

receive the fifth random bit string; and use the fifth random bit string to generate a cryptographic key used in encryption or decryption of data;

wherein a length of the third random bit string, represented by m, is asymptotically proportional to a sum of the first min-entropy and the second min-entropy, minus the input length (n); and wherein the two-source randomness extractor has a complexity of order equal or less than n log (n).

29. The method of claim 28, further comprising configuring a test system to receive the first random bit string to perform a test to confirm quantum behavior in generation of the generation of the first random bit string.

30. The method of claim 29, wherein the two-source randomness extractor is a strong two-source randomness extractor, such that output of the strong two-source randomness extractor, namely the third random bit string, is independent of any one of the first and second random bit strings, such that either the first random bit string or the second random bit string could be made public without compromising secrecy of the third random bit string.

31. The method of claim 30, wherein the third random bit string has near-perfect entropy.

32. The method of claim 28, further comprising configuring a seeded randomness extractor to:

receive as a seed a first input comprising the third random bit string output by the two-source randomness extractor;

receive a second input comprising the fourth random bit string having a fourth min-entropy, wherein the fourth min-entropy is less than a third min-entropy of the third random bit string; and generate and output the fifth random bit string derived from the third and fourth random bit strings, wherein multiple fourth random bit strings are used in succession with the seed to produce multiple respective fifth random bit strings.

33. The method of claim 32, wherein the seeded randomness extractor is a strong extractor, such that secrecy of the fifth random bit string, is independent of any one of the third and fourth random bit strings, such that multiple fifth random bit strings are produced from the seed in combination with multiple respective fourth random bits strings without compromising secrecy of the seed, and wherein a number of fifth random bits strings that are produced from the seed is limited by a security parameter.

34. The method of claim 32, wherein configuring the seeded randomness extractor comprises implementing the seeded randomness extractor using a number theoretic transform (NTT) that has a complexity of an order equal or less than n log (n).

35. The method of claim 28, the two-source randomness extractor generates the third random bit string at a rate larger than 10 Mbits/sec.

36. The method of claim 28, wherein the two-source randomness extractor uses circulant matrices to compute and output the third random bit string.

37. The method of claim 28, wherein configuring the two-source randomness extractor comprises implementing the two-source randomness extractor using a number theoretic transform (NTT).

38. The method of claim 28, wherein the first input is received from a first source of randomness having a guessing probability, represented by p1, the second input is received from a second source of randomness having a guessing probability, represented by p2, and the third random bit string has a security parameter ($\Sigma_{SEC}$) greater than zero, and m is substantially equal to:

$$\frac{1}{5}\left[-\log(p1 \times p2) - \log \varepsilon_{sec}^{-8} + 10 - 4\log 3\right] - \frac{n}{5}.$$

39. The system of claim 1, wherein the first source of randomness has a guessing probability, represented by p1, the second source of randomness has a guessing probability represented by p2, the third random bit string has a security parameter ($\Sigma$SEC) greater than zero, and m is substantially equal to:

$$\frac{1}{5}\left[-\log(p1 \times p2) - \log \varepsilon_{sec}^{-8} + 10 - 4\log 3\right] - \frac{n}{5}.$$

40. The system of claim 1, wherein m is asymptotically proportional to the sum of the first and second min-entropies minus the input length (n) as n increases.

41. The system of claim 28, wherein m is asymptotically proportional to the sum of the first and second min-entropies minus the input length (n) as n increases.

* * * * *